(12) United States Patent
Dayrell

(10) Patent No.: US 12,344,472 B2
(45) Date of Patent: Jul. 1, 2025

(54) ADVANCED WAREHOUSE AND LOGISTIC SYSTEMS USING AUTONOMOUS MOBILE LIFT ROBOTS

(71) Applicant: Ivan Araujo Dayrell, Belo Horizonte MG (BR)

(72) Inventor: Ivan Araujo Dayrell, Belo Horizonte MG (BR)

( * ) Notice: Subject to any disclaimer, the term of this patent is extended or adjusted under 35 U.S.C. 154(b) by 1012 days.

(21) Appl. No.: 17/384,720

(22) Filed: Jul. 24, 2021

(65) Prior Publication Data

US 2021/0347569 A1 Nov. 11, 2021

Related U.S. Application Data

(63) Continuation-in-part of application No. 15/970,607, filed on May 3, 2018, now Pat. No. 11,104,547.

(60) Provisional application No. 62/501,201, filed on May 4, 2017.

(51) Int. Cl.
  *B65G 1/04* (2006.01)
  *B65G 1/06* (2006.01)
  *B65G 1/10* (2006.01)

(52) U.S. Cl.
  CPC ......... *B65G 1/0492* (2013.01); *B65G 1/0471* (2013.01); *B65G 1/065* (2013.01); *B65G 1/10* (2013.01); *B65G 2201/0267* (2013.01)

(58) Field of Classification Search
  CPC .... B65G 1/0492; B65G 1/0471; B65G 1/065; B65G 1/10; B65G 2201/0267
  See application file for complete search history.

(56) References Cited

U.S. PATENT DOCUMENTS 7,381,022 B1\* 6/2008 King .................... B65G 1/1375
  414/807
2009/0074545 A1\* 3/2009 Lert, Jr. ............... B65G 1/1378
  414/267

\* cited by examiner

*Primary Examiner* — Saul Rodriguez
*Assistant Examiner* — Willie W Berry, Jr.
(74) *Attorney, Agent, or Firm* — Z IP Law PLLC

(57) ABSTRACT

An advanced warehouse and logistic system having a hinged rack lattice structure that allows multiple autonomous mobile lift robots to move independently through the hinged rack structure to move goods and load trucks and other vehicles. The autonomous mobile lift robot of the present invention comprising a plurality of driving trains having a first gear mounted perpendicularly to a second gear to have the autonomous mobile lift robot be movable in an up, down, left, and right direction through the hinged rack depending on the geometry of the hinged rack lattice structure.

20 Claims, 58 Drawing Sheets

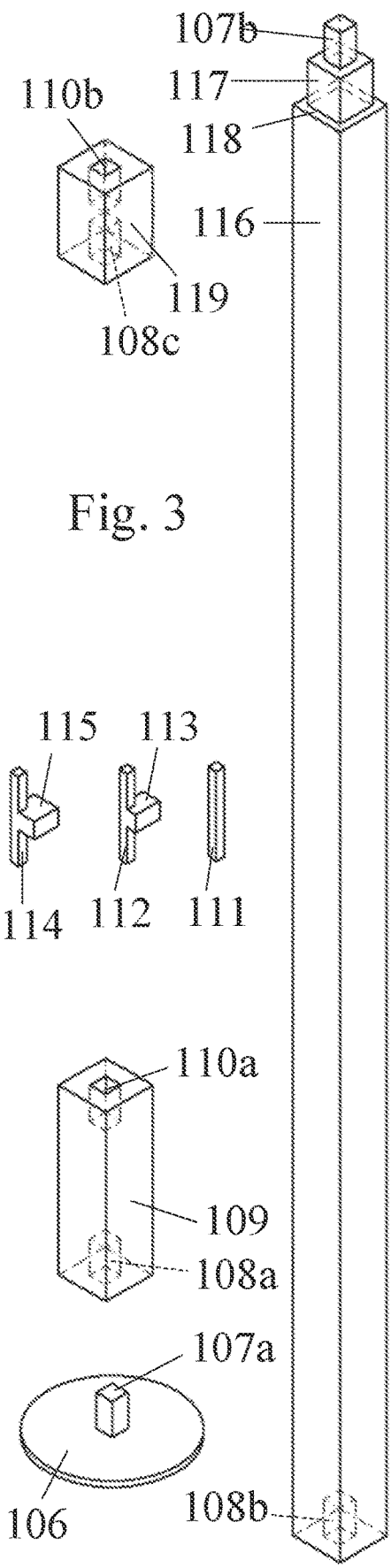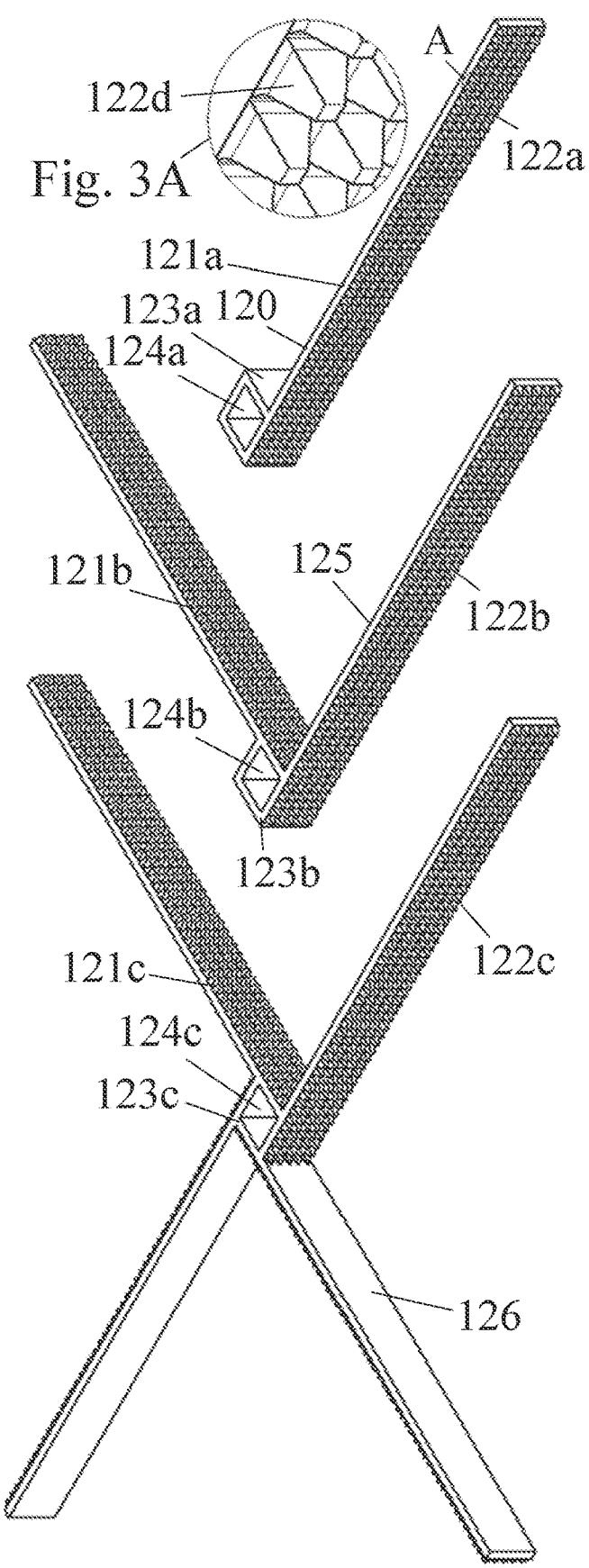
Fig. 3
Fig. 3A

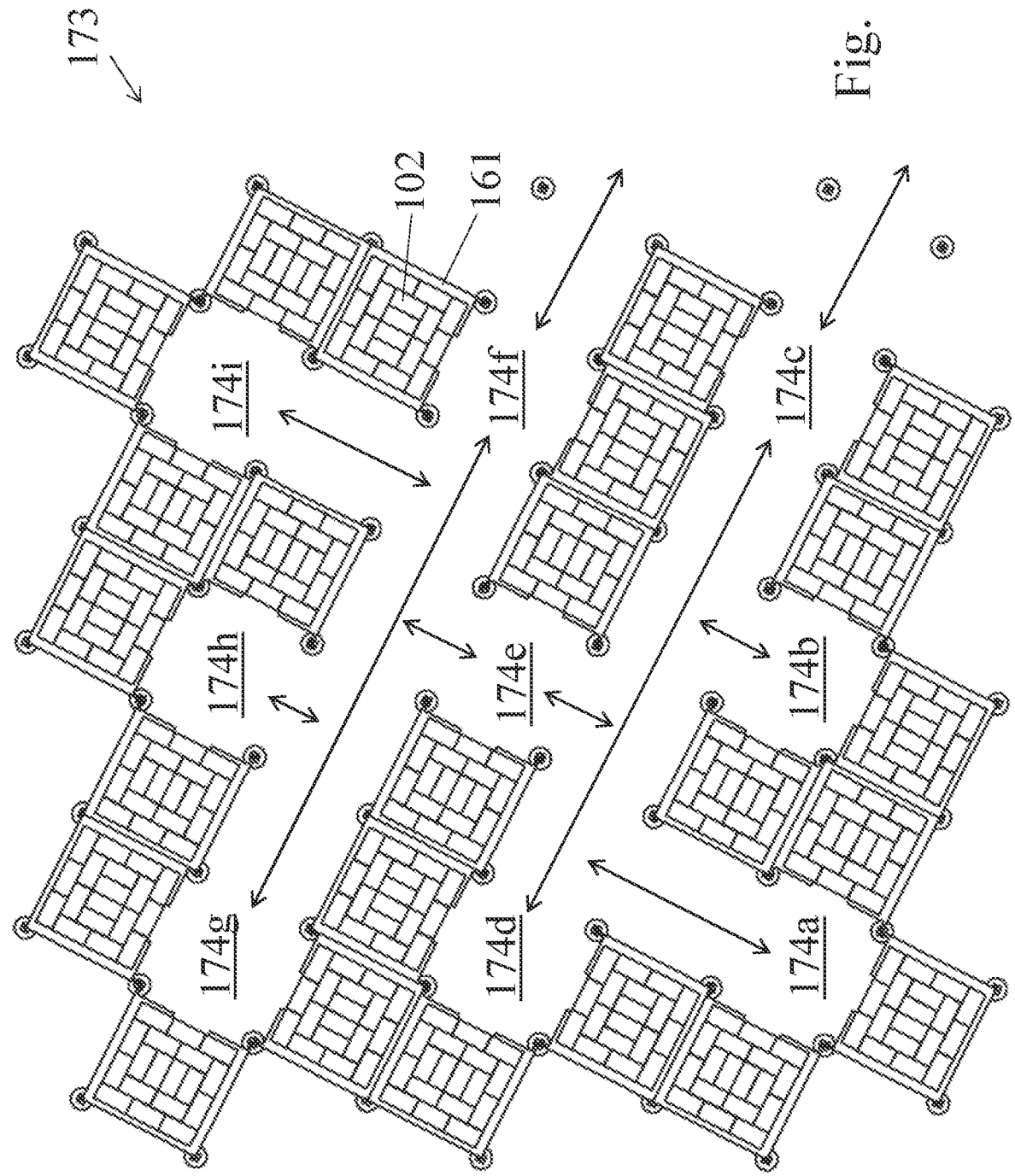

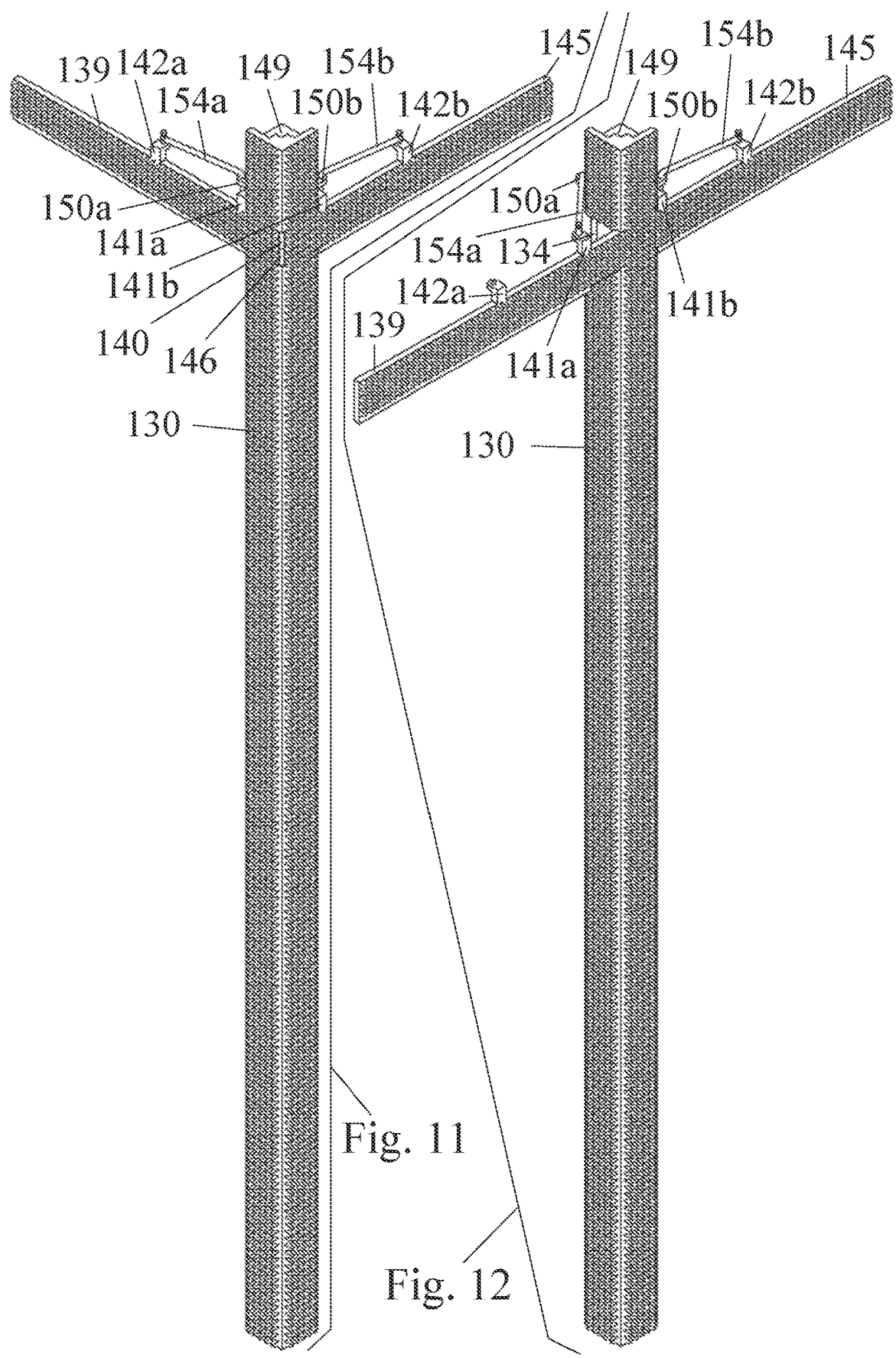

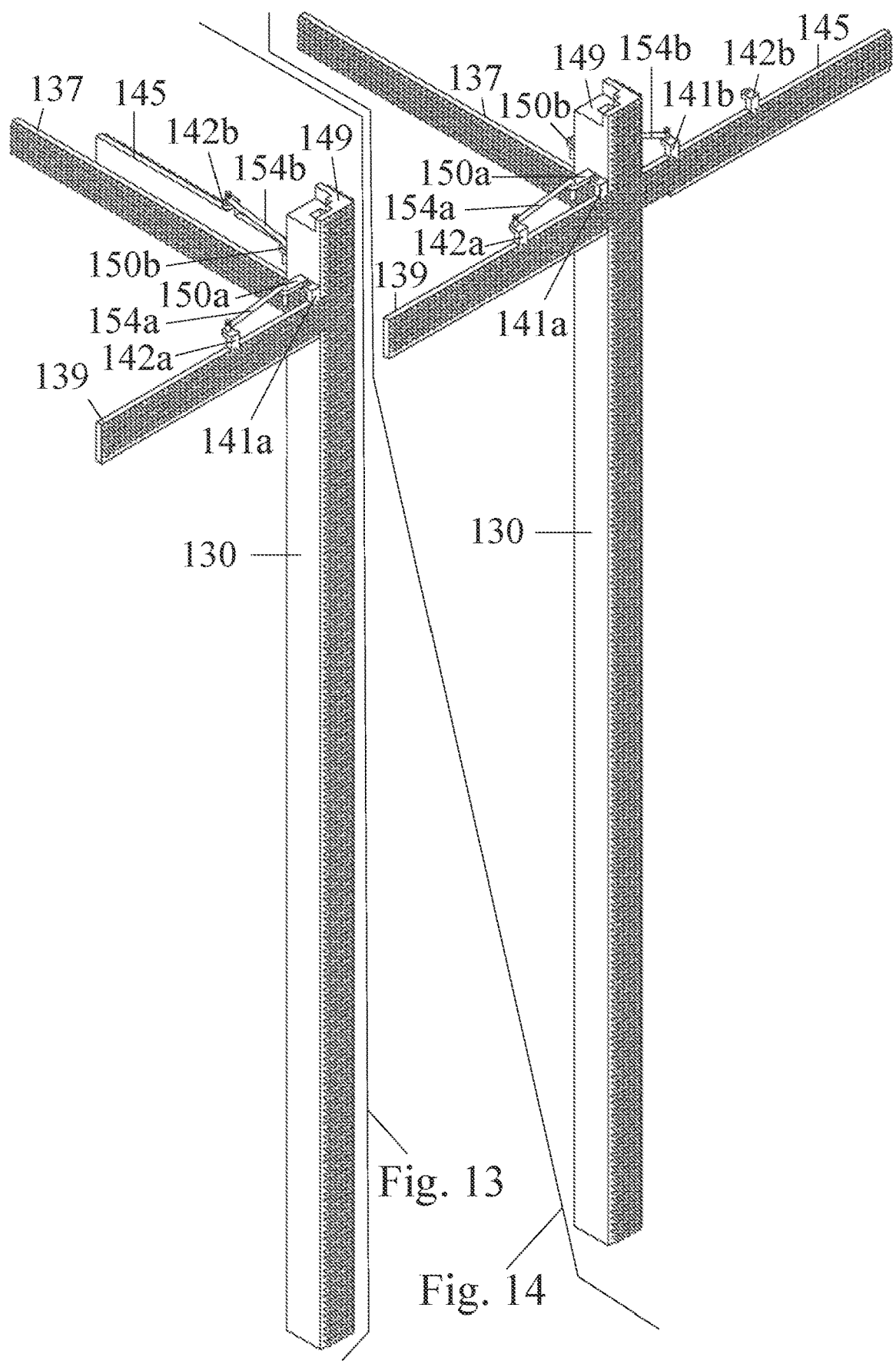

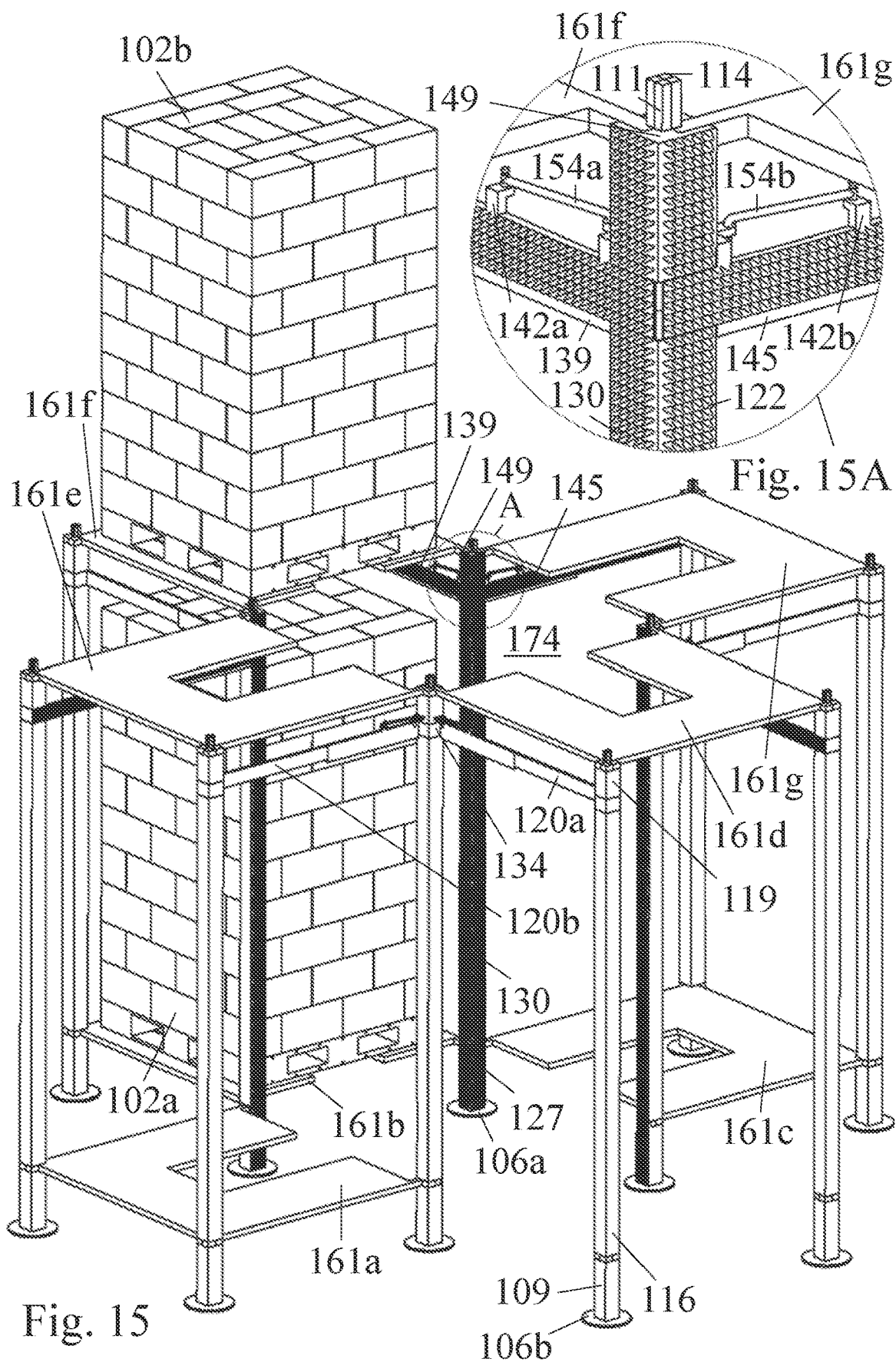

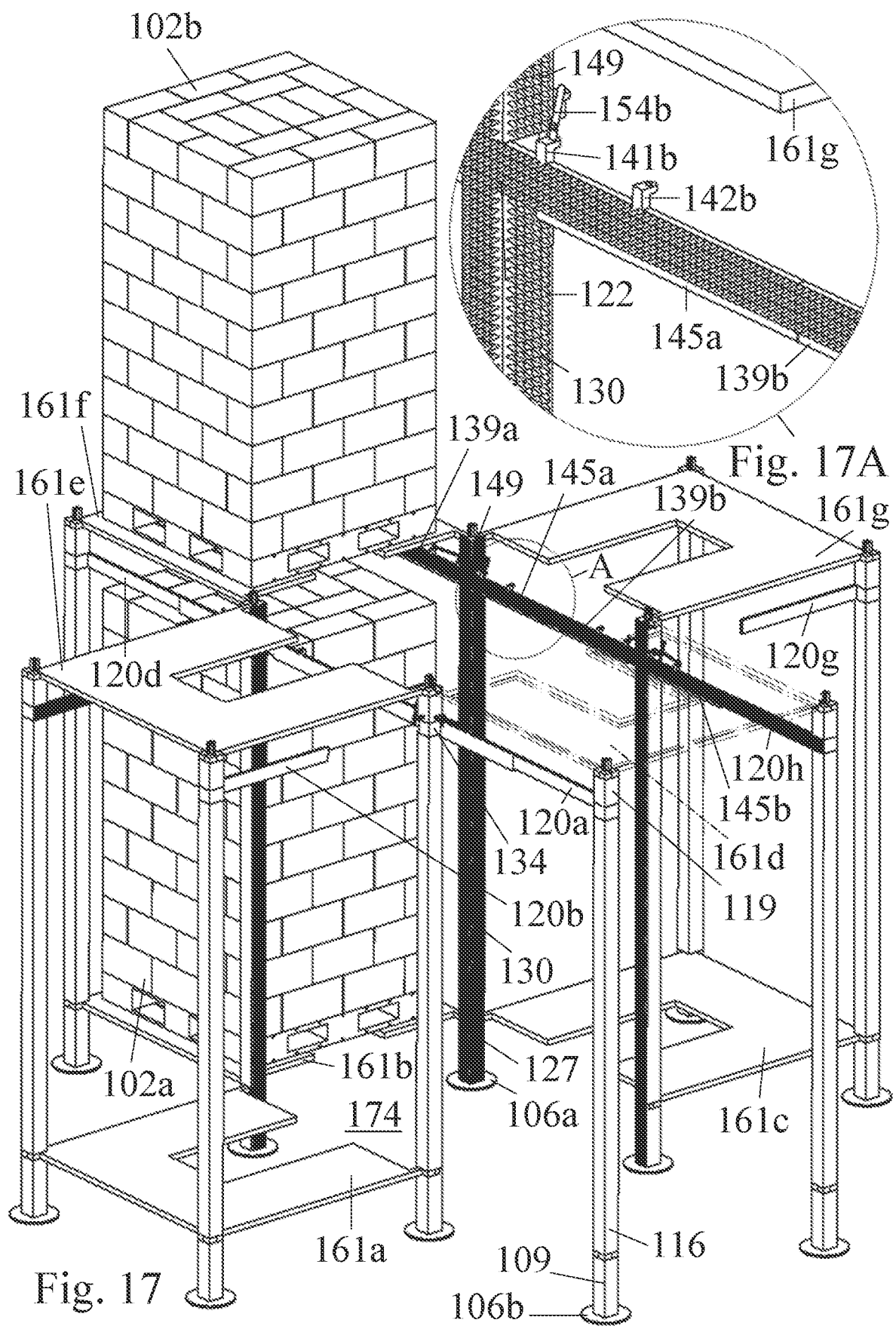

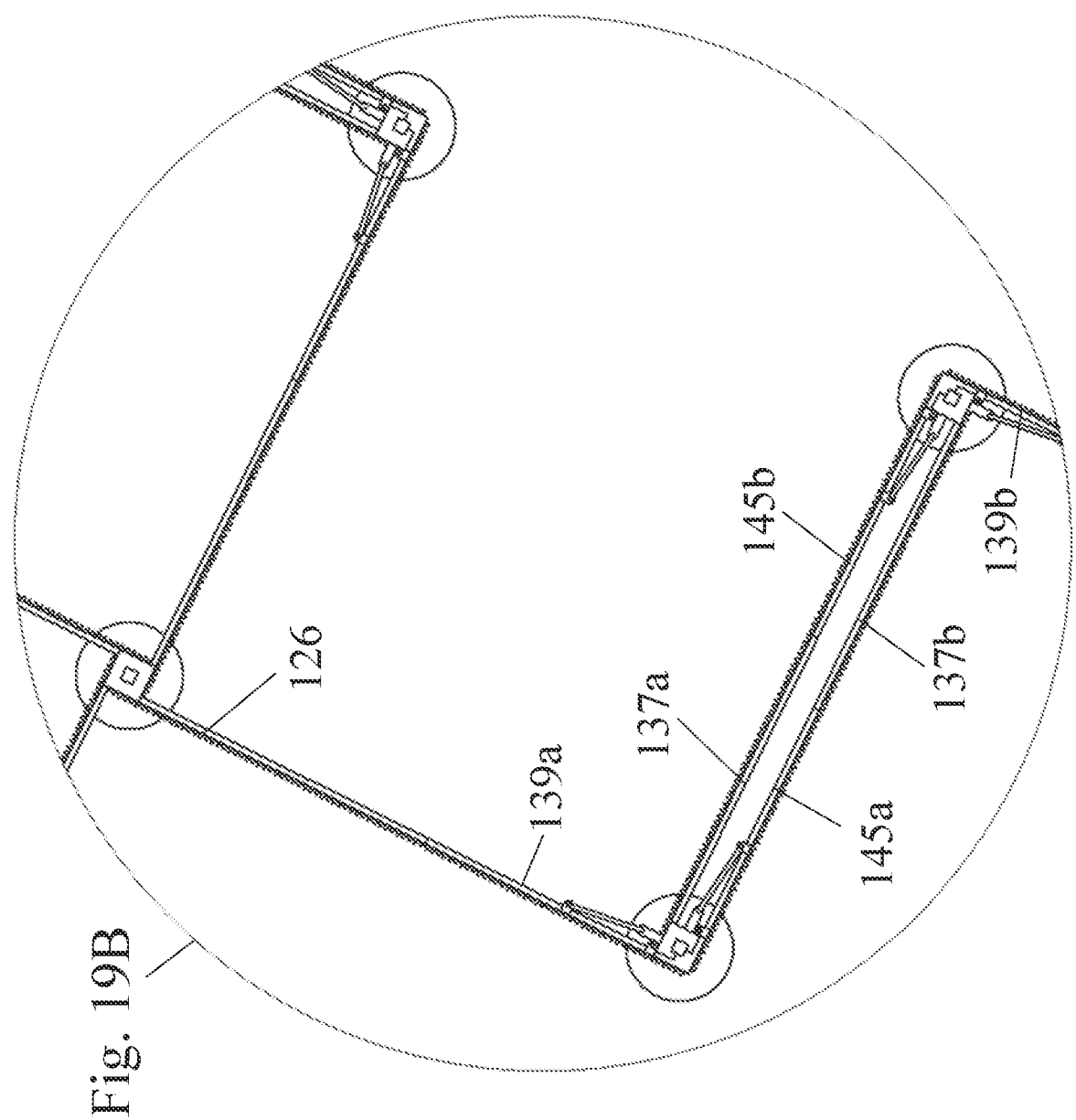

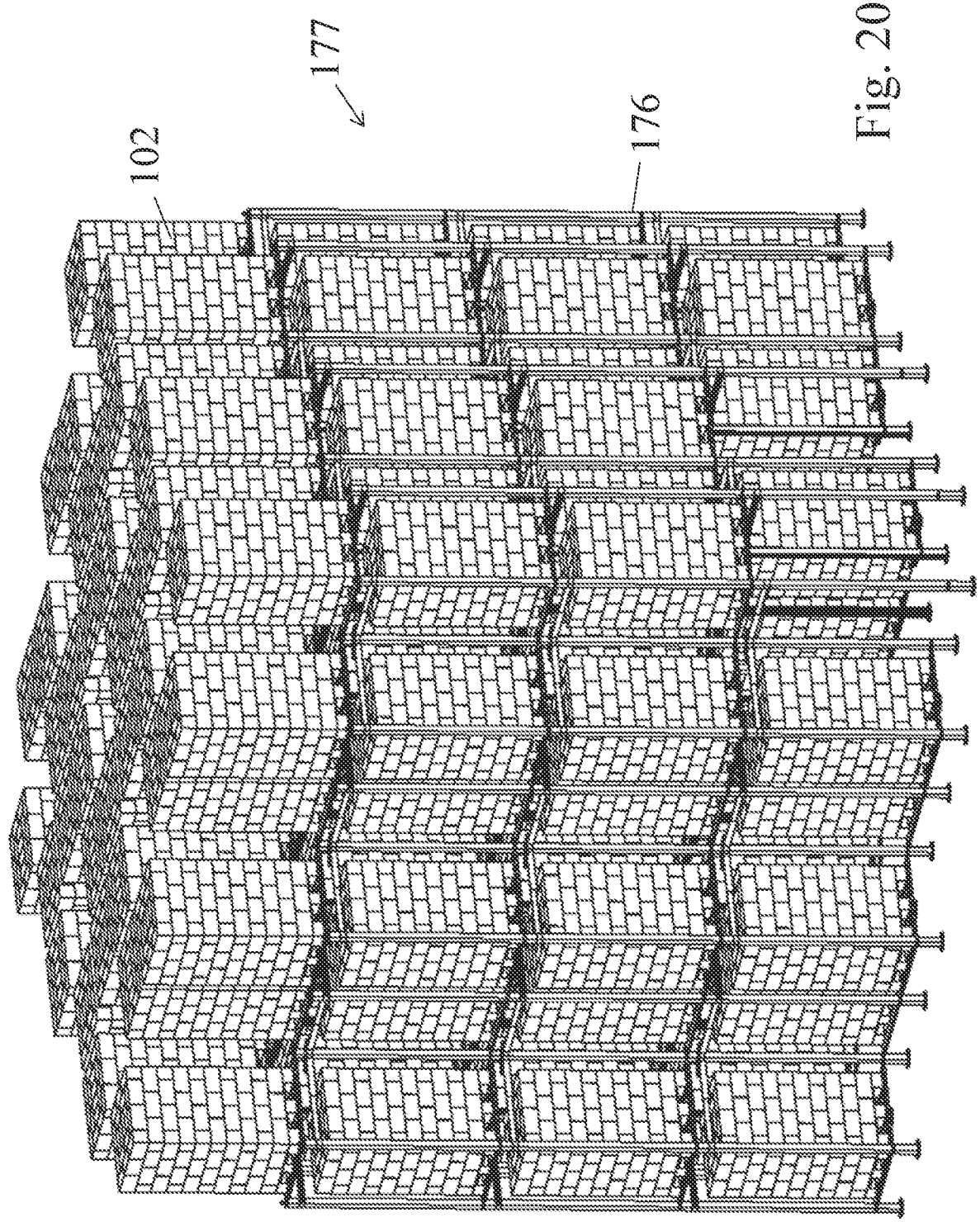

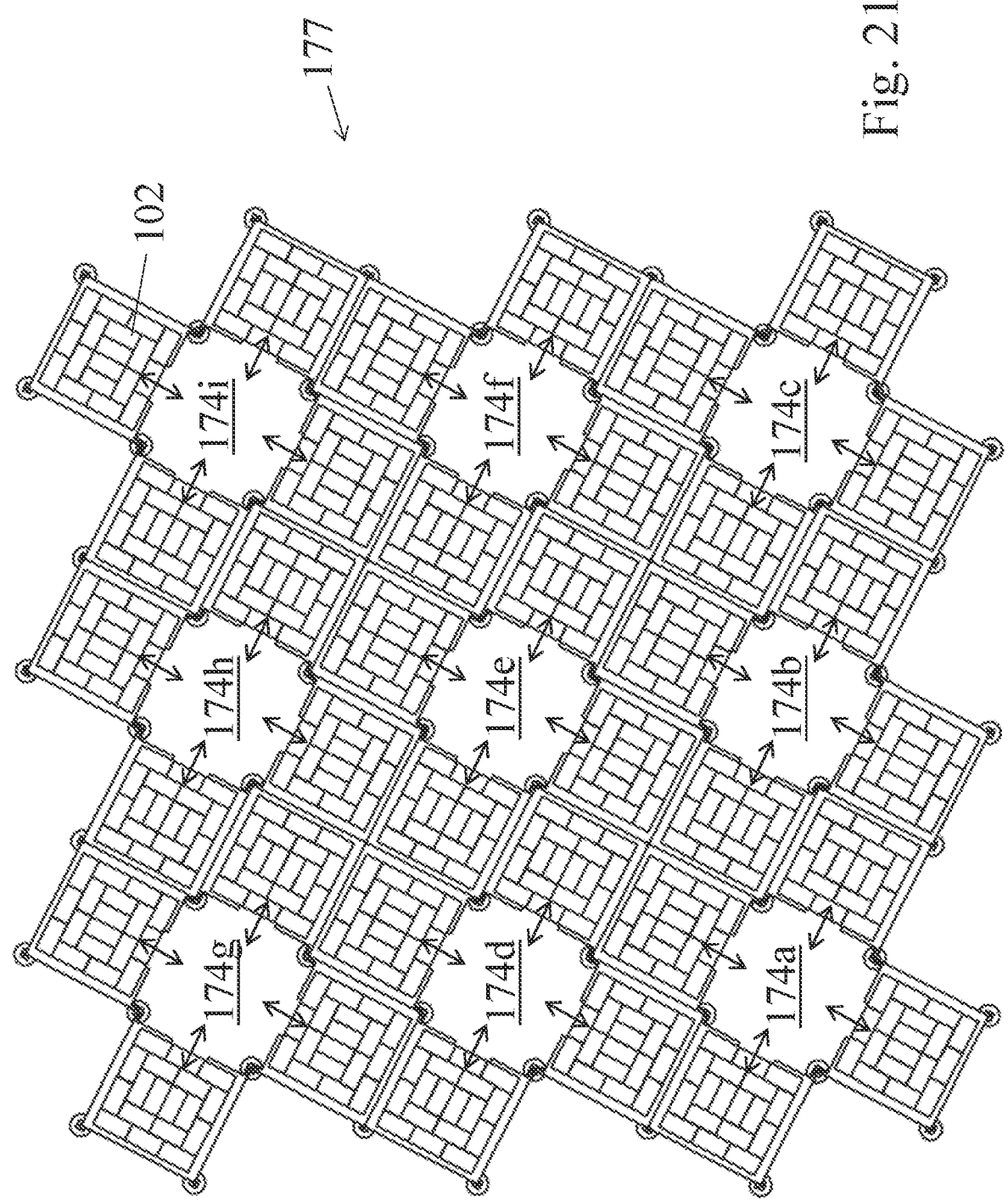

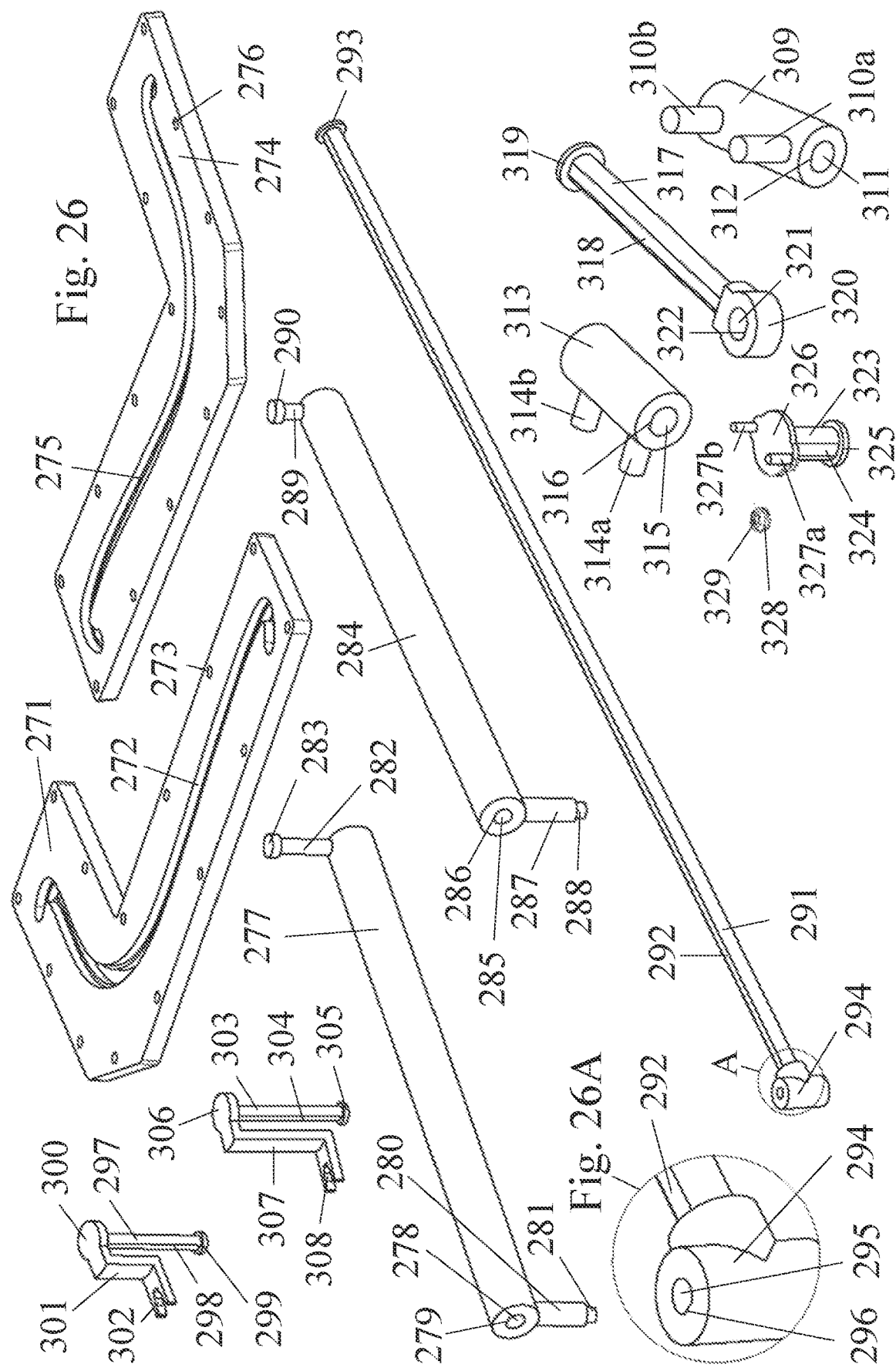

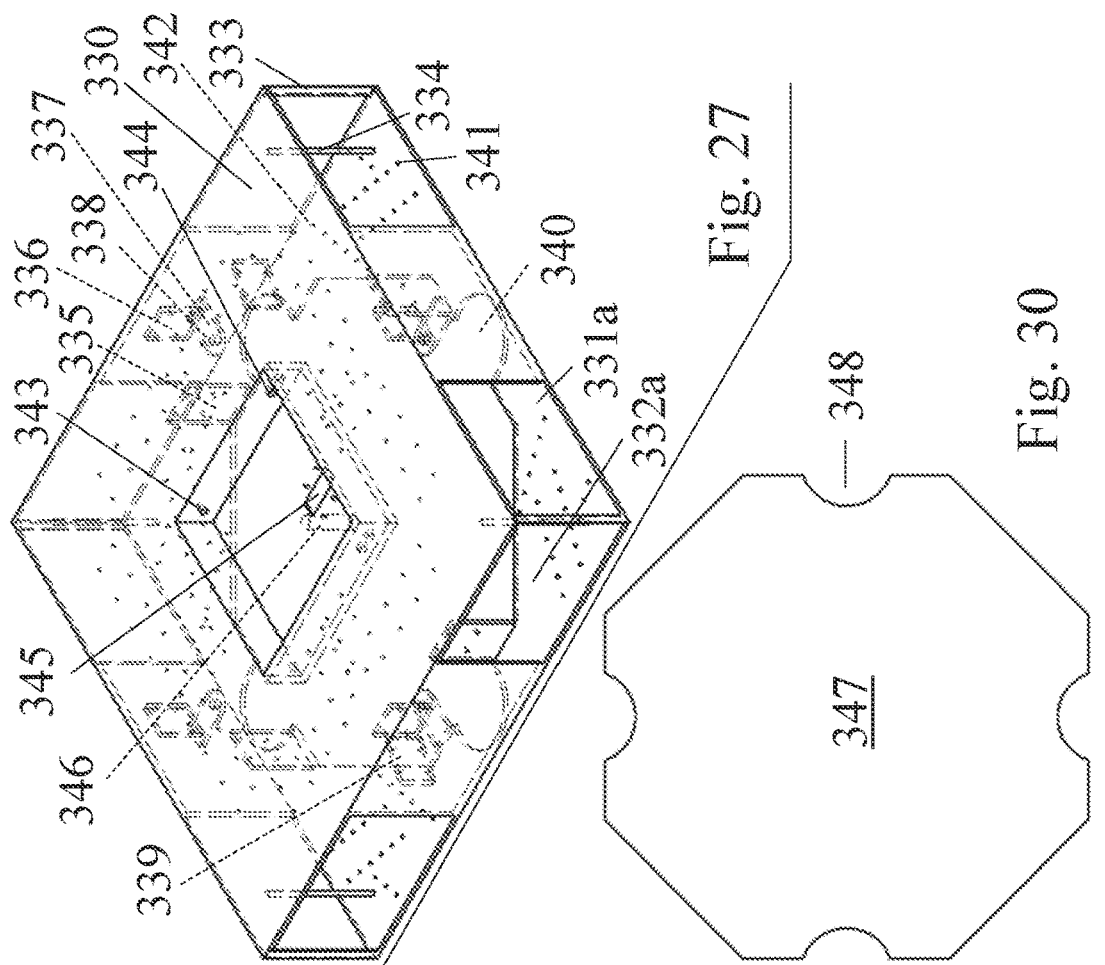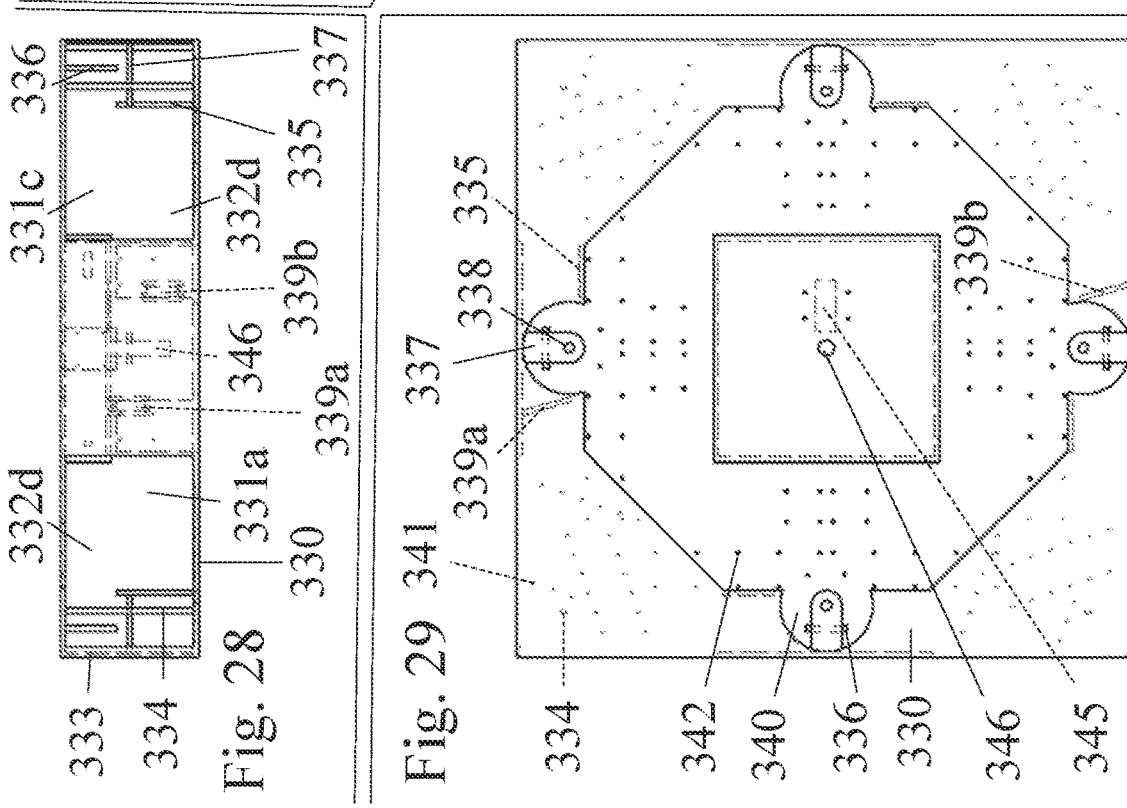

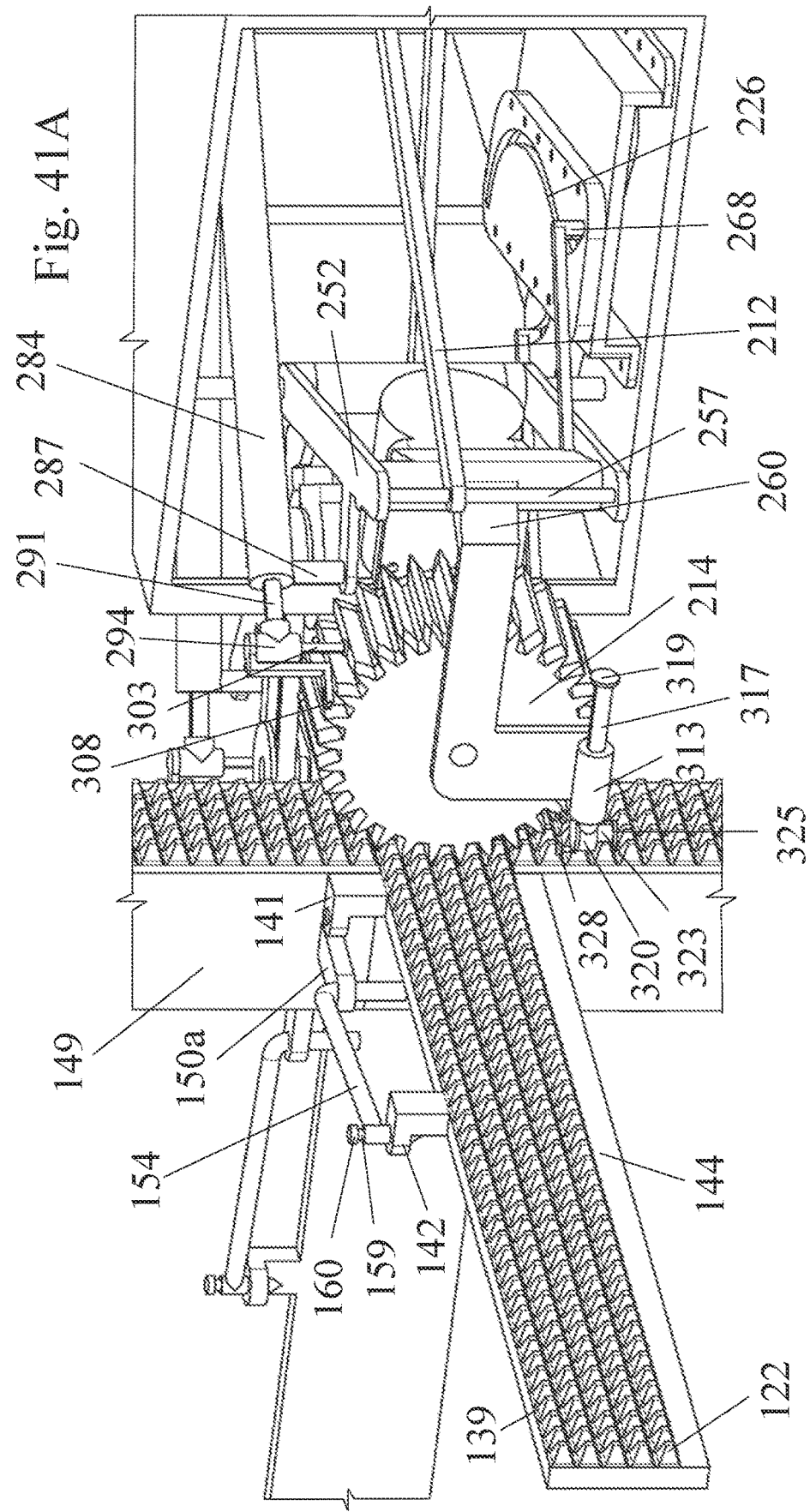

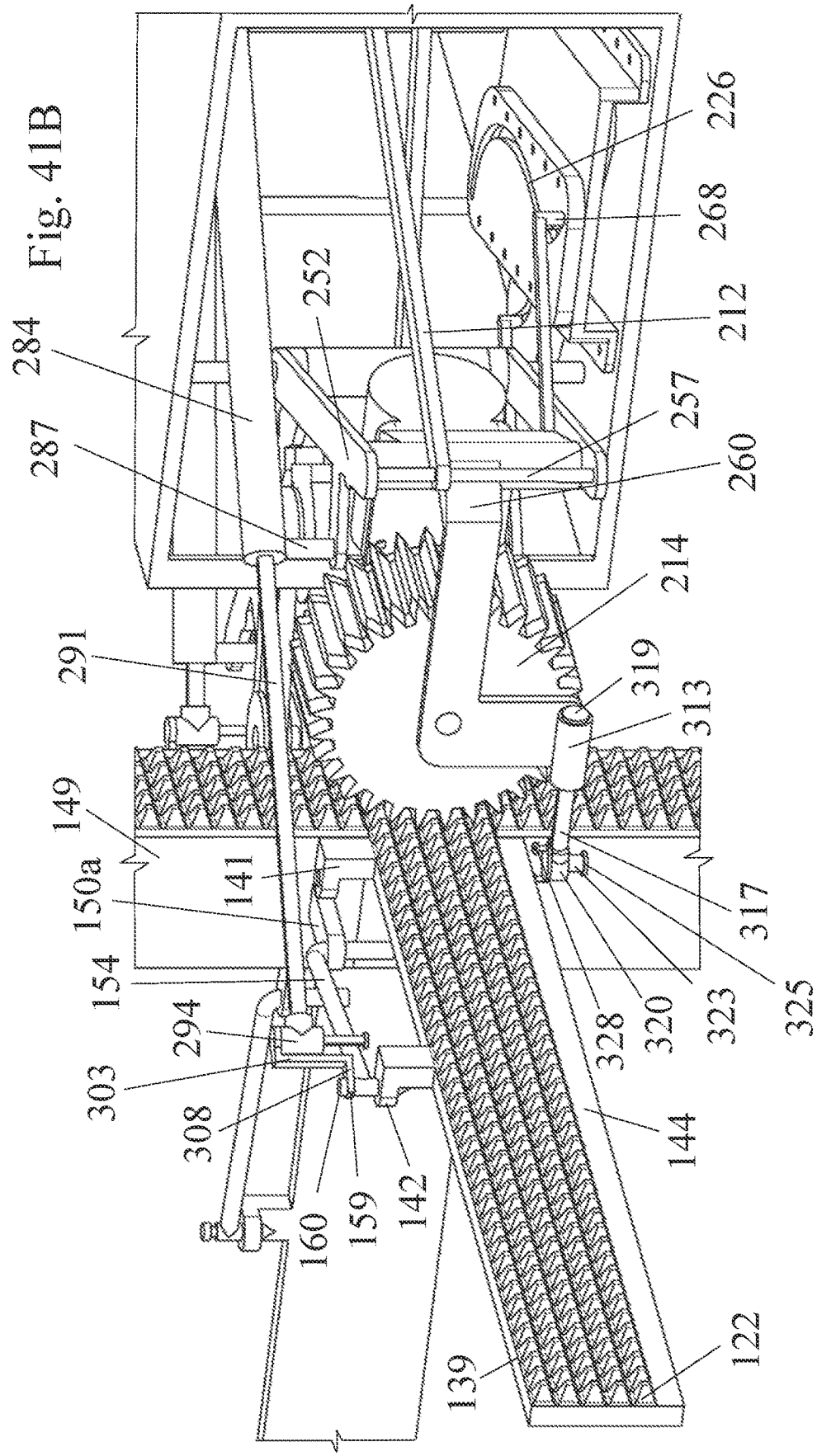

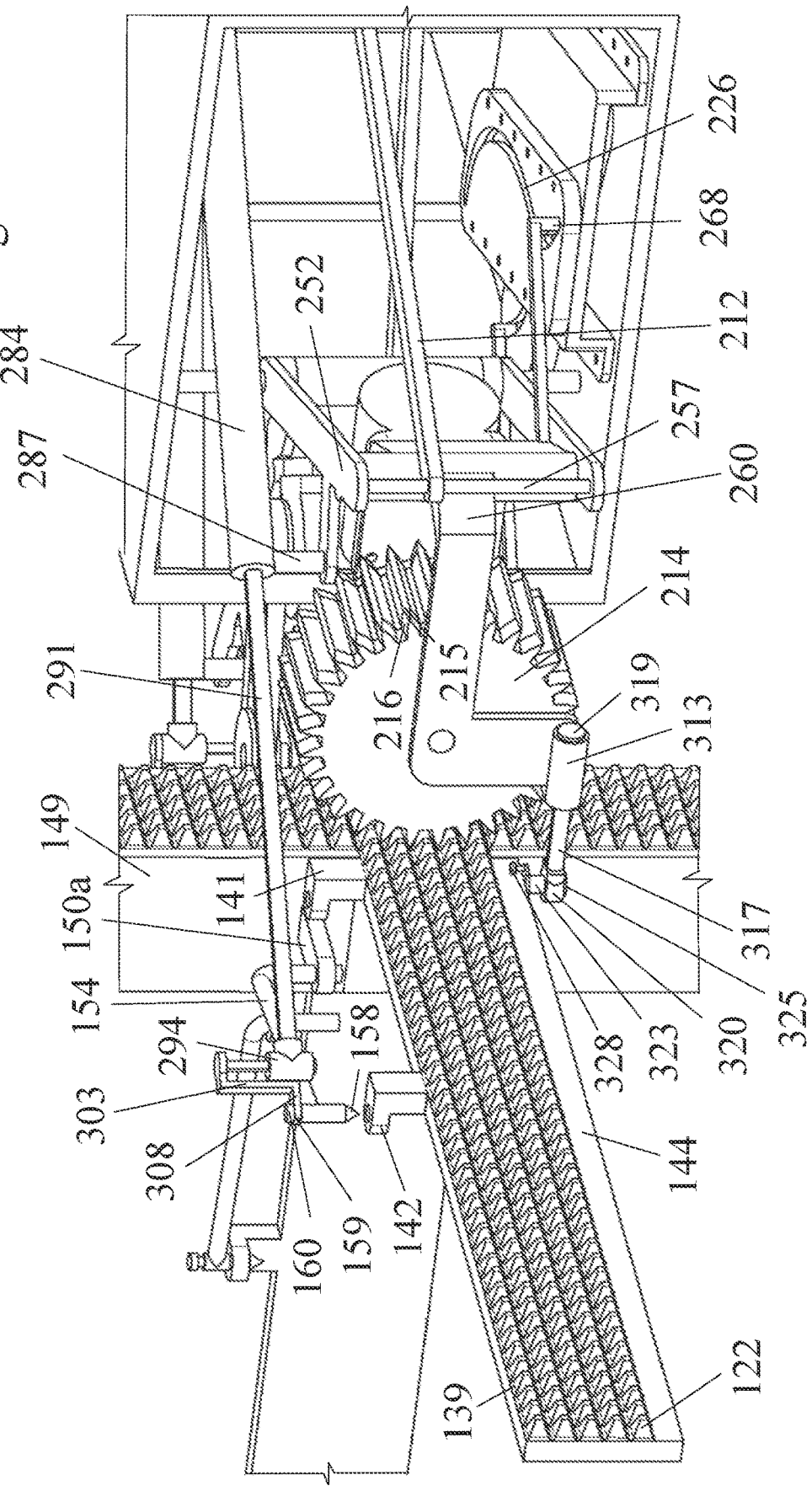

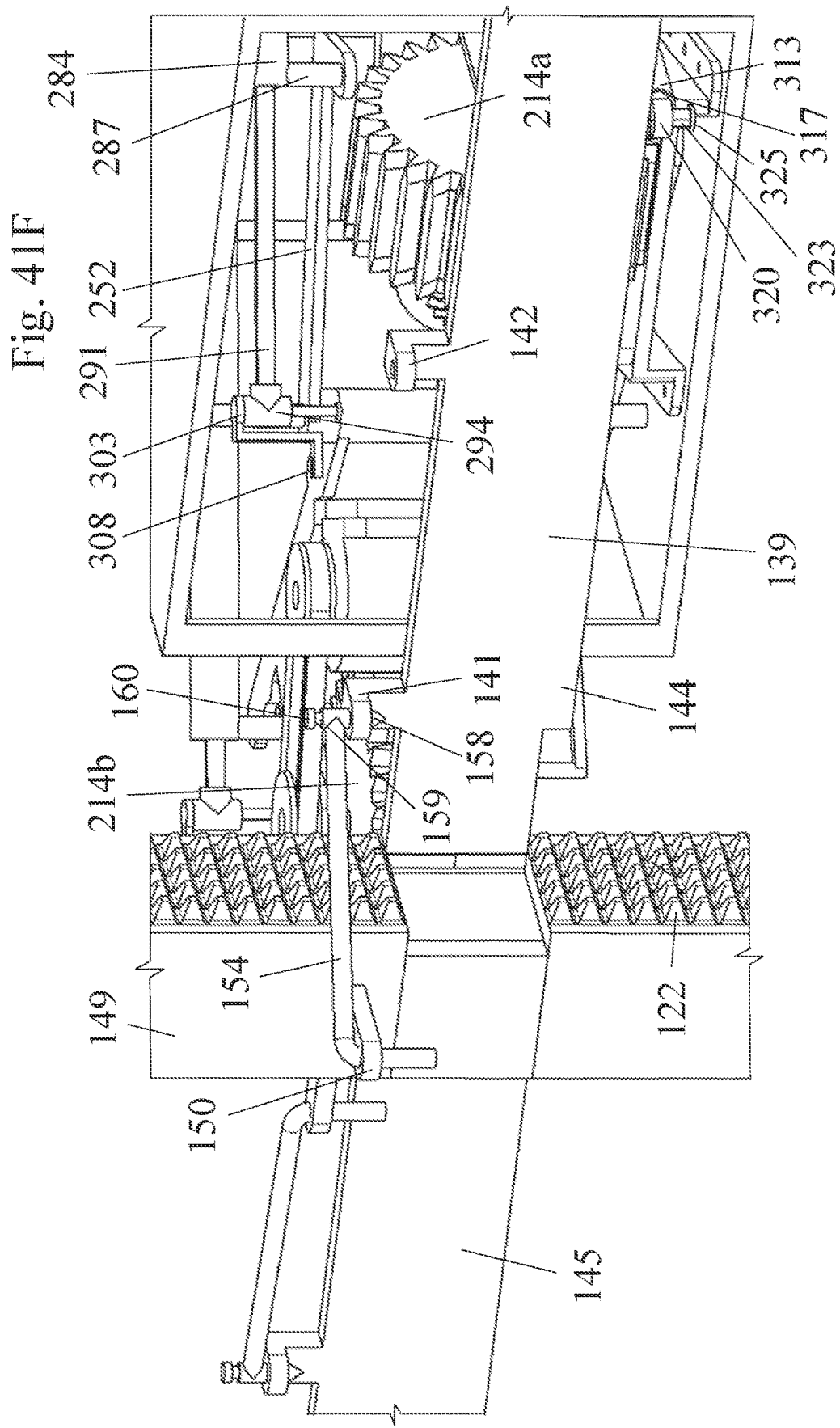

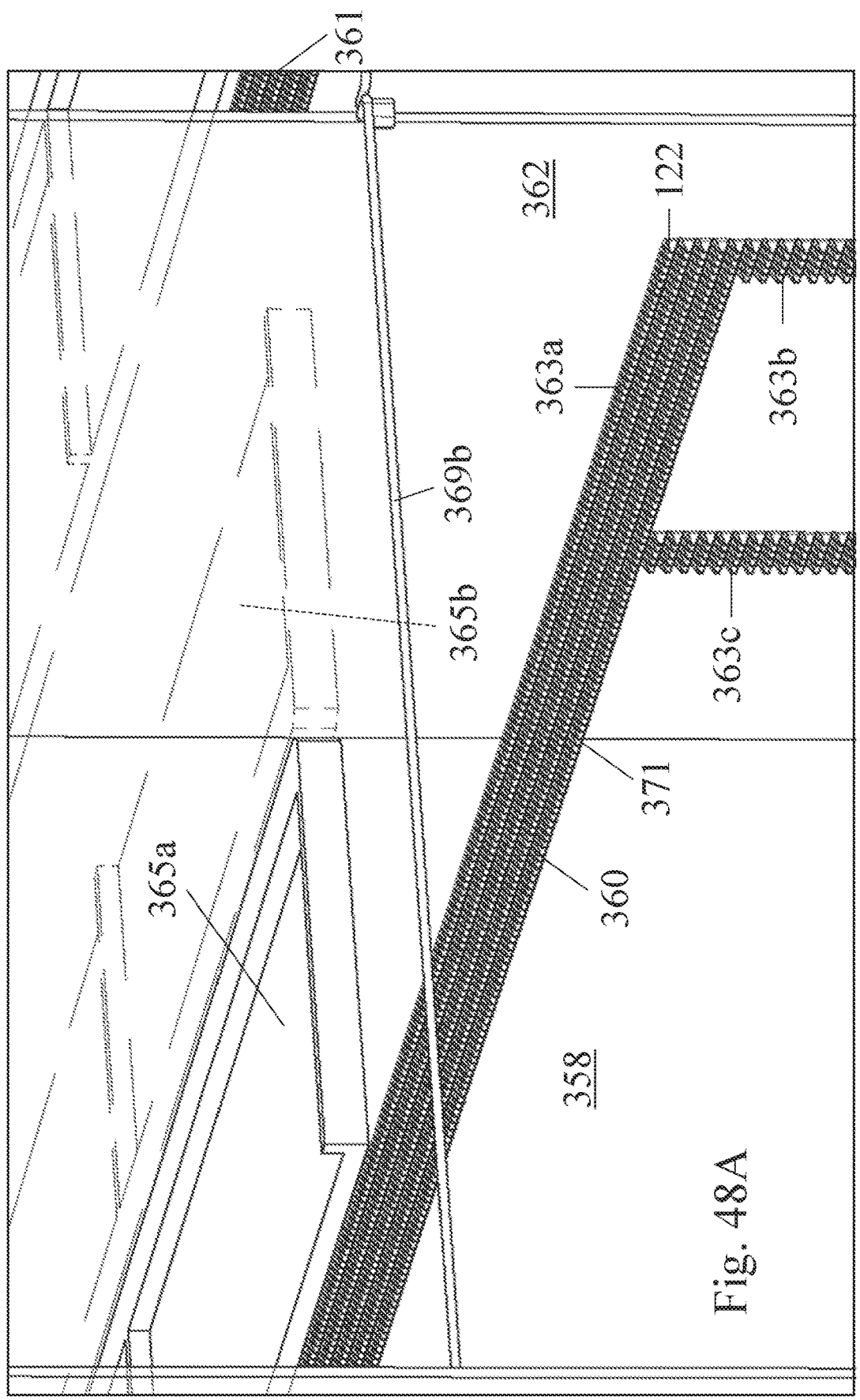

ADVANCED WAREHOUSE AND LOGISTIC SYSTEMS USING AUTONOMOUS MOBILE LIFT ROBOTS

FIELD OF THE INVENTION

The present invention is related to the storage and movement of goods in a warehouse and the logistics to load them into trucks and other vehicles and more specifically to an advanced warehouse and logistic system having a hinged rack lattice structure that allows multiple autonomous mobile lift robots to move independently through the hinged rack structure to move goods and load trucks and other vehicles. The autonomous mobile lift robot of the present invention comprising a plurality of driving trains having a first gear mounted perpendicularly to a second gear to have the autonomous mobile lift robot be movable in an up, down, left, and right direction through the hinged rack depending on the geometry of the hinged rack lattice structure.

BACKGROUND

The storage of goods in warehouses is central to the modern society and has allowed the flourishment of e-commerce. Gains in efficiency and speed have increased the availability of a wide variety of goods at affordable prices.

The steady and continuing increase of automation is a recent trend that has not yet reached its full potential. Wholesale and retail companies are constantly looking for an edge in efficiency and cost reduction to face ever more fierce competition.

The current state-of-the-art warehouse design and associated automatic retrieving and movement robots offers a substantial advantage when compared to a traditional warehouse with no automation but is still inefficient in many ways and has many weak points that can be improved.

The available technologies for pallet storage and movement require the use of different machines: forklifts are used to load and unload trucks; robots are used to move the pallets inside the warehouse; and fixed shelf row robots are used to place the pallets in their designated spots. This requires the exchange of pallets from one machine to another and may cause delays, damage and mistakes. Additionally, maintenance costs to service different machines are higher, capital costs are high due to the need to set up fixed robots for each shelf row using up valuable floor space, and efficiency is low as each shelf row robot can typically handle only one pallet at a time.

A better solution that reduces floor space wasted with fixed machines and allows the storage of more pallets loaded with goods for a given warehouse volume, and a single robot that can handle the pallets seamlessly from inside the truck all the way to its designated storage spot at a greater speed is needed. Additionally, the warehouse design must allow for the simultaneous handling of a large number of trucks loading and unloading goods without producing choke points inside the warehouse.

SUMMARY OF THE INVENTION

Technical Problem

The existing warehouse designs of the prior art require large areas for the installation of fixed shelf row robots with the movement of loaded robots and/or forklifts wasting valuable floor space and increasing capital costs.

The shelf row robots can typically handle only one pallet at a time, this produces a choke point that seriously limits the capacity to service multiple trucks loading and unloading at a given time.

Loaded and unloaded robots and/or forklifts require space to maneuver inside the warehouse and additional floor space is required to avoid choke points.

The multiple transfers from one machine to another causes delays and requires intermediate storage places that take yet more floor space, further reducing efficiency and increasing costs.

The traditional warehouse design of the prior art allows for the loading and unloading of trucks typically only in one or two sides of the building, requiring the trucks to be parked side by side. The trucks parked at the end of the truck bay take longer to load and unload than the trucks near the center of the truck bay as the robots need to travel further to collect or deliver the goods.

The use of forklifts to load and unload trucks may cause damage to the pallets and goods caused by human error or tipping.

Technical Solution

An object and advantage of the present invention is a new warehouse design that eliminates the need for fixed robots and forklifts and as a result increases floorspace usage, being able to hold more pallets of goods for a given volume than existing designs.

Another object of the present invention is a shelf design that allows for autonomous mobile lift robots to climb access shafts and reach any storage location without blocking the entire shaft, increasing efficiency, and allowing multiple storage spots to be reached at the same time by different autonomous mobile lift robots in the same shaft.

Another object and advantage of the present invention is a single autonomous mobile lift robot that is configured to pick up, move, and place pallets inside trucks, move inside the warehouse floor and climb the access shafts to take or deposit the pallets on their designated storage spots.

Another object of the present invention is a shelf design within a truck that allows for multiple autonomous mobile lift robots to enter and leave in succession in such a way that all pallets of a given shelf level are loaded or unloaded simultaneously in one operation. The last autonomous mobile lift robot to enter the truck is the first to leave after the pallets are loaded or unloaded.

Another object of the present invention is one or more software applications configured to control the movement of the autonomous mobile lift robots inside the warehouse and in and out of the trucks to maximize efficiency.

Advantageous Effects of the Invention

The proposed invention increases efficiency of the warehouse operation in multiple dimensions.

The warehouse is able to hold a higher number of goods in a smaller area when compared with the traditional warehouse design of the prior art, allowing for better usage of existing space.

The warehouse design allows for trucks to be parked at any place around the warehouse building at the same average distance to the warehouse shelves reducing travel distance between the truck and the warehouse shelves and maximizing loading and unloading speed.

The rack structure shelf design is simple, flexible and modular, allowing for easy expansion and modifications in the layout. Rack structure shelves of different heights can be used with the same equipment.

Additional levels of rack structure shelves can be built on top of an existing operating structure expanding the installed capacity of the warehouse without disturbing the normal operation in any way.

A single autonomous mobile lift robot design is used for all operations, simplifying the operations, reducing maintenance costs, and eliminating the need to transfer cargo from one machine such as a robot and/or forklift to another.

Multiple autonomous mobile lift robots can work simultaneously to accomplish one loading operation, reducing the time it takes to load or unload a truck.

Standardization and reduction of the number of components reduces the cost of equipment and the cost of maintenance.

The warehouse design of the present invention allows for a high number of autonomous mobile lift robots to perform several loading operations and/or unloading operations simultaneously without producing choke points thereby maximizing speed and efficiency.

The present invention is related to an advanced warehouse and logistic system, comprising a rack lattice having a plurality of hinged racks configured to set the geometry of the rack lattice; an autonomous mobile lift robot having a plurality of driving trains, the autonomous mobile lift robot configured to be movable along the rack lattice in an up, down, left, and right direction depending on the geometry of the rack lattice; and wherein the geometry of the rack lattice sets the direction of movement of the autonomous mobile lift robot. In embodiments of the advanced warehouse and logistic system of the present invention a hinged rack of the plurality of hinged racks comprises an internal lock fixture configured to lock the hinged rack in a first position to set the geometry of the rack lattice for movement of the autonomous mobile lift robot in a first direction; an external lock fixture configured to lock the hinged rack in a second position to set the geometry of the rack lattice for movement of the autonomous mobile lift robot in a second direction; and a lock bar configured to set the hinged rack in either the first position or the second position. In embodiments of the advanced warehouse and logistic system of the present invention, the autonomous mobile lift robot comprises an actuator arm configured to move the lock bar from the first position to the second position to set the geometry of the rack lattice. In embodiments of the advanced warehouse and logistic system of the present invention, the rack lattice comprises a plurality of rack poles, each rack pole having frustum shaped teeth, the rack pole configured to support one or more components of the rack lattice. In some embodiments each rack pole has a hinge pin configured to support and pivot one of the plurality of hinged racks. In some embodiments each rack pole has at least one dovetail notch configured for the attachment of a fixed rack having a dovetail pin. In embodiments of the advanced warehouse and logistic system of the present invention, each of the plurality of hinged racks of the rack lattice having a hinge and frustrum shaped teeth. In some embodiments, the rack lattice comprises a rack pole top cover having a lock fixture configured to support the lock bar. In some embodiments, the rack lattice comprises a plurality of plain poles configured to support one or more of a plurality of non-hinged racks. In some embodiments, the rack lattice comprises a plurality of base rack spacers having frustum shaped teeth, a shelf insertion notch, a shelf support, and a rack extension, and wherein the base rack spacer configured to support components of the rack lattice. In some embodiments, the rack lattice comprises a plurality of shelves. In some embodiments, the shelves have a shelf neck and shelf fixation pin configured for insertion in the shelf insertion notch. In some embodiments, the rack lattice comprises a shelf blank having a shelf stub, the shelf blank with shelf stub configured to fill space corresponding to a shelf not installed. In some embodiments, the rack lattice comprises access shafts configured to provide for the autonomous mobile lift robot to reach any storage location without blocking the entire shaft.

In embodiments of the advanced warehouse and logistic system of the present invention, the autonomous mobile lift robot comprises a pantographic lift, the pantographic lift configured to raise a pallet for transport using the autonomous mobile lift robot and lower a pallet to a shelf. In embodiments of the advanced warehouse and logistic system of the present invention comprises a truck having a rack lattice system installed to configure the truck for fast loading using a plurality of autonomous mobile lift robots. In some embodiments, the autonomous mobile lift robot comprises wheels configured to move and maneuver the autonomous mobile lift robot in any direction outside of the rack lattice system. In some embodiments, the autonomous mobile lift robot comprises electronics to establish connection to one or more digital devices for communication to have the one or more digital devices control the operation and movement of the autonomous mobile lift robot. In some embodiments, the autonomous mobile lift robot comprises electronics to establish connection to one or more digital devices for communication to have the one or more digital devices schedule the operations of the autonomous mobile lift robot using one or more software applications. In some embodiments, the autonomous mobile lift robot comprises electronics to establish connection to one or more digital devices for communication to have the one or more software applications map the locations for delivery and schedule the loading of pallets using the autonomous mobile lift robot in the proper order to have the proper goods of each pallet be delivered along a designated route to the proper location. In some embodiments, the autonomous mobile lift robot comprises at least one first gear having tapered teeth, the first gear configured to move the autonomous mobile lift robot in a vertical direction along the frustum shaped teeth of the rack lattice; at least one second gear having tapered teeth mounted perpendicularly to the first gear, the second gear configured to move the autonomous mobile lift robot in a horizontal direction along the frustum shaped teeth of the rack lattice. In some embodiments, the autonomous mobile lift robot comprises a control guide track configured to adjust the angle of the tapered teeth to have the tapered teeth adjust and align within the frustum shaped teeth providing the traction necessary to move the autonomous mobile lift robot case along the frustum shaped teeth of the rack lattice. In some embodiments, the autonomous mobile lift robot comprises a plurality of control disks; at least one driving engine configured to drive one or more of the plurality of control disks; and wherein the control disks configured to move the actuator arm that is configured to move the lock bar from the first position to the second position to move a hinged rack to set the geometry of the rack lattice.

These and other features, advantages and improvements according to this invention will be better understood by reference to the following detailed description and accompanying drawings.

BRIEF DESCRIPTION OF DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 3 is an isometric view of one embodiment of a first out of three sets of parts used to construct an advanced warehouse of the present invention;

Detail FIG. 3A is an isometric view of the frustum shaped teeth used in some parts used to construct an advanced warehouse of the present invention;

Detail

Detail FIG. 7A is an isometric view of the base rack spacer to better illustrate the assembly process of the advanced warehouse of the present invention shown in FIG. 7;

Detail FIG. 7B is an isometric view of the base spacer to better illustrate the assembly process of the advanced warehouse of the present invention shown in FIG. 7;

Detail FIG. 8A is an isometric view of the base rack spacer after the insertion of the shelf and other components to better illustrate the assembly process of the advanced warehouse of the present invention shown in FIG. 8;

Detail FIG. 8B is an isometric view of the base spacer after the insertion of the shelf and other components to better illustrate the assembly process of the advanced warehouse of the present invention shown in FIG. 8;

FIG. 10 is a top view of an intermediate stage of the assembly process of one embodiment of the advanced warehouse of the present invention with 9 access shafts showing pallets placed on the ground level and access routes to the access shafts;

FIG. 11 is an isometric view of a first configuration of a rack pole assembly equipped with the required moving parts in a first position;

FIG. 12 is an isometric view of the first configuration of a rack pole assembly equipped with the required moving parts in a second position;

FIG. 13 is an isometric view of a second configuration of a rack pole assembly equipped with the required moving parts and an additional rack pole standard fixed rack with the moving parts in the first position as shown in FIG. 11 but seen from a different angle;

FIG. 14 is an isometric view of the second configuration of a rack pole assembly equipped with the required moving parts and an additional rack pole standard fixed rack with the moving parts in a third position;

FIG. 15 is an isometric view of one embodiment of the advanced warehouse of the present invention showing a access shaft with two levels and with moving parts in a first position;

Detail FIG. 15A is an isometric view of the moving parts in one rack pole of the access shaft of the advanced warehouse of the present invention with two levels and with moving parts in the first position;

Detail

FIG. 17 is an isometric view of one embodiment of the advanced warehouse of the present invention showing a access shaft with two levels and with moving parts in a third position;

Detail FIG. 17A is an isometric view of the moving parts in one rack pole of the access shaft of the advanced warehouse of the present invention with two levels and with moving parts in the third position;

Detail

Detail FIG. 19B is a top view of a second configuration of the warehouse structure;

FIG. 20 is an isometric view of one embodiment of the advanced warehouse of the present invention with nine access shafts, four levels and with moving parts in a first position;

FIG. 21 is a top view of one embodiment of the advanced warehouse of the present invention with nine access shafts showing the accessibility of the pallets stored;

Detail FIG. 24A is a detail view of the tapered teeth in the tapered teeth gear;

FIG. 26 is an isometric view of one embodiment of the parts used to manipulate parts outside the autonomous mobile lift robot;

Detail FIG. 26A is a detail view of an actuator hand;

FIG. 27 is an isometric view of the embodiment of an autonomous mobile lift robot case;

FIG. 28 is a front view of one embodiment of an autonomous mobile lift robot case;

FIG. 29 is a bottom view of the embodiment of an autonomous mobile lift robot case;

FIG. 30 is a top view of the embodiment of a bottom lid;

Detail FIG. 40A is an isometric view of one of the first and second perpendicularly mounted tapered teeth gears engaging the rack pole and other rack components;

Detail FIG. 41A is a zoomed isometric view of one tapered teeth gear and actuators used to manipulate the moving components in a first position;

Detail FIG. 41B is a zoomed isometric view of one tapered teeth gear and actuators used to manipulate the moving components in a second position;

Detail FIG. 41C is a zoomed isometric view of one tapered teeth gear and actuators used to manipulate the moving components in a third position;

Detail

Detail

Figure 42:
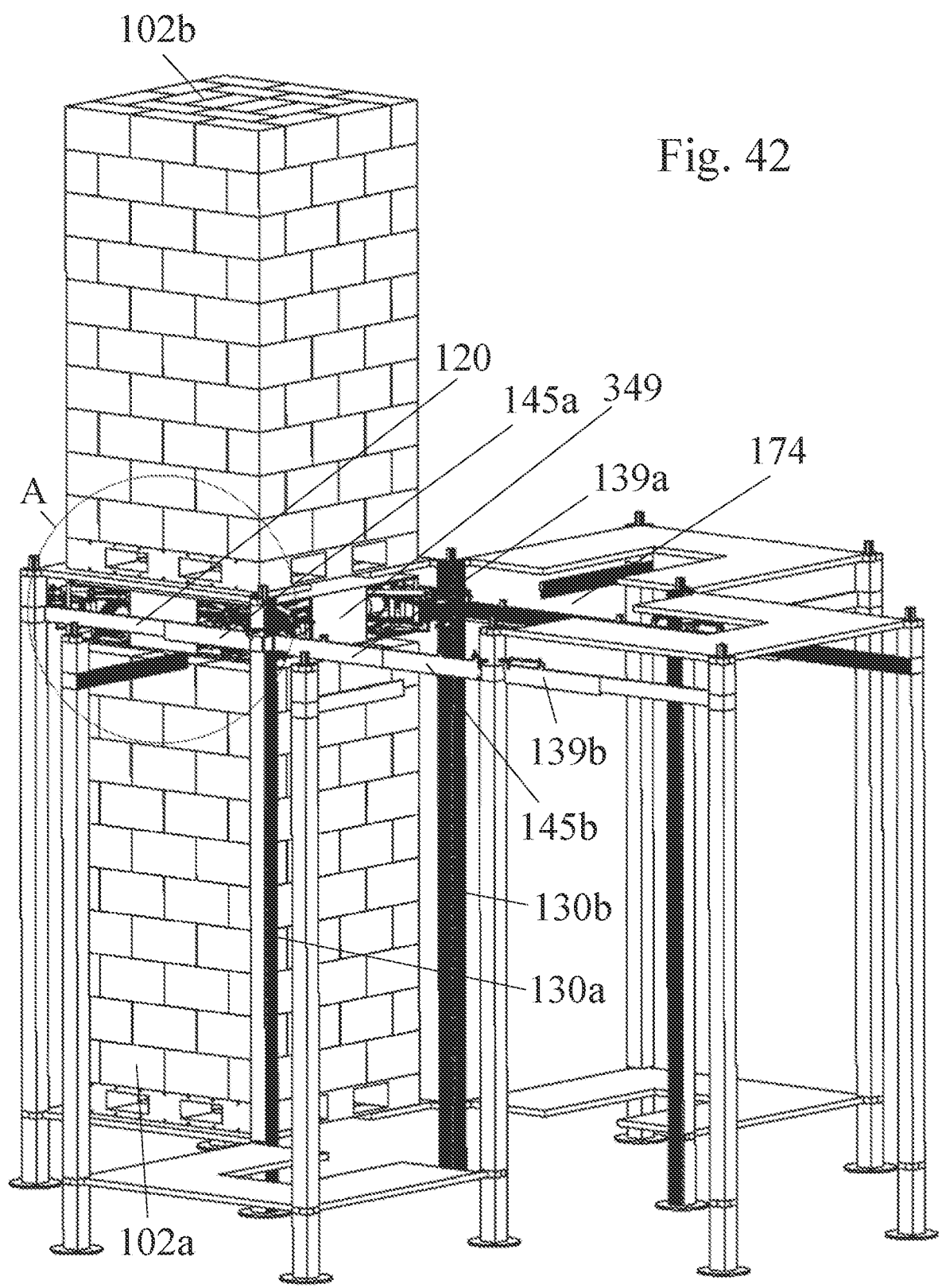
Figure 42A:
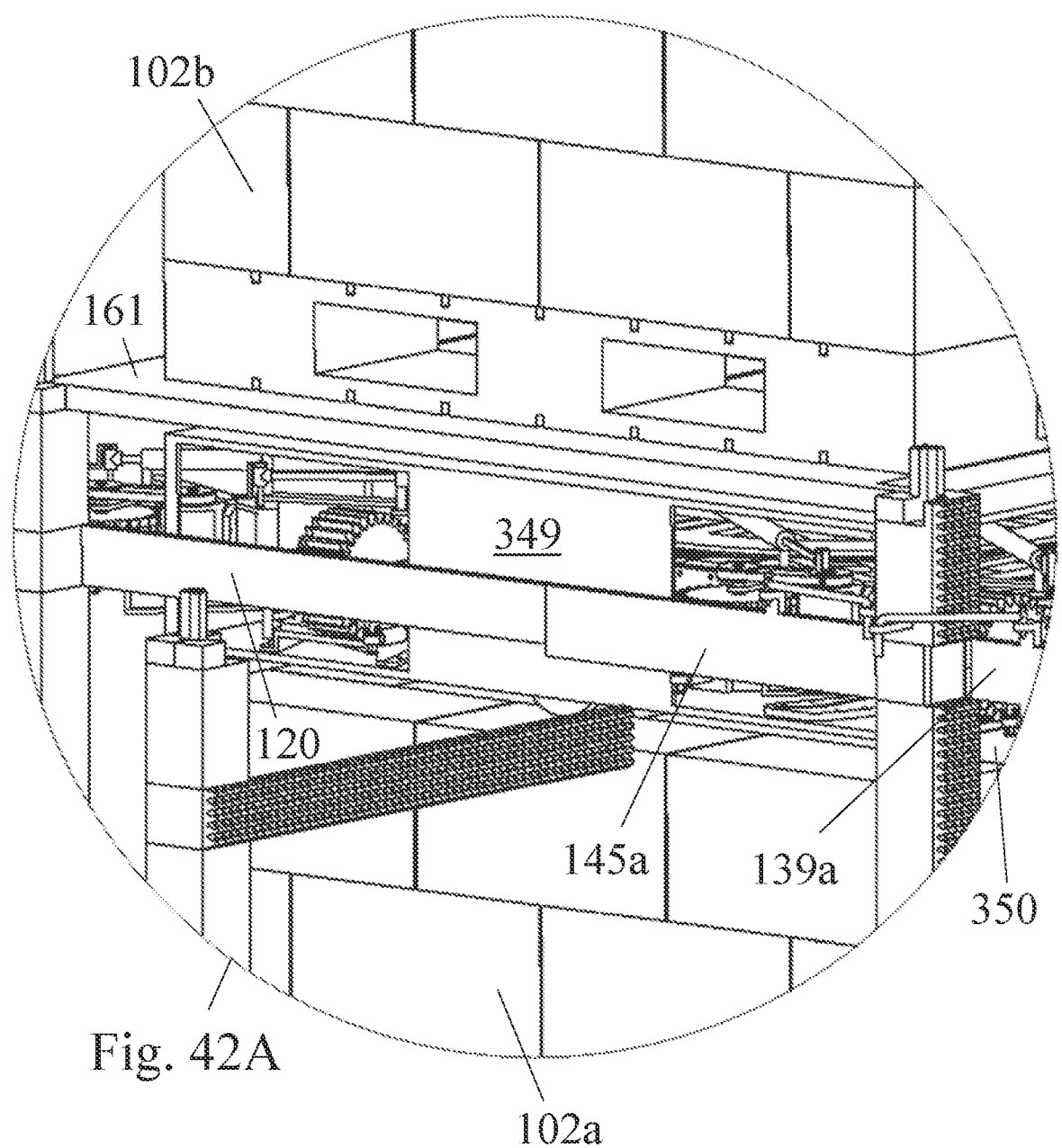
Figure 43:
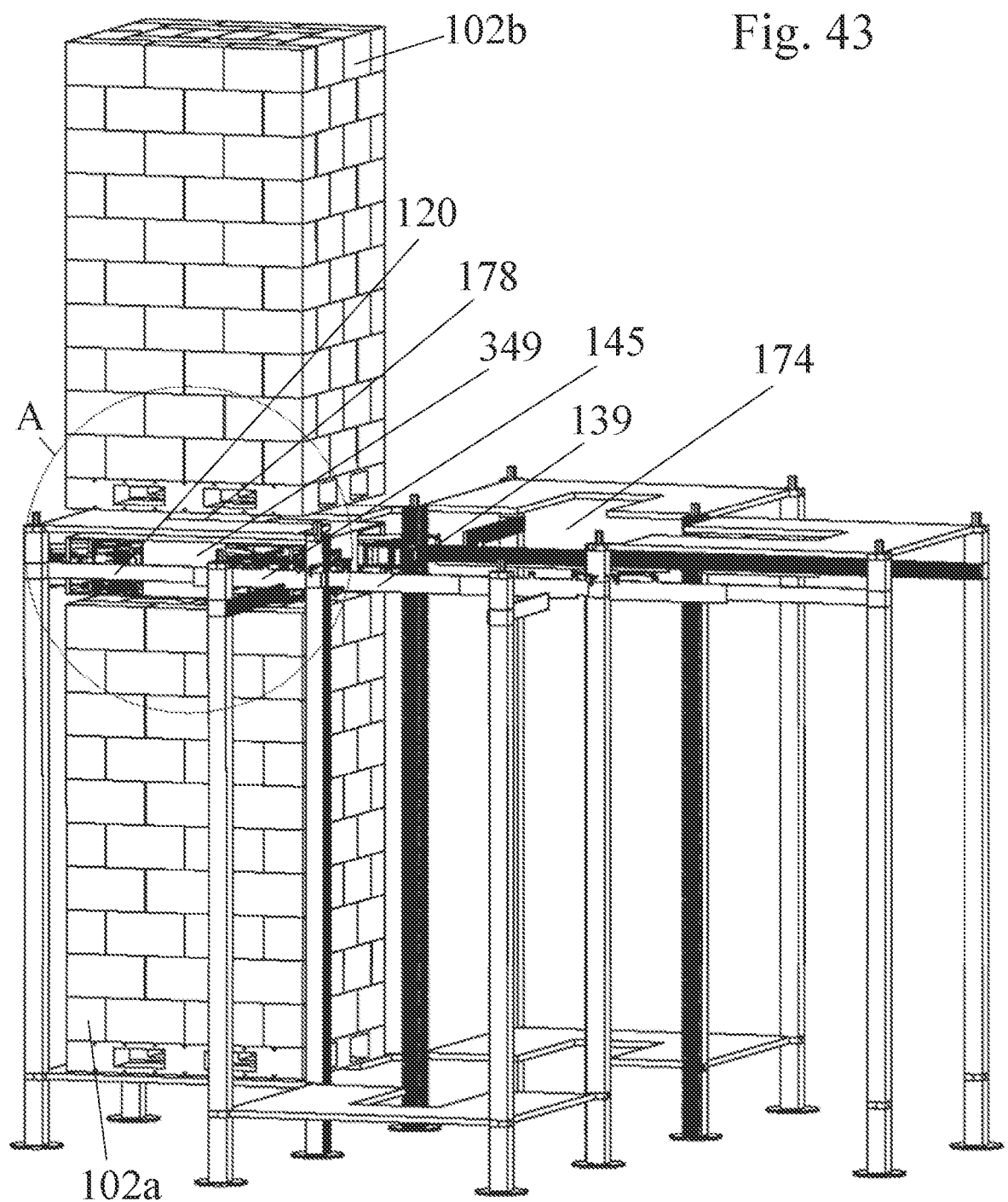
Figure 43A:
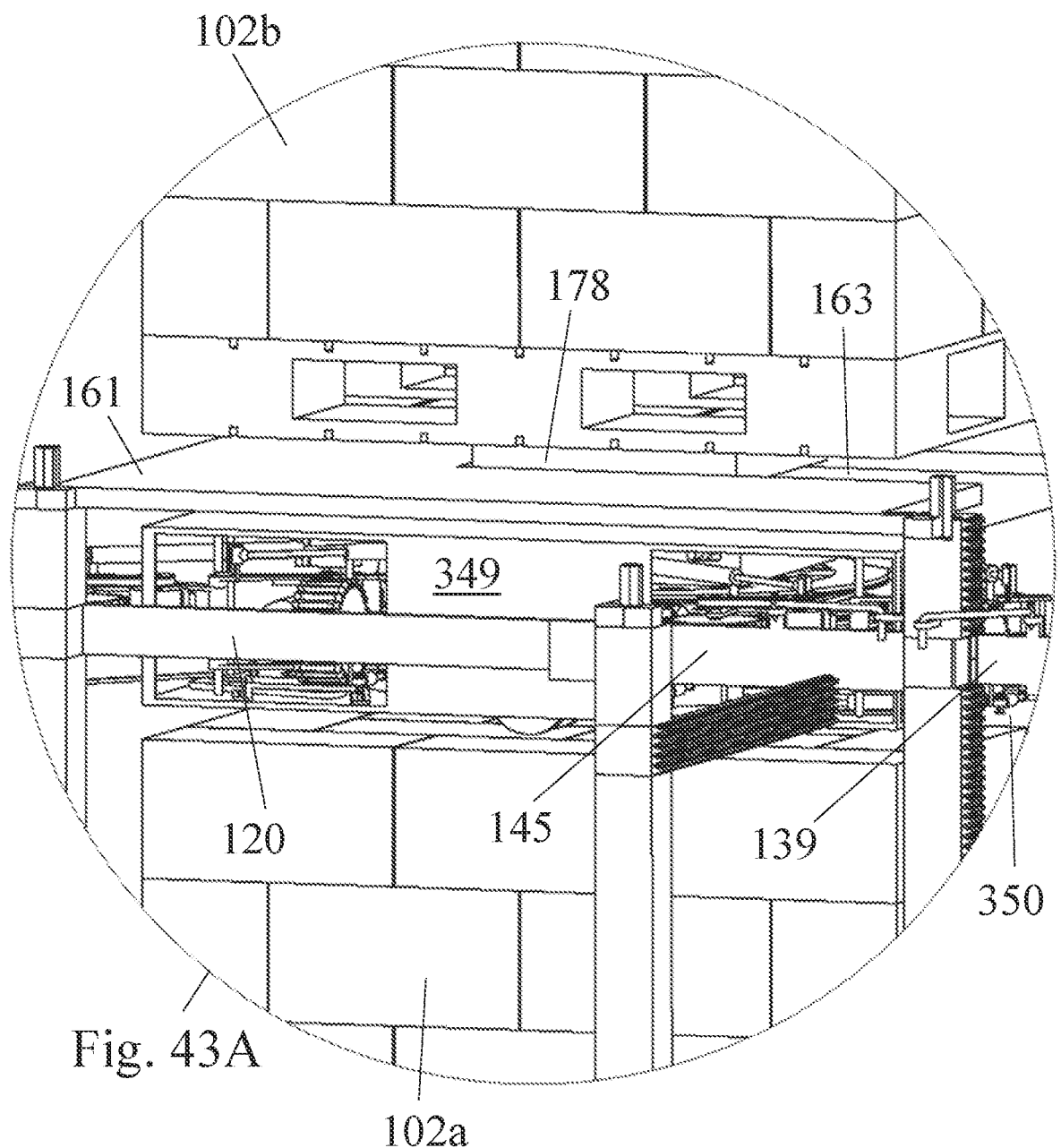
Figure 44:
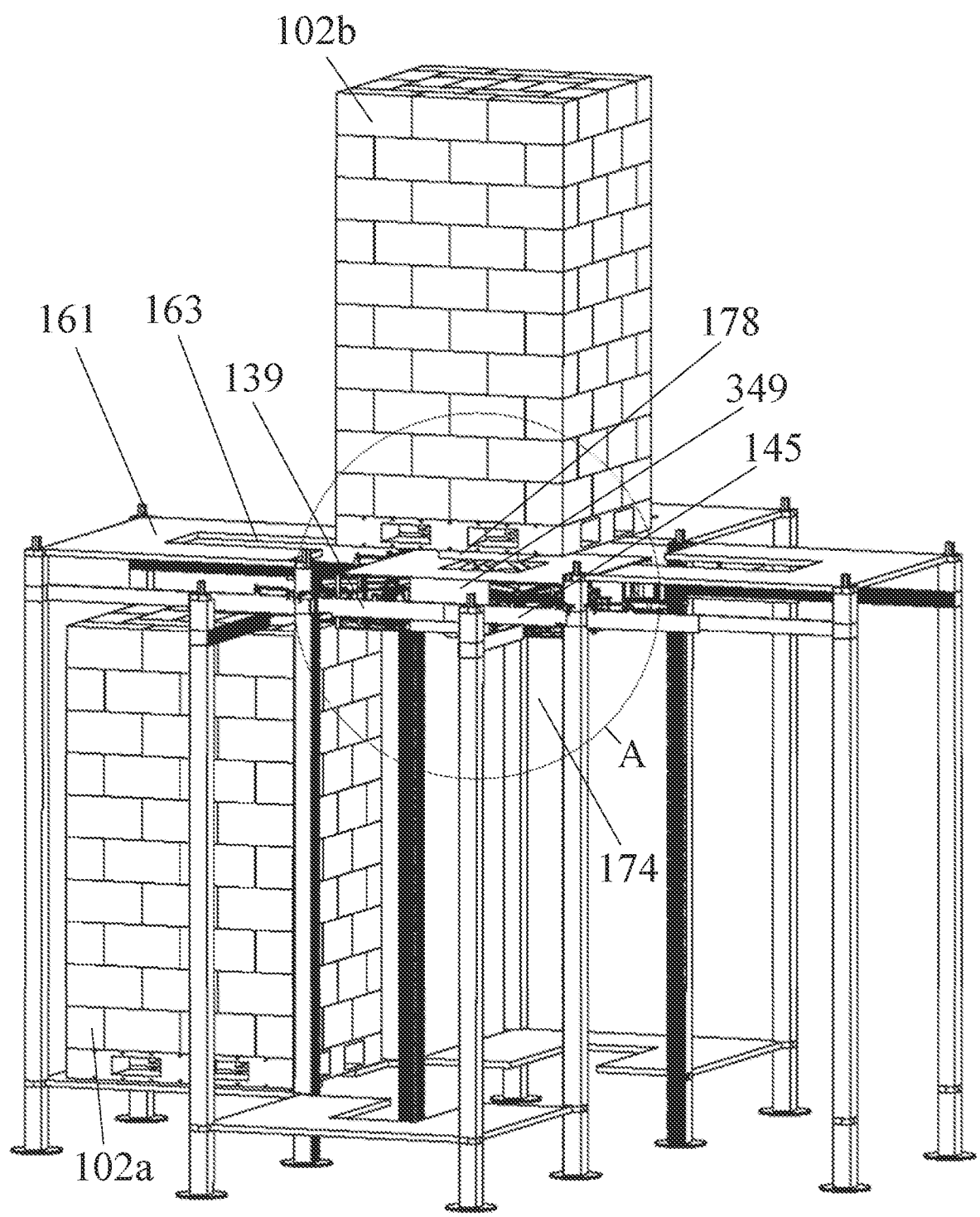
Figure 44A:
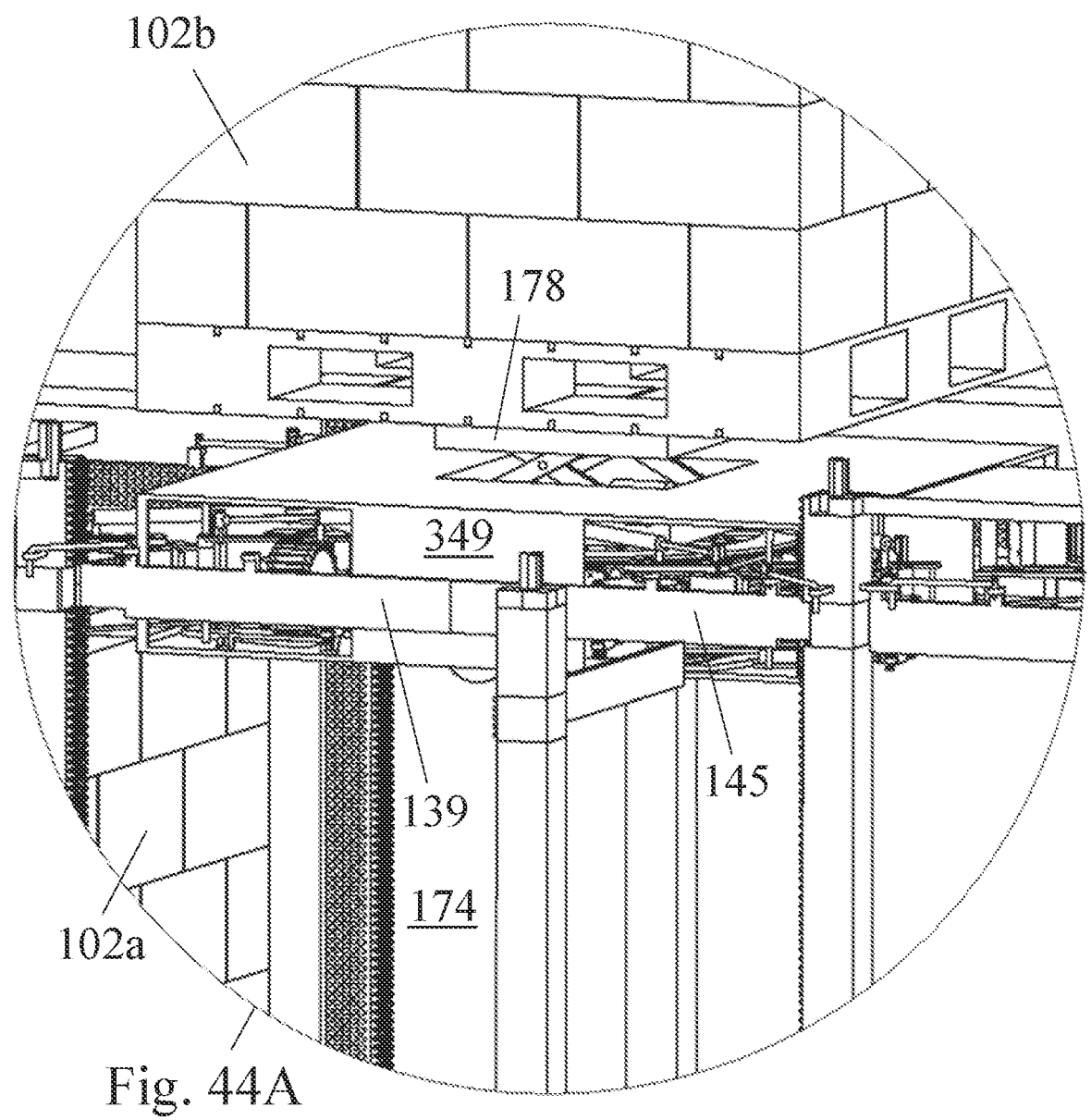
Figure 45:
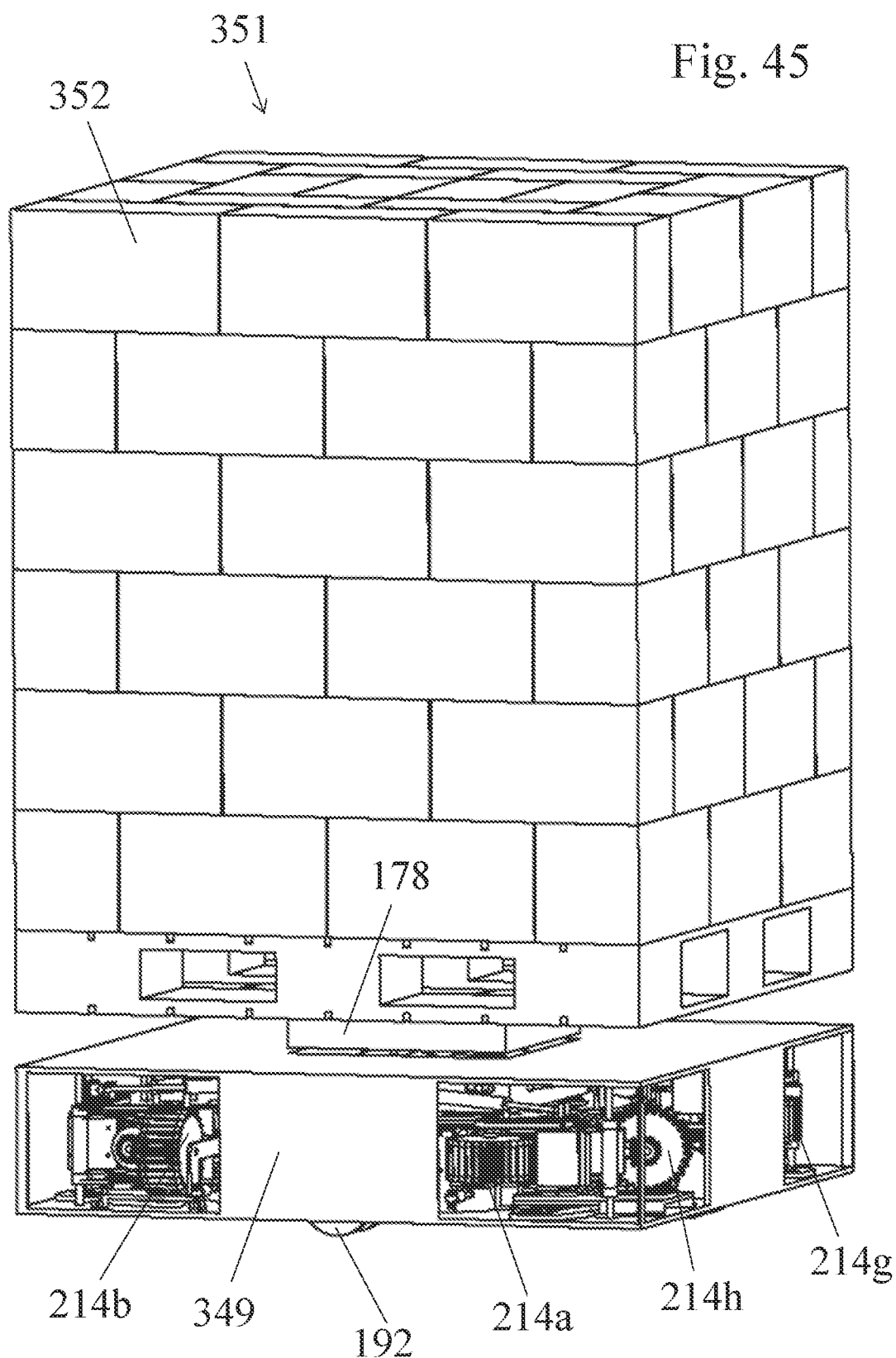
Figure 46:
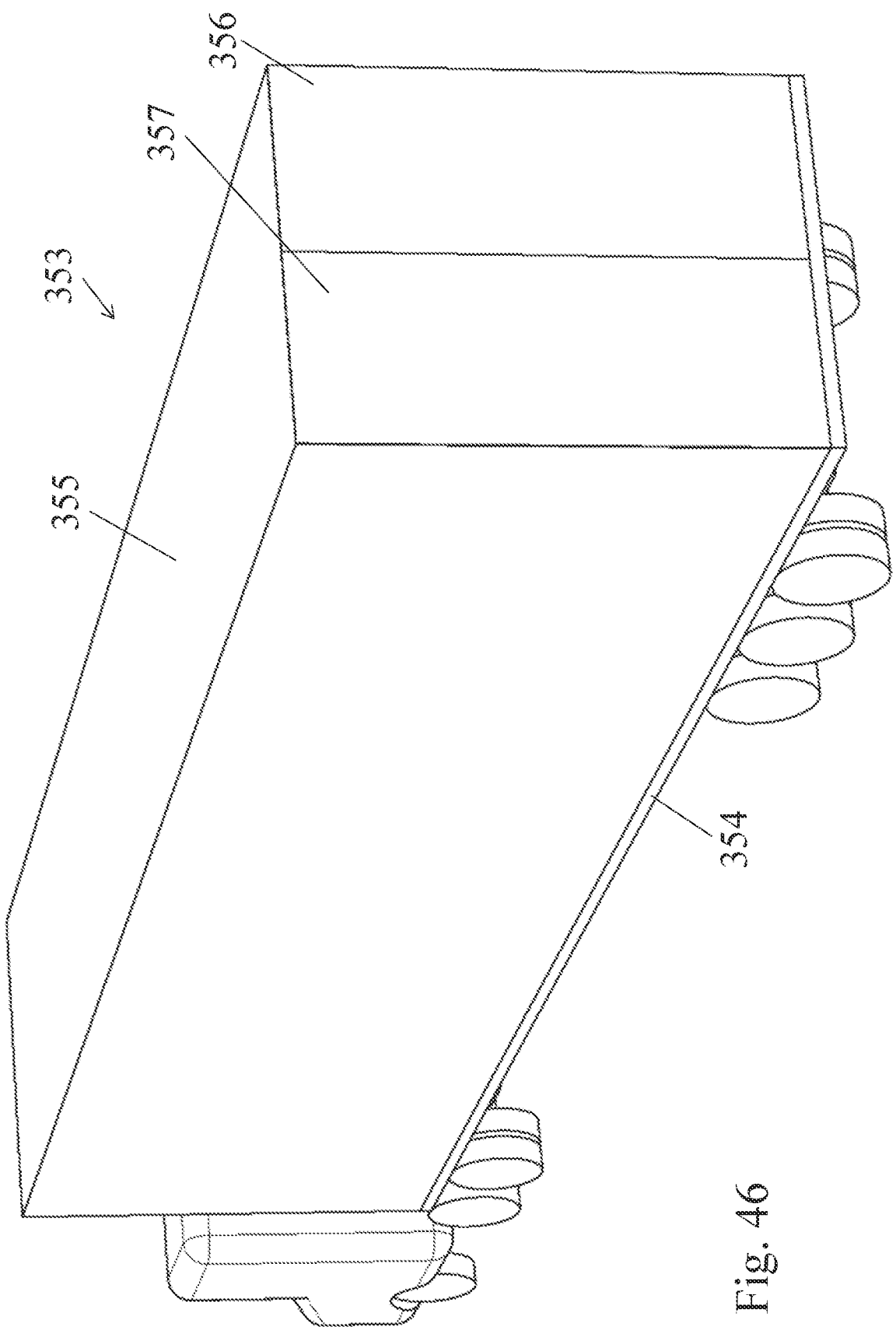
Figure 47:
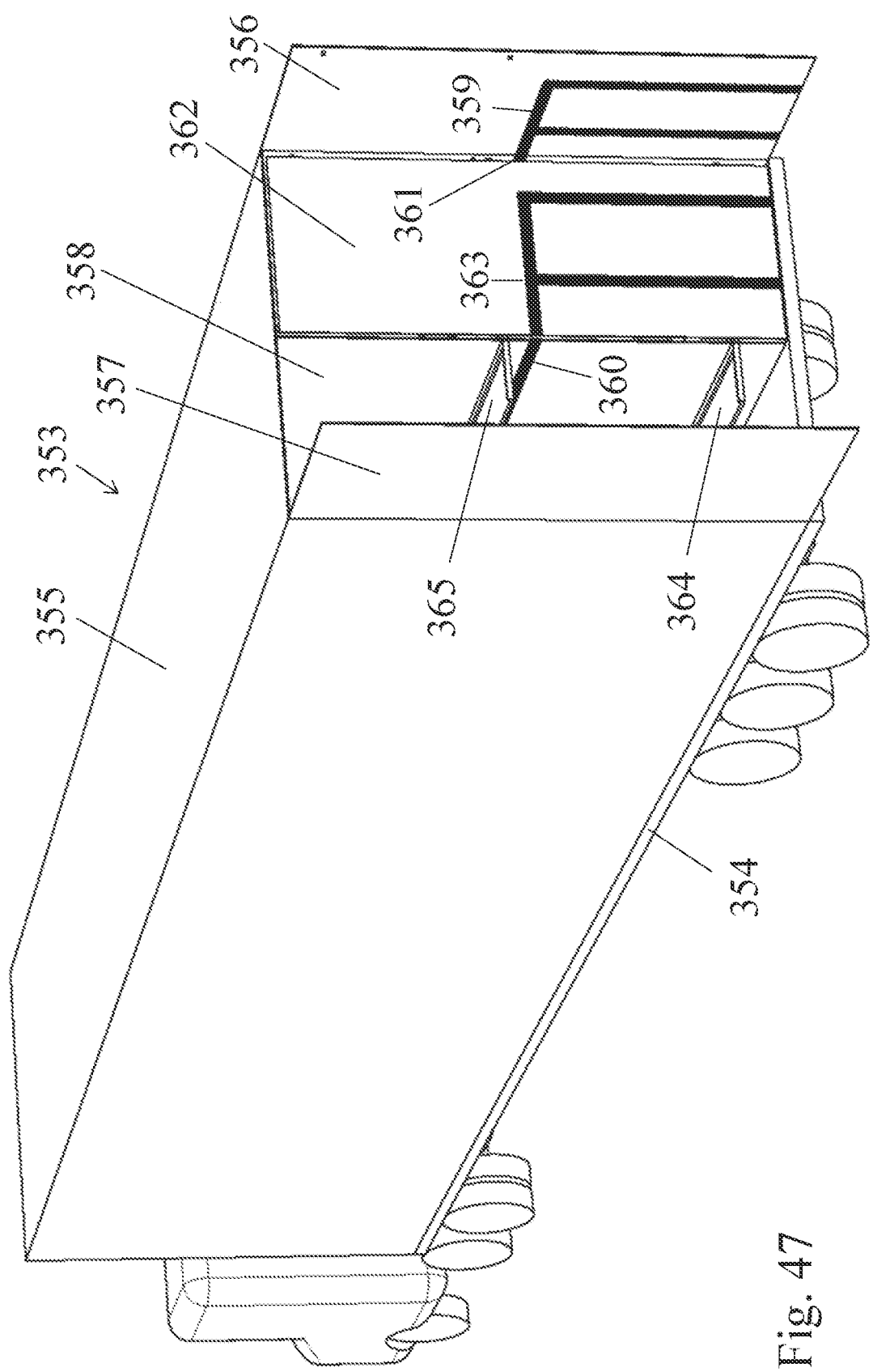
Figure 48:
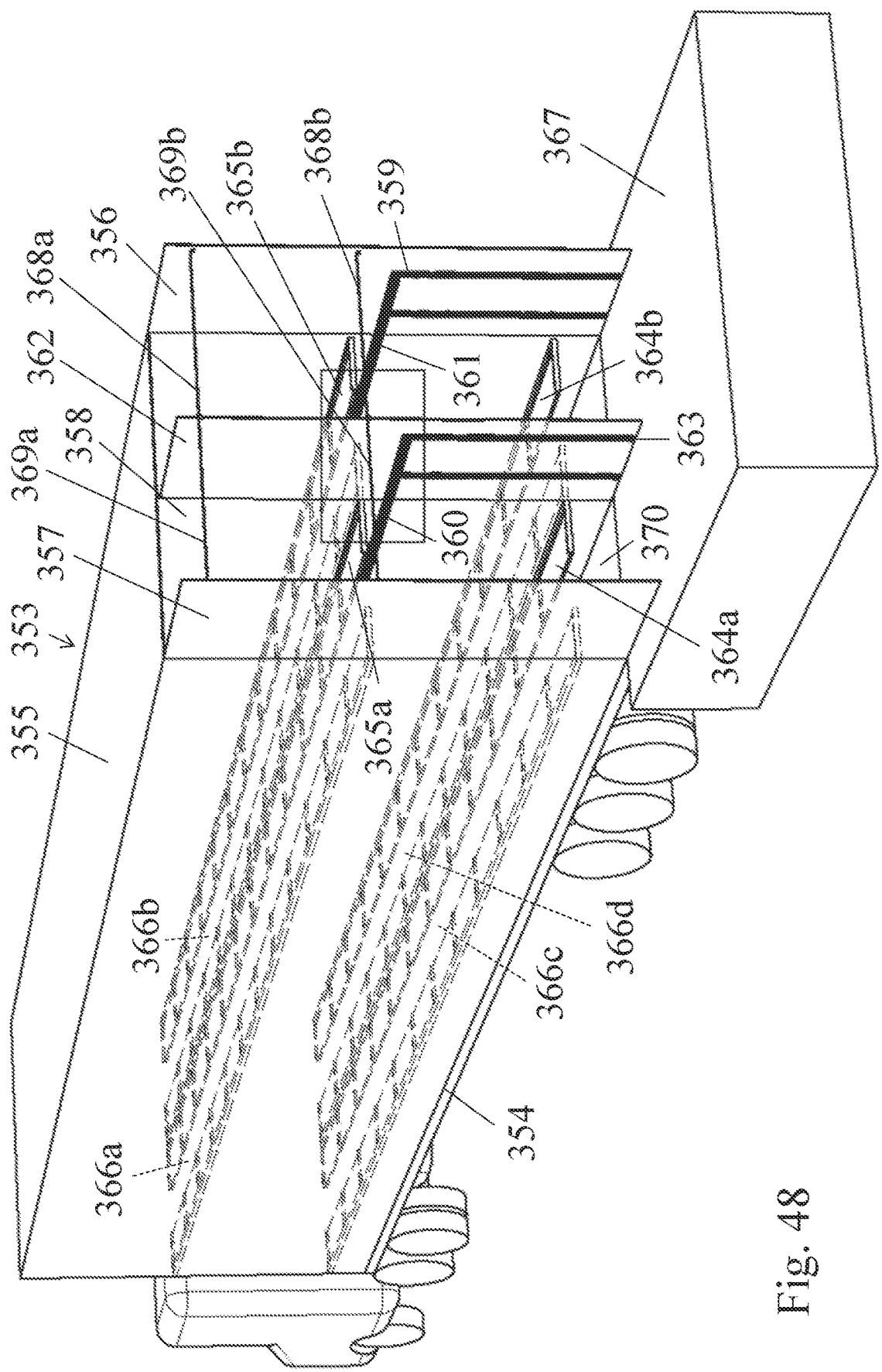
Figure 49:
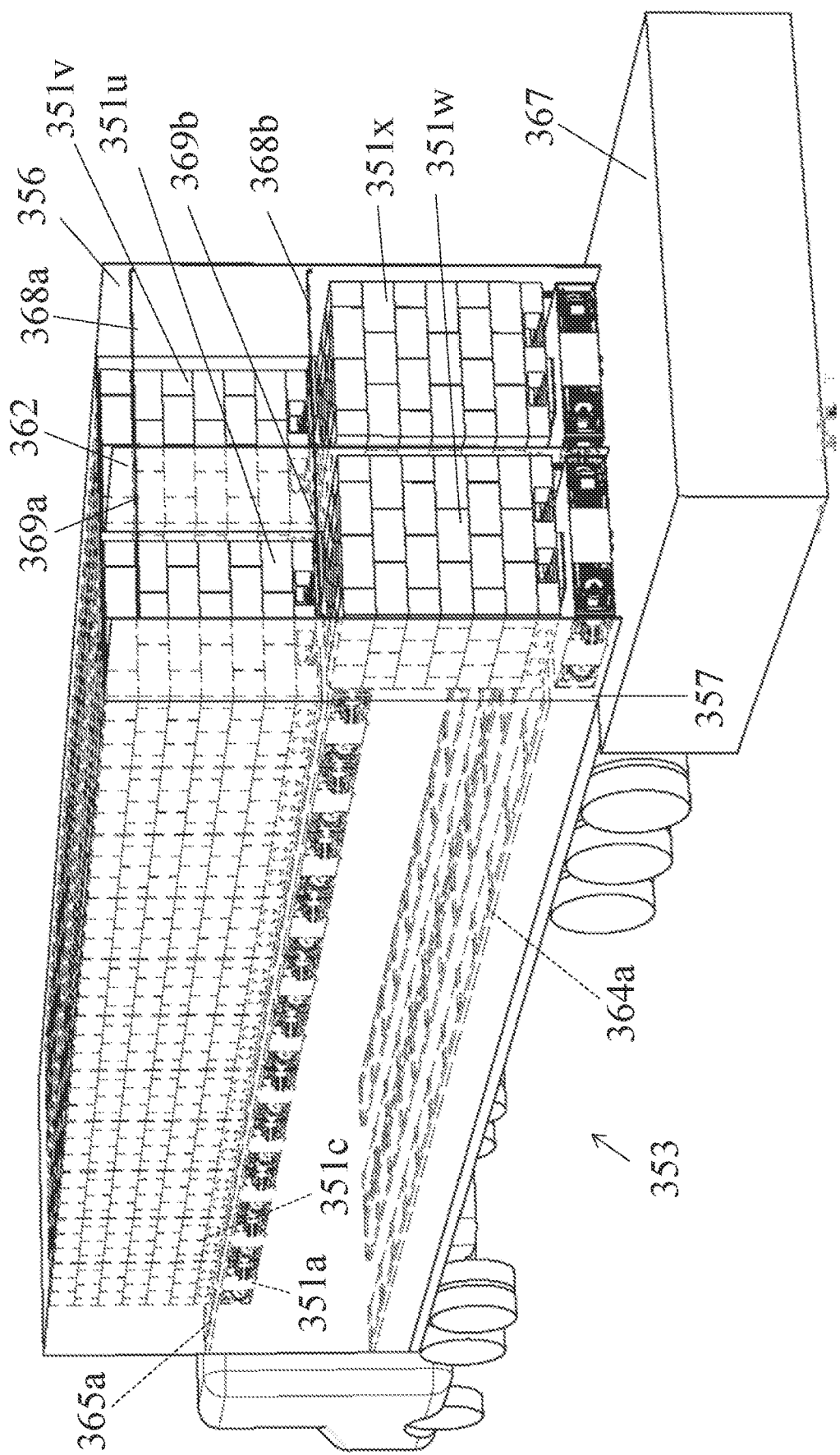
Figure 50:
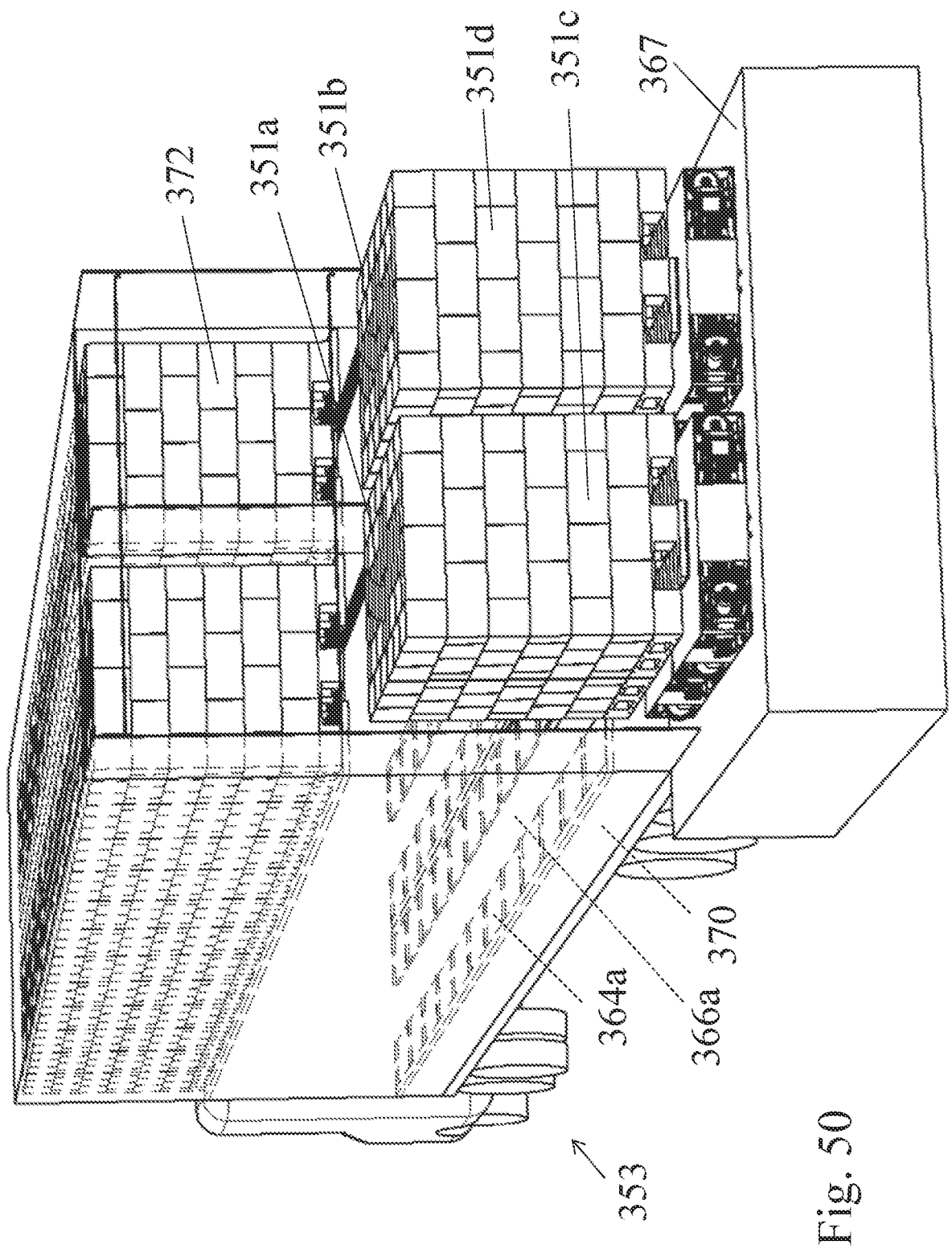

Detail FIG. 41F a zoomed isometric view of one tapered teeth gear and actuators used to manipulate the moving components in a sixth position showing the other perpendicularly mounted tapered teeth gear;

FIG. 42 is an isometric view of one embodiment of the autonomous mobile lift robot of the present invention at the first level of a access shaft positioned to retrieve a pallet that is still resting on the shelf;

Detail FIG. 42A is an isometric view of an embodiment of the autonomous mobile lift robot of the present invention at the first level of a access shaft under a pallet that is still resting on the shelf;

FIG. 43 is an isometric view of one embodiment of the autonomous mobile lift robot of the present invention at the first level of a access shaft with raised pantographic lift platform to lift the pallet from the shelf;

Detail FIG. 43A is an isometric view of one embodiment of the autonomous mobile lift robot of the present invention with raised pantographic lift platform lifting the pallet from the shelf;

FIG. 44 is an isometric view of an embodiment of the autonomous mobile lift robot of the present invention back at the center of the first level of a access shaft carrying a pallet on top of the raised pantographic lift platform;

Detail FIG. 44A is an isometric view of an embodiment of the autonomous mobile lift robot of the present invention carrying a pallet on top of the raised pantographic lift platform;

FIG. 45 is an isometric view of an embodiment of the autonomous mobile lift robot of the present invention with tapered teeth gears in the retracted position suitable for maneuvering to a truck for loading carrying a half size pallet on top of the raised pantographic lift platform;

FIG. 46 is an isometric rear view of one embodiment of a fast loading truck of the present invention with doors closed;

FIG. 47 is an isometric rear view of one embodiment of a fast loading truck of the present invention with doors open and middle division folded;

FIG. 48 is an isometric rear view of one embodiment of a fast loading truck of the present invention with doors and middle division open parked at a truck loading bay awaiting loading;

Detail FIG. 48A is an isometric view of the inside of the cargo bay of one embodiment of a fast loading truck of the present invention showing the upper shelves, the cargo bay center rack, and the middle division rack;

FIG. 49 is an isometric rear view of one embodiment of a fast loading truck of the present invention with doors and middle division open parked at a truck loading bay being loaded at the upper level by a train of multiple loaded autonomous mobile lift robots;

FIG. 50 is an isometric rear view of one embodiment of a fast loading truck of the present invention with doors and middle division open parked at a truck loading bay with a loaded upper level and being loaded at the lower level by a train of multiple loaded autonomous mobile lift robots.

DETAILED DESCRIPTION OF EMBODIMENT

The present invention is composed of multiple components that work together to allow the storage of goods in a warehouse and the transfer of goods to and from trucks with maximum efficiency.

While references may be made to upper, lower, vertical and horizontal, these terms are used merely to describe relationships and not to limit the operation or use of the present invention to any one orientation.

Figure 1:
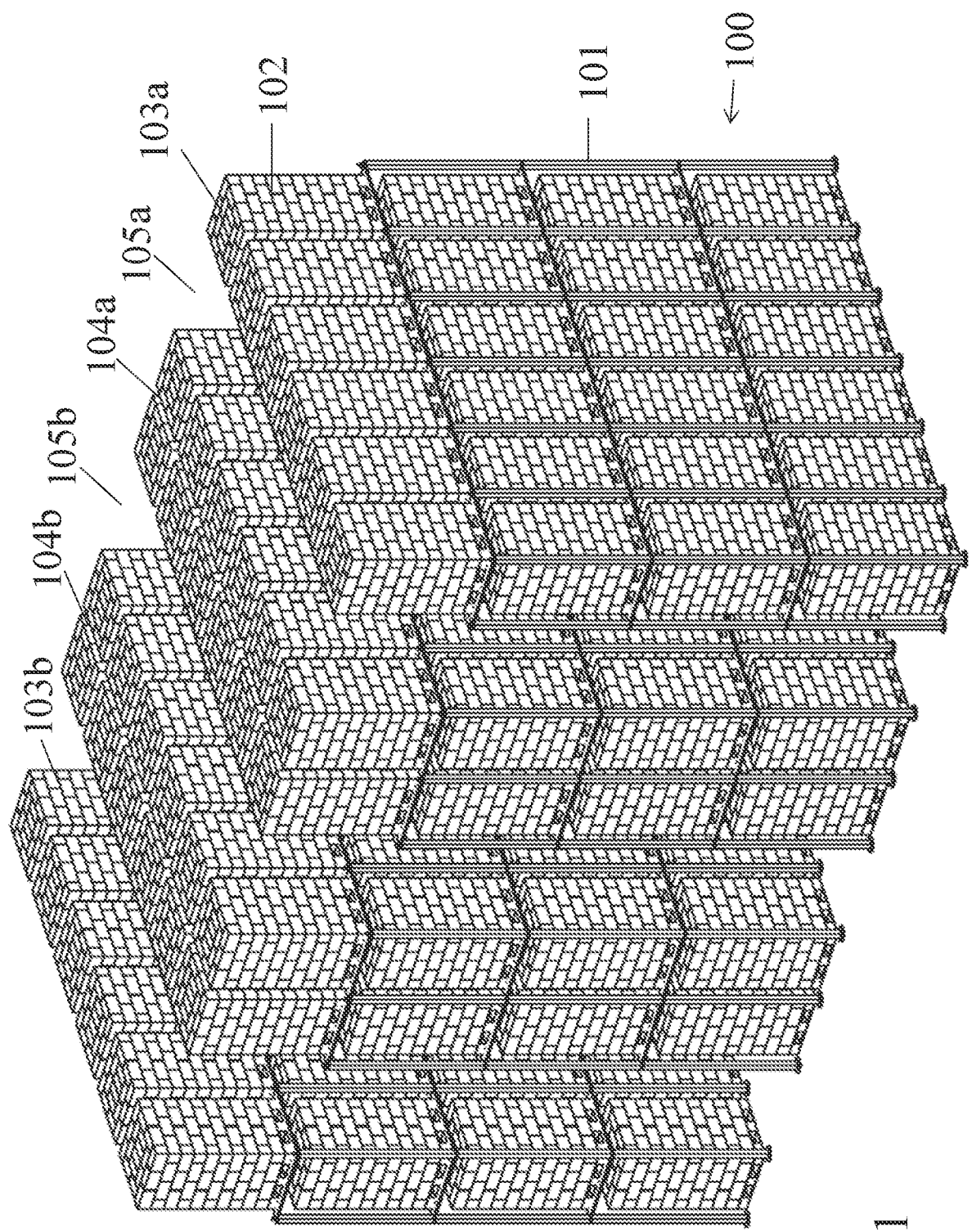
FIG. 1 is an isometric view of one example of a traditional warehouse design of the prior art.

FIG. 1 shows a traditional warehouse 100 of the prior art that is not part of the present invention and is shown for comparison purposes. The traditional warehouse 100 has a shelf structure 101 capable of holding a series of pallets 102 arranged in multiple levels and in rows. At both extremities, the pallets 102 are arranged in a single row 103a, 103b and in the rest of the structure, the pallets 102 are arranged in a series of back-to-back rows 104. To allow access to the pallets 102 a series of access rows 105a, 105b is placed between any two adjacent rows containing pallets 102.

Figure 2:
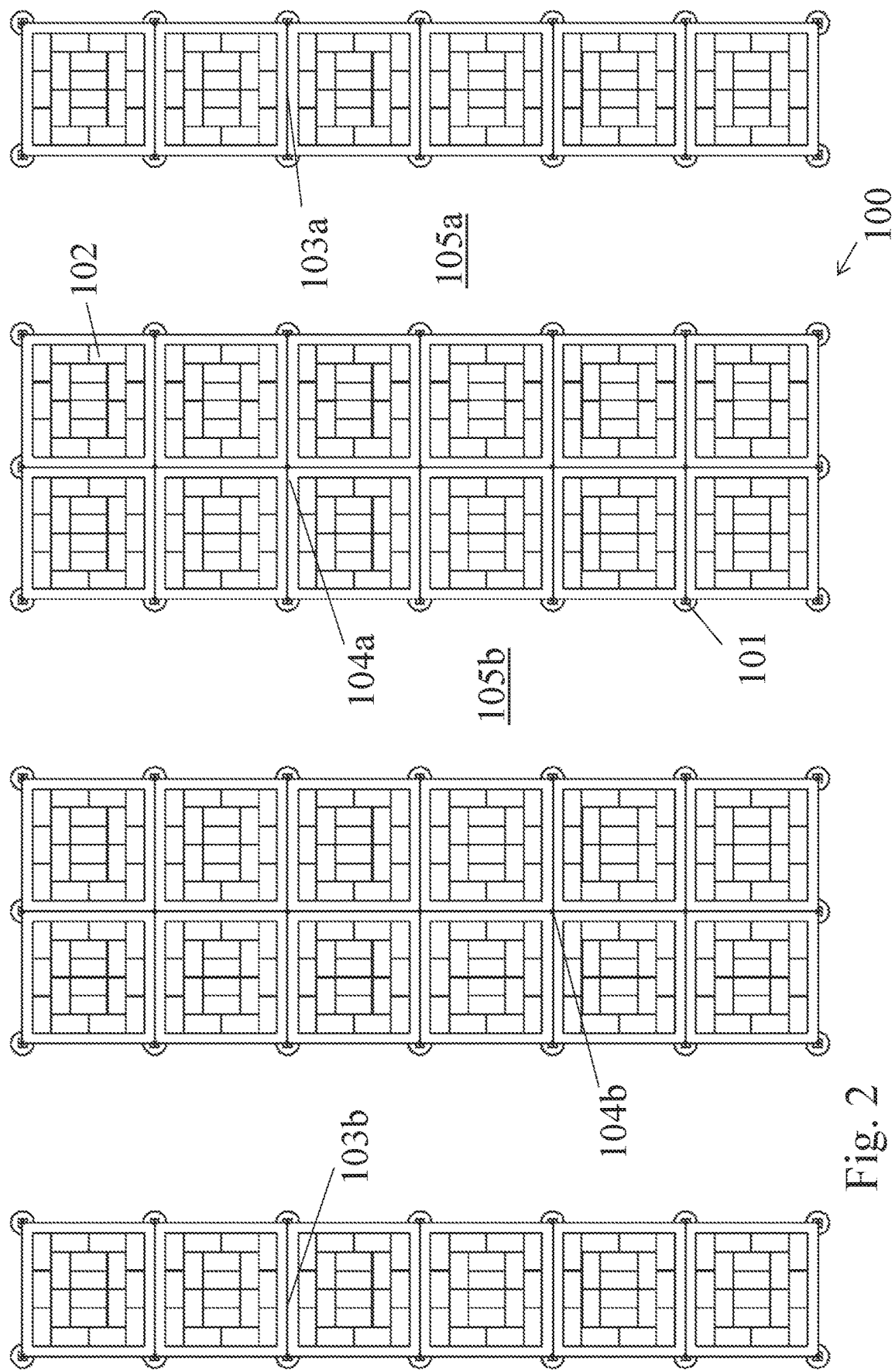
FIG. 2 is a top view of the example of the traditional warehouse design of the prior art of FIG. 1.

FIG. 2 shows a top view of the traditional warehouse 100 of the prior art to better illustrate the relative dimensions of the shelf structure 101. At both extremities, the pallets 102 are arranged in single rows 103a, and 103b and in the rest of the structure, the pallets 102 are arranged in back-to-back rows 104. To allow access to the pallets 102, access rows 105a, 105b are placed between any two adjacent rows containing pallets 102. Typically the access rows 105a, 105b have a width ranging from the width of one and a half pallets 102 to two pallets 102 to allow the movement of forklifts or stationary row robots.

The total area occupied by the traditional warehouse 100 of the prior art is the area occupied by the shelf structure 101 plus a considerable amount of additional area needed for the movement of robots, forklifts, etc. that are required for the proper operation of the warehouse. The need for this additional area as well as the inefficient use of the area occupied by access rows 105a, 105b negatively impacts the storage capacity and operational efficiency of the traditional warehouse 100.

FIG. 3 shows one embodiment of a first out of three sets of parts used to construct an advanced warehouse of the present invention. A base 106 consisting of a round circle with a guide pin 107a in the center is used to provide support and stability for the structure. For added stability, the base 106 may be fixated to a floor by adequate fixation bolts (not shown).

A base spacer 109 consisting of an adequate, relatively short length of a square profile with a centered, square guide pin notch 108a at the bottom and a centered, square shelf insertion notch 110a at the top is designed to be placed on top of the base 106 by means of fitting the guide pin notch 108a of the base spacer 109 into the guide pin 107a of the base 106. The base spacer 109 provides support at a short distance to ground level for other components of the structure of the advanced warehouse of the present invention.

A plain blank 111 consisting of a short square profile bar with the width of one fourth of the shelf insertion notch 110 and appropriate length is used to fill one fourth of the shelf insertion notch 110 and preserve the alignment for structures placed on top in places where required (see detail FIG. 8A).

A shelf blank 112 consisting of a short square profile bar with the width of one fourth of the shelf insertion notch 110 and appropriate length with a shelf stub 113 located at the center is used to fill one fourth of the shelf insertion notch 110 and fill gaps to provide leveled support and preserve the alignment for structures placed on top in places where required (see detail FIG. 8A). If necessary, up to two shelf blanks 112 may be used simultaneously to fill space in one particular shelf insertion notch 110.

A quarter blank 114 consisting of a short square profile bar with the width of one fourth of the shelf insertion notch 110 and appropriate length with a quarter stub 115 located at the center is used to fill one fourth of the shelf insertion notch 110 and fill gaps to provide leveled support and preserve the alignment for structures placed on top in places where required (see detail FIG. 8A and detail FIG. 8B). If necessary, up to four quarter blanks 114 may be used simultaneously to fill space in one particular shelf insertion notch 110.

A plain pole 116 consisting of an adequate, relatively long length of a square profile with one centered, square guide pin notch 108b at the bottom and one centered, square guide pin 107b at the top is designed to provide support to other components of the structure at the necessary distance from the previous level to accommodate the pallets 102 intended to be stored in the advanced warehouse of the present invention.

The plain pole 116 has a plain pole neck 117 that starts at a pole horizontal rack plane 118 that is used to fit additional components required to complete the structure.

A plain top spacer 119 consisting of an adequate, relatively short length of a square profile with one centered, square guide pin notch 108c at the bottom and one centered, square shelf insertion notch 110b at the top is designed to be placed on top of the plain pole 116 by means of fitting the guide pin notch 108c of the plain top spacer 119 into the guide pin 107b of the plain pole 116. The plain top spacer 119 provides support at a short distance to the top of the plain pole 116 for other components of the structure of the advanced warehouse of the present invention.

A single rack piece 120 consisting of a standard rack track 121a that contains an array of frustum shaped teeth 122a in the outer side and has a square base 123a with a square base insertion hole 124a in the middle is designed to be placed on top of the plain pole 116 around the plain pole neck 117.

The square base insertion hole 124a has dimensions that allow the square base 123a to fit perfectly around the plain pole neck 117 and the height of the square base 123a matches the height of the plain pole neck 117 so when the single rack piece 120 is installed around the plain pole neck 117 on the top of the plain pole 116, the plain top spacer 119 can be installed on a flat surface the same size of its base.

A double standard rack piece 125 consists of two standard rack tracks 121b with frustum shaped teeth 122b in the outer sides and has one square base 123b with one square base insertion hole 124b in the middle. The double standard rack piece 125 is designed to be placed on top of the plain pole 116 around the plain pole neck 117. The double standard rack piece 125 shape is the same of two single rack pieces 120 merged together, with the second single rack piece 120 rotated 90 degrees in the counter clockwise direction.

A quadruple standard rack piece 126 consists of four standard rack tracks 121c with frustum shaped teeth 122c in the outer sides and has one square base 123c with one square base insertion hole 124c in the middle. The quadruple standard rack piece 126 is designed to be placed on top of the plain pole 116 around the plain pole neck 117. The quadruple standard rack piece 126 shape is the same of four single rack pieces 120 merged together, with each single rack piece 120 rotated 90 degrees in the counter clockwise direction with respect to the previous one.

Detail FIG. 3A shows the frustum shaped teeth 122c in greater magnification to allow a better visualization of their shape that is produced cutting a standard rack in one direction and then again in a second direction at an angle of 90 degrees to the first direction.

Figure 4:
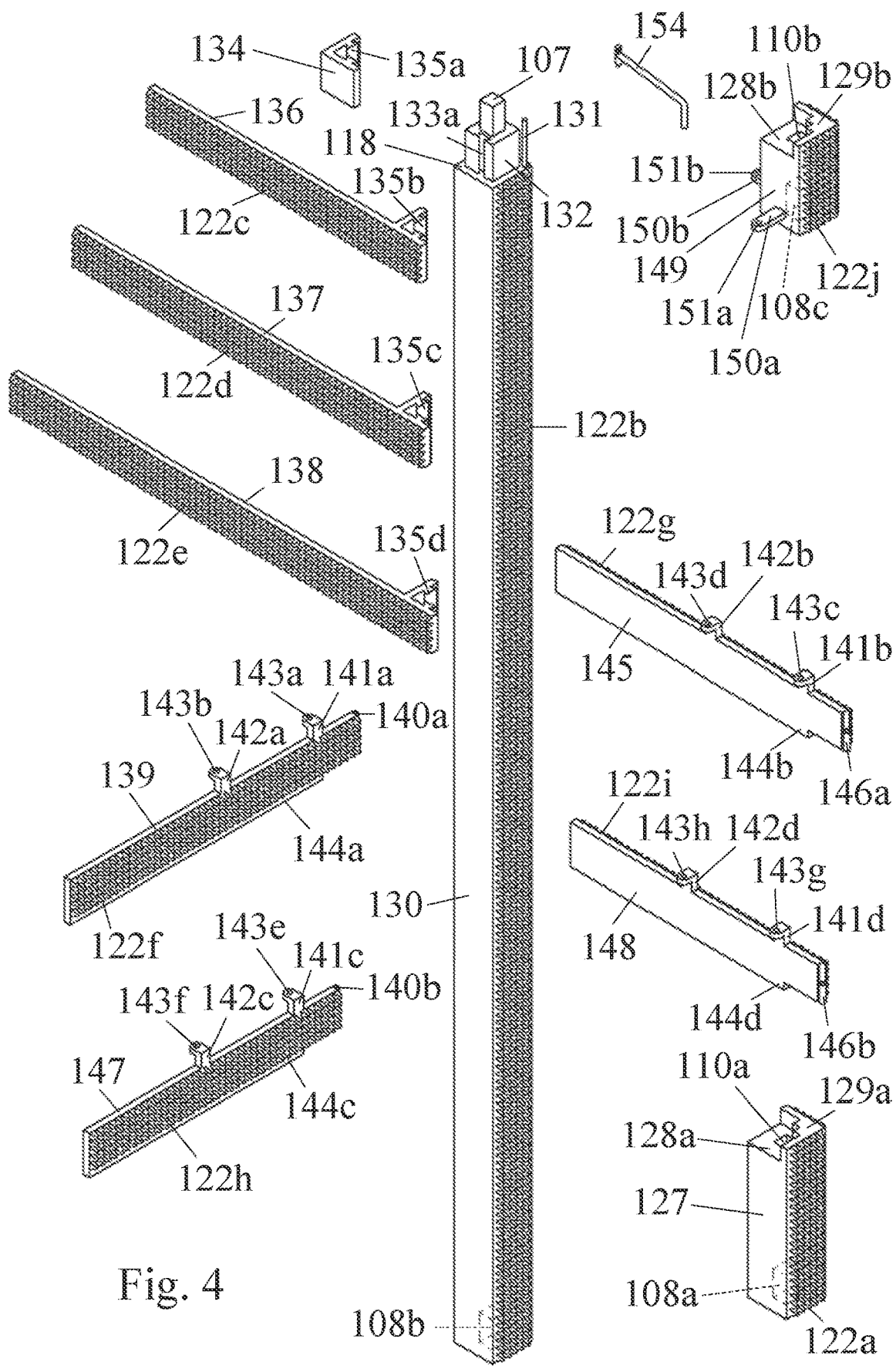
FIG. 4 is an isometric view of one embodiment of a second out of three set of parts used to construct an advanced warehouse of the present invention.

FIG. 4 shows one embodiment of a second out of three sets of parts used to construct an advanced warehouse of the present invention.

A base rack spacer 127 consisting of an adequate, relatively short length of a square profile with one centered, square guide pin notch 108a at the bottom and one centered, square shelf insertion notch 110a at the top is designed to be placed on top of the base 106 by means of fitting the guide pin notch 108a of the base rack spacer 127 into the guide pin 107a of the base 106 (see FIG. 3).

The base rack spacer 127 has a shelf support 128a plane at the same height of the length of the base spacer 109 that provides support at a short distance to ground level for other components of the structure of the advanced warehouse of the present invention. Differently from the base spacer 109 that has four plain faces, the base rack spacer 127 has frustum shaped teeth 122a in two faces at the front that extend all the way to the top forming a rack extension 129a that has the same width as the shelf stub 113 and the quarter stub 115 (see FIG. 3).

A rack pole 130 consisting of an adequate, relatively long length of a square profile with one centered, square guide pin notch 108b at the bottom and one centered, square guide pin 107 at the top is designed to provide support to other components of the structure at the necessary distance from the previous level to accommodate the pallets 102 intended to be stored in the advanced warehouse of the present invention.

The rack pole 130 has a hinge pin 131 and a rack pole neck 132 that starts at the pole horizontal rack plane 118 and has the same height as the plain pole neck 117 in the plain pole 116 (see FIG. 3). The rack pole neck 132 has a pair of dovetail notches 133a at the faces opposite to the hinge pin 131 that allow the fixation of additional components required to complete the structure.

Differently from the plain pole 116 that has four plain faces, the rack pole 130 has frustum shaped teeth 122b in two faces at the front that extend all the way to the pole horizontal rack plane 118. The rack pole 130 and the plain pole 116 have the same height and the rack pole neck 132 and the plain pole neck 117 are always aligned at the same level in the assembled structure. (see FIG. 3).

A rack pole neck cover 134 with the same height of the rack pole neck 132 and fitted with a pair of dovetail pins 135a configured to slide into the dovetail notches 133a in the rack pole neck 132 is used to cover the rack pole neck 132 at places in the structure where no other part is required.

A rack pole short fixed rack 136 with frustum shaped teeth 122c in the front face and the same height of the rack pole neck 132 and fitted with dovetail pins 135b configured to slide into the dovetail notches 133a in the rack pole neck 132 is used to provide an additional short fixed rack attached to the rack pole 130 at places in the structure where this is required.

A rack pole standard fixed rack 137 with frustum shaped teeth 122d in the front face and the same height of the rack pole neck 132 and fitted with dovetail pins 135c designed to slide into the dovetail notches 133a in the rack pole neck 132 is used to provide an additional standard fixed rack attached to the rack pole 130 at places in the structure where this is required.

A rack pole long fixed rack 138 with frustum shaped teeth 122e in the front face and the same height of the rack pole neck 132 and fitted with dovetail pins 135d designed to slide into the dovetail notches 133a in the rack pole neck 132 is used to provide an additional long fixed rack attached to the rack pole 130 at places in the structure where this is required.

A rack pole standard hinged rack A 139 is fitted with an array of frustum shaped teeth 122f in the front face with the same height of the rack pole neck 132 and has a hinge A 140a at one extremity. The frustum shaped teeth 122f in the rack pole standard hinged rack A 139 are so constructed that when the hinge A 140a is installed at the hinge pin 131 in the rack pole neck 132, the frustum shaped teeth 122f in the rack pole standard hinged rack A 139 align perfectly with the frustum shaped teeth 122b in the rack pole 130.

The rack pole standard hinged rack A 139 has a hinged rack internal lock fixture 141a fitted at a first fixed short distance to the hinge A 140a and a hinged rack external lock fixture 142a fitted at a second fixed distance to the hinged rack internal lock fixture 141a towards the extremity opposite to the hinge A 140a. The hinged rack internal lock fixture 141a has a hinged rack lock hole 143a and the hinged rack external lock fixture 142a has a hinged rack lock hole 143b at the top. A plain hinged rack hold bar 144a with no frustum shaped teeth runs from the extremity opposite to the hinge A 140a stopping short of the hinge A 140a in such a way that when the hinge A 140a is installed at the hinge pin 131, the hinged rack hold bar 144a stays outside the rack pole neck 132 and does not hit the rack pole 130.

A rack pole standard hinged rack B 145 is fitted with an array of frustum shaped teeth 122g in the front face with the same height of the rack pole neck 132 and has a hinge B 146a at one extremity. The frustum shaped teeth 122g in the rack pole standard hinged rack B 145 are so constructed that when the hinge B 146a is installed at the hinge pin 131 in the rack pole neck 132, the frustum shaped teeth 122g in the rack pole standard hinged rack B 145 align perfectly with the frustum shaped teeth 122b in the rack pole 130.

The rack pole standard hinged rack B 145 has one hinged rack internal lock fixture 141b fitted at a first fixed short distance to the hinge B 146a and one hinged rack external lock fixture 142b fitted at a second fixed distance to the hinged rack internal lock fixture 141b towards the extremity opposite to the hinge B 146a. The hinged rack internal lock fixture 141b has one hinged rack lock hole 143c and the hinged rack external lock fixture 142b has one hinged rack lock hole 143d at the top. One plain hinged rack hold bar 144b with no frustum shaped teeth runs from the extremity opposite to the hinge B 146a stopping short of the hinge B 146a in such a way that when the hinge B 146a is installed at the hinge pin 131, the hinged rack hold bar 144b stays outside the rack pole neck 132 and does not hit the rack pole 130.

Apart from the hinge A 140a and the hinge B 146a that are designed to fit, the rack pole standard hinged rack A 139 and the rack pole standard hinged rack B 145 are mirror images of each other.

A rack pole short hinged rack A 147 is fitted with an array of frustum shaped teeth 122h in the front face with the same height of the rack pole neck 132 and has one hinge A 140b at one extremity. The frustum shaped teeth 122h in the rack pole short hinged rack A 147 are so constructed that when the hinge A 140b is installed at the hinge pin 131 in the rack pole neck 132, the frustum shaped teeth 122h in the rack pole short hinged rack A 147 align perfectly with the frustum shaped teeth 122b in the rack pole 130.

The rack pole short hinged rack A 147 has one hinged rack internal lock fixture 141c fitted at a first fixed short distance to the hinge A 140b and one hinged rack external lock fixture 142c fitted at a second fixed distance to the hinged rack internal lock fixture 141c towards the extremity opposite to the hinge A 140*b*. The hinged rack internal lock fixture 141*c* has one hinged rack lock hole 143*e* and the hinged rack external lock fixture 142*c* has one hinged rack lock hole 143*f* at the top. One plain hinged rack hold bar 144*c* with no frustum shaped teeth runs from the extremity opposite to the hinge A 140*b* stopping short of the hinge A 140*b* in such a way that when the hinge A 140*b* is installed at the hinge pin 131, the hinged rack hold bar 144*c* stays outside the rack pole neck 132 and does not hit the rack pole 130.

A rack pole short hinged rack B 148 is fitted with an array of frustum shaped teeth 122*i* in the front face with the same height of the rack pole neck 132 and has one hinge B 146*b* at one extremity. The frustum shaped teeth 122*i* in the rack pole short hinged rack B 148 are so constructed that when the hinge B 146*b* is installed at the hinge pin 131 in the rack pole neck 132 the frustum shaped teeth 122*i* in the rack pole short hinged rack B 148 align perfectly with the frustum shaped teeth 122*b* in the rack pole 130.

The rack pole short hinged rack B 148 has one hinged rack internal lock fixture 141*d* fitted at a first fixed short distance to the hinge B 146*b* and one hinged rack external lock fixture 142*d* fitted at a second fixed distance to the hinged rack internal lock fixture 141*d* towards the extremity opposite to the hinge B 146*b*. The hinged rack internal lock fixture 141*d* has one hinged rack lock hole 143*g* and the hinged rack external lock fixture 142*d* has one hinged rack lock hole 143*h* at the top. One plain hinged rack hold bar 144*d* with no frustum shaped teeth runs from the extremity opposite to the hinge B 146*b* stopping short of the hinge B 146*b* in such a way that when the hinge B 146*b* is installed at the hinge pin 131, the hinged rack hold bar 144*d* stays outside the rack pole neck 132 and does not hit the rack pole 130.

Apart from the hinge A 140*b* and the hinge B 146*b* that are designed to fit, the rack pole short hinged rack A 147 and the rack pole short hinged rack B 148 are mirror images of each other.

The rack pole short hinged rack A 147 is a shorter, truncated version of the rack pole standard hinged rack A 139 with features and distances identical apart from the total length.

The rack pole short hinged rack B 148 is a shorter, truncated version of the rack pole standard hinged rack B 145 with features and distances identical apart from the total length.

A rack pole top cover 149 consisting of an adequate, relatively short length of a square profile with one centered, square guide pin notch 108*c* at the bottom and one centered, square shelf insertion notch 110*b* at the top is designed to be placed on top of the rack pole 130 by means of fitting the guide pin notch 108*c* of the rack pole top cover 149 into the guide pin 107 of the rack pole 130.

The rack pole top cover 149 has one shelf support 128*b* plane at the same height of the length of the plain top spacer 119 that provides support at a short distance to the top of the rack pole 130 for other components of the structure of the advanced warehouse of the present invention. Differently from the plain top spacer 119 that has four plain faces, the rack pole top cover 149 has frustum shaped teeth 122*j* in two faces at the front that extend all the way to the top forming one rack extension 129*b* that has the same width as the shelf stub 113 and the quarter stub 115 (see FIG. 3).

The rack pole top cover 149 has a pair of rack pole top lock fixtures 150*a*, 150*b* placed at the bottom of the two plain faces at the back. Each rack pole top lock fixture 150*a*, 150*b* is equipped with a respective rack pole top lock hole 151*a*, 151*b*.

A series of lock bars 154 are used in the assembled structure to lock the moving components. Each lock bar 154 is placed between one rack pole top lock hole 151 in the rack pole top lock fixture 150 in the rack pole top cover 149 and one hinged rack lock hole 143 either in the hinged rack internal lock fixture 141 or in the hinged rack external lock fixture 142.

Figure 4A:
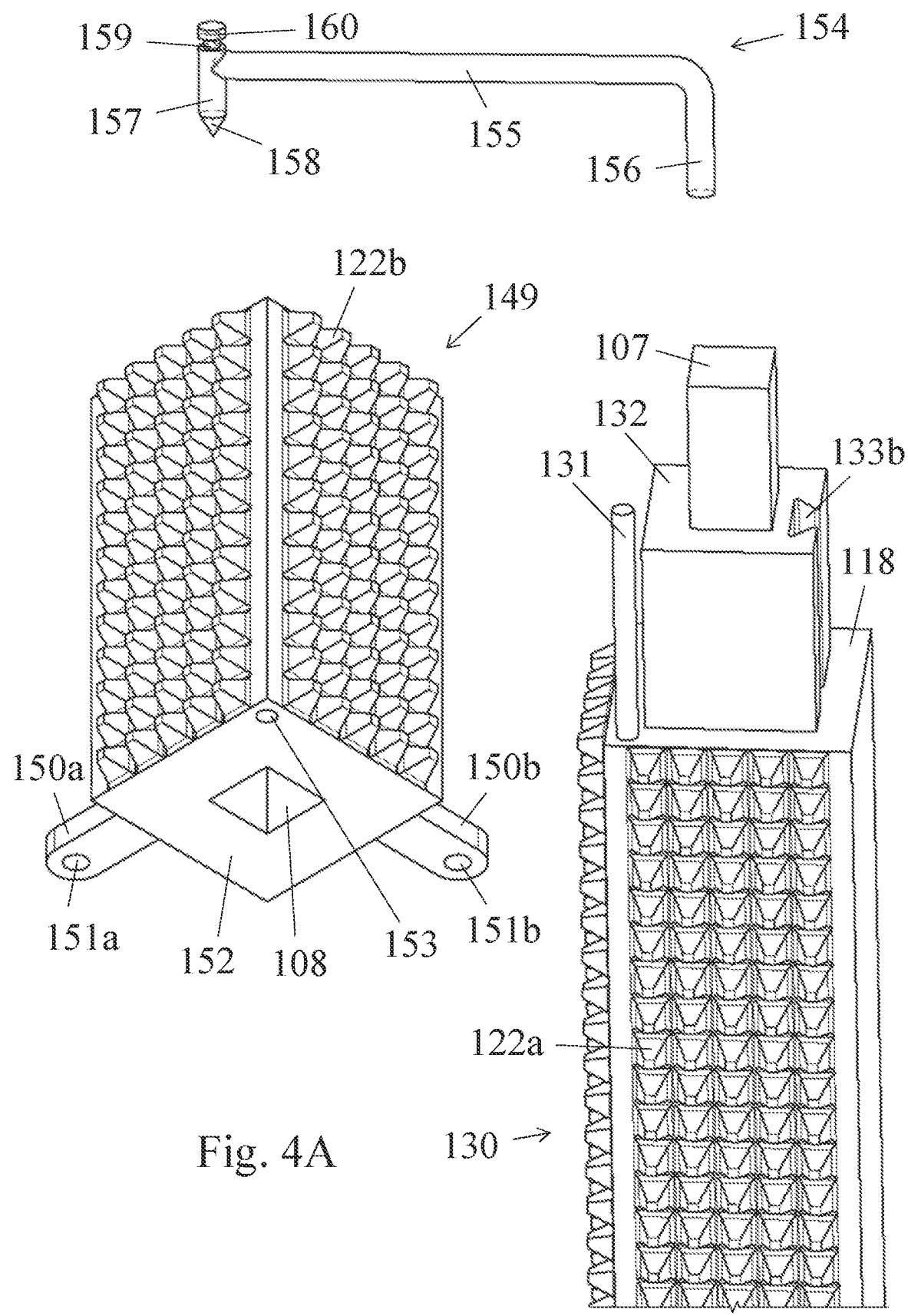
FIG. 4A is an isometric view of three of the parts shown in FIG. 4 to show additional features of the parts.

Detail FIG. 4A shows the rack pole 130, the rack pole top cover 149, and the lock bar 154 in greater magnification and from a different angle to show additional detail.

The rack pole 130 has frustum shaped teeth 122*a* in two faces at the front that extend all the way to the pole horizontal rack plane 118. The hinge pin 131 and the rack pole neck 132 with the dovetail notches 133*b* at the faces opposite to the hinge pin 131 that allow the fixation of additional components required to complete the structure are also visible. The centered, square guide pin 107 is located at the top of the rack pole 130.

The rack pole top cover 149 has a flat rack pole base 152 with a hinge pin hole 153 in the corner between the two faces with frustum shaped teeth 122*b*. When the rack pole top cover 149 is placed at the top of the rack pole 130 and the guide pin 107 of the rack pole 130 is fully inserted into the guide pin notch 108 at the bottom of the rack pole top cover 149, the hinge pin hole 153 aligns perfectly with the hinge pin 131 and covers the top part of the hinge pin 131 providing additional strength and stability to the hinge pin 131.

The two rack pole top lock fixtures 150*a*, 150*b* with the respective rack pole top lock holes 151*a*, 151*b* are also visible in greater detail.

The lock bar 154 is composed of a horizontal bar 155 that terminates in a centered vertical bar 156 in one extremity and in a pivoting vertical bar 157 in the other extremity. The centered vertical bar 156 is inserted into one rack pole top lock hole 151 in the rack pole top lock fixture 150 in the rack pole top cover 149 and remain inserted at all times, functioning as a fixed reference point around that the lock bar 154 can rotate when needed. The pivoting vertical bar 157 has a tapered end 158 to facilitate the insertion of the pivoting vertical bar 157 in one hinged rack lock hole 143 either in the hinged rack internal lock fixture 141 or in the hinged rack external lock fixture 142. A lock bar grabbing neck 159 at the top of the pivoting vertical bar 157 with a lock bar knob 160 provide a grabbing spot to manipulate the lock bar 154, allowing it to be raised and lowered and rotated around the pivoting vertical bar 157 (see FIG. 41B, FIG. 41C, FIG. 41D, FIG. 41E, and FIG. 41F).

Figure 5:
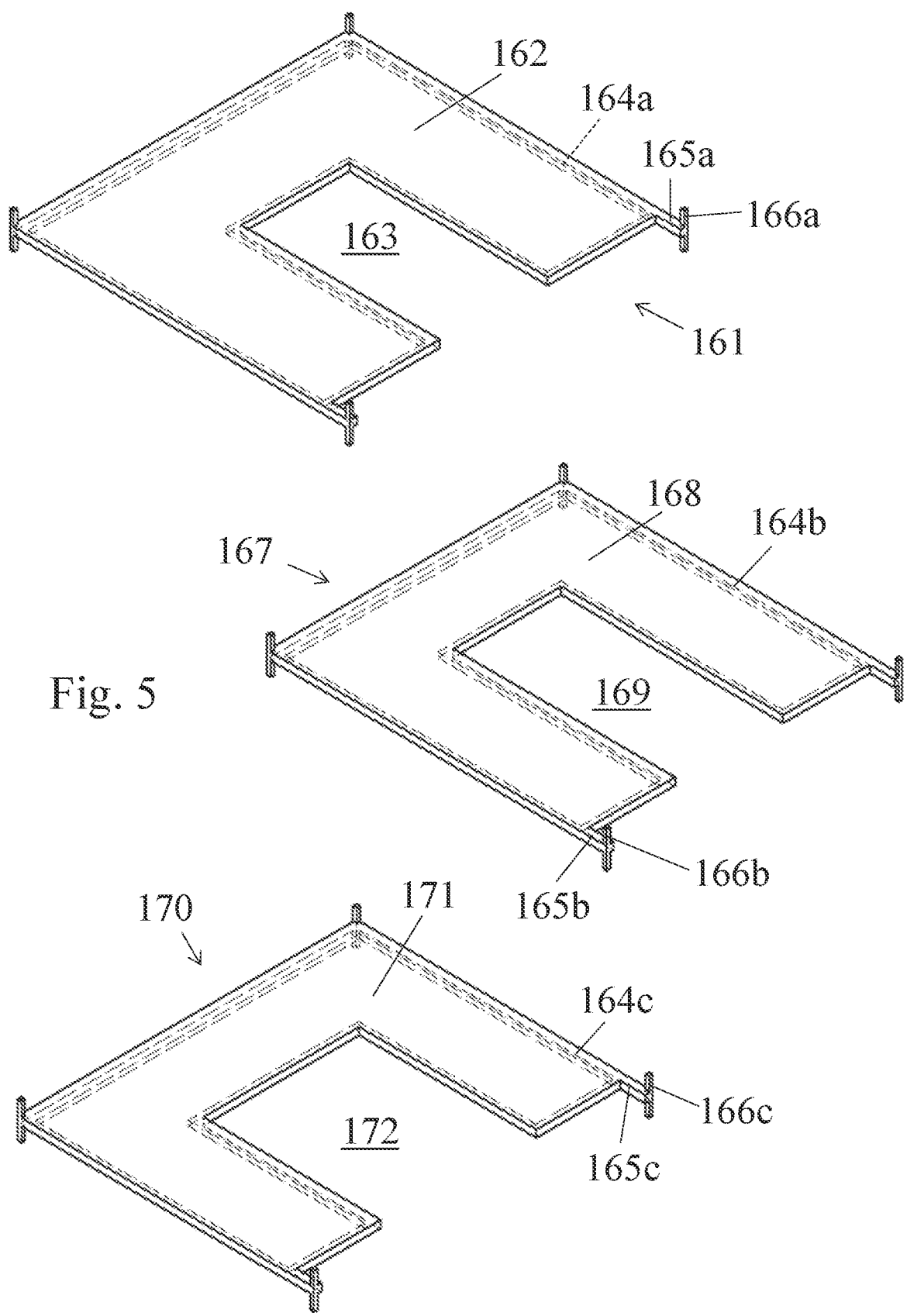
FIG. 5 is an isometric view of one embodiment of a third out of three set of parts used to construct an advanced warehouse of the present invention.

FIG. 5 shows embodiments of a third out of three sets of parts used to construct an advanced warehouse of the present invention.

In a first embodiment, a shelf 161 consists of a shelf base 162 in the shape of an U that has the same length and width with a shelf access channel 163 in the center. The shelf 161 has a rim reinforcement 164*a* around the shelf base 162 that provides additional reinforcement to support weight. The rim reinforcement 164*a* extends into a pair of shelf necks 165*a* that provides clearance to the front of the shelf 161. A set of four shelf fixation pins 166*a*, with one at each of the four corners of the shelf 161 provides a means to fixate the shelf 161 to the structure of the advanced warehouse of the present invention.

In a second embodiment, a longer shelf 167 consists of a longer shelf base 168 in the shape of an U that is longer than wider with a longer shelf access channel 169 in the center. The longer shelf 167 has one rim reinforcement 164*b* around the longer shelf base 168 that provides additional reinforcement to support weight. The rim reinforcement 164*b* extends into one pair of shelf necks 165*b* that provides clearance to the front of the longer shelf 167. One set of four shelf fixation pins 166*b*, with one at each of the four corners of the longer shelf 167 provides a means to fixate the longer shelf 167 to the structure of the advanced warehouse of the present invention.

In a third embodiment, a wider shelf 170 consists of a wider shelf base 171 in the shape of an U that is wider than longer with a wider shelf access channel 172 in the center. The wider shelf 170 has one rim reinforcement 164*c* around the wider shelf base 171 that provides additional reinforcement to support weight. The rim reinforcement 164*c* extends into one pair of shelf necks 165*c* that provides clearance to the front of the wider shelf 170. One set of four shelf fixation pins 166*c*, with one at each of the four corners of the wider shelf 170 provides a means to fixate the wider shelf 170 to the structure of the advanced warehouse of the present invention.

For each embodiment, the dimensions of the hinged rack lattice structure are adjusted to accommodate a longer shelf 167 or a wider shelf 170. The embodiment described using a shelf 161 not to limit the operation or use of the present invention to any one embodiment and other embodiments and within the scope of the present invention.

Figure 6:
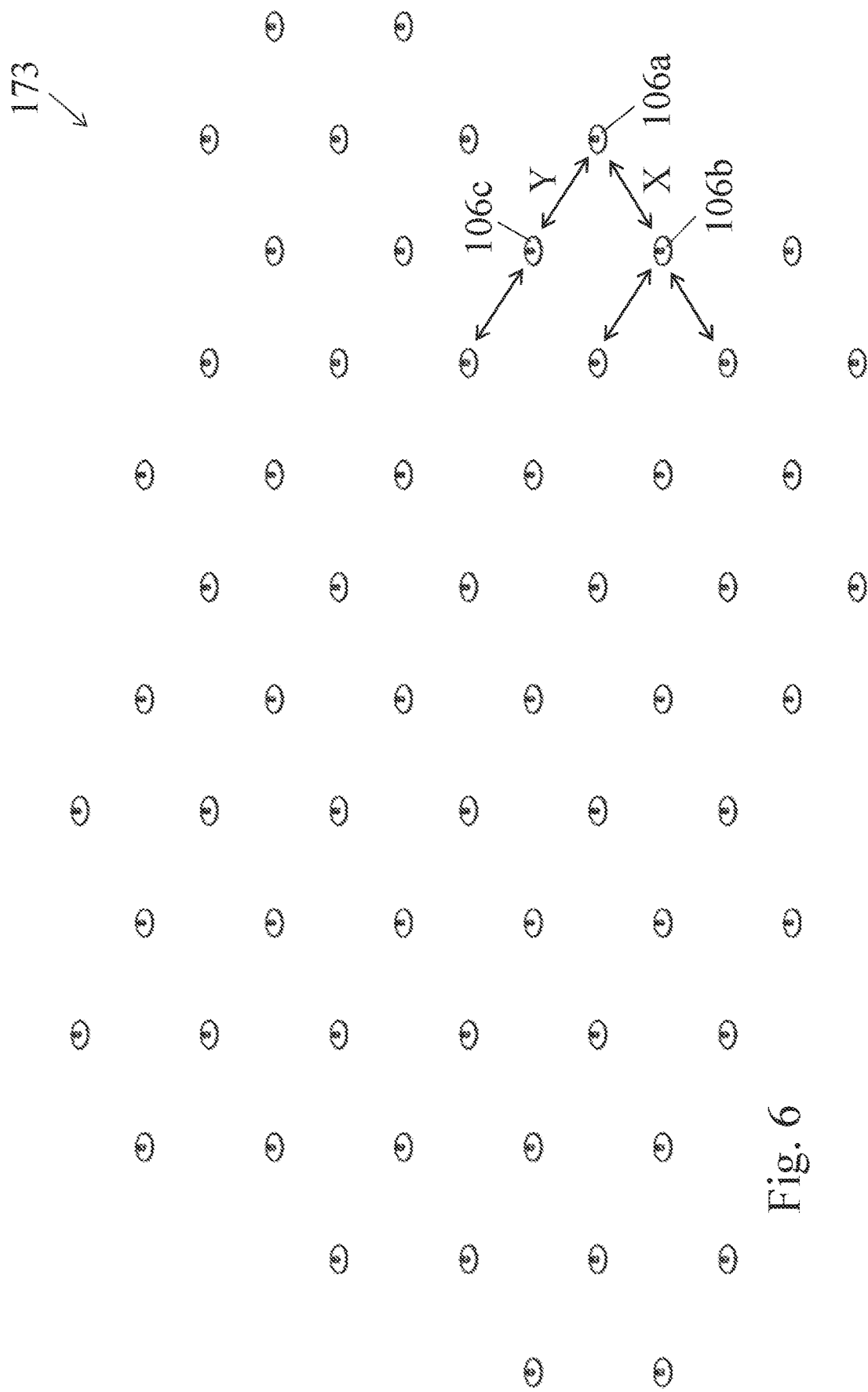
FIG. 6 is an isometric view of the first step of the assembly process of one embodiment of an advanced warehouse of the present invention using the parts shown in previous FIG. 3 through FIG. 5.

FIG. 6 shows the first step of a warehouse being assembled 173. One array of bases 106*a*, 106*b*, 106*c*, etc. with the bases 106*a*, 106*b*, 106*c* placed at the adequate distance from each other in the X and Y direction, is constructed.

Figure 7:
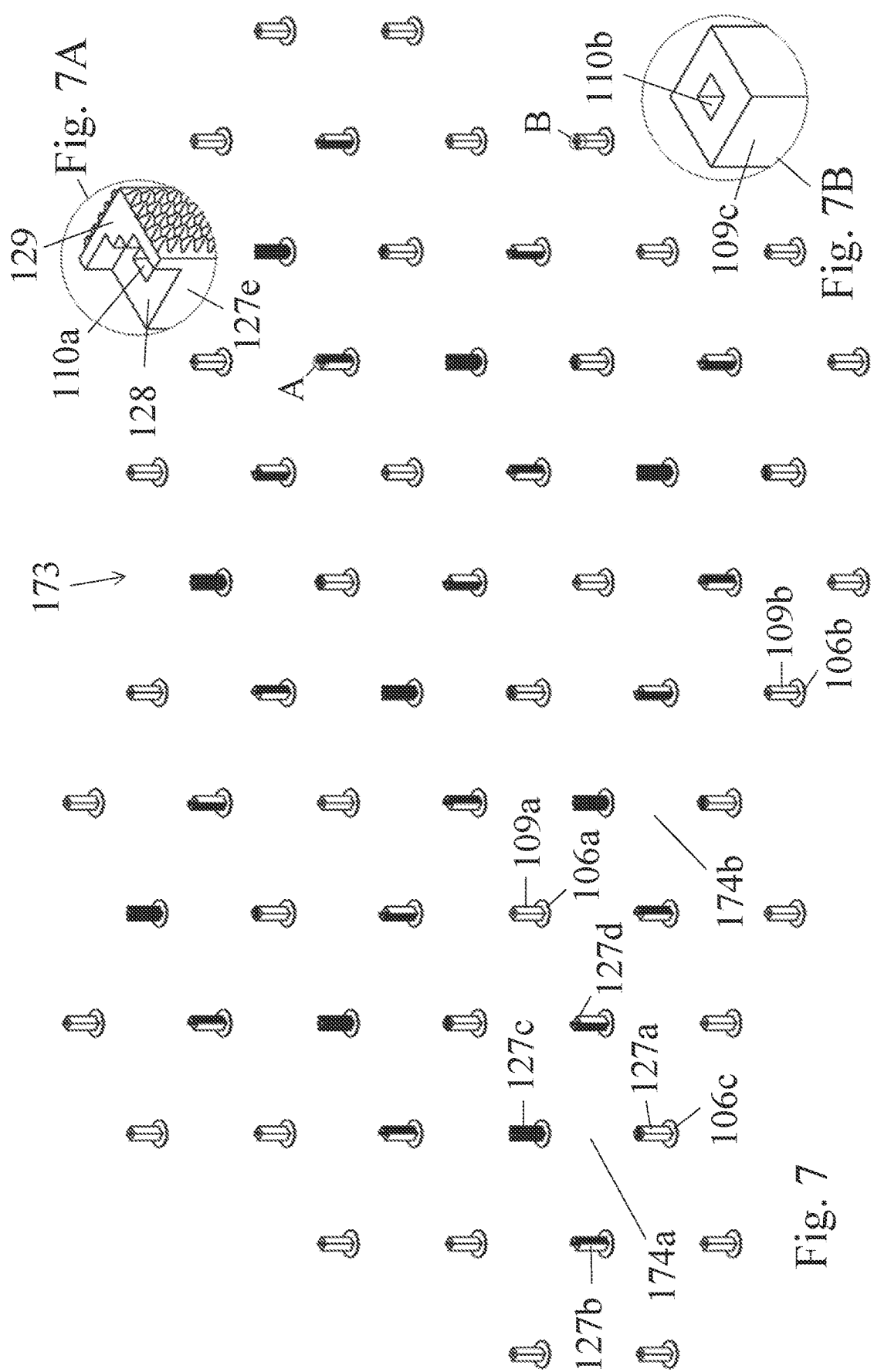
FIG. 7 is an isometric view of the second step of the assembly process of one embodiment of an advanced warehouse of the present invention using the parts shown in previous FIG. 3 through FIG. 5.

FIG. 7 shows the second step of the warehouse being assembled 173. At the correct places, the required number of base spacers 109*a*, 109*b*, etc. and base rack spacers 127*a*, 127*b*, 127*c*, 127*d*, etc. are placed on top of the corresponding bases 106*a*, 106*b*, 106*c*, etc. The base rack spacers 127*a*, 127*b*, 127*c*, 127*d*, are placed with the front faces facing each other creating a set of access shafts 174*a*, 174*b*, etc. that are regularly spaced.

Detail FIG. 7A shows one base rack spacer 127*e* in greater magnification to display the shelf insertion notch 110*a* that is used for the installation of shelves at a later stage. Also visible are the features of the shelf support 128 and the rack extension 129.

Detail FIG. 7B shows one base spacer 109*c* in greater magnification to display the shelf insertion notch 110*b* that is used for the installation of shelves at a later stage.

Figure 8:
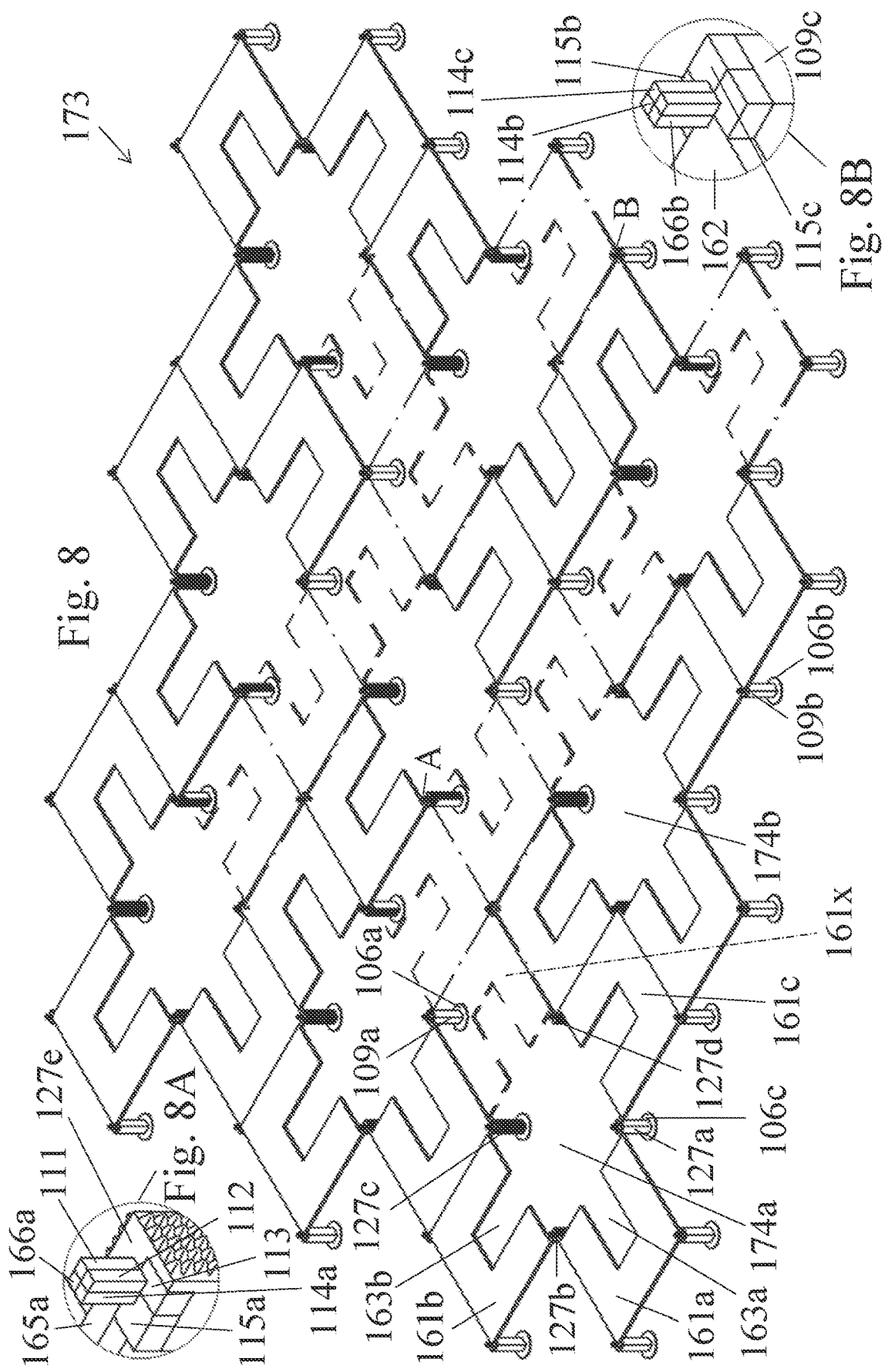
FIG. 8 is an isometric view of the third step of the assembly process of one embodiment of an advanced warehouse of the present invention using the parts shown in previous FIG. 3 through FIG. 5.

FIG. 8 shows the third step of the warehouse being assembled 173. One array of shelves 161*a*, 161*b*, 161*c*, etc. with each shelf placed at the right orientation is placed over the array of base spacers 109*a*, 109*b*, etc. and base rack spacers 127*a*, 127*b*, 127*c*, 127*d*, etc. that have been previously placed on top of the corresponding bases 106*a*, 106*b*, 106*c*, etc.

The orientation of one particular shelf 161*a*, 161*b*, 161*c*, etc. is defined by its relative position with respect to the access shaft 174*a*, 174*b*, etc. it is connected to. Each shelf 161*a*, 161*b*, etc. is placed with its shelf access channel 163*a*, 163*b*, etc. opening to the respective access shaft 174*a*, 174*b*, etc. it is connected to.

At the ground level, the layout of shelves is different than at the subsequent levels due to the necessity to provide access paths to the access shafts 174*a*, 174*b*, etc. to load and unload pallets. At the ground level, some shelves 161*x* (drawn in dash dot lines) are therefore not installed. More shelves may be removed or not installed at ground level to increase the number of access paths to the access shafts 174*a*, 174*b*, etc. eventually removing all shelves from the ground level to enable maximum access to all access shafts 174*a*, 174*b*, etc.

Where needed, plain blanks 111, shelf blanks 112, and quarter blanks 114 are installed to fill missing elements and ensure the stability of the structure (see detail FIG. 8A and detail FIG. 8B).

Detail FIG. 8A shows one base rack spacer 127*e* in greater magnification to display the shelf neck 165*a* and shelf fixation pin 166*a* from the corresponding shelf installed at this particular place and the plain blank 111, the shelf blank 112, and quarter blank 114*a* installed to complete the structure and fill the space left by missing elements that were not installed to provide access paths to the access shafts 174*a*, 174*b*, etc. The shelf stub 113 of the shelf blank 112 fills the space corresponding to one missing shelf neck from one missing shelf not installed at the access shaft that the base rack spacer 127*e* is connected. The quarter stub 115*a* of the quarter blank 114*a* fills the space of one missing shelf base from one missing shelf not installed at a neighboring access shaft.

Detail FIG. 8B shows one base spacer 109*c* in greater magnification to display the shelf base 162 and shelf fixation pin 166*b* from the corresponding shelf installed at this particular place and the quarter blanks 114*b*, 114*c*, etc. installed to complete the structure and fill the space left by missing elements that were not installed to provide access paths to the access shafts 174*a*, 174*b*, etc. and because the base spacer 109*c* is located on the edge of the structure.

The quarter stubs 115*b*, 115*c*, etc. of the quarter blanks 114*b*, 114*c*, etc. fill the space of missing shelf bases 162 left from missing shelves not installed.

Figure 9:
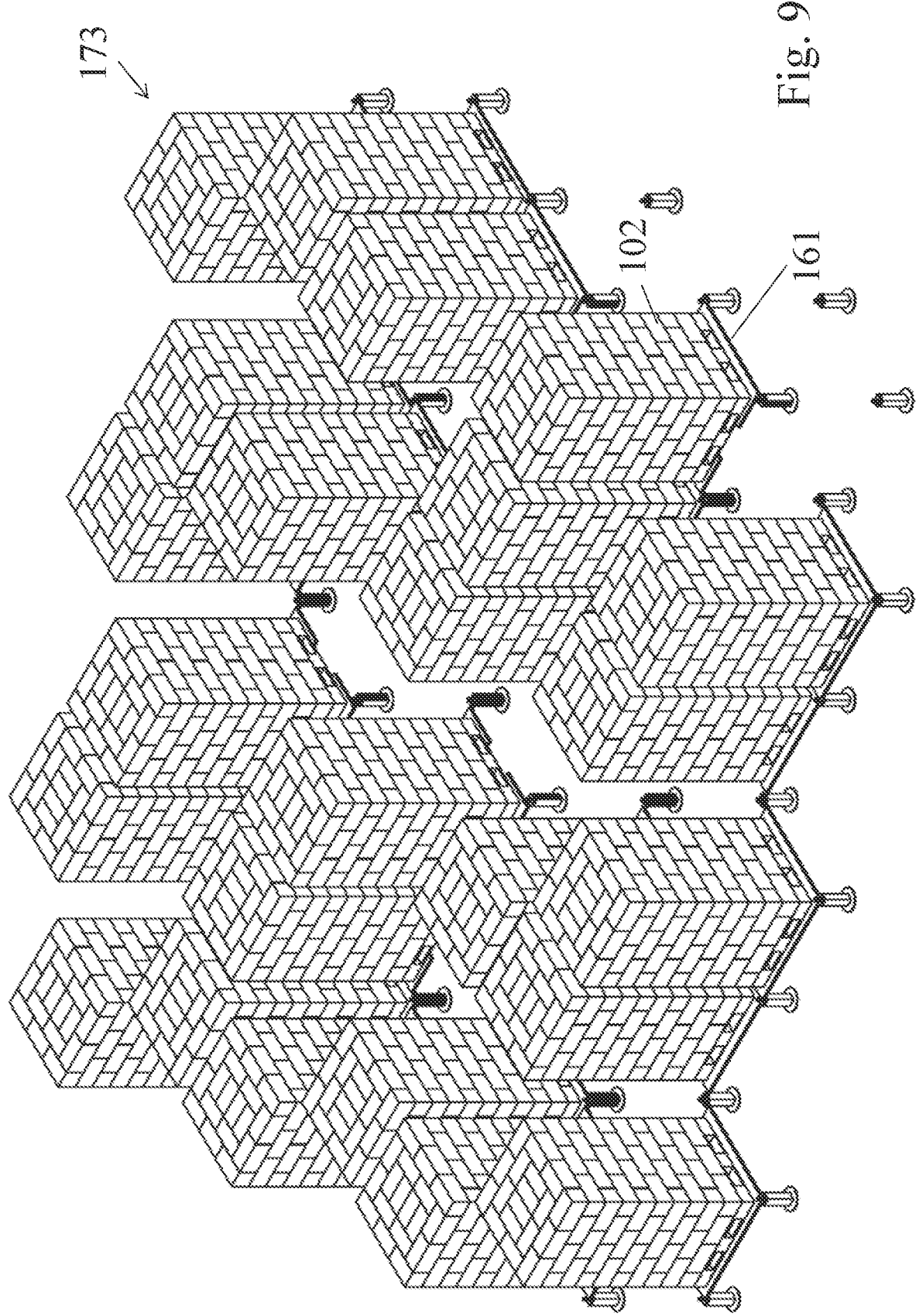
FIG. 9 is an isometric view of an intermediate stage of the assembly process of one embodiment of the advanced warehouse of the present invention with 9 access shafts showing pallets placed on the ground level.

FIG. 9 shows the warehouse being assembled 173 in an intermediate stage with pallets 102 placed on the ground level, each pallet 102 resting on its corresponding installed shelf 161.

FIG. 10 shows a top view of the warehouse being assembled 173 in an intermediate stage with pallets 102 placed on the ground level, each pallet 102 resting on its corresponding installed shelf 161. The access paths to all access shafts 174*a*, 174*b*, etc. produced by not installing shelves at convenient points of the structure are indicated using double arrowed lines.

FIG. 11 shows a first configuration of components for a rack pole assembly with one rack pole 130, one rack pole standard hinged rack A 139, one rack pole standard hinged rack B 145, and one rack pole top cover 149 properly installed with moving components in a first position.

The rack pole standard hinged rack A 139 is held at a fixed position aligned to the left front face of the rack pole 130 by means of one lock bar 154*a* installed between the rack pole top lock fixture 150*a* and the hinged rack external lock fixture 142*a* of the rack pole standard hinged rack A 139 leaving the hinged rack internal lock fixture 141*a* unused.

The rack pole standard hinged rack B 145 is held at a fixed position aligned to the right front face of the rack pole 130 by means of one lock bar 154*b* installed between the rack pole top lock fixture 150*b* and the hinged rack external lock fixture 142*b* of the rack pole standard hinged rack B 145 leaving the hinged rack internal lock fixture 141*b* unused.

In this position and at the angle shown in FIG. 11, parts of the hinge A 140 and the hinge B 146 are visible.

FIG. 12 shows the same configuration of components for a rack pole assembly shown in FIG. 11 with one rack pole 130, one rack pole standard hinged rack A 139, one rack pole standard hinged rack B 145, and one rack pole top cover 149 properly installed with moving components in a second position.

The rack pole standard hinged rack A 139 is held at a fixed position aligned to the right front face of the rack pole 130 and to the rack pole standard hinged rack B 145 by means of one lock bar 154a installed between the rack pole top lock fixture 150a and the hinged rack internal lock fixture 141a of the rack pole standard hinged rack A 139 leaving the hinged rack external lock fixture 142a unused.

The rack pole standard hinged rack B 145 is held at a fixed position aligned to the right front face of the rack pole 130 by means of one lock bar 154b installed between the rack pole top lock fixture 150b and the hinged rack external lock fixture 142b of the rack pole standard hinged rack B 145 leaving the hinged rack internal lock fixture 141b unused.

In this position and at the angle shown in FIG. 12, parts of the rack pole neck cover 134 are visible.

FIG. 13 shows a second configuration of components for a rack pole assembly with one rack pole 130, one rack pole standard hinged rack A 139, one rack pole standard hinged rack B 145, one rack pole standard fixed rack 137 and one rack pole top cover 149 properly installed with moving components in the same first position shown in FIG. 11.

The rack pole standard hinged rack A 139 is held at a fixed position aligned to the left front face of the rack pole 130 by means of one lock bar 154a installed between the rack pole top lock fixture 150a and the hinged rack external lock fixture 142a of the rack pole standard hinged rack A 139 leaving the hinged rack internal lock fixture 141a unused.

The rack pole standard hinged rack B 145 is held at a fixed position aligned to the right front face of the rack pole 130 by means of one lock bar 154b installed between the rack pole top lock fixture 150b and the hinged rack external lock fixture 142b of the rack pole standard hinged rack B 145.

The rack pole standard fixed rack 137 is rigidly attached to the rack pole 130 and is therefore not affected by the movement of other components.

FIG. 14 shows the same second configuration of components for a rack pole assembly shown in FIG. 13 with one rack pole 130, one rack pole standard hinged rack A 139, one rack pole standard hinged rack B 145, one rack pole standard fixed rack 137, and one rack pole top cover 149 properly installed with moving components in a third position.

The rack pole standard hinged rack A 139 is held at a fixed position aligned to the left front face of the rack pole 130 by means of one lock bar 154a installed between the rack pole top lock fixture 150a and the hinged rack external lock fixture 142a of the rack pole standard hinged rack A 139 leaving the hinged rack internal lock fixture 141a unused.

The rack pole standard hinged rack B 145 is held at a fixed position aligned to the left front face of the rack pole 130 and to the rack pole standard hinged rack A 139 by means of one lock bar 154b installed between the rack pole top lock fixture 150b and the hinged rack internal lock fixture 141b of the rack pole standard hinged rack B 145 leaving the hinged rack external lock fixture 142b unused.

The rack pole standard fixed rack 137 is rigidly attached to the rack pole 130 and is therefore not affected by the movement of other components.

FIG. 15 shows one embodiment of the advanced warehouse of the present invention showing one access shaft 174 with two levels and with moving parts in the first position.

One rack pole 130 equipped with one rack pole standard hinged rack A 139, one rack pole standard hinged rack B 145, and one rack pole top cover 149 properly installed is placed on top of each base rack spacer 127 and its corresponding base 106a at the proper orientation with the front faces of the base rack spacer 127 and the front faces of the rack pole 130 having frustum shaped teeth 122 facing towards the center of the access shaft 174.

Similarly, one plain pole 116 with one single rack piece 120a installed and fitted with one plain top spacer 119 at the top is placed on top of each base spacer 109 and its corresponding base 106b at the proper orientation with the single rack pieces 120a, 120b, etc. aligned with the corresponding shelf 161d, 161e, etc. above it.

One shelf has not been installed on the ground level to allow access to the access shaft 174, leaving the ground level with three shelves 161a, 161b, and 161c. The first level has all four shelves 161d, 161e, 161f, and 161g installed.

Only two pallets 102a, 102b of the total capacity of seven are shown as reference to avoid obstructing the view of other components of the structure.

In the first position shown in FIG. 15, the access shaft 174 is configured to allow vertical movement only and horizontal movement is not possible above the ground level. In the first position, the shelves 161d, 161e, 161f, and 161g in the first level are not accessible. The shelves 161a, 161b, and 161c that are at ground level are accessible and remain accessible at all times.

One rack pole neck cover 134 used when no fixed rack is attached to the rack pole 130 is also visible.

Detail FIG. 15A shows the rack pole 130 equipped with one rack pole standard hinged rack A 139, one rack pole standard hinged rack B 145, and one rack pole top cover 149 in greater magnification to display additional details including the shape of the structures containing frustum shaped teeth 122.

The rack pole standard hinged rack A 139 is held at a fixed position aligned to the left front face of the rack pole 130 using the lock bar 154a that is attached to the hinged rack external lock fixture 142a of the rack pole standard hinged rack A 139.

The rack pole standard hinged rack B 145 is held at a fixed position aligned to the right front face of the rack pole 130 using the lock bar 154b that is attached to the hinged rack external lock fixture 142b of the rack pole standard hinged rack B 145.

Detail FIG. 15A also shows the shelves 161f, and 161g, one plain blank 111, and one quarter blank 114 installed on the rack pole top cover 149 completing the structure and providing a proper place for the installation of one additional rack pole 130 to build another level of the structure.

Figures 16, 16A:
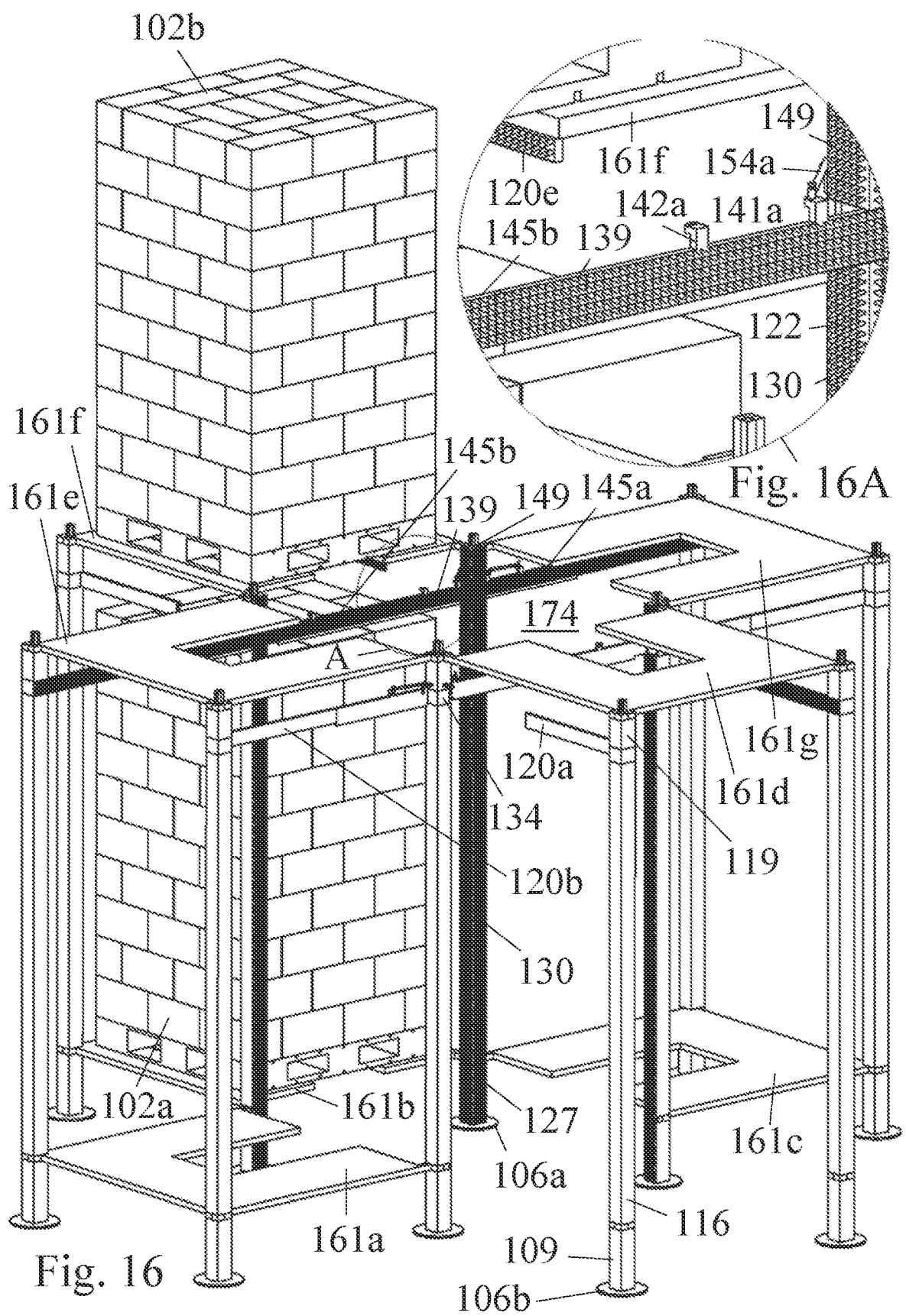
FIG. 16 is an isometric view of one embodiment of the advanced warehouse of the present invention showing a access shaft with two levels and with moving parts in a second position.
FIG. 16A is an isometric view of the moving parts in one rack pole of the access shaft of the advanced warehouse of the present invention with two levels and with moving parts in the second position.

FIG. 16 shows one embodiment of the advanced warehouse of the present invention showing one access shaft 174 with two levels and with moving parts in the second position.

One rack pole 130 equipped with one rack pole standard hinged rack A 139, one rack pole standard hinged rack B 145a, and one rack pole top cover 149 properly installed is placed on top of each base rack spacer 127 and its corresponding base 106a at the proper orientation with the front faces of the base rack spacer 127 and the front faces of the rack pole 130 having frustum shaped teeth 122 facing towards the center of the access shaft 174.

Similarly, one plain pole 116 with one single rack piece 120a installed and fitted with one plain top spacer 119 at the top is placed on top of each base spacer 109 and its corresponding base 106b at the proper orientation with the single rack pieces 120a, 120b, etc. aligned with the corresponding shelf 161d, 161e, etc. above it.

One shelf has not been installed on the ground level to allow access to the access shaft 174, leaving the ground level with three shelves 161a, 161b, and 161c. The first level has all four shelves 161d, 161e, 161f, and 161g installed.

Only two pallets 102a, 102b of the total capacity of seven are shown as reference to avoid obstructing the view of other components of the structure.

In the second position shown in FIG. 16, the access shaft 174 is configured to allow horizontal movement only and vertical movement is temporarily blocked. In the second position, the rack pole standard hinged rack A 139 and the rack pole standard hinged rack B 145b join at the edges to form a continuous seamless rack that bridges the gap in front of shelf 161f and continues in both directions all the way to the edges of the structure. Similarly, the gap in front of shelf 161d is also bridged. As a result, the shelves 161e, and 161g are accessible while the shelves 161d, and 161f are isolated from the access shaft 174. Components associated with the access to the shelves 161d, and 161f such as the single rack piece 120a remain disconnected from the rest of the rack structure.

One rack pole neck cover 134 used when no fixed rack is attached to the rack pole 130 is also visible.

Detail FIG. 16A shows the bridged region produced with the moving components in the second position in greater magnification to display additional details including the shape of the structures containing frustum shaped teeth 122.

The rack pole standard hinged rack A 139 and the rack pole standard hinged rack B 145b join at the edges to form a continuous seamless rack that bridges the gap in front of shelf 161f As the rack pole standard hinged rack A 139 moves to join with the rack pole standard hinged rack B 145b, the single rack piece 120c becomes disconnected from the rest of the rack structure.

The rack pole standard hinged rack A 139 is held at a fixed position aligned to the right front face of the rack pole 130 using the lock bar 154a that is attached to the hinged rack internal lock fixture 141a of the rack pole standard hinged rack A 139 leaving the hinged rack external lock fixture 142a unused.

FIG. 17 shows one embodiment of the advanced warehouse of the present invention showing one access shaft 174 with two levels and with moving parts in the third position.

One rack pole 130 equipped with one rack pole standard hinged rack A 139a, one rack pole standard hinged rack B 145a, and one rack pole top cover 149 properly installed is placed on top of each base rack spacer 127 and its corresponding base 106a at the proper orientation with the front faces of the base rack spacer 127 and the front faces of the rack pole 130 having frustum shaped teeth 122 facing towards the center of the access shaft 174.

Similarly, one plain pole 116 with one single rack piece 120a installed and fitted with one plain top spacer 119 at the top is placed on top of each base spacer 109 and its corresponding base 106b at the proper orientation with the single rack pieces 120a, 120b, etc. aligned with the corresponding shelf 161d, 161e, etc. above it.

One shelf has not been installed on the ground level to allow access to the access shaft 174, leaving the ground level with three shelves 161a, 161b, and 161c. The first level has all four shelves 161d, 161e, 161f, and 161g installed. For better visualization however, the shelf 161d is not shown and drawn in dash dotted lines for reference.

Only two pallets 102a, 102b of the total capacity of seven are shown as reference to avoid obstructing the view of other components of the structure.

In the third position shown in FIG. 17, the access shaft 174 is configured to allow horizontal movement only and vertical movement is temporarily blocked. In the third position, the rack pole standard hinged rack B 145a and the rack pole standard hinged rack A 139b join at the edges to form a continuous seamless rack that bridges the gap in front of shelf 161g. This continuous seamless rack extends in both directions until the edges of the structure, in one direction with the rack pole standard hinged rack B 145b and the single rack piece 120h and in the other direction with rack pole standard hinged rack A 139a and one additional single rack piece not visible as it is obstructed by the pallet 102b. The position of the single rack piece that is not visible can be determined though as it is the counterpart to the single rack piece 120d that is visible, the same way that the single rack piece 120h is the counterpart to the single rack piece 120a.

Similarly, the gap in front of shelf 161e is also bridged. As a result, the shelves 161d, and 161f are accessible while the shelves 161e, and 161g are isolated from the access shaft 174. Components associated with the access to the shelves 161e, and 161g such as the single rack piece 120b, 120g, etc. remain disconnected from the rest of the rack structure.

One rack pole neck cover 134 used when no fixed rack is attached to the rack pole 130 is also visible.

Detail FIG. 17A shows the bridged region produced with the moving components in the third position in greater magnification to display additional details including the shape of the structures containing frustum shaped teeth 122.

The rack pole standard hinged rack B 145a and the rack pole standard hinged rack A 139b join at the edges to form a continuous seamless rack that bridges the gap in front of shelf 161g.

The rack pole standard hinged rack B 145a is held at a fixed position aligned to the left front face of the rack pole 130 using the lock bar 154b that is attached to the hinged rack internal lock fixture 141b of the rack pole standard hinged rack B 145a leaving the hinged rack external lock fixture 142b unused.

Figure 18:
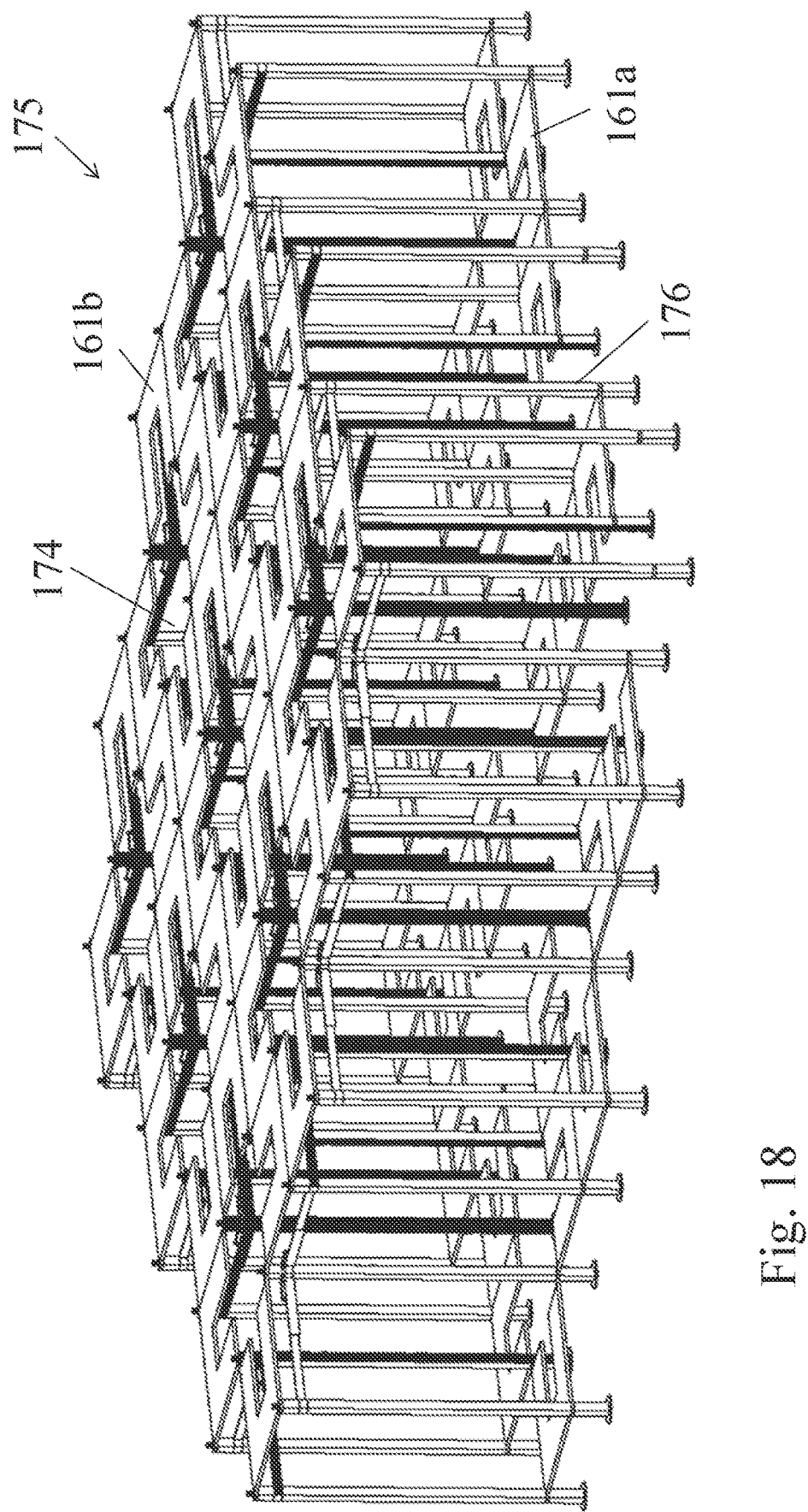
FIG. 18 is an isometric view of one embodiment of the advanced warehouse of the present invention with 9 access shafts, two levels and with moving parts in a first position.

FIG. 18 shows a complete two level nine cell warehouse 175 that has a warehouse structure 176 and is equipped with shelves 161a at ground level and shelves 161b at the first level. The warehouse structure 176 of the two level nine cell warehouse 175 is shown in the first position, allowing vertical movement in the access shafts 174.

Figure 19:
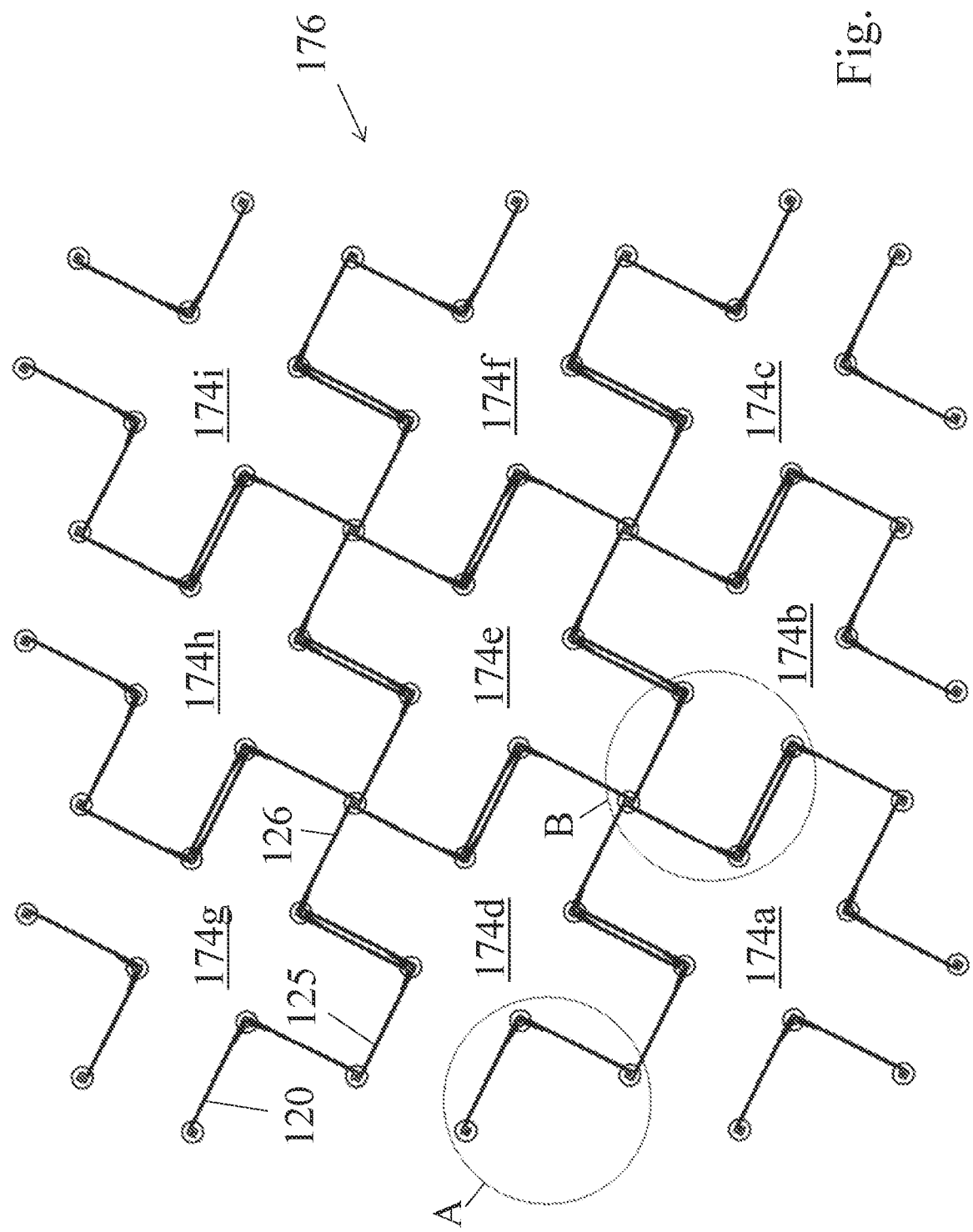
FIG. 19 is a top view of one embodiment of an advanced warehouse of the present invention with 9 access shafts and moving parts in a first position, not showing any shelf to show details of the warehouse structure.

FIG. 19 shows a top view of the warehouse structure 176 without shelves to allow a better view of the structure. The warehouse structure 176 is shown in the first position, allowing vertical movement in the access shafts 174a, 174b, etc.

The warehouse structure 176 requires the usage of different components depending on the location they are installed. At places in the edge of the warehouse structure 176 that are adjacent to only one access shaft 174g, the single rack piece 120 is installed. At places of the warehouse structure 176 that are adjacent to two access shafts 174d, and 174g the double standard rack piece 125 is installed and at places at the center of the warehouse structure 176 that are adjacent to four access shafts 174d, 174e, 174g, and 174h the quadruple standard rack piece 126 is installed.

Figure 19A:
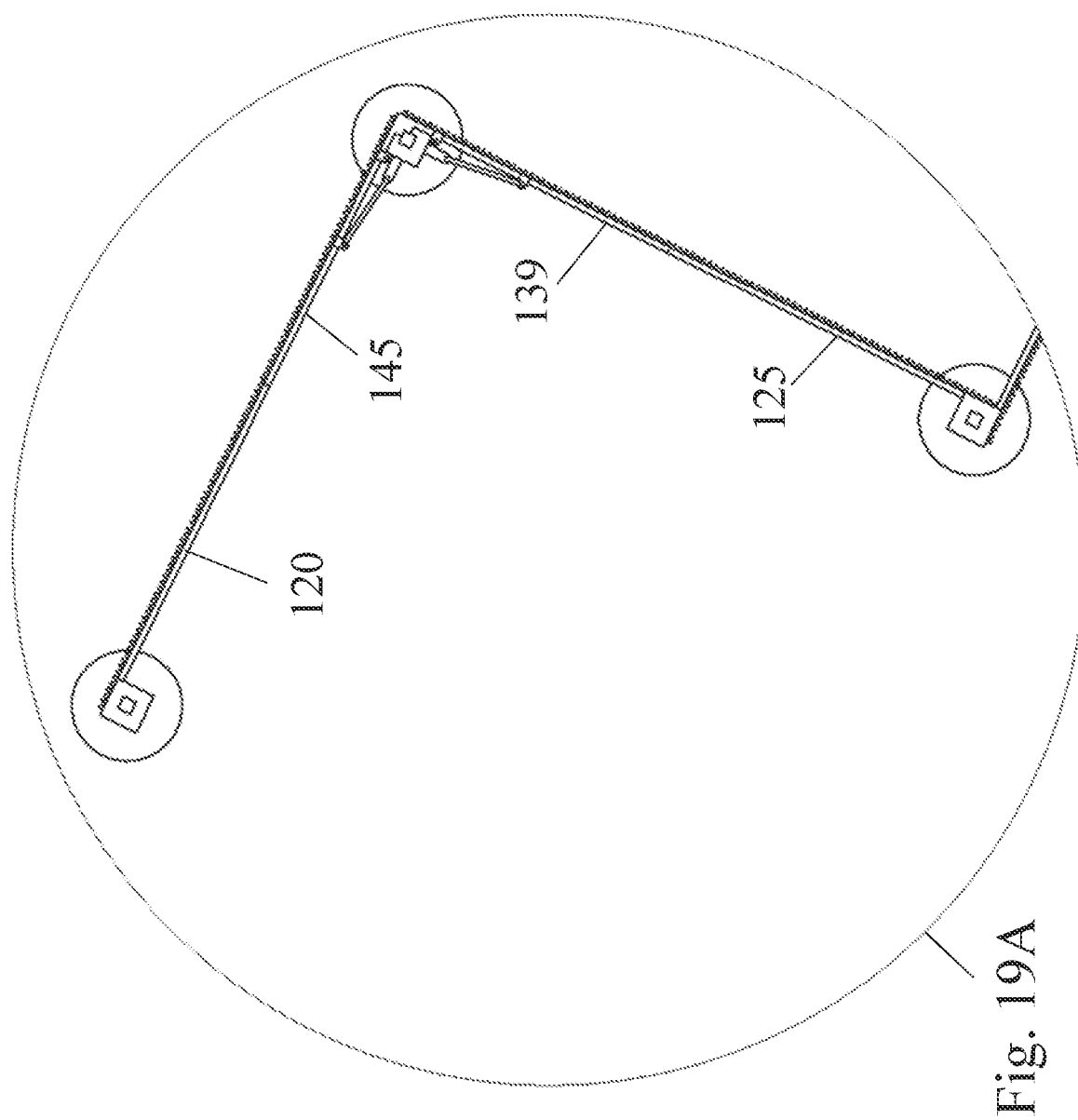
FIG. 19A is a top view of a first configuration of the warehouse structure.

Detail FIG. 19A shows one rack pole standard hinged rack B 145 and one rack pole standard hinged rack A 139 in the first position. In the first position, the rack pole standard hinged rack B 145 is in alignment with one single rack piece 120 at the top left and both parts make a continuous seamless rack. Similarly, in the first position the rack pole standard hinged rack A 139 is in alignment with one arm of one double standard rack piece 125 at the bottom and both parts make a continuous seamless rack.

Detail FIG. 19B shows a part of the warehouse structure 176 that requires the installation of rack pole standard fixed racks 137a, 137b to complete the structure.

The rack pole standard hinged rack A 139a and the rack pole standard hinged rack B 145a at the left and the rack pole standard hinged rack A 139b and the rack pole standard hinged rack B 145b at the right are both shown in the first position.

The rack pole standard hinged rack B 145a at the bottom left is in alignment with the rack pole standard fixed rack 137b at the bottom right and both parts make a continuous seamless rack. Similarly, the rack pole standard hinged rack B 145b at the right is in alignment with the rack pole standard fixed rack 137a at the left and both parts make a continuous seamless rack. The rack pole standard hinged rack A 139 in alignment with one arm of the quadruple standard rack piece 126 at the top right and both parts make a continuous seamless rack.

FIG. 20 shows a four level nine cell warehouse 177 with the corresponding four level warehouse structure 176 fully loaded with pallets 102.

FIG. 21 shows a top view of the four level nine cell warehouse 177 fully loaded with pallets 102 to illustrate the accessibility of individual pallets 102. Each access shaft 174a, 174b, etc. provides access to four pallets 102 as indicated by the double arrowed lines. Any pallet 102 is accessible through only one specific access shaft.

Figure 22:
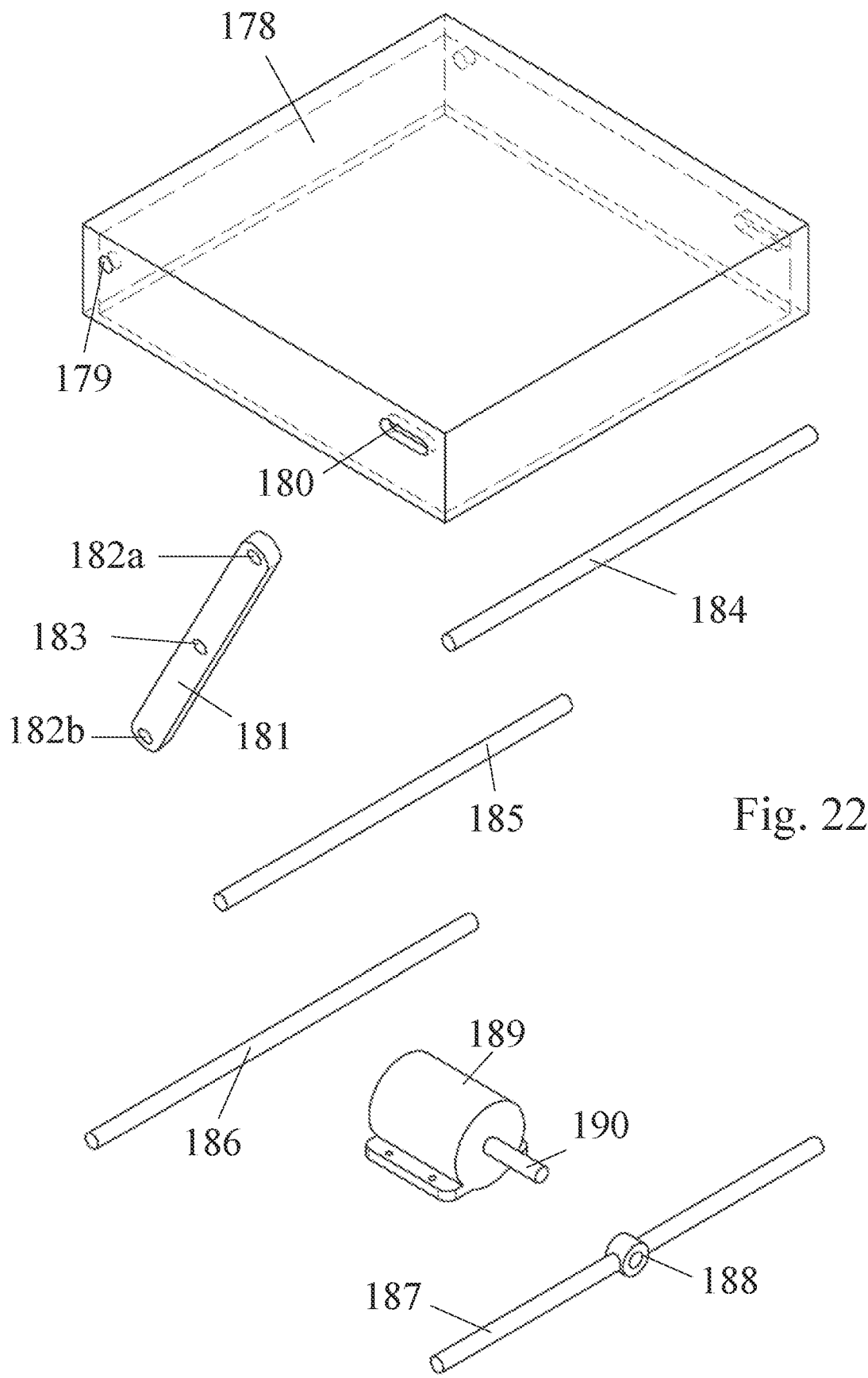
FIG. 22 is an isometric view of one embodiment of the parts used to construct a pantographic lift.
Figure 32:
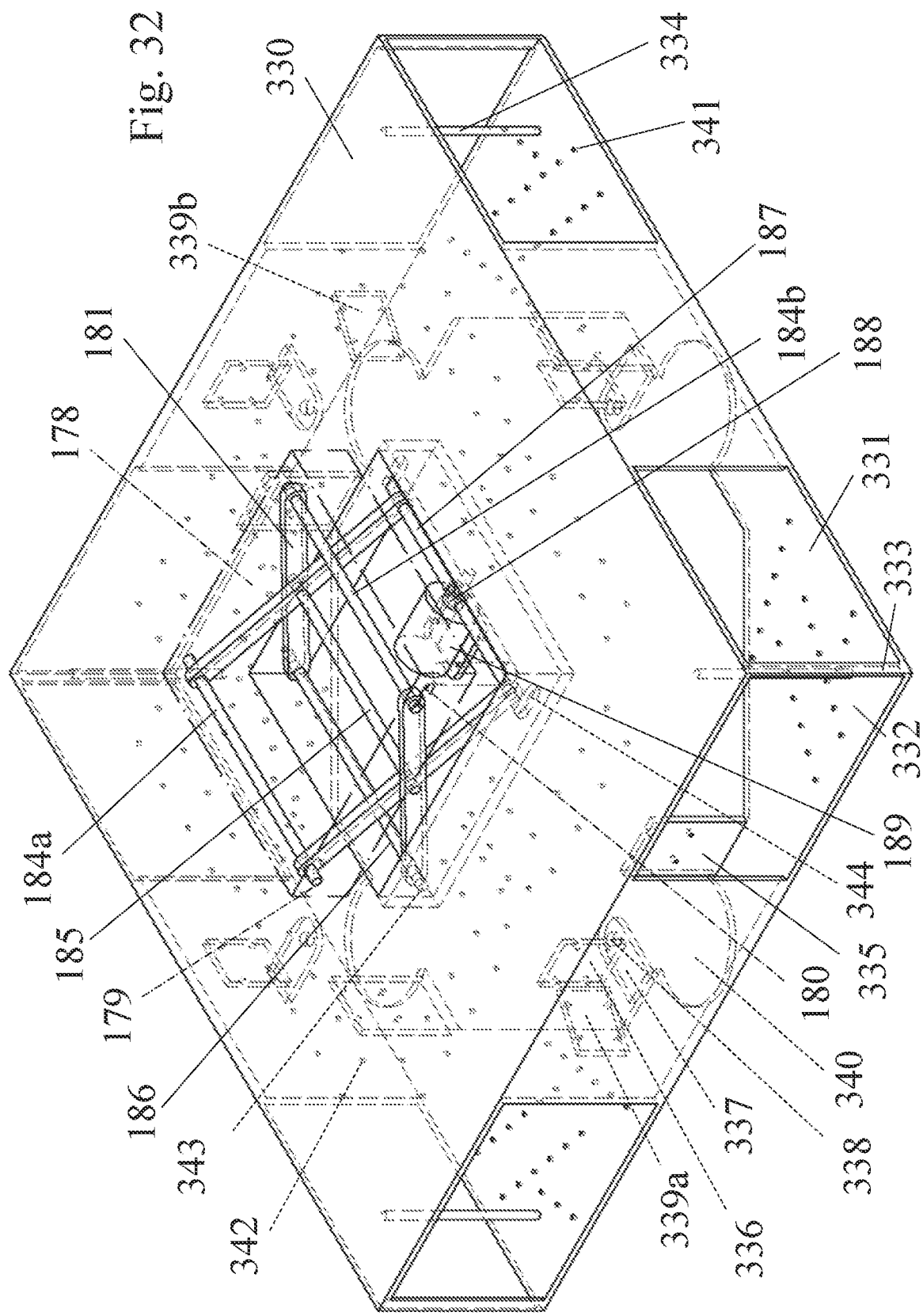
FIG. 32 is an isometric view of one embodiment of a pantographic lift assembled in the autonomous mobile lift robot case.

FIG. 22 shows components used to construct a pantographic lift (see FIG. 32).

A pantographic lift platform 178 has the shape of a parallelogram that is hollow and does not have the face at the bottom. The pantographic lift platform 178 has a platform fixed axis hole 179 located near the top face, parallel to the top face that goes all the way through from one side to the other side of the pantographic lift platform 178. The pantographic lift platform 178 also has a platform moving axis slot 180 that is parallel to the top face and is located at the same distance of the top face of the pantographic lift platform 178 as the platform fixed axis hole 179 and goes all the way through from one side to the other side of the pantographic lift platform 178.

A pantographic bar 181 is composed of a straight bar with a pair of outer axis holes 182a, 182b one at each end of the bar and a center axis hole 183 located at the center of the bar. Four pantographic bars 181 are required to build the pantographic lift. Two pantographic bars 181 are installed linked at the middle forming a "X" at each side of the pantographic lift platform 178 (see FIG. 32).

A top axis 184 is a simple rod with the same width as the outer wall of the pantographic lift platform 178. Two top axis 184 are required to build the pantographic lift, one installed at platform fixed axis hole 179 that remains fixed and another installed at the platform moving axis slot 180 that is able to slide the length of the platform moving axis slot 180.

The outer axis holes 182a of the pantographic bars 181 are inserted into the two top axis 184 before the top axis 184 are fully inserted into their corresponding places of installation. Matching sides of the top arms of the two "X" shapes constructed with the four pantographic bars 181 are inserted at each top axis 184 so that each top axis 184 is inserted into two top axis 184, one from each "X" shape that are at the same side of the "X" shapes (see FIG. 32).

A center axis 185 is a simple rod with the width as the inner wall of the pantographic lift platform 178. The center axis 185 is installed connecting the center axis holes 183 of all the four pantographic bars 181 used to construct the pantographic lift and that are arranged in two "X" shapes, one "X" shape at each side of the pantographic lift platform 178 (see FIG. 32).

A bottom fixed axis 186 is a simple rod longer than the width as the outer wall of the pantographic lift platform 178 to allow it to be installed at an anchoring point.

A bottom moving axis 187 is a simple rod with the same length of the bottom fixed axis 186 that has a bottom moving axis nut 188 at the center.

A pantographic engine 189 with a pantographic engine axis 190 of suitable length that has a thread with the same gage as the bottom moving axis nut 188 is used to engage the bottom moving axis nut 188 and move the bottom moving axis 187 closer or further away from the pantographic engine 189. Embodiments of the present invention comprise suitable electronics are provided within the scope of the present invention to establish connection to one or more digital devices such as computers, laptops, cellphones, tablets or other, may be connected wirelessly, using Wi-Fi, Bluetooth, cellular, radio-frequency, and other bandwidths for communication to have the one or more digital devices control the pantographic engine 189 to direct operation and movement or for scheduling of operations using one or more software applications.

Figure 23:
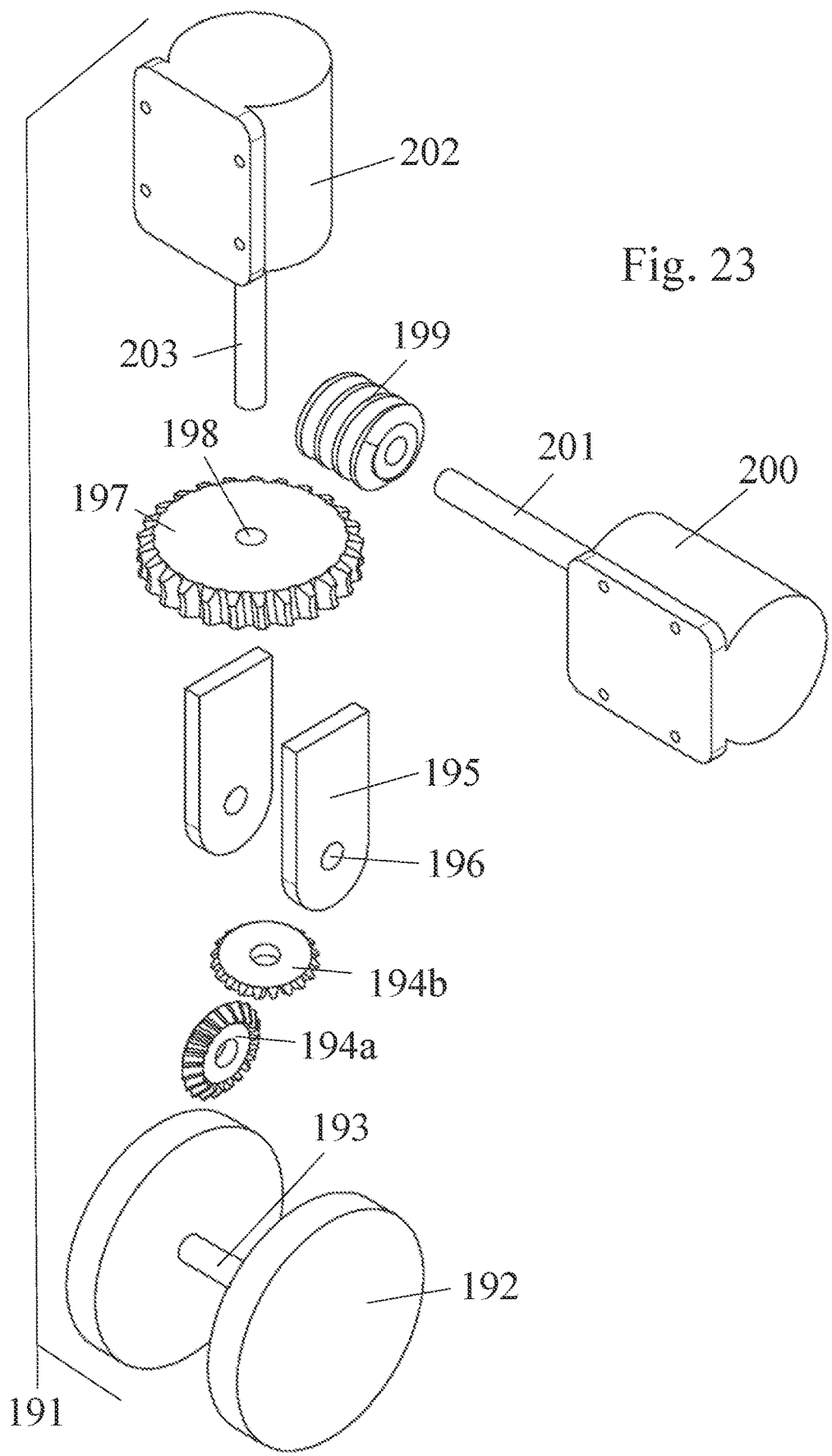
FIG. 23 is an isometric view of one embodiment of the parts used in the wheel assembly.

FIG. 23 shows an exploded view of one embodiment of a wheel assembly 191 of the present invention. The wheel assembly 191 is composed of a pair of wheels 192 that are connected by a wheel axis 193 that is supported by a wheel support 195 that has a pair of wheel support axis holes 196 that match the wheel axis 193.

A pair of wheel driving bevels 194a, and 194b with the first wheel driving bevel 194a placed at the wheel axis 193 to drive the wheel axis 193 and the second wheel driving bevel 194b placed at a 90 degrees angle to the first wheel driving bevel 194a is used to drive the wheels 192.

The wheel support 195 is attached to a wheel directional gear 197 that has a wheel directional gear center passage 198. The wheel directional gear 197 is able to rotate altering the orientation of the wheel support 195 and as a consequence of the wheels 192 by means of a wheel directional worm 199 that is fixed to a wheel directional engine shaft 201 of a wheel directional engine 200.

A wheel driving engine 202 with a wheel driving axle 203 of suitable length passes through the wheel directional gear center passage 198 and reaches the wheel driving bevel 194b. The wheel driving bevel 194a is fixated to the wheel driving axle 203 so when the wheel driving engine 202 drives the wheel driving axle 203 the movement is transferred to the wheels 192.

Figure 24:
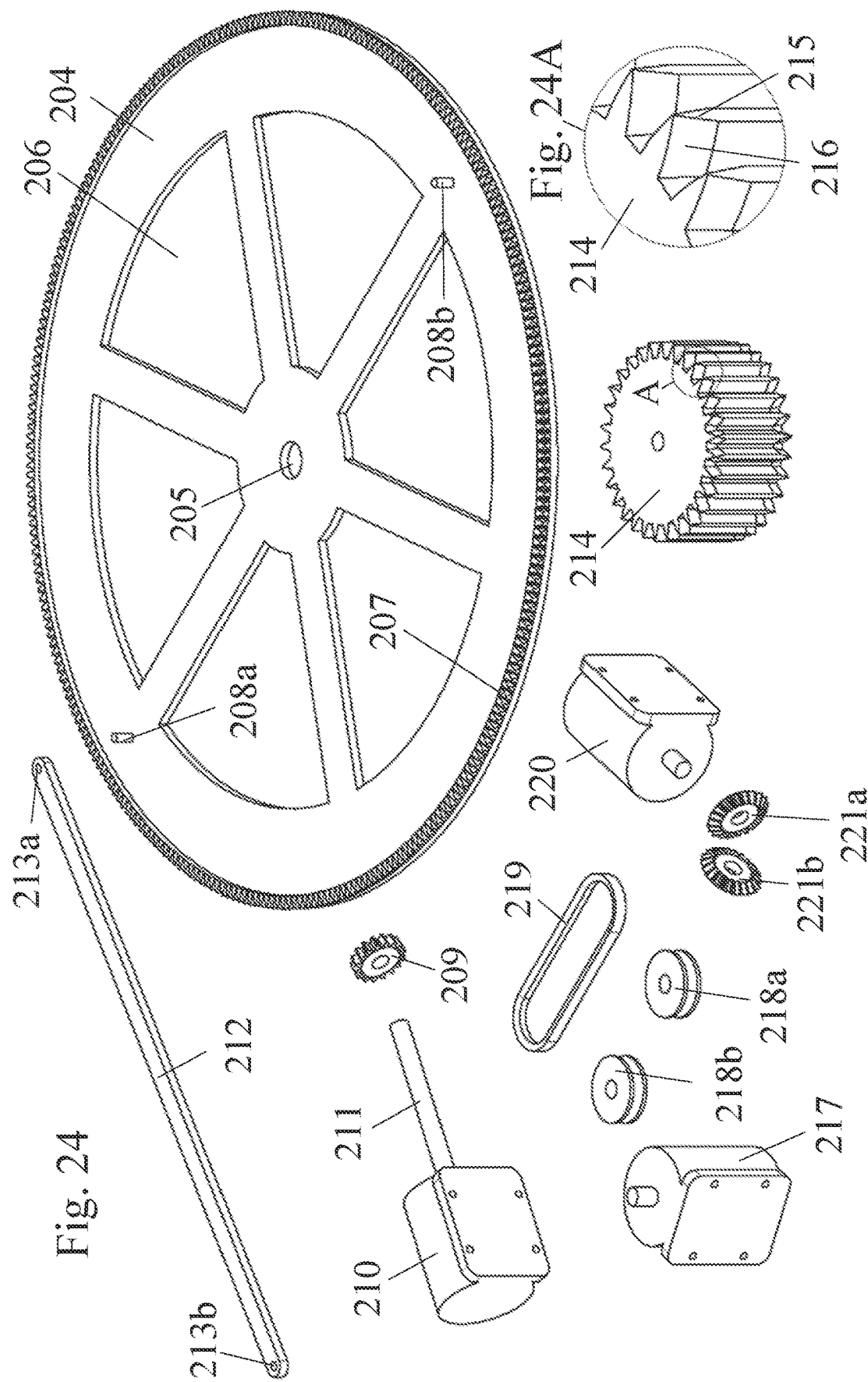
FIG. 24 is an isometric view of one embodiment of the parts used to drive other components in the autonomous mobile lift robot.

FIG. 24 shows one embodiment of parts used to drive other components of the present invention.

A control disk 204 is made out of a flat disk with a control disk central axis 205 and a set of six weight reduction cuts 206 equally spaced to reduce weight. The control disk 204 has a complete circle of control disk beveled teeth 207 around its perimeter and a pair of control disk attachment pins 208a, and 208b that are opposite to each other, symmetrical with respect to the control disk central axis 205.

A control disk actuator beveled gear 209 with matching teeth to the control disk beveled teeth 207 in the control disk 204, driven by an actuator beveled gear driving engine shaft 211 of an actuator beveled gear driving engine 210 is used to drive the control disk 204.

A gear position control bar 212 has a pair of gear position control bar attachment holes 213a, and 213b, one at each end of the gear position control bar 212. Two gear position control bars 212 oriented at opposite directions are attached to the control disk 204 by fitting one gear position control bar attachment hole 213a of each gear position control bar 212 to one of the control disk attachment pins 208a of the control disk 204. This arrangement converts the rotational movement of the control disk 204 into symmetrical linear movement of the two gear position control bars 212 attached.

FIG. 24 also shows a tapered teeth gear 214 that has tapered teeth at both faces (see detail FIG. 24A).

A horizontal gear driving engine 217 in conjunction with a pair of horizontal gear driving pulleys 218a, and 218b and a matching horizontal gear driving belt 219 is used to drive the tapered teeth gears 214 that are mounted horizontally.

A vertical gear driving engine 220 in conjunction with a pair of vertical gear driving bevels 221a, and 221b is used to drive the tapered teeth gears 214 that are mounted vertically.

Detail FIG. 24A shows the tapered teeth gear 214 edge at greater magnification. The tapered teeth gear 214 has a set of tapered teeth 215 at both faces to accommodate eventual variations in the surface in situations where the tapered teeth gear 214 slides at a direction parallel to its axis. The tapered teeth 215 have a matching tapered teeth edge face 216 at each side that makes the transition to the regular teeth thickness at the body of the tapered teeth gear 214.

Figure 25:
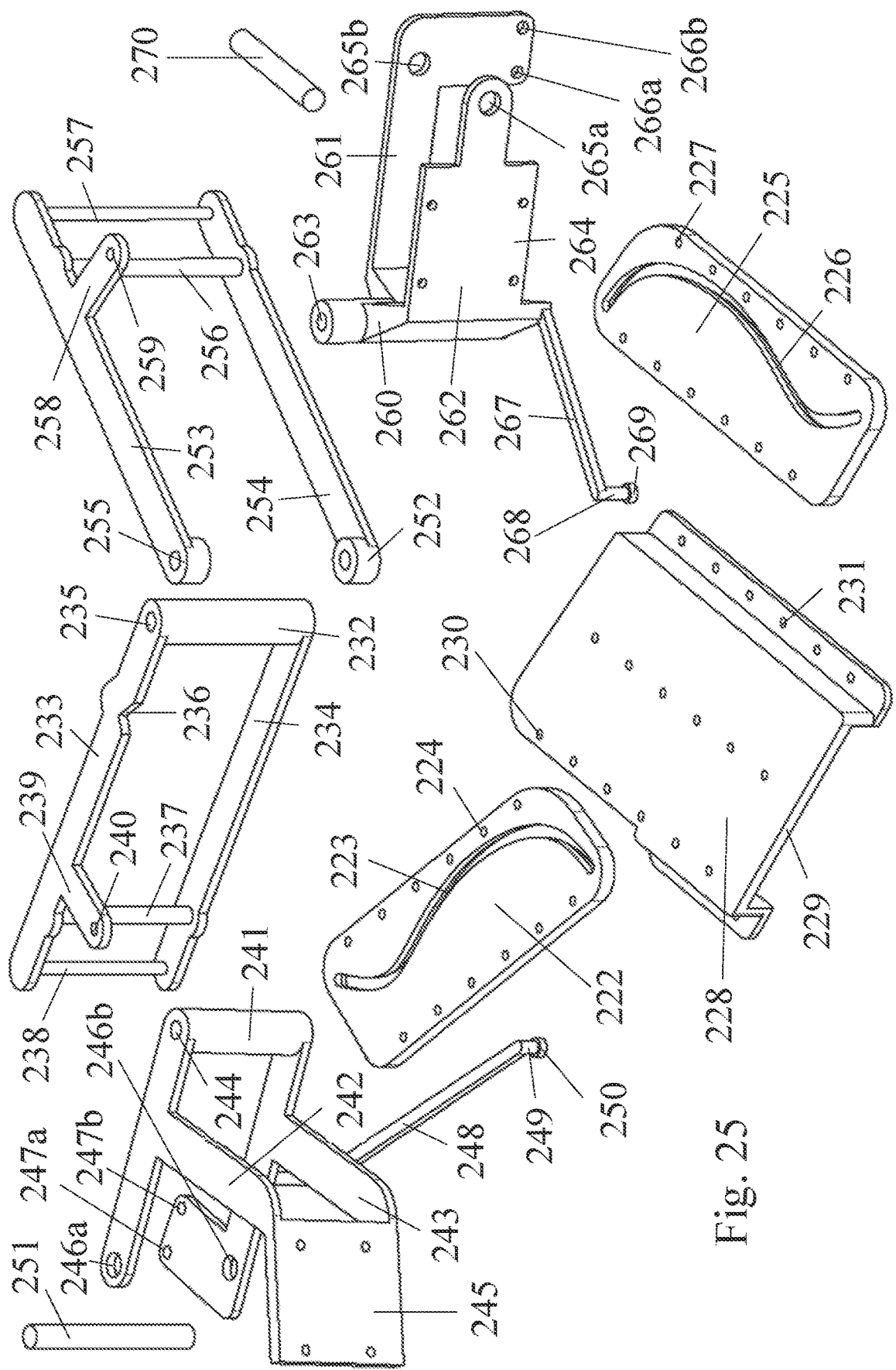
FIG. 25 is an isometric view of one embodiment of the parts used to support and position the tapered teeth gear of the autonomous mobile lift robot.

FIG. 25 is an isometric view of one embodiment of the parts used to support and position the tapered teeth gear 214 of the present invention.

A horizontal angle control guide 222 is composed of a plate of suitable size with a horizontal angle control guide track 223 at the center and a series of horizontal angle control guide fixation holes 224 to allow it to be fixated.

A vertical angle control guide 225 is composed of a plate of suitable size with a vertical angle control guide track 226 at the center and a series of vertical angle control guide fixation holes 227 to allow it to be fixated.

A vertical angle control support 228 is composed of a vertical angle control support raised platform 229 that contains a series of vertical angle control support angle control guide fixation holes 230 that match the vertical angle control guide fixation holes 227 to allow the fixation of the vertical angle control guide 225 at the raised position with a small offset to one side of the vertical angle control support 228.

The vertical angle control support 228 also has a series of vertical angle control support fixation holes 231 that allow the vertical angle control support 228 itself to be fixated to its intended place for installation.

The horizontal angle control guide 222 and the vertical angle control guide 225 are symmetrical to each other and installed at symmetrical positions. Because of the geometry, to respect the symmetry, the horizontal angle control guide 222 and the vertical angle control guide 225 need to be installed at different heights, the vertical angle control guide 225 on top of the vertical angle control support 228 while the horizontal angle control guide 222 is installed underneath the vertical angle control support raised platform 229 of the vertical angle control support 228 with part of the structure of the horizontal angle control guide 222 staying below the vertical angle control support 228 (see FIG. 33 and FIG. 35).

A horizontal pivoting support 232 is composed of a horizontal pivoting support top bar 233 with a horizontal pivoting support notch 236 and a horizontal pivoting support bottom bar 234 that are connected at one side by a horizontal pivoting support main axis 235 and at the other side by a horizontal pivoting support gear support axis 237 and a horizontal pivoting support action bar 238.

The horizontal pivoting support top bar 233 has a horizontal pivoting support top bar extension 239 with a horizontal pivoting support actuator reference hole 240.

The horizontal pivoting support 232 is driven at the horizontal pivoting support action bar 238 and rotates around the horizontal pivoting support main axis 235. As the horizontal pivoting support 232 rotates, the horizontal pivoting support gear support axis 237 and the horizontal pivoting support actuator reference hole 240 describe an arch carrying the components attached to them.

A horizontal gear support 241 is composed of a horizontal gear support top plate 242 and a horizontal gear support bottom plate 243 that are connected by a horizontal gear support axis 244 and a horizontal gear support engine support 245.

The horizontal gear support 241 has a pair of horizontal gear support gear shaft holes 246a, and 246b. The horizontal gear support gear shaft hole 246a is located in the horizontal gear support top plate 242 and the horizontal gear support gear shaft hole 246b is located in the horizontal gear support bottom plate 243.

The horizontal gear support bottom plate 243 also has a pair of horizontal gear support actuator insertion holes 247a, 247b and a horizontal gear support guide bar 248. The horizontal gear support guide bar 248 has a horizontal gear support guide pin 249 at the end and terminates in a horizontal gear support guide knob 250.

The horizontal gear support axis 244 is inserted into the horizontal pivoting support gear support axis 237 and allows the horizontal gear support 241 to vary its angle as it is driven by the horizontal pivoting support gear support axis 237.

This is accomplished using the horizontal gear support guide pin 249 that is inserted into the horizontal angle control guide track 223 in the horizontal angle control guide 222 and the horizontal gear support guide knob 250 that fits in the underside of the horizontal angle control guide 222 preventing the horizontal gear support guide pin 249 from escaping the horizontal angle control guide track 223.

Figure 35:
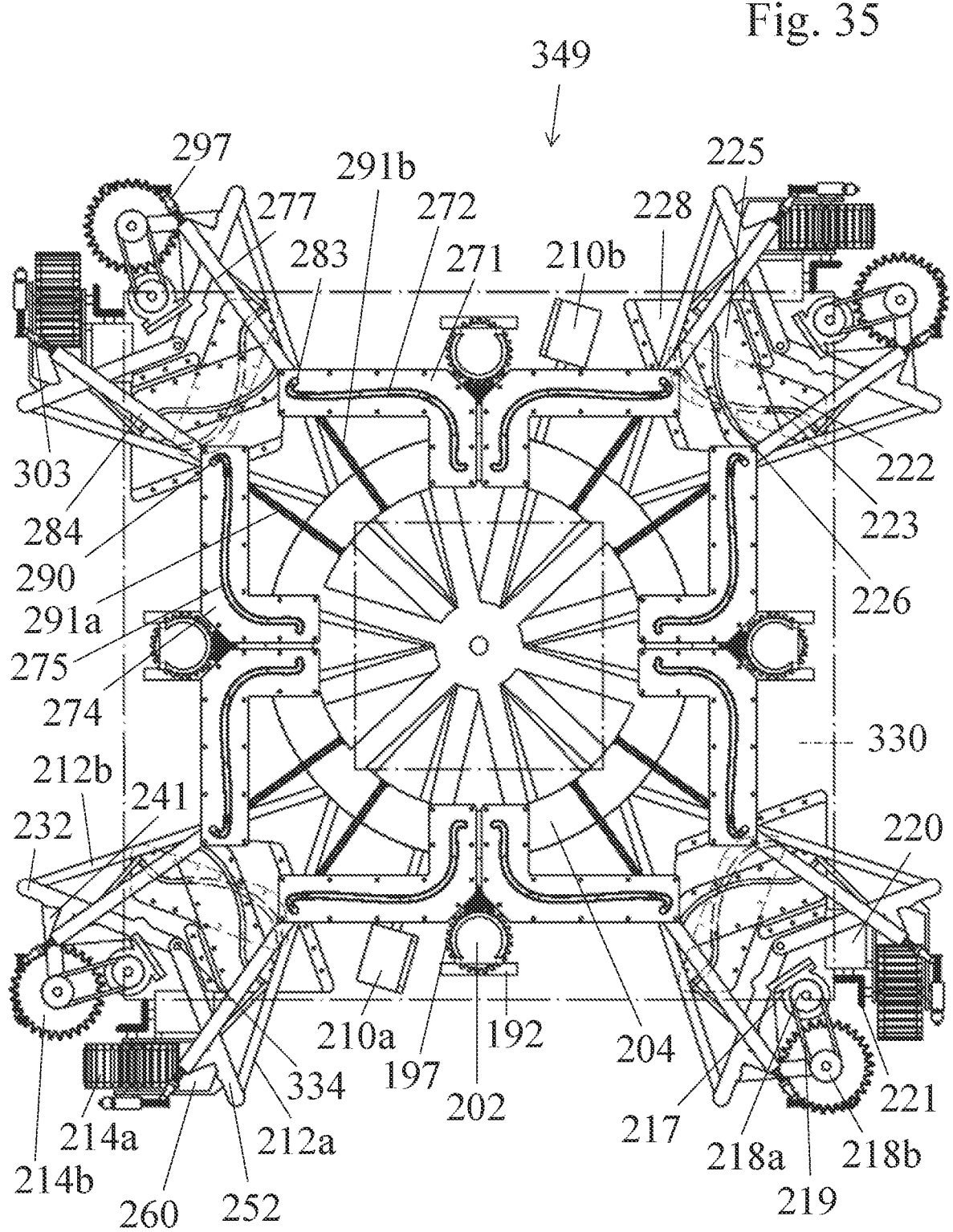
FIG. 35 is a top view of one embodiment of the autonomous mobile lift robot of the present invention with each of the first and second perpendicularly mounted tapered teeth gears in the extended position.

As the horizontal pivoting support 232 rotates around the horizontal pivoting support main axis 235, the horizontal pivoting support gear support axis 237 carries the horizontal gear support 241 and the horizontal gear support guide pin 249 slides in the horizontal angle control guide track 223 forcing the horizontal gear support 241 to rotate more or less around the horizontal pivoting support gear support axis 237 providing angle adjustment for the horizontal gear support 241 (see FIG. 35).

A horizontal gear shaft 251 with the correct size is inserted into the horizontal gear support gear shaft holes 246a, and 246b.

The horizontal pivoting support notch 236 is needed as due to standardization of components, the horizontal gear driving engine 217 may be longer than the available space between the horizontal pivoting support top bar 233 and the horizontal pivoting support bottom bar 234. The horizontal pivoting support notch 236 allows some extra space in the extended and in the retracted positions, when the horizontal gear support 241 installed at the horizontal pivoting support gear support axis 237 is fully to the right and the horizontal gear driving engine 217 that is installed at the horizontal gear support engine support 245 would otherwise hit the horizontal pivoting support top bar 233 (see FIG. 24, FIG. 35, and FIG. 36).

A vertical pivoting support 252 is composed of a vertical pivoting support top bar 253 and a vertical pivoting support bottom bar 254 with a vertical pivoting support main axis 255 on one side and a vertical pivoting support gear support axis 256 and a vertical pivoting support action bar 257 at the other side.

The vertical pivoting support top bar 253 and the vertical pivoting support bottom bar 254 of the vertical pivoting support 252 are connected by the vertical pivoting support gear support axis 256 and the vertical pivoting support action bar 257.

The vertical pivoting support main axis 255 has the correct size to allow it to be installed in the same axis as the horizontal pivoting support main axis 235, the vertical pivoting support main axis 255 perfectly fitting the extremities of the horizontal pivoting support main axis 235.

The vertical pivoting support top bar 253 has a vertical pivoting support top bar extension 258 with a vertical pivoting support actuator reference hole 259.

The vertical pivoting support 252 is driven at the vertical pivoting support action bar 257 and rotates around the vertical pivoting support main axis 255. As vertical pivoting support 252 rotates, the vertical pivoting support gear support axis 256 and the vertical pivoting support actuator reference hole 259 describe an arch carrying the components attached to them.

A vertical gear support 260 is composed of a vertical gear support left plate 261 and a vertical gear support right plate 262 that are connected by a vertical gear support axis 263. The vertical gear support right plate 262 has a vertical gear support engine support 264 and a vertical gear support gear shaft hole 265a. The vertical gear support left plate 261 has one vertical gear support gear shaft hole 265b and a pair of vertical gear support actuator insertion holes 266a, and 266b.

The vertical gear support 260 also has a vertical gear support guide bar 267 attached to the vertical gear support 260 near the vertical gear support right plate 262. The vertical gear support guide bar 267 has a vertical gear support guide pin 268 at the end and terminates in a vertical gear support guide knob 269.

The vertical gear support axis 263 is inserted into the vertical pivoting support gear support axis 256 and allows the vertical gear support 260 to vary its angle as it is driven by the vertical pivoting support gear support axis 256.

This is accomplished using the vertical gear support guide pin 268 that is inserted into the vertical angle control guide track 226 in the vertical angle control guide 225 and the vertical gear support guide knob 269 that fits in the underside of the vertical angle control guide 225 preventing the vertical gear support guide pin 268 from escaping the vertical angle control guide track 226.

As the vertical pivoting support 252 rotates around the vertical pivoting support main axis 255, the vertical pivoting support gear support axis 256 carries the vertical gear support 260 and the vertical gear support guide pin 268 slides in the vertical angle control guide track 226 forcing the vertical gear support 260 to rotate more or less around the vertical pivoting support gear support axis 256 providing angle adjustment for the vertical gear support 260 (see FIG. 35).

A vertical gear shaft 270 with the correct size is inserted into the vertical gear support gear shaft hole 265a, and 265b.

FIG. 26 shows components used for manipulating moving parts in the advanced warehouse of the present invention.

A horizontal actuator angle control guide 271 is made of a flat plate with a horizontal actuator angle control track 272 in the center and a set of horizontal actuator angle control guide fixation holes 273 for fixation.

A vertical actuator angle control guide 274 is made of a flat plate with a vertical actuator angle control track 275 in the center and a set of vertical actuator angle control guide fixation holes 276 for fixation. The horizontal actuator angle control guide 271 and the vertical actuator angle control guide 274 are constructed as mirror images of each other.

A horizontal arm actuator 277 is made of a cylinder with a horizontal arm actuator center hole 278 that has a horizontal arm actuator center hole key 279 on top. The horizontal arm actuator 277 has a horizontal arm actuator fixation bar 280 with a horizontal arm actuator fixation pin 281 projecting downwards in one end and a horizontal arm actuator sliding bar 282 with a horizontal arm actuator sliding knob 283 projecting upwards in the other end.

The horizontal arm actuator sliding bar 282 is inserted into the horizontal actuator angle control track 272 of the horizontal actuator angle control guide 271 that is fixated above the horizontal arm actuator 277 and the horizontal arm actuator sliding knob 283 keeps the horizontal arm actuator sliding bar 282 from falling from the horizontal actuator angle control track 272. The horizontal arm actuator fixation pin 281 is fixated to the horizontal pivoting support actuator reference hole 240 of the horizontal pivoting support 232.

As the horizontal pivoting support 232 rotates around the horizontal pivoting support main axis 235, the horizontal pivoting support actuator reference hole 240 rotates and carries the horizontal arm actuator 277 forcing the horizontal arm actuator sliding bar 282 to slide inside the horizontal actuator angle control track 272 that in turn produces the desired orientation angle for the horizontal arm actuator 277 throughout the excursion of the horizontal pivoting support 232.

A vertical arm actuator 284 is made of a cylinder with a vertical arm actuator center hole 285 that has a vertical arm actuator center hole key 286 on top. The vertical arm actuator 284 has a vertical arm actuator fixation bar 287 with a vertical arm actuator fixation pin 288 projecting downwards in one end and a vertical arm actuator sliding bar 289 with a vertical arm actuator sliding knob 290 projecting upwards in the other end.

The vertical arm actuator sliding bar 289 is inserted into the vertical actuator angle control track 275 of the vertical actuator angle control guide 274 that is fixated above the vertical arm actuator 284 and the vertical arm actuator sliding knob 290 keeps the vertical arm actuator sliding bar 289 from falling from the vertical actuator angle control track 275. The vertical arm actuator fixation pin 288 is fixated to the vertical pivoting support actuator reference hole 259 of the vertical pivoting support 252.

As the vertical pivoting support 252 rotates around the vertical pivoting support main axis 255, the vertical pivoting support actuator reference hole 259 rotates and carries the vertical arm actuator 284 forcing the vertical arm actuator sliding bar 289 to slide inside the vertical actuator angle control track 275 that in turn produces the desired orientation angle for the vertical arm actuator 284 throughout the excursion of the vertical pivoting support 252.

An actuator arm 291 composed of a metal rod with an actuator arm key 292 that is a narrow flat plane in the full extension of the top of the metal rod terminates at an actuator arm stopper 293 at one side and an actuator hand 294 on the other side.

The actuator arm 291 has the same diameter of the horizontal arm actuator center hole 278 and the vertical arm actuator center hole 285 and the actuator arm key 292 matches the horizontal arm actuator center hole key 279 and the vertical arm actuator center hole key 286 so that only one version of the actuator arm 291 is needed and can be installed at both the horizontal arm actuator 277 and the vertical arm actuator 284.

The horizontal arm actuator sliding bar 282 is longer than the vertical arm actuator sliding bar 289 to offset the position of the horizontal arm actuator 277 and the vertical arm actuator 284 to prevent the actuator arms 291 installed at the horizontal arm actuator center hole 278 and the vertical arm actuator center hole 285 from hitting each other allowing horizontal arm actuators 277 and vertical arm actuators 284 to be installed in proximity and move without interfering with each other.

A horizontal actuator hand 297 composed of a metal rod with a horizontal actuator hand key 298 that is a narrow flat plane in the full extension of the front of the metal rod terminates at a horizontal actuator stopper 299 at the bottom and a horizontal actuator hand top 300 on the top.

The horizontal actuator hand 297 has a horizontal actuator hand finger 301 connected to the horizontal actuator hand top 300 that terminates in a horizontal actuator hand grabbing tip 302 that is a partially flexible metal fork that is able to snap into a metal rod of appropriate matching diameter and hold it with a relatively small force but sufficient to move the rod safely if there is no opposition to the movement and releases the rod when some opposition is present.

A vertical actuator hand 303 composed of a metal rod with a vertical actuator hand key 304 that is a narrow flat plane in the full extension of the front of the metal rod terminates at a vertical actuator stopper 305 at the bottom and a vertical actuator hand top 306 on the top.

The vertical actuator hand 303 has a vertical actuator hand finger 307 connected to the vertical actuator hand top 306 that terminates in a vertical actuator hand grabbing tip 308 that is a partially flexible metal fork that is able to snap into a metal rod of appropriate matching diameter and hold it with a relatively small force but sufficient to move the rod safely if there is no opposition to the movement and releases the rod when some opposition is present.

A horizontal hinged rack actuator 309 is made of a cylinder with a pair of horizontal hinged rack actuator attachment bars 310*a*, and 310*ba* at the top for fixation. The horizontal hinged rack actuator 309 has a horizontal hinged rack actuator center hole 311 with a horizontal hinged rack actuator center hole key 312 on top.

A vertical hinged rack actuator 313 is made of a cylinder with a pair of vertical hinged rack actuator attachment bars 314*a*, and 314*b* at the left for fixation. The vertical hinged rack actuator 313 has a vertical hinged rack actuator center hole 315 with a vertical hinged rack actuator center hole key 316 on top.

A hinged rack arm 317 composed of a metal rod with a hinged rack arm key 318 that is a narrow flat plane in the full extension of the top of the metal rod terminates at a hinged rack arm stopper 319 at one side and a hinged rack arm hand actuator 320 on the other side.

The hinged rack arm 317 has the same diameter of the horizontal hinged rack actuator center hole 311 and the vertical hinged rack actuator center hole 315 and the hinged rack arm key 318 matches the horizontal hinged rack actuator center hole key 312 and the vertical hinged rack actuator center hole key 316 so that only one version of the hinged rack arm 317 is needed and can be installed at both the horizontal hinged rack actuator 309 and the vertical hinged rack actuator 313.

A hinged rack hand 323 composed of a metal rod with a hinged rack hand key 324 that is a narrow flat plane in the full extension of the front of the metal rod terminates at a hinged rack hand stopper 325 at the bottom and a hinged rack hand base 326 on the top.

The hinged rack hand 323 has a pair of hinged rack hand fingers 327*a*, and 327*b* connected to the hinged rack hand base 326. A hinged rack hand roller 328 is installed on each hinged rack hand finger 327*a*, 327*b* by means of inserting a hinged rack hand roller center hole 329 in the center of the hinged rack hand roller 328 into the corresponding hinged rack hand finger 327*a*, 327*b* allowing the hinged rack hand rollers 328 to rotate freely around the hinged rack hand fingers 327*a*, 327*b*.

Detail FIG. 26A shows the actuator hand 294 in greater magnification to better display its features. The actuator hand 294 is composed of a cylinder with an actuator hand center hole 295 in the center with an actuator hand center hole key 296 in the front. The actuator arm key 292 that is a flat plane on top of the actuator arm 291 is also visible.

FIG. 27 shows an isometric view of one embodiment of an autonomous mobile lift robot case 330 of the present invention that provides the support for the installation of the components described in FIG. 22 through FIG. 26. The autonomous mobile lift robot case 330 has an opening A 331*a* and an opening B 332*b* at each corner making a total of 8 corner openings. A separation bar 333 is located at each corner to provide additional structural integrity and prevent the warping of the autonomous mobile lift robot case 330 around any opening A 331*a* or opening B 332*b*.

A pivoting axis 334 is located at a short distance from each separation bar 333. In total, there are four pivoting axis 334 located at points in the diagonals of the autonomous mobile lift robot case 330 at the same distance from each corner. One pair of one horizontal pivoting support 232 and one vertical pivoting support 252 is installed with their respective horizontal pivoting support main axis 235 and vertical pivoting support main axis 255 around each pivoting axis 334.

The autonomous mobile lift robot case 330 has four sets of three different supports one set at each side of the autonomous mobile lift robot case 330 that are designed to support components of the wheel assembly 191. A directional engine support 335 is designed to support the wheel directional engine 200; a wheel engine support 336 is designed to support the wheel driving engine 202; and a wheel assembly support 337 with a wheel driving axis passage hole 338 is designed to support the wheel directional gear 197 and allow the wheel driving axle 203 to pass through.

The autonomous mobile lift robot case 330 also has a pair of extension engine supports 339, one in the front and the other at the back of the autonomous mobile lift robot case 330 designed to support two actuator beveled gear driving engines 210.

On the bottom of the autonomous mobile lift robot case 330 a set of four wheel openings 340 provide access for the wheels 192 to reach the floor and rotate freely and a set of bottom fixation holes 341 provide the place for the installation of four sets of one horizontal angle control guide 222 and one vertical angle control support 228.

On the top of the autonomous mobile lift robot case 330 a set of top fixation holes 342 provide the place for the installation of four sets of one horizontal actuator angle control guide 271 and one vertical actuator angle control guide 274.

The autonomous mobile lift robot case 330 also has a pair of pantographic fixed axis holes 343 for the installation of the bottom fixed axis 186, a pair of pantographic moving axis slots 344 for the installation of the bottom moving axis 187, and a pantographic engine niche 345 for the installation of the pantographic engine 189.

A case central axis 346 provides the place for the installation of four control disks 204.

FIG. 28 shows a front view of one embodiment of the autonomous mobile lift robot case 330 of the present invention to provide another angle for the visualization of its features.

The opening A 331*a* from the first corner and the opening B 332*b* from the fourth corner and the opening B 332*b* from the second corner and opening A 331*c* from the third corner at the corresponding other sides of the autonomous mobile lift robot case 330 provide a clear view through the autonomous mobile lift robot case 330.

The separation bar 333 is located at each corner to provide additional structural integrity and prevent the warping of the autonomous mobile lift robot case 330 around the openings A and B.

The pivoting axis 334 is located at a short distance from the separation bar 333 at points in the diagonals of the autonomous mobile lift robot case 330 at the same distance from each corner. One pair of one horizontal pivoting support 232 and one vertical pivoting support 252 is installed with their respective horizontal pivoting support main axis 235 and vertical pivoting support main axis 255 around each pivoting axis 334.

The autonomous mobile lift robot case 330 has four sets of three different supports one set at each side of the autonomous mobile lift robot case 330 that are designed to support components of the wheel assembly 191. The directional engine support 335 is designed to support the wheel directional engine 200; the wheel engine support 336 is designed to support the wheel driving engine 202; and the wheel assembly support 337 is designed to support the wheel directional gear 197.

The case central axis 346 provides the place for the installation of four control disks 204. To drive the control disks 204, the autonomous mobile lift robot case 330 has two extension engine supports 339*a*, and 339*b* designed to support two actuator beveled gear driving engines 210. The extension engine supports 339*a* are located in the front of the autonomous mobile lift robot case 330 at a slightly higher level to drive the first two control disks 204, and the extension engine support 339*b* is located at the back of the autonomous mobile lift robot case 330 at a slightly lower level to drive the last two control disks 204.

FIG. 29 shows a bottom view of one embodiment of the autonomous mobile lift robot case 330 of the present invention to provide yet another angle for the visualization of its features.

The autonomous mobile lift robot case 330 has four sets of three different supports one set at each side of the autonomous mobile lift robot case 330 that are designed to support components of the wheel assembly 191. The directional engine support 335 is designed to support the wheel directional engine 200; the wheel engine support 336 is designed to support the wheel driving engine 202; and the wheel assembly support 337 with the wheel driving axis passage hole 338 is designed to support the wheel directional gear 197 and allow the wheel driving axle 203 to pass through.

The pivoting axis 334 is located at points in the diagonals of the autonomous mobile lift robot case 330 at a short distance from each corner. One pair of one horizontal pivoting support 232 and one vertical pivoting support 252 is installed with their respective horizontal pivoting support main axis 235 and vertical pivoting support main axis 255 around each pivoting axis 334.

On the bottom of the autonomous mobile lift robot case 330 the wheel openings 340 provide access for the wheels 192 to reach the floor and rotate freely and the bottom fixation holes 341 provide the place for the installation of four sets of one horizontal angle control guide 222 and one vertical angle control support 228.

On the top of the autonomous mobile lift robot case 330 the top fixation holes 342 provide the place for the installation of four sets of one horizontal actuator angle control guide 271 and one vertical actuator angle control guide 274.

The case central axis 346 provides the place for the installation of four control disks 204. To drive the control disks 204, the autonomous mobile lift robot case 330 has two extension engine supports 339*a*, and 339*b* designed to support two actuator beveled gear driving engines 210. The extension engine supports 339*a* is located in the front of the autonomous mobile lift robot case 330 at a slightly higher level to drive the first two control disks 204, and the extension engine support 339*b* is located at the back of the autonomous mobile lift robot case 330 at a slightly lower level to drive the last two control disks 204.

The pantographic engine niche 345 is the place for the installation of the pantographic engine 189.

FIG. 30 shows a bottom lid 347 with a set of four bottom lid wheel openings 348 that complete the wheel openings 340 once the bottom lid 347 is installed closing the bottom of the autonomous mobile lift robot case 330.

Figure 31:
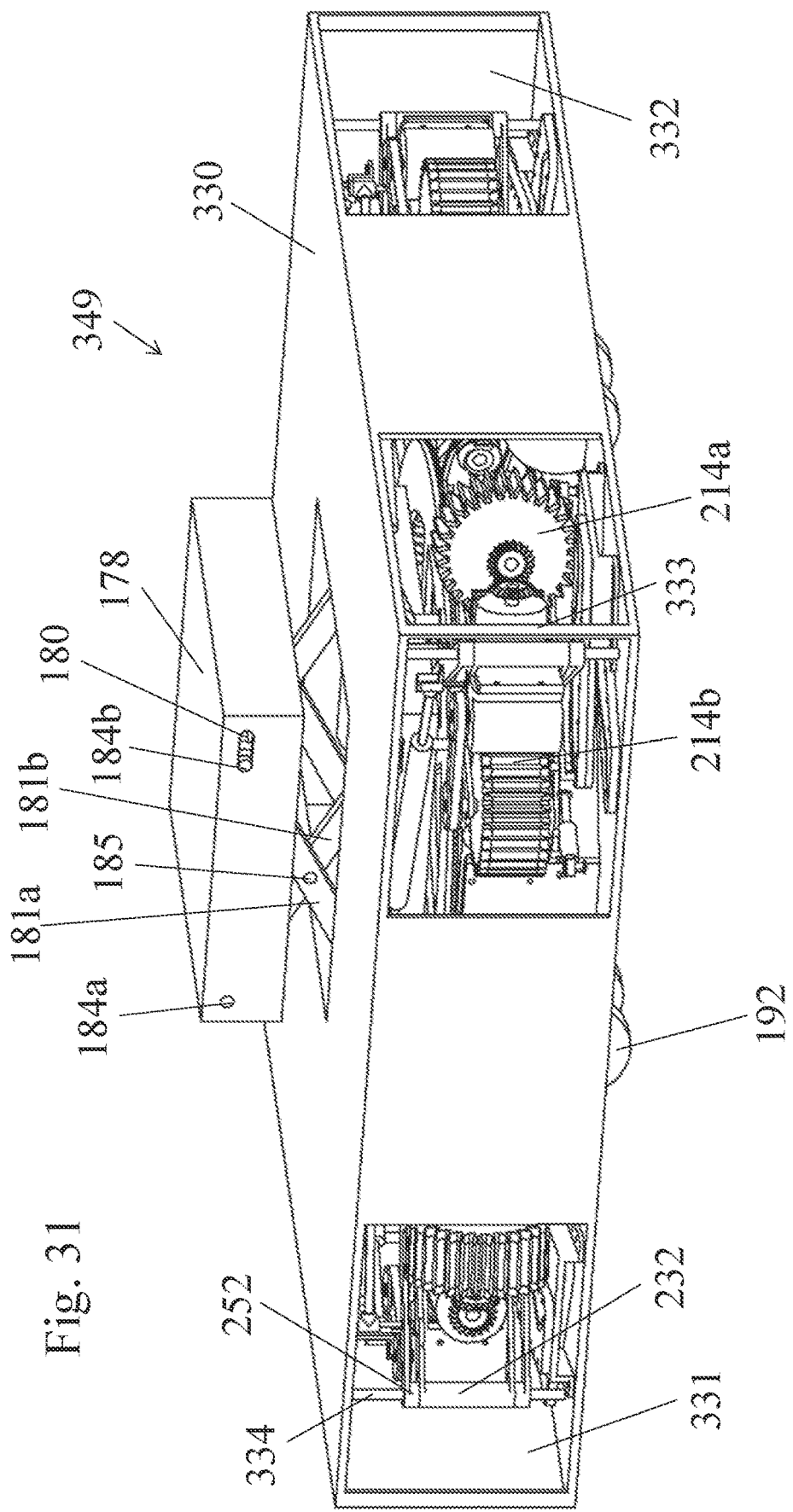
FIG. 31 is an isometric view of one embodiment of the autonomous mobile lift robot of the present invention having a first tapered teeth gear mounted perpendicularly to a second tapered teeth gear in each corner.

FIG. 31 shows an isometric view of one embodiment of an autonomous mobile lift robot 349 of the present invention. The pantographic lift platform 178 is shown in the extended position revealing the pantographic bars 181*a*, 181*b* that are installed linked at the middle by the center axis 185 forming a "X" at each side of the pantographic lift platform 178 and the two top axis 184*a*, and 184*b*. The top axis 184*a* is installed in the platform fixed axis hole 179 and the top axis 184*b* in the platform moving axis slot 180.

The separation bar 333 is located at each corner to provide additional structural integrity and prevent the warping of the autonomous mobile lift robot case 330 around any opening A 331 or opening B 332.

The pivoting axis 334 is located at points in the diagonals of the autonomous mobile lift robot case 330 at a short distance from each corner. One pair of one horizontal pivoting support 232 and one vertical pivoting support 252 is installed around each pivoting axis 334.

The tapered teeth gear 214*a* mounted in the vertical position perpendicularly to the tapered teeth gear 214*b* mounted in the horizontal position and the wheels 192 are also visible.

FIG. 32 shows an isometric view of the autonomous mobile lift robot case 330 to display its features and additional details on the installation of the pantographic lift. For better visualization, the pantographic lift platform 178 is drawn transparent in dash dotted lines.

The autonomous mobile lift robot case 330 has four sets of three different supports one set at each side of the autonomous mobile lift robot case 330 that are designed to support components of the wheel assembly 191. The directional engine support 335 is designed to support the wheel directional engine 200; the wheel engine support 336 is designed to support the wheel driving engine 202; and the wheel assembly support 337 with the wheel driving axis passage hole 338 is designed to support the wheel directional gear 197 and allow the wheel driving axle 203 to pass through.

The autonomous mobile lift robot case 330 has one opening A 331 and one opening B 332 at each corner making a total of eight corner openings. One separation bar 333 is located at each corner to provide additional structural integrity and prevent the warping of the autonomous mobile lift robot case 330 around any opening A 331 or opening B 332.

The pivoting axis 334 is located at points in the diagonals of the autonomous mobile lift robot case 330 at a short distance from each corner. One pair of one horizontal pivoting support 232 and one vertical pivoting support 252 is installed with their respective horizontal pivoting support main axis 235 and vertical pivoting support main axis 255 around each pivoting axis 334.

On the bottom of the autonomous mobile lift robot case 330 the wheel openings 340 provide access for the wheels 192 to reach the floor and rotate freely and the bottom fixation holes 341 provide the place for the installation of four sets of one horizontal angle control guide 222 and one vertical angle control support 228.

On the top of the autonomous mobile lift robot case 330 the top fixation holes 342 provide the place for the installation of four sets of one horizontal actuator angle control guide 271 and one vertical actuator angle control guide 274.

The extension engine supports 339*a* is located in the front of the autonomous mobile lift robot case 330 at a slightly higher level and the extension engine support 339*b* is located at the back of the autonomous mobile lift robot case 330 at a slightly lower level.

The autonomous mobile lift robot case 330 has two pantographic fixed axis holes 343 for the installation of the bottom fixed axis 186 and two pantographic moving axis slots 344 for the installation of the bottom moving axis 187.

The pantographic lift platform 178 has one platform fixed axis hole 179 located near the top face, parallel to the top face that goes all the way through from one side to the other side of the pantographic lift platform 178. The pantographic lift platform 178 also has one platform moving axis slot 180 that is parallel to the top face and is located at the same distance of the top face of the pantographic lift platform 178 as the platform fixed axis hole 179 and goes all the way through from one side to the other side of the pantographic lift platform 178.

Two pantographic bars 181 are installed linked at the middle by the center axis 185 forming a "X" at each side of the pantographic lift platform 178. One top axis 184*a* is installed at the platform fixed axis hole 179 that remains fixed and another top axis 184*b* is installed at the platform moving axis slot 180 and is able to slide the length of the platform moving axis slot 180.

The pantographic engine 189 engages the bottom moving axis nut 188 and moves the bottom moving axis 187 closer or further away from the pantographic engine 189 causing the pantographic lift platform 178 to rise or drop accordingly.

Figure 33:
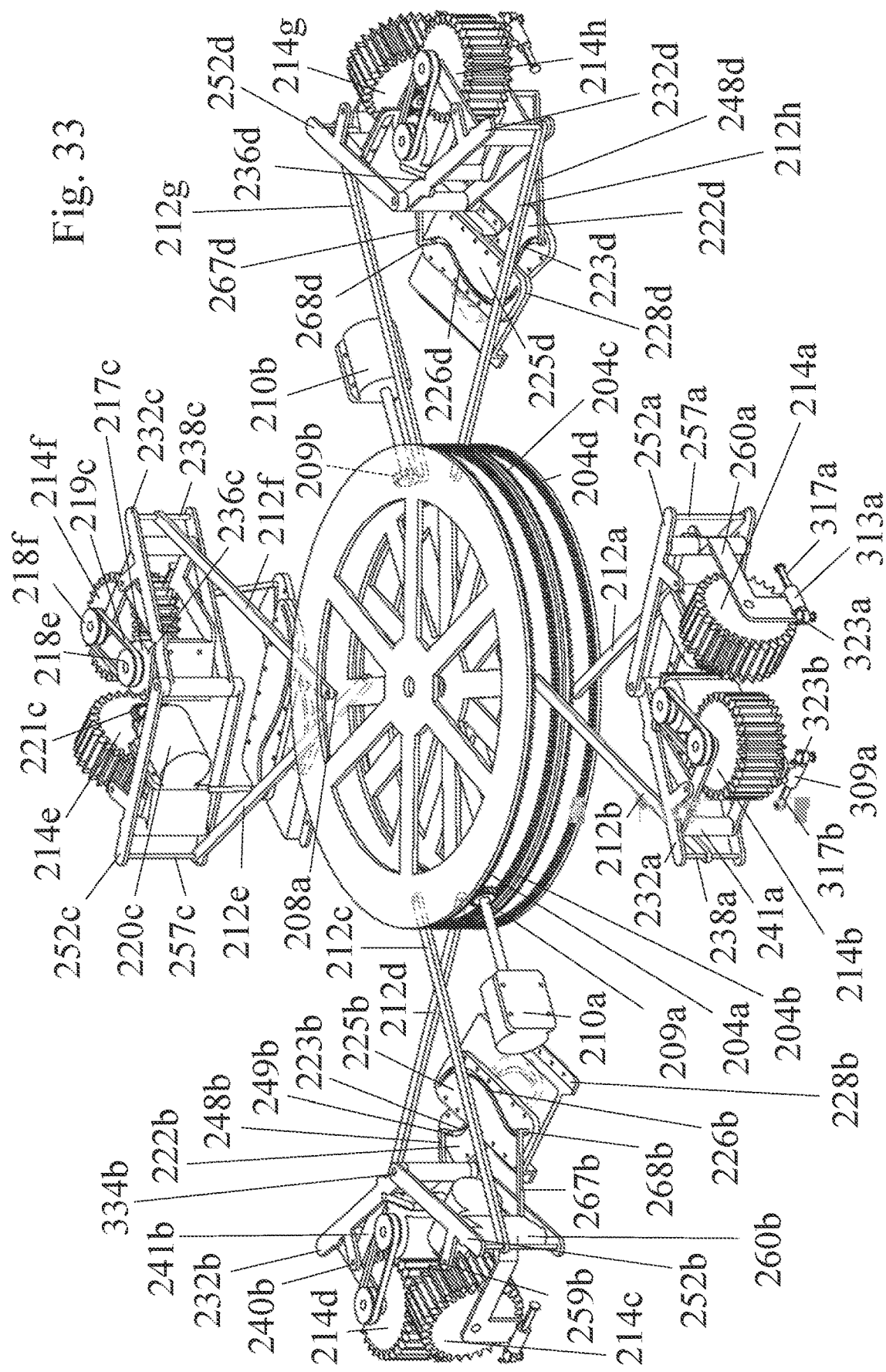
FIG. 33 is an isometric view of one embodiment of the tapered teeth gear support and positioning mechanism for each first tapered teeth gear mounted perpendicularly to each second tapered teeth gear in the autonomous mobile lift robot of the present invention.

FIG. 33 is an isometric view of one embodiment of the tapered teeth gear support and positioning mechanism for each first and second perpendicularly mounted tapered teeth gears installed in each corner of the autonomous mobile lift robot 349 of the present invention.

Four control disks 204*a*, 204*b*, 204*c*, and 204*d* arranged in two groups of two control disks 204*a*, and 204*b* and control disks 204*c*, and 204*d* mounted back to back are installed around the case central axis 346. The control disks 204*a*, and 204*b* are driven by the control disk actuator beveled gear 209*a* and the actuator beveled gear driving engine 210*a* and the control disks 204*c*, and 204*d* are driven by the control disk actuator beveled gear 209*b* and the actuator beveled gear driving engine 210*b*.

The gear position control bars 212*b*, and 212*f* are mounted at opposite control disk attachment pins 208*a* of the control disk 204*b*; and the gear position control bars 212*c*, and 212*g* are mounted at opposite control disk attachment pins 208 of the control disk 204*a*. Similarly, the gear position control bars 212*a*, and 212*e* are mounted at opposite control disk attachment pins 208 of the control disk 204*d*; and the gear position control bars 212*d*, and 212*h* are mounted at opposite control disk attachment pins 208 of the control disk 204*c*.

Because the control disks 204*a*, and 204*b* are mounted back to back, as the control disk actuator beveled gear 209*a* rotates clockwise, the control disk 204*a* is turned clockwise and the control disk 204*b* is turned counter clockwise and vice versa. The same applies to the control disks 204*c*, and 204*d* and the control disk actuator beveled gear 209*b*.

As a result, the gear position control bars 212*b*, and 212*f* and the gear position control bars 212*d*, and 212*h* extend or retract simultaneously, depending on the direction the control disk actuator beveled gear 209*a* rotates, extending if the control disk actuator beveled gear 209*a* rotates clockwise and retracting if the control disk actuator beveled gear 209*a* rotates counter clockwise. Similarly, the gear position control bars 212*a*, and 212*e* and the gear position control bars 212*c*, and 212*g* extend or retract simultaneously, depending on the direction the control disk actuator beveled gear 209*b* rotates, extending if the control disk actuator beveled gear 209*b* rotates clockwise and retracting if the control disk actuator beveled gear 209*b* rotates counter clockwise.

The gear position control bars 212*b*, and 212*f* transmit the movement to the horizontal pivoting supports 232*a*, and 232*c* respectively that result in movement of the tapered teeth gears 214*b*, and 214*f* that are in the same face of the autonomous mobile lift robot case 330. Similarly, the gear position control bars 212*d*, and 212*h* transmit the movement to the vertical pivoting supports 252*b*, and 252*d* respectively that in turn result in movement of the tapered teeth gears 214*d*, and 214*h* that are on the same face, opposite to the face where the tapered teeth gears 214*b*, and 214*f* are located.

Likewise, the gear position control bars 212*a*, and 212*e* transmit the movement to the vertical pivoting supports 252*a*, and 252*c* respectively that result in movement of the tapered teeth gears 214*a*, and 214*e* that are in the same face of the autonomous mobile lift robot case 330. Similarly, the gear position control bars 212*c*, and 212*g* transmit the movement to the horizontal pivoting supports 232*b*, and 232*d* respectively that result in movement of the tapered teeth gears 214*c*, and 214*g* that are on the same face, opposite to the face where the tapered teeth gears 214*a*, and 214*e* are located.

This mechanism allows for the positioning of all tapered teeth gears 214 in one pair of two opposite corners simultaneously with one actuator beveled gear driving engine 210*a*, and all tapered teeth gears 214 in the other pair of two opposite corners with the other actuator beveled gear driving engine 210*b*.

The exact positioning of a particular tapered teeth gear 214 is also affected by the angle control mechanism. The process is the same for all four pairs of the first and second perpendicularly mounted gears so it will be explained only once for concision, mostly for the pair of tapered teeth gears 214*c*, and 214*d*, exceptions made if other gear pairs offer a better angle for visualization. As the components are the same in all four sets of gears pairs, it is possible to identify the correspondent components in other gear pairs.

The gear position control bar 212a drives the vertical pivoting support 252a at the vertical pivoting support action bar 257a and the vertical pivoting support 252a carries the vertical gear support 260a that holds the tapered teeth gears 214a.

Likewise, the gear position control bar 212b drives the horizontal pivoting support 232a at the horizontal pivoting support action bar 238a and the horizontal pivoting support 232a carries the horizontal gear support 241a that holds the tapered teeth gears 214b.

As the control disk 204a moves the gear position control bar 212c, the movement is transferred to the vertical pivoting support 252b that rotates around the pivoting axis 334b and carries the vertical gear support 260b. As the vertical gear support 260b moves, the movement is transferred to the vertical gear support guide bar 267b and the vertical gear support guide pin 268b is forced to follow the geometry of the vertical angle control guide track 226b of the vertical angle control guide 225b installed on top of the vertical angle control support 228b. As the vertical gear support guide pin 268b slides in the vertical angle control guide track 226b, the vertical gear support 260b is forced to rotate accordingly to accommodate the geometry providing angle adjustment for the tapered teeth gear 214c to have the tapered teeth 215 adjust and align within the frustum shaped teeth 122 providing the traction necessary to move the autonomous mobile lift robot case 330 along the frustum shaped teeth 122 of the rack lattice structure in a vertical direction.

Likewise, as the control disk 204c moves the gear position control bar 212d, the movement is transferred to the horizontal pivoting support 232b that rotates around the pivoting axis 334b and carries the horizontal gear support 241b. As the horizontal gear support 241b moves, the movement is transferred to the horizontal gear support guide bar 248b and the horizontal gear support guide pin 249b is forced to follow the geometry of the horizontal angle control guide track 223b of the horizontal angle control guide 222b. As the horizontal gear support guide pin 249b slides in the horizontal angle control guide track 223b, the horizontal gear support 241b is forced to rotate accordingly to accommodate the geometry providing angle adjustment for the tapered teeth gear 214d to have the tapered teeth 215 adjust and align within the frustum shaped teeth 122 providing the traction necessary to move the autonomous mobile lift robot case 330 along the frustum shaped teeth 122 of the rack lattice structure in a horizontal direction.

The horizontal angle control guide 222b and the vertical angle control guide 225b are symmetrical to each other and installed at symmetrical positions. Because of the geometry, to respect the symmetry, the horizontal angle control guide 222b and the vertical angle control guide 225b need to be installed at different heights, the vertical angle control guide 225b on top of the vertical angle control support 228b while the horizontal angle control guide 222b is installed underneath the vertical angle control support 228b. The parts of the structure of the horizontal angle control guide 222b that are below the vertical angle control support 228b are drawn in dashed lines.

The vertical gear driving engine 220 and the vertical gear driving bevels 221e, and 221f that drive the tapered teeth gear 214e are seen on their installed positions.

The horizontal gear driving engine 217c, the horizontal gear driving pulleys 218e, and 218f and the horizontal gear driving belt 219c that drive the tapered teeth gears 214f are seen on their installed positions.

The horizontal pivoting support notch 236c provides additional space to accommodate the horizontal gear driving engine 217c that due to standardization of components may be longer than the available space in the horizontal pivoting support 232c.

The vertical hinged rack actuator 313a with the hinged rack arm 317a and the hinged rack hand 323a are seen on their installed position on the vertical gear support 260a. The horizontal hinged rack actuator 309a with the hinged rack arm 317b and the hinged rack hand 323b are seen on their installed position on the horizontal gear support 241a.

Figure 34:
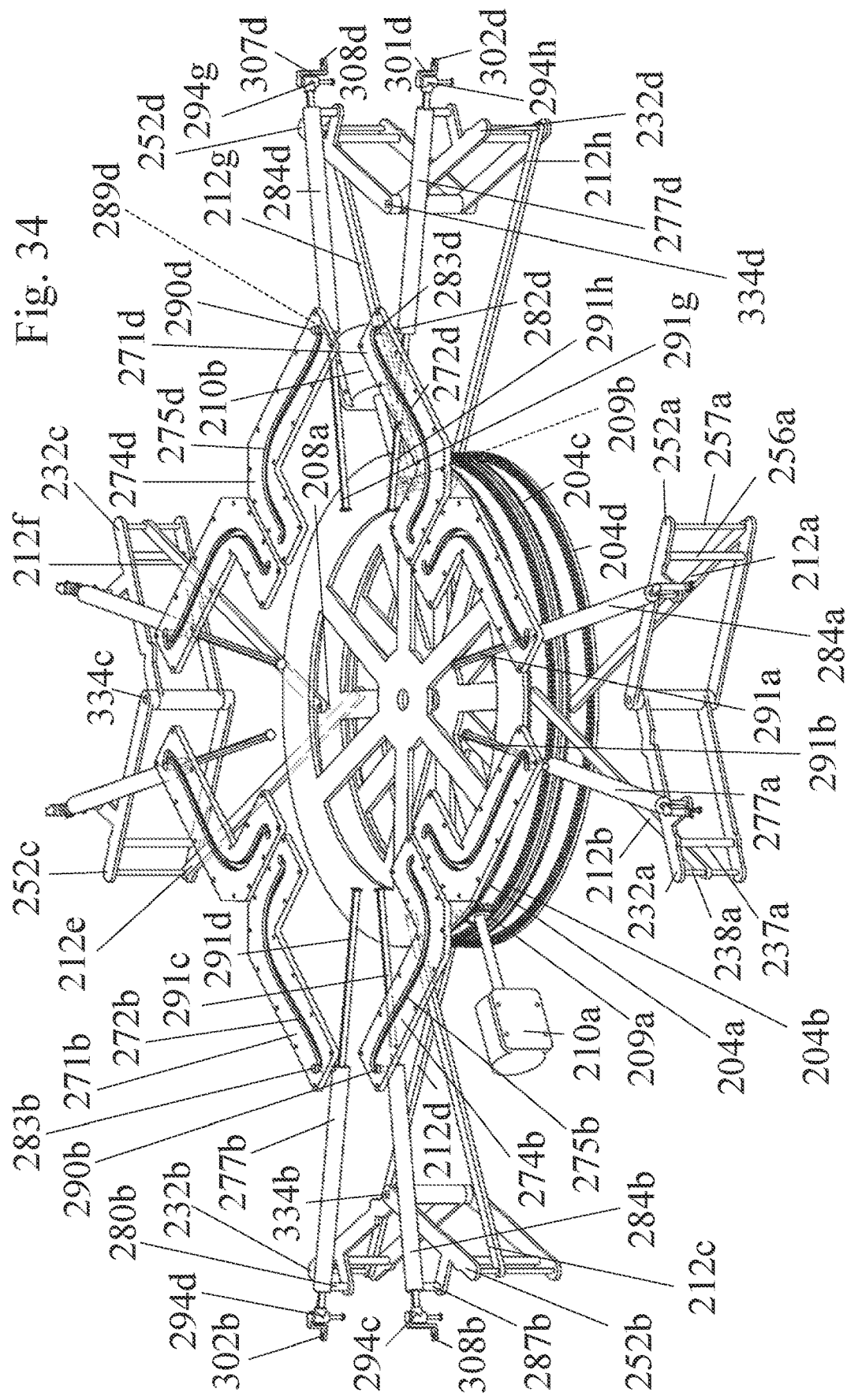
FIG. 34 is an isometric view of one embodiment of the actuator positioning control mechanism used in the autonomous mobile lift robot of the present invention.

The horizontal pivoting support actuator reference hole 240b is indicated in the horizontal pivoting support 232c and the vertical pivoting support actuator reference hole 259b is indicated in the vertical pivoting support 252a as reference for FIG. 34 that describes the actuator positioning control mechanism.

FIG. 34 shows an isometric view of one embodiment of the actuator positioning control mechanism used in the autonomous mobile lift robot 349 of the present invention.

The mechanism controlling the positioning of the vertical pivoting supports 252a, 252b, 252c, and 252d and the horizontal pivoting supports 232a, 232b, 232c, and 232d is described in FIG. 33.

The control disks 204a, 204b, 204c, and 204d; the control disk attachment pin 208a; the control disk actuator beveled gears 209a, and 209b; the actuator beveled gear driving engine 210a, and 210b; the gear position control bar 212a, through 212h; the horizontal pivoting support action bar 238a; and the vertical pivoting support action bar 257a have been drawn and indicated as reference and to facilitate the correspondence with the explanation in FIG. 33. Additionally, the horizontal pivoting support gear support axis 237a where the horizontal gear support 241a is installed and the vertical pivoting support gear support axis 256a where the vertical gear support 260a is installed are indicated to provide additional details related to the explanation of the FIG. 25 and FIG. 33.

FIG. 34 describes the components involved in the actuator positioning control mechanism used in the autonomous mobile lift robot 349 of the present invention. The positioning of a particular actuator is affected by the position of the pivoting support it is fixated to and the angle control guide it is linked to. The process is the same for all four pairs of pivoting supports so it will be explained only once for concision, mostly referring to the pair of pivoting supports 232b, and 252b and to the pair of pivoting supports 232d, and 252d exceptions made if other pivoting support pairs offer a better angle for visualization. As the components are the same in all four sets of pivoting support pairs, it is possible to identify the correspondent components in other pivoting support pairs.

The horizontal arm actuator 277b is installed in the horizontal pivoting support 232b fixating the horizontal arm actuator fixation pin 281b at the tip of the horizontal arm actuator fixation bar 280b in the horizontal pivoting support actuator reference hole 240b. The vertical arm actuator 284b is installed in the vertical pivoting support 252b fixating the vertical arm actuator fixation pin 288b at the tip of the vertical arm actuator fixation bar 287b in the vertical pivoting support actuator reference hole 259b (see FIG. 26 and FIG. 33).

The horizontal arm actuator sliding bar 282d is inserted into the horizontal actuator angle control track 272d of the horizontal actuator angle control guide 271d that is fixated above the horizontal arm actuator 277*d* and the horizontal arm actuator sliding knob 283*d* keeps the horizontal arm actuator sliding bar 282*d* from falling from the horizontal actuator angle control track 272*d*.

As the horizontal pivoting support 232*d* rotates around the pivoting axis 334*d*, the horizontal arm actuator sliding bar 282*d* slides inside the horizontal actuator angle control track 272*d* that in turn produces the desired orientation angle for the horizontal arm actuator 277*d* throughout the excursion of the horizontal pivoting support 232*d*.

The vertical arm actuator sliding bar 289*d* is inserted into the vertical actuator angle control track 275*d* of the vertical actuator angle control guide 274*d* that is fixated above the vertical arm actuator 284*d* and the vertical arm actuator sliding knob 290*d* keeps the vertical arm actuator sliding bar 289*d* from falling from the vertical actuator angle control track 275*d*.

As the vertical pivoting support 252*d* rotates around the pivoting axis 334*d*, the vertical arm actuator sliding bar 289*d* slides inside the vertical actuator angle control track 275*d* that in turn produces the desired orientation angle for the vertical arm actuator 284*d* throughout the excursion of the vertical pivoting support 252*d*.

The actuator arm 291*g* is installed in the vertical arm actuator 284*d* and the actuator arm 291*h* is installed in the horizontal arm actuator 277*d*.

The horizontal arm actuator sliding bar 282*d* is longer than the vertical arm actuator sliding bar 289*d* to offset the position of the horizontal arm actuator 277*d* and the vertical arm actuator 284*d* to prevent the actuator arms 291*h*, and 291*g* from hitting each other allowing the horizontal arm actuator 277*d* and the vertical arm actuator 284*d* to be installed in proximity and move without interfering with each other.

Due to the offset in the position of the vertical arm actuator 284*d* and the horizontal arm actuator 277*d*, the actuator hand 294*g* is higher than the actuator hand 294*h*. To compensate that, the vertical actuator hand finger 307*d* is longer than the horizontal actuator hand finger 301*d* to align the vertical actuator hand grabbing tip 308*d* with the horizontal actuator hand grabbing tip 302*d* in the same level.

FIG. 35 shows a top view of one embodiment of the autonomous mobile lift robot 349 of the present invention with the tapered teeth gears in the extended position showing the gear positioning mechanism and other internal components affected by the gear positioning mechanism and the clearances to other internal components.

The actuator beveled gear driving engines 210*a*, and 210*b* drive the control disks 204 that in turn drive the gear position control bars 212*a*, and 212*b* that extend the horizontal pivoting supports 232 and the vertical pivoting supports 252 that pivot around the pivoting axis 334 to the extended position. Embodiments of the present invention comprise suitable electronics are provided within the scope of the present invention to establish connection to one or more digital devices such as computers, laptops, cellphones, tablets or other, may be connected wirelessly, using Wi-Fi, Bluetooth, cellular, radio-frequency, and other bandwidths for communication to have the one or more digital devices control the actuator beveled gear driving engines 210 to direct operation and movement or for scheduling of operations using one or more software applications.

The vertical pivoting supports 252 hold the vertical gear supports 260 that hold the tapered teeth gears 214*a* that are mounted vertically. The horizontal pivoting supports 232 hold the horizontal gear supports 241 that hold the tapered teeth gears 214*b* that are mounted horizontally.

The vertical gear driving engines 220 in conjunction with two vertical gear driving bevels 221 drive the tapered teeth gears 214*a* that are mounted vertically. The horizontal gear driving engine 217 in conjunction with the horizontal gear driving pulleys 218*a*, and 218*b* and the horizontal gear driving belt 219 drive the tapered teeth gears 214*b* that are mounted horizontally. Embodiments of the present invention comprise suitable electronics are provided within the scope of the present invention to establish connection to one or more digital devices such as computers, laptops, cellphones, tablets or other, may be connected wirelessly, using Wi-Fi, Bluetooth, cellular, radio-frequency, and other bandwidths for communication to have the one or more digital devices control the vertical gear driving engines 220 and the horizontal gear driving engine 217 to direct operation and movement or for scheduling of operations using one or more software applications.

The horizontal angle control guide tracks 223 in the horizontal angle control guides 222 provide angle adjustment for the tapered teeth gears 214*b* that are mounted horizontally to have the tapered teeth 215 adjust and align within the frustum shaped teeth 122 providing the traction necessary to move the autonomous mobile lift robot case 330 along the frustum shaped teeth 122 of the rack lattice structure in a horizontal direction. The vertical angle control guide tracks 226 in the vertical angle control guides 225 mounted in the vertical angle control supports 228 provide angle adjustment for the tapered teeth gears 214*a* that are mounted vertically to have the tapered teeth 215 adjust and align within the frustum shaped teeth 122 providing the traction necessary to move the autonomous mobile lift robot case 330 along the frustum shaped teeth 122 of the rack lattice structure in a vertical direction.

In the extended position, the vertical arm actuator sliding knobs 290 move to the nearest end to the corners of the autonomous mobile lift robot case 330 of the vertical actuator angle control tracks 275 of the vertical actuator angle control guides 274 defining the alignment of the vertical arm actuators 284, the actuator arms 291*a*, and the vertical actuator hands 303.

Likewise, in the extended position, the horizontal arm actuator sliding knobs 283 move to the nearest end to the corners of the autonomous mobile lift robot case 330 of the horizontal actuator angle control tracks 272 of the horizontal actuator angle control guides 271 defining the alignment of the horizontal arm actuators 277, the actuator arms 291*b*, and the horizontal actuator hands 297.

The wheels 192, the wheel directional gear 197, and the wheel driving engine 202 are also visible in the center of each of the four faces of the autonomous mobile lift robot 349.

Figure 36:
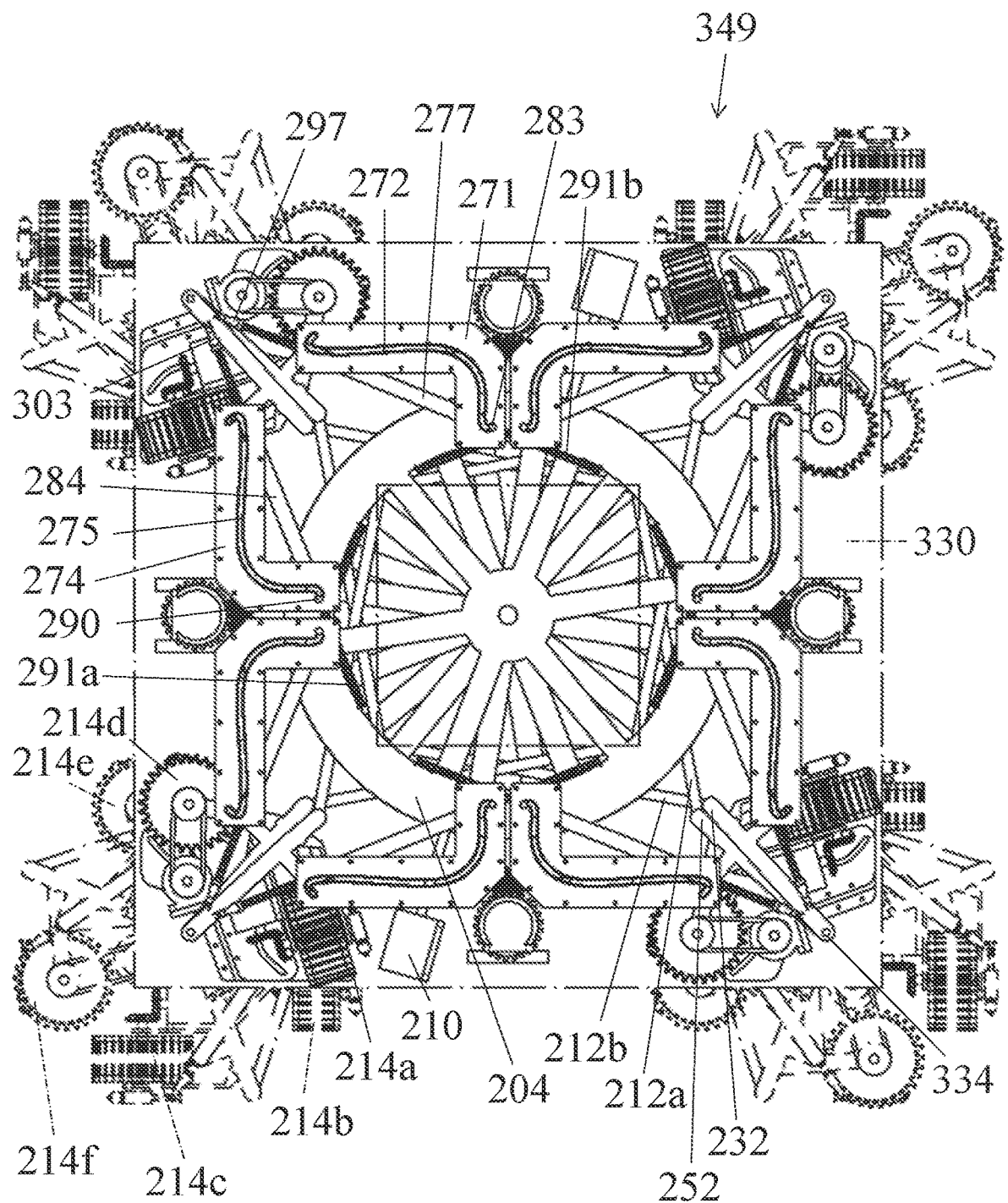
FIG. 36 is a top view of one embodiment of the autonomous mobile lift robot of the present invention with each of the first and second perpendicularly mounted tapered teeth gears in the retracted position overlayed with the views of each of the first and second perpendicularly mounted tapered teeth gears in the parallel and in the extended positions.

FIG. 36 shows a top view of one embodiment of the autonomous mobile lift robot 349 of the present invention with the tapered teeth gears in the retracted position overlayed with the views of the tapered teeth gears in the parallel and in the extended positions.

The actuator beveled gear driving engines 210 drive the control disks 204 that in turn drive the gear position control bars 212*a*, and 212*b* that retract the horizontal pivoting supports 232 and the vertical pivoting supports 252 that pivot around the pivoting axis 334 to the retracted position.

The positions of the vertically mounted tapered teeth gear $214a_1$, $214a_2$, and $214a_3$ are shown in the retracted position, the parallel position, and the extended position respectively. The positions of horizontally mounted tapered teeth gear $214b_1$, $214b_2$, and $214b_3$ are in the retracted position, the parallel position, and the extended position respectively.

In the retracted position, the vertical arm actuator sliding knobs 290 move to the farthest end to the corners of the autonomous mobile lift robot case 330 of the vertical actuator angle control tracks 275 of the vertical actuator angle control guides 274 defining the alignment of the vertical arm actuators 284, the actuator arms 291*a*, and the vertical actuator hands 303.

Likewise, in the retracted position, the horizontal arm actuator sliding knobs 283 move to the farthest end to the corners of the autonomous mobile lift robot case 330 of the horizontal actuator angle control tracks 272 of the horizontal actuator angle control guides 271 defining the alignment of the horizontal arm actuators 277, the actuator arms 291*b*, and the horizontal actuator hands 297.

Figure 37:
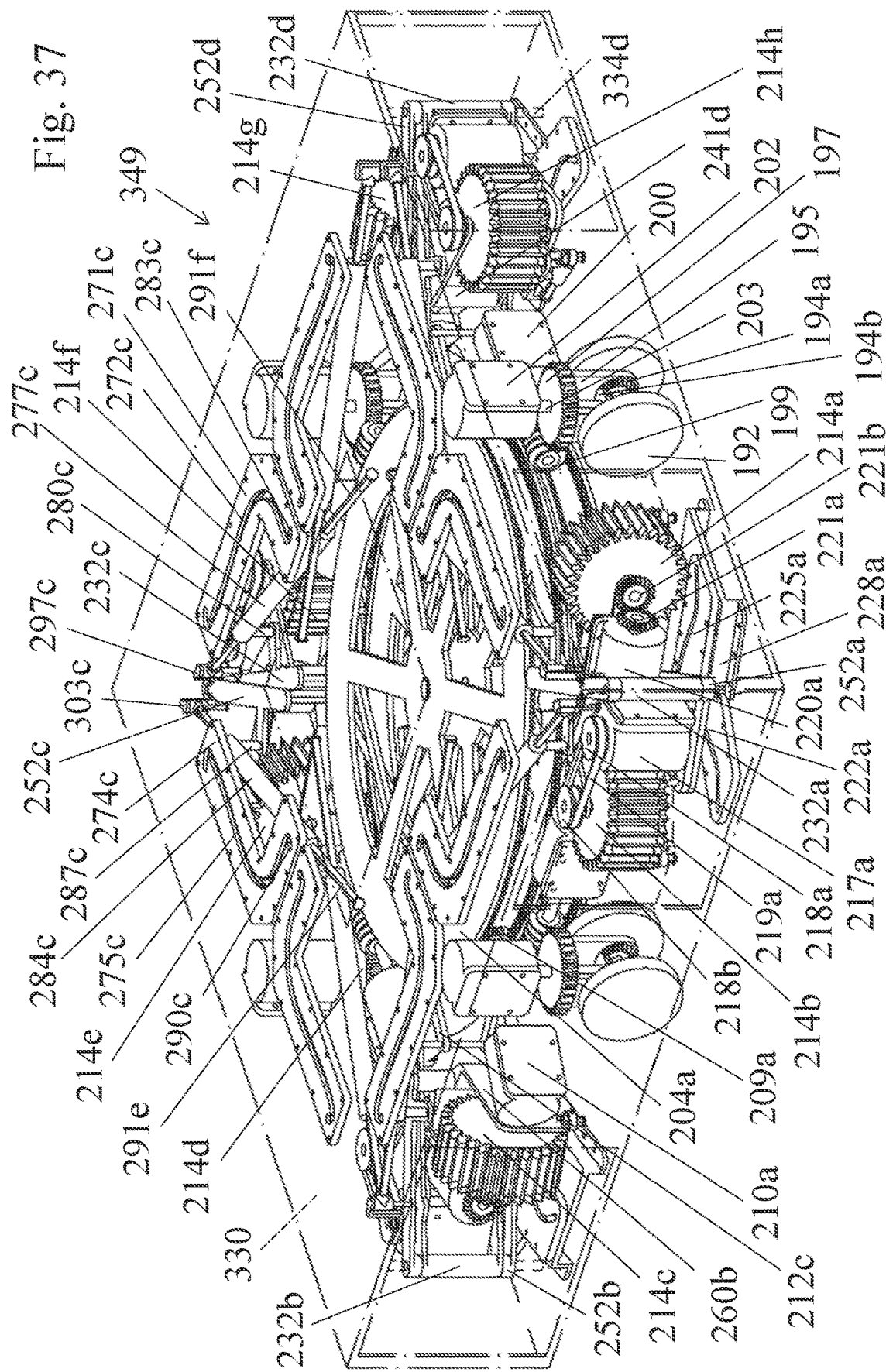
FIG. 37 is an isometric view of one embodiment of the autonomous mobile lift robot of the present invention with each of the first and second perpendicularly mounted tapered teeth gears in the retracted position showing internal components.

FIG. 37 shows an isometric view of one embodiment of the autonomous mobile lift robot 349 of the present invention with the tapered teeth gears in each corner in the retracted position and with the autonomous mobile lift robot case 330 drawn transparent in dash dotted lines to display details of the internal components and provide an overall picture of the components location inside the autonomous mobile lift robot 349.

The numbering pattern is the same used in FIG. 33 and FIG. 34 that are in the extended position, with same components located in the same place using the same differentiation letters to facilitate the identification of a particular component in all figures.

As FIG. 37 displays the autonomous mobile lift robot 349 in the retracted position, the gear position control bars 212*c*, etc. are mostly inside the control disks 204*a*, etc. that are located at the center of the autonomous mobile lift robot case 330. The actuator beveled gear driving engine 210*b* and the control disk actuator beveled gear 209*a* that drive the control disks 204*a*, and 204*b* on top are also visible, however, most of the positioning mechanism is partially obstructed from view by the other components and can be better seen in the extended position in FIG. 33 and FIG. 34.

FIG. 37 shows the horizontal pivoting support 232*d* and the vertical pivoting supports 252*d* installed around the pivoting axis 334*d*, with the horizontal gear support 241*d* indicated on its installed position in the horizontal pivoting support 232*d*. For better visualization angle, the vertical gear support 260*b* is indicated on its installed position in the vertical pivoting supports 252*b*.

The horizontal angle control guide 222*a* is installed at the bottom of the autonomous mobile lift robot case 330 and the vertical angle control guide 225*a* is installed on top of the vertical angle control support 228*a* that is installed at the bottom of the autonomous mobile lift robot case 330.

The vertical gear driving engine 220*a* and the vertical gear driving bevels 221*a*, and 221*b* that drive the vertical tapered teeth gear 214*a* are seen on their installed positions.

The horizontal gear driving engine 217*a*, the horizontal gear driving pulleys 218*a*, and 218*b* and the horizontal gear driving belt 219*a* that drive the horizontal tapered teeth gear 214*b* are seen on their installed positions.

FIG. 37 also shows the positioning arrangement of tapered teeth gears in each side of the autonomous mobile lift robot 349 allowing for a better understanding of the positioning mechanism.

The tapered teeth gears 214*b* and 214*c* are located in the side facing opposite to the side facing where the tapered teeth gears 214*f* and 214*g* are installed; and tapered teeth gears 214*d* and 214*e* are located in the side facing opposite to the side facing where the tapered teeth gears 214*h* and 214*a* are installed.

The positioning mechanism moves the horizontal pivoting supports 232*a*, and 232*c* together with the vertical pivoting support 252*b*, and 252*d*. This results in simultaneous movement of the tapered teeth gears 214*b*, and 214*f* together with the tapered teeth gears 214*c*, and 214*g* to configure the positioning of these gears on the two sides facing opposite to each other.

Similarly, the positioning mechanism moves the horizontal pivoting supports 232*b*, and 232*d* together with the vertical pivoting support 252*a*, and 252*c*. This results in simultaneous movement of the tapered teeth gears 214*d*, and 214*h* together with the tapered teeth gears 214*a*, and 214*e* to configure the positioning of these gears on the two other sides facing opposite to each other (see FIG. 33). Embodiments of the present invention comprise suitable electronics are provided within the scope of the present invention to establish connection to one or more digital devices such as computers, laptops, cellphones, tablets or other, may be connected wirelessly, using Wi-Fi, Bluetooth, cellular, radio-frequency, and other bandwidths for communication to have the one or more digital devices control the positioning mechanism to direct operation and movement or for scheduling of operations using one or more software applications.

The horizontal arm actuator 277*c* is installed fixating the horizontal arm actuator fixation bar 280*c* in the horizontal pivoting support 232*c*. The horizontal arm actuator sliding knob 283*c* keeps the horizontal arm actuator sliding bar 282*c* from falling from the horizontal actuator angle control track 272*c* in the horizontal actuator angle control guide 271*c* that is installed at the top of the autonomous mobile lift robot case 330.

The vertical arm actuator 284*c* is installed fixating the vertical arm actuator fixation bar 287*c* in the vertical pivoting support 252*c*. The vertical arm actuator sliding knob 290*c* keeps the vertical arm actuator sliding bar 289*c* from falling from the vertical actuator angle control track 275*c* in the vertical actuator angle control guide 274*c* that is installed at the top of the autonomous mobile lift robot case 330.

The actuator arm 291*f* with the horizontal actuator hand 297*c* in the end is installed in the horizontal arm actuator 277*c* and the actuator arm 291*e* with the vertical actuator hand 303*c* in the end is installed in the vertical arm actuator 284*c*.

The wheels 192 are supported by the wheel support 195 that is attached to the wheel directional gear 197. The wheel directional engine 200 drives the wheel directional worm 199 that turns the wheel directional gear 197 adjusting the direction of movement.

The wheel driving axle 203 of the wheel driving engine 202 passes through the center of the wheel directional gear 197 and drives the wheel driving bevel 194*b* that transfers the movement to the wheel driving bevel 194*a* that drives the wheels 192. Embodiments of the present invention comprise suitable electronics are provided within the scope of the present invention to establish connection to one or more digital devices such as computers, laptops, cellphones, tablets or other, may be connected wirelessly, using Wi-Fi, Bluetooth, cellular, radio-frequency, and other bandwidths for communication to have the one or more digital devices control the wheel directional engine 200 and wheel driving engine 202 to direct operation and movement or for scheduling of operations using one or more software applications.

Figure 38:
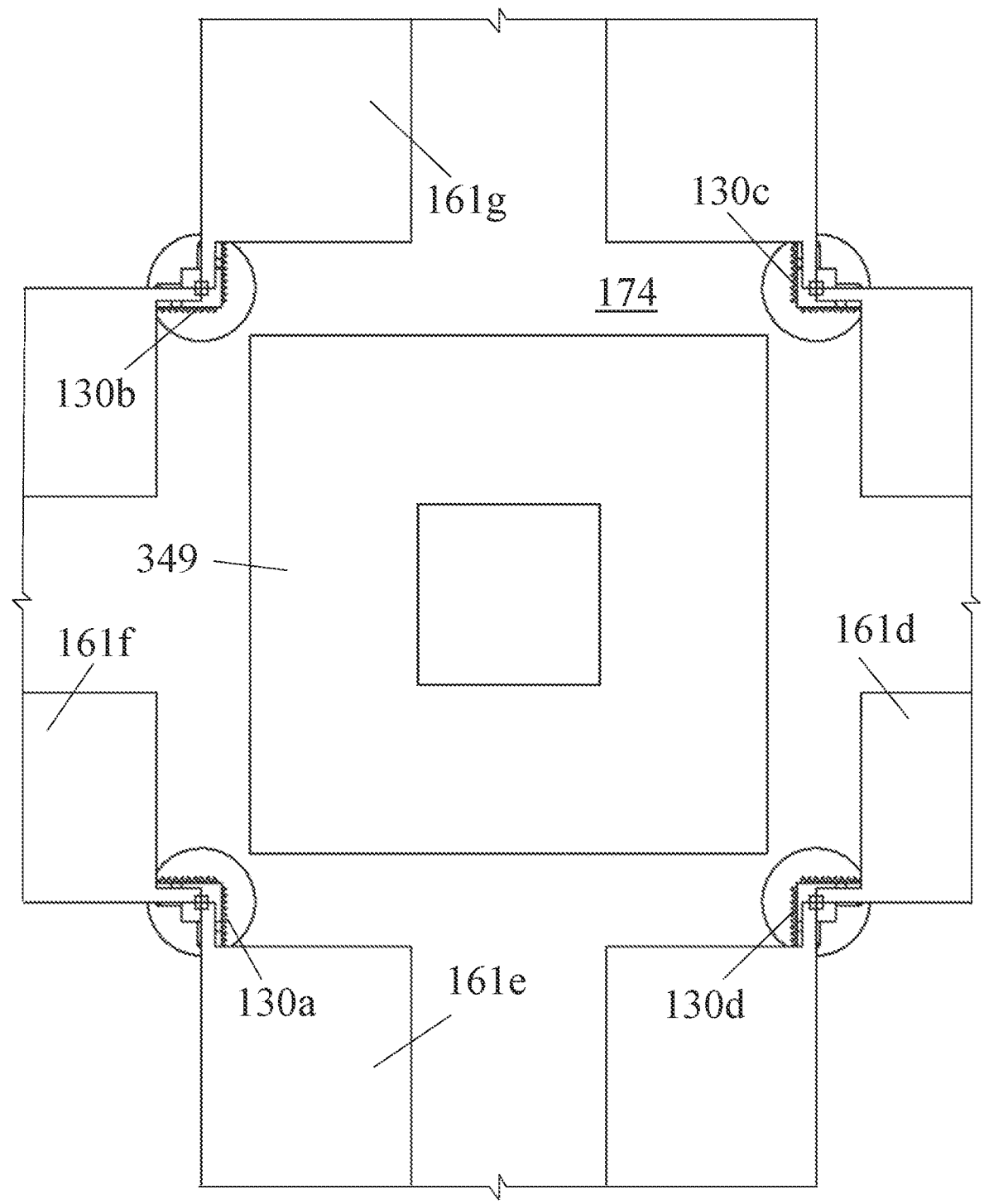
FIG. 38 is a top view of one embodiment of the autonomous mobile lift robot of the present invention with each of the first and second perpendicularly mounted tapered teeth gears in the retracted position at the center of a access shaft.

FIG. 38 is a top view of the autonomous mobile lift robot 349 in the retracted position standing on the floor in middle of one access shaft 174 with two levels to show the clearances to the rack poles 130*a*, 130*b*, 130*c*, and 130*d* and the shelves 161*d*, 161*e*, 161*f*, and 161*g* (see FIG. 15, FIG. 16, and FIG. 17).

Figure 39:
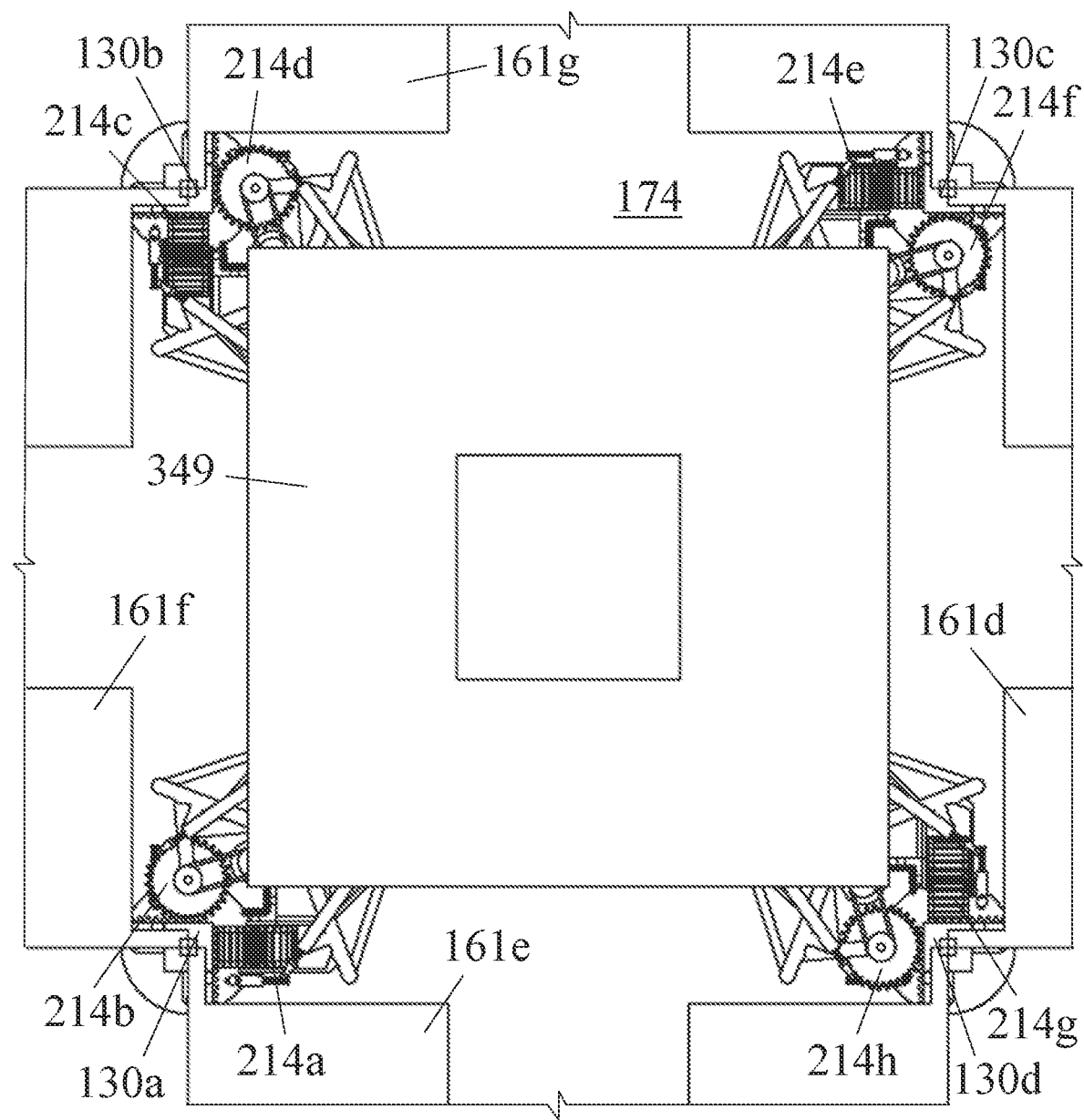
FIG. 39 is a top view of one embodiment of the autonomous mobile lift robot of the present invention with each of the first and second perpendicularly mounted tapered teeth gears in the extended position at the center of a access shaft.

FIG. 39 is a top view of the autonomous mobile lift robot 349 in the extended position in the middle of one access shaft 174 with two levels. In the extended position, the tapered teeth gears 214*a*, through 214*h* engage the rack poles 130*a*, 130*b*, 130*c*, and 130*d* allowing the autonomous mobile lift robot 349 to climb the rack poles.

As the autonomous mobile lift robot 349 climbs the rack poles 130*a*, 130*b*, 130*c*, and 130*d*, the vertically mounted tapered teeth gears 214*a*, 214*c*, 214*e*, and 214*g* rotate and drive the autonomous mobile lift robot 349 up or down. The horizontally mounted tapered teeth gears 214*b*, 214*d*, 214*f*, and 214*h* remain stationary and slide along the frustum shaped teeth 122 providing a reference to keep the autonomous mobile lift robot 349 steady in the center of the access shaft 174. The clearances to shelves 161*d*, 161*e*, 161*f*, and 161*g* are visible in FIG. 39 (see FIG. 15, FIG. 16, and FIG. 17).

Figure 40:
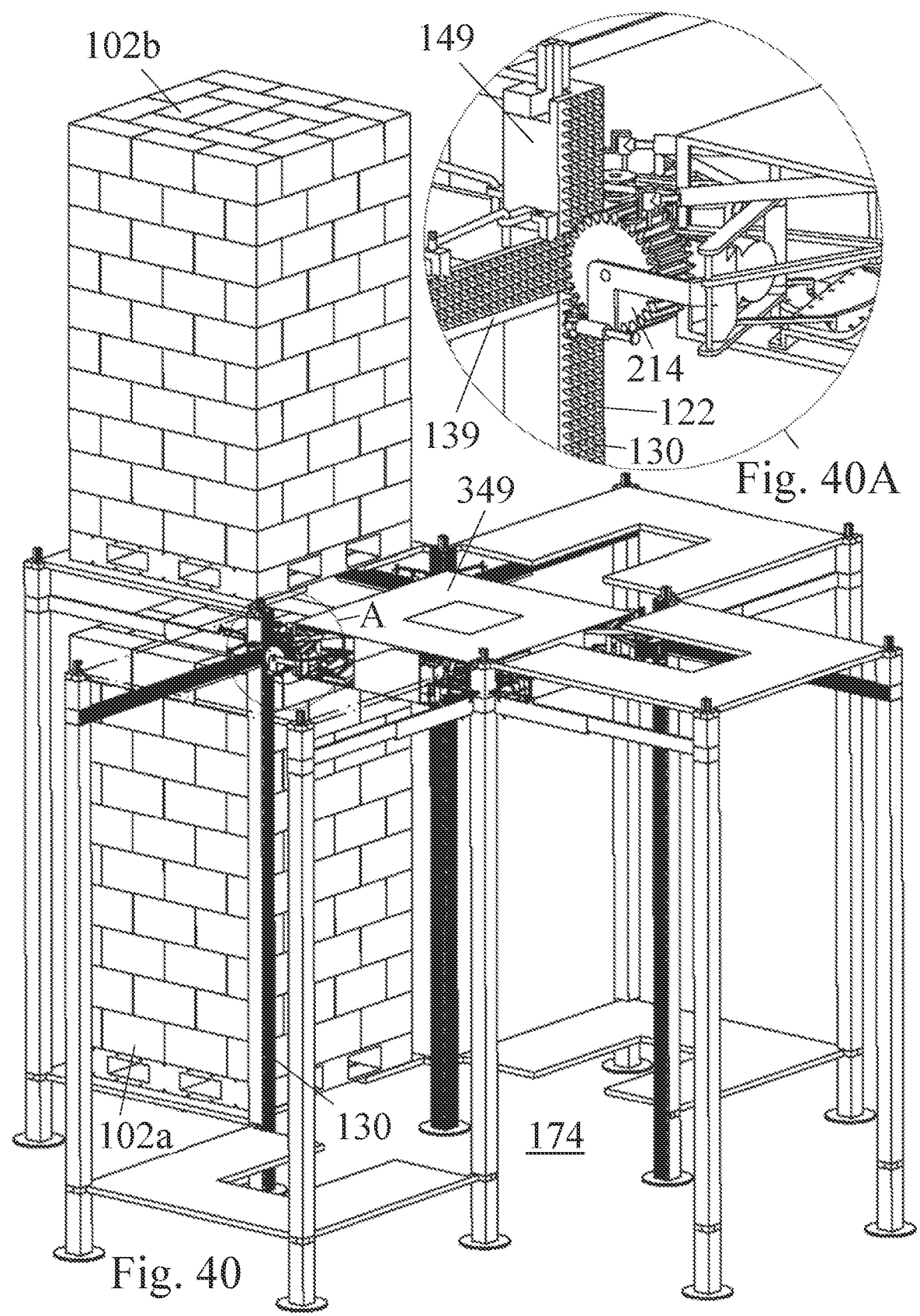
FIG. 40 is an isometric view of one embodiment of the autonomous mobile lift robot of the present invention with each of the first and second perpendicularly mounted tapered teeth gears in the extended position at the first level of a access shaft.

FIG. 40 shows the autonomous mobile lift robot 349 that has climbed the rack poles 130 and reached the first level of the access shaft 174 in preparation to retrieve the pallet 102*b* stored in the first level exactly above the pallet 102*a* that is on the ground level.

Detail FIG. 40A shows a zoomed view of the tapered teeth gear 214 engaging the frustum shaped teeth 122 in the rack pole 130, in the rack pole standard hinged rack A 139, and in the rack pole top cover 149 and stopping at the center of the rack pole standard hinged rack A 139 in preparation to unlock and move the rack pole standard hinged rack A 139 to gain access to the pallet 102*b*.

Figure 41:
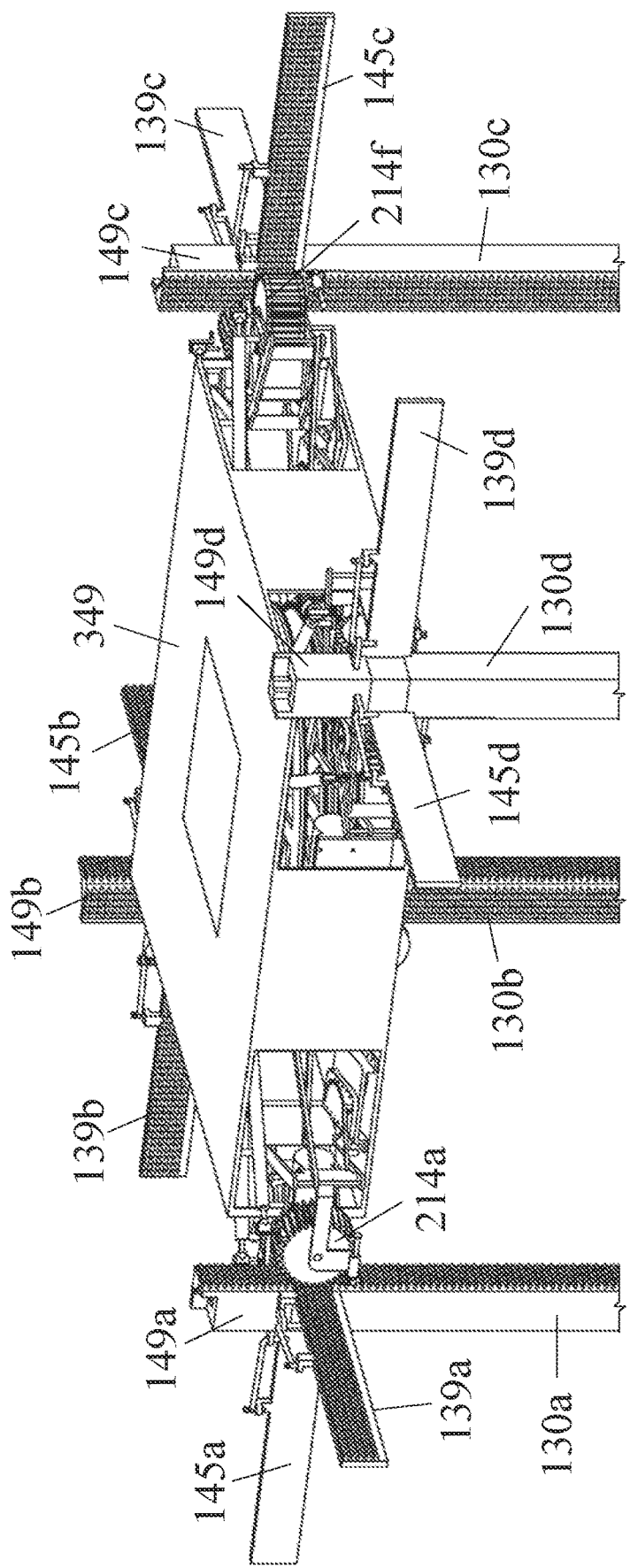
FIG. 41 is an isometric view of one embodiment of the autonomous mobile lift robot of the present invention and moving components of the advanced warehouse of the present invention in a first position to explain the process of manipulation of the moving components of the advanced warehouse by the autonomous mobile lift robot.

FIG. 41 shows the autonomous mobile lift robot 349 in position for unlocking and moving the required components to gain access to the pallet 102*b* (see FIG. 40). To facilitate the view of more details, a reduced number of affected components and components needed to better illustrate the procedure are drawn: the rack poles 130*a*, through 130*d*; the rack pole standard hinged rack A 139*a*, through 139*d*; the rack pole standard hinged rack B 145*a*, trough 145*d*; and the rack pole top cover 149*a*, through 149*d*.

To access the pallet 102*b* the autonomous mobile lift robot 349 needs to move the rack pole standard hinged rack A 139*a*, and 139*c* and the rack pole standard hinged rack B 145*b*, and 145*d*. The process is the same for all parts, so it is explained only once for the rack pole standard hinged rack A 139*a*.

Detail FIG. 41A shows a first position with the tapered teeth gear 214 engaging the frustum shaped teeth 122 in the rack pole standard hinged rack A 139. The lock bar 154 is firmly placed between the rack pole top lock fixture 150*a* of the rack pole top cover 149 and the hinged rack external lock fixture 142 of the rack pole standard hinged rack A 139. The hinged rack internal lock fixture 141 of the rack pole standard hinged rack A 139 is left unused.

The gear position control bar 212 attached to the vertical pivoting support action bar 257 keeps the vertical pivoting support 252 in the extended position. The vertical arm actuator fixation bar 287 fixated to the vertical pivoting support 252 puts the vertical arm actuator 284 in the extended position ensuring the proper alignment of the vertical arm actuator 284 (see FIG. 34).

In the extended position, the vertical gear support guide pin 268 is at the extremity of the vertical angle control guide track 226 adjusting the angle of the vertical gear support 260 so that the tapered teeth gear 214 is in full contact with the frustum shaped teeth 122 in the rack pole standard hinged rack A 139.

The vertical hinged rack actuator 313 is installed at the vertical gear support 260 and aligned perpendicularly to the rack pole standard hinged rack A 139. The hinged rack arm 317 is retracted and the hinged rack arm stopper 319 is further to the right. The hinged rack arm hand actuator 320, the hinged rack hand 323, and the hinged rack hand rollers 328 remain at a distance, not engaging the hinged rack hold bar 144 of the rack pole standard hinged rack A 139.

The hinged rack hand 323 is retracted and the hinged rack hand stopper 325 is further to the bottom to keep the hinged rack hand rollers 328 below the hinged rack hold bar 144.

The vertical arm actuator 284 and the actuator arm 291 are aligned with the position of lock bar grabbing neck 159 and the lock bar knob 160. The vertical actuator hand 303 is in a low position in the actuator hand 294 causing the vertical actuator hand grabbing tip 308 to be at exactly the same level of the lock bar grabbing neck 159. As the actuator arm 291 is retracted, the vertical actuator hand grabbing tip 308 stays at a distance and does not engage the lock bar grabbing neck 159.

Detail FIG. 41B shows a second position with the tapered teeth gear 214 engaging the frustum shaped teeth 122 in the rack pole standard hinged rack A 139. The lock bar 154 is firmly placed between the rack pole top lock fixture 150*a* of the rack pole top cover 149 and the hinged rack external lock fixture 142 of the rack pole standard hinged rack A 139. The hinged rack internal lock fixture 141 of the rack pole standard hinged rack A 139 is left unused.

The gear position control bar 212 attached to the vertical pivoting support action bar 257 keeps the vertical pivoting support 252 in the extended position. The vertical arm actuator fixation bar 287 fixated to the vertical pivoting support 252 puts the vertical arm actuator 284 in the extended position ensuring the proper alignment of the vertical arm actuator 284 (see FIG. 34).

In the extended position, the vertical gear support guide pin 268 is at the extremity of the vertical angle control guide track 226 adjusting the angle of the vertical gear support 260 so that the tapered teeth gear 214 is in full contact with the frustum shaped teeth 122 in the rack pole standard hinged rack A 139.

The vertical hinged rack actuator 313 is installed at the vertical gear support 260 and aligned perpendicularly to the rack pole standard hinged rack A 139. The hinged rack arm 317 is extended and the hinged rack arm stopper 319 is in contact with the vertical hinged rack actuator 313. The hinged rack arm hand actuator 320, the hinged rack hand 323, and the hinged rack hand rollers 328 are exactly below the hinged rack hold bar 144 of the rack pole standard hinged rack A 139.

As the hinged rack hand 323 is retracted and the hinged rack hand stopper 325 is further to the bottom the hinged rack hand rollers 328 are not in contact with the hinged rack hold bar 144 of the rack pole standard hinged rack A 139.

The vertical arm actuator 284 and the actuator arm 291 are aligned with the position of lock bar grabbing neck 159 and the lock bar knob 160. The actuator arm 291 is extended and the vertical actuator hand 303 is in a low position in the actuator hand 294 causing the vertical actuator hand grabbing tip 308 to engage the lock bar grabbing neck 159.

Detail FIG. 41C shows a third position with the tapered teeth gear 214 engaging the frustum shaped teeth 122 in the rack pole standard hinged rack A 139. The lock bar 154 is lifted and free to rotate around the rack pole top lock fixture 150a of the rack pole top cover 149. The hinged rack hand rollers 328 of the hinged rack hand 323 are in contact with both sides of the hinged rack hold bar 144 of the rack pole standard hinged rack A 139 and hold the rack pole standard hinged rack A 139 in place. The hinged rack internal lock fixture 141 and the hinged rack external lock fixture 142 of the rack pole standard hinged rack A 139 are not used.

The gear position control bar 212 attached to the vertical pivoting support action bar 257 keeps the vertical pivoting support 252 in the extended position. The vertical arm actuator fixation bar 287 fixated to the vertical pivoting support 252 puts the vertical arm actuator 284 to the extended position ensuring the proper alignment of the vertical arm actuator 284 (see FIG. 34).

In the extended position, the vertical gear support guide pin 268 is at the extremity of the vertical angle control guide track 226 adjusting the angle of the vertical gear support 260 so that the tapered teeth gear 214 is in full contact with the frustum shaped teeth 122 in the rack pole standard hinged rack A 139, with the tapered teeth 215 parallel to the rack pole standard hinged rack A 139.

Figure 41D:
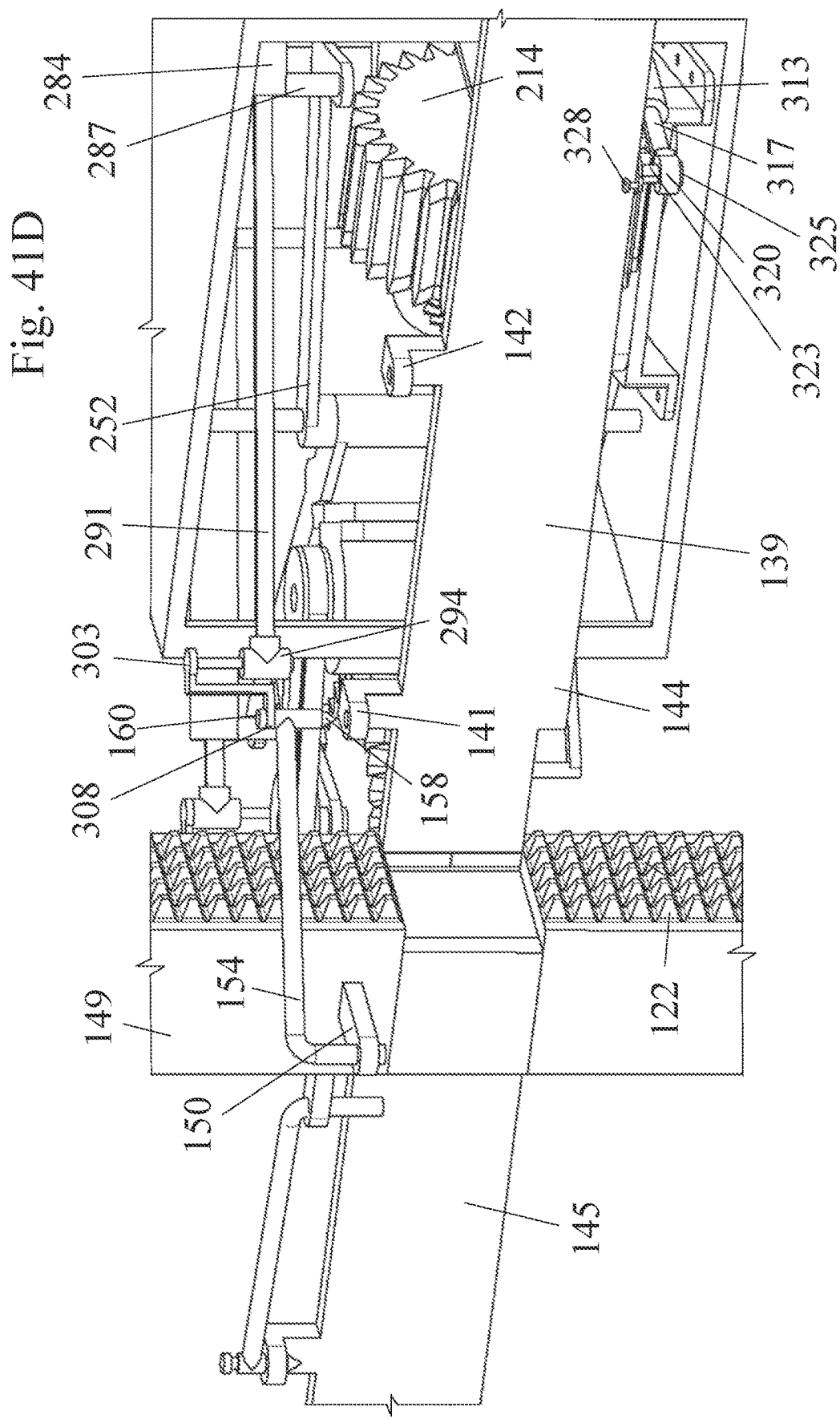
FIG. 41D is a zoomed isometric view of one tapered teeth gear and actuators used to manipulate the moving components in a fourth position showing the other perpendicularly mounted tapered teeth gear.

The tapered teeth edge face 216 help the tapered teeth 215 to adjust to eventual minor variations in the frustum shaped teeth 122 individual positions when the tapered teeth gear 214 needs to slide horizontally against the rack pole standard hinged rack A 139 (see detail FIG. 41D).

The vertical hinged rack actuator 313 is installed at the vertical gear support 260 and aligned perpendicularly to the rack pole standard hinged rack A 139. The hinged rack arm 317 is extended and the hinged rack arm stopper 319 is in contact with the vertical hinged rack actuator 313.

The hinged rack arm hand actuator 320 is exactly below the hinged rack hold bar 144 and the hinged rack hand 323 is extended with the hinged rack hand stopper 325 in contact with the hinged rack arm hand actuator 320. The hinged rack hand rollers 328 in both sides of the hinged rack hand 323 are in contact with the hinged rack hold bar 144 holding the rack pole standard hinged rack A 139 in contact with the tapered teeth gear 214.

The vertical arm actuator 284 and the actuator arm 291 are aligned with the position of lock bar grabbing neck 159 and the lock bar knob 160. The actuator arm 291 is extended and the vertical actuator hand 303 is in a raised position in the actuator hand 294 causing the vertical actuator hand grabbing tip 308 engaged to the lock bar grabbing neck 159 to lift the lock bar knob 160 and the lock bar 154 until the tapered end 158 clears the hinged rack external lock fixture 142 of the rack pole standard hinged rack A 139.

To avoid losing the grip on the rack pole standard hinged rack A 139 the hinged rack hand 323 is extended before the vertical actuator hand 303 is raised.

The gear position control bar 212 attached to the vertical pivoting support action bar 257 then retracts and pulls the vertical pivoting support 252 to the parallel position. The vertical arm actuator fixation bar 287 fixated to the vertical pivoting support 252 pushes the vertical arm actuator 284 to the parallel position and the alignment of the vertical arm actuator 284 changes according to the profile of the vertical actuator angle control track 275 of the vertical actuator angle control guide 274 that is made to ensure that the movement of the vertical actuator hand grabbing tip 308 matches the lock bar grabbing neck 159 as the lock bar 154 rotates around the rack pole top lock fixture 150a of the rack pole top cover 149 (see FIG. 34).

At the same time, the vertical gear support guide pin 268 slides in the vertical angle control guide track 226 that has the profile needed to adjust the angle of the vertical gear support 260 so that the tapered teeth gear 214 remains in full contact with the frustum shaped teeth 122 in the rack pole standard hinged rack A 139, with the tapered teeth 215 parallel to the rack pole standard hinged rack A 139 at all times until the tapered teeth gear 214 reaches the parallel position.

Because the pivoting axes are different, the change in the positions of the rack pole standard hinged rack A 139 and the tapered teeth gear 214 requires a change in the relative position of the rack pole standard hinged rack A 139 and the tapered teeth gear 214. In case of a horizontally mounted tapered teeth gear 214 the tapered teeth gear 214 can just rotate. A vertically mounted tapered teeth gear 214 on the other hand has to slide horizontally against the rack pole standard hinged rack A 139. The tapered teeth edge face 216 helps the tapered teeth 215 to adjust to eventual minor variations in the frustum shaped teeth 122 individual positions throughout the length of the rack pole standard hinged rack A 139 where the slide takes place. As reference, the initial position of the tapered teeth gear 214 is in this example, a little to the right of the hinged rack internal lock fixture 141 (see detail FIG. 41D).

Detail FIG. 41D shows a fourth position with the rack pole standard hinged rack A 139 already moved to align with the rack pole standard hinged rack B 145. The lock bar 154 is lifted and free to rotate around the rack pole top lock fixture 150a of the rack pole top cover 149. The hinged rack hand rollers 328 of the hinged rack hand 323 are in contact with both sides of the hinged rack hold bar 144 of the rack pole standard hinged rack A 139 and hold the rack pole standard hinged rack A 139 in place. The hinged rack internal lock fixture 141 and the hinged rack external lock fixture 142 of the rack pole standard hinged rack A 139 are not used.

The vertical arm actuator fixation bar 287 fixated to the vertical pivoting support 252 puts the vertical arm actuator 284 in the parallel position and the alignment of the vertical arm actuator 284 is adjusted according to the profile of the vertical actuator angle control track 275 of the vertical actuator angle control guide 274 that ensures that at the parallel position, the position of the vertical actuator hand grabbing tip 308 matches the position of the hinged rack internal lock fixture 141 of the rack pole standard hinged rack A 139.

In the parallel position, the vertical gear support guide pin 268 sliding in the vertical angle control guide track 226 adjusts the angle of the vertical gear support 260 so that the tapered teeth gear 214 is in full contact with the frustum shaped teeth 122 in the rack pole standard hinged rack A 139.

The vertical hinged rack actuator 313 is installed at the vertical gear support 260 and aligned perpendicularly to the rack pole standard hinged rack A 139. The hinged rack arm 317 is extended and the hinged rack arm stopper 319 is in contact with the vertical hinged rack actuator 313.

The hinged rack arm hand actuator 320 is exactly below the hinged rack hold bar 144 and the hinged rack hand 323 is extended with the hinged rack hand stopper 325 in contact with hinged rack arm hand actuator 320. The hinged rack hand rollers 328 in both sides of the hinged rack hand 323 are in contact with the hinged rack hold bar 144 holding the rack pole standard hinged rack A 139 in contact with the tapered teeth gear 214.

The vertical arm actuator 284 and the actuator arm 291 are aligned with the position of lock bar grabbing neck 159 and the lock bar knob 160. The actuator arm 291 is extended and the vertical actuator hand 303 is in a high position in the actuator hand 294 causing the vertical actuator hand grabbing tip 308 engaged to the lock bar grabbing neck 159 to hold the lock bar 154 in a high position in such a way that the tapered end 158 aligns with and stays above the hinged rack internal lock fixture 141 of the rack pole standard hinged rack A 139.

As the tapered teeth gear 214 reaches the final position of the horizontal slide a little to the left of hinged rack external lock fixture 142 of the rack pole standard hinged rack A 139 the length of the horizontal slide during the pivoting of the rack pole standard hinged rack A 139 can be ascertained comparing the position of the tapered teeth gear 214 in detail FIG. 41D with the position of the tapered teeth gear 214 in detail FIG. 41C.

Figure 41E:
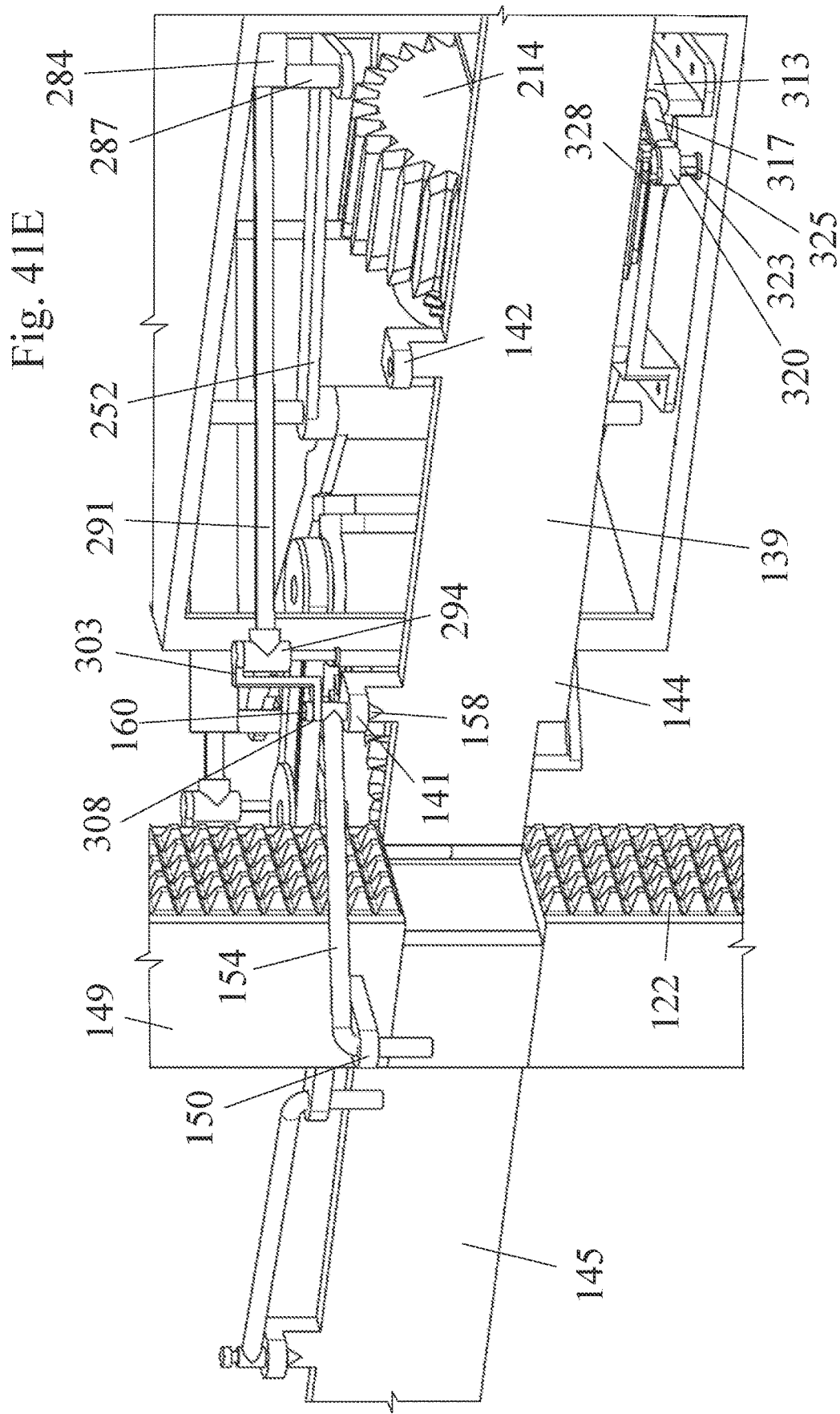
FIG. 41E is a zoomed isometric view of one tapered teeth gear and actuators used to manipulate the moving components in a fifth position showing the other perpendicularly mounted tapered teeth gear.

Detail FIG. 41E shows a fifth position with the rack pole standard hinged rack A 139 aligned with the rack pole standard hinged rack B 145. The lock bar 154 is firmly placed between the rack pole top lock fixture 150a of the rack pole top cover 149 and the hinged rack internal lock fixture 141 of the rack pole standard hinged rack A 139. The hinged rack external lock fixture 142 of the rack pole standard hinged rack A 139 is left unused.

The vertical arm actuator fixation bar 287 fixated to the vertical pivoting support 252 puts the vertical arm actuator 284 in the parallel position and the alignment of the vertical arm actuator 284 is adjusted according to the profile of the vertical actuator angle control track 275 of the vertical actuator angle control guide 274 that ensures that at the parallel position, the position of the vertical actuator hand grabbing tip 308 matches the position of the hinged rack internal lock fixture 141 of the rack pole standard hinged rack A 139.

In the parallel position, the vertical gear support guide pin 268 sliding in the vertical angle control guide track 226 adjusts the angle of the vertical gear support 260 so that the tapered teeth gear 214 is in full contact with the frustum shaped teeth 122 in the rack pole standard hinged rack A 139.

The vertical hinged rack actuator 313 is installed at the vertical gear support 260 and aligned perpendicularly to the rack pole standard hinged rack A 139. The hinged rack arm 317 is extended and the hinged rack arm hand actuator 320, the hinged rack hand 323, and the hinged rack hand rollers 328 are exactly below the hinged rack hold bar 144 of the rack pole standard hinged rack A 139.

As the hinged rack hand 323 has retracted, the hinged rack hand stopper 325 is located further to the bottom and the hinged rack hand rollers 328 are no longer in contact with the hinged rack hold bar 144 of the rack pole standard hinged rack A 139.

The vertical arm actuator 284 and the actuator arm 291 are aligned with the position of lock bar grabbing neck 159 and the lock bar knob 160. The actuator arm 291 is extended and the actuator hand 294 has lowered the position of the vertical actuator hand 303 causing the vertical actuator hand grabbing tip 308 engaged in the lock bar grabbing neck 159 to lower the lock bar knob 160 and the lock bar 154 so that the tapered end 158 fits into the hinged rack internal lock fixture 141 of the rack pole standard hinged rack A 139. The conical profile of the tapered end 158 helps to compensate for minor variations in the positioning and ensures a successful insertion of the lock bar 154 into the hinged rack internal lock fixture 141 of the rack pole standard hinged rack A 139.

To avoid losing the grip on the rack pole standard hinged rack A 139 the vertical actuator hand 303 is lowered before the hinged rack hand 323 is retracted.

Detail FIG. 41F shows a sixth position with the rack pole standard hinged rack A 139 aligned with the rack pole standard hinged rack B 145. The lock bar 154 is firmly placed between the rack pole top lock fixture 150a of the rack pole top cover 149 and the hinged rack internal lock fixture 141 of the rack pole standard hinged rack A 139. The hinged rack external lock fixture 142 of the rack pole standard hinged rack A 139 is left unused.

The vertical arm actuator fixation bar 287 fixated to the vertical pivoting support 252 puts the vertical arm actuator 284 in the parallel position and the alignment of the vertical arm actuator 284 is adjusted according to the profile of the vertical actuator angle control track 275 of the vertical actuator angle control guide 274 that ensures that at the parallel position, the position of the vertical actuator hand grabbing tip 308 matches the position of the hinged rack internal lock fixture 141 of the rack pole standard hinged rack A 139.

In the parallel position, the vertical gear support guide pin 268 sliding in the vertical angle control guide track 226 adjusts the angle of the vertical gear support 260 so that the tapered teeth gear 214a is in full contact with the frustum shaped teeth 122 in the rack pole standard hinged rack A 139.

The vertical hinged rack actuator 313 is installed at the vertical gear support 260 and aligned perpendicularly to the rack pole standard hinged rack A 139. The hinged rack arm 317 is retracted and hinged rack arm hand actuator 320, the hinged rack hand 323, and the hinged rack hand rollers 328 remain at a distance, not engaging the hinged rack hold bar 144 of the rack pole standard hinged rack A 139 and clear of other structures.

The hinged rack hand 323 is retracted and the hinged rack hand stopper 325 is further to the bottom keeping the hinged rack hand rollers 328 below the hinged rack hold bar 144.

The vertical arm actuator 284 and the actuator arm 291 are aligned with the position of lock bar grabbing neck 159 and the lock bar knob 160. As the actuator arm 291 retracts, the vertical actuator hand grabbing tip 308 disengages the lock bar grabbing neck 159 and moves back and stays clear of other structures. The vertical actuator hand 303 is in a low position in the actuator hand 294 and the vertical actuator hand grabbing tip 308 remains at the same level of the lock bar grabbing neck 159.

The tapered teeth gear 214b remains stationary at the same position throughout the process of pivoting the rack pole standard hinged rack A 139. Once the process of pivoting the rack pole standard hinged rack A 139 is complete, the tapered teeth gear 214b is able to rotate to propel the autonomous mobile lift robot case 330 horizontally. The tapered teeth gear 214a perpendicularly mounted to the tapered teeth gear 214b does not rotate but slides along the rack pole standard hinged rack A 139 and the rack pole standard hinged rack B 145. As the tapered teeth gear 214a slides, the engaged teeth function as guides to keep the autonomous mobile lift robot case 330 at the desired level.

FIG. 42 shows the autonomous mobile lift robot 349 at the first level of the access shaft 174 positioned to retrieve the pallet 102b stored in the first level exactly above the pallet 102a that is on the ground level.

The single rack piece 120, the rack pole standard hinged rack A 139a, and the rack pole standard hinged rack B 145a installed at the rack pole 130a and the rack pole standard hinged rack A 139b, and the rack pole standard hinged rack B 145b installed at the rack pole 130b are all aligned and form a single seamless rack. The same occurs at the other side of the access shaft 174 allowing the autonomous mobile lift robot 349 to leave the center of the access shaft 174 and move to the retrieving position below the pallet 102*b*.

Detail FIG. 42A shows the autonomous mobile lift robot 349 under the pallet 102*b* that is still resting on the shelf 161. A storage gap 350 between the pallet 102*a* and the pallet 102*b* provides sufficient space for the autonomous mobile lift robot 349 to fit in and the single rack piece 120, the rack pole standard hinged rack B 145*a* and the rack pole standard hinged rack A 139*a* provide a continuous rack that supports the autonomous mobile lift robot 349.

FIG. 43 shows the autonomous mobile lift robot 349 with the pantographic lift platform 178 raised at the first level of the access shaft 174 retrieving the pallet 102*b* stored in the first level exactly above the pallet 102*a* that is on the ground level.

The single rack piece 120, the rack pole standard hinged rack A 139, and the rack pole standard hinged rack B 145 are all aligned and form a single seamless rack.

Detail FIG. 43A shows the autonomous mobile lift robot 349 with the pantographic lift platform 178 raised and supporting the pallet 102*b* that is no longer resting on the shelf 161. The storage gap 350 between the pallet 102*a* and the pallet 102*b* provides sufficient space for the autonomous mobile lift robot 349 to fit in and the single rack piece 120, the rack pole standard hinged rack B 145 and the rack pole standard hinged rack A 139 provide a continuous rack that supports the autonomous mobile lift robot 349.

FIG. 44 shows the autonomous mobile lift robot 349 with the pantographic lift platform 178 raised and carrying the pallet 102*b* that was retrieved from the shelf 161 on the first level. The shelf access channel 163 provides the path to allow the raised pantographic lift platform 178 to pass and remove the pallet 102*b* from the shelf 161.

The rack pole standard hinged rack A 139 and the rack pole standard hinged rack B 145 are aligned and form a single seamless rack that supports the autonomous mobile lift robot 349 as it moves back to the center of the access shaft 174.

Detail FIG. 44A shows the autonomous mobile lift robot 349 with the pantographic lift platform 178 raised and supporting the pallet 102*b* that is no longer above the pallet 102*a*. The rack pole standard hinged rack A 139 and the rack pole standard hinged rack B 145 are aligned and form a single seamless rack that supports the autonomous mobile lift robot 349 as it moves back to the center of the access shaft 174.

FIG. 45 shows a loaded autonomous mobile lift robot 351 configured with a half size pallet 352 loaded on top of the autonomous mobile lift robot 349 with the pantographic lift platform 178 raised and the tapered teeth gears 214*a*, and 214*b* in the front face and the corresponding tapered teeth gears 214*e*, and 214*f* on the opposite face on the back in the parallel position and the tapered teeth gears 214*g*, and 214*h* in the right face and the corresponding tapered teeth gears 214*c*, and 214*d* in the left face in the retracted position.

FIG. 46 shows a fast loading truck 353 that has a flatbed chassis 354. The fast loading truck 353 has a standard cargo bay 355 with a right door 356 and a left door 357 at the rear that are seen closed.

FIG. 47 shows the fast loading truck 353 with the flatbed chassis 354 and the standard cargo bay 355 with the right door 356 and the left door 357 open. With the doors open, a cargo bay center division 358 that divides the cargo bay 355 in two from top to bottom can be seen. A door rack 359 is seen installed at the right door 356 and a mirror version of the door rack 359 is installed at the left door 357.

A cargo bay center rack 360 is installed at both sides of the cargo bay center division 358 that divides the cargo bay 355. A cargo bay side rack 361 is installed at the right side of the cargo bay 355 that is aligned with the door rack 359 when the right door 356 is open and a mirror version of the cargo bay side rack 361 is installed at the left side of the cargo bay 355 that is aligned with the mirror version of the door rack 359 installed at the left door 357 when the left door 357 is open (see detail FIG. 48A).

A middle division 362 is seen on its stored position folded to one side of the cargo bay 355. The middle division 362 has a middle division rack 363 at both sides of the middle division 362 that aligns with the cargo bay center rack 360 installed at both sides of the cargo bay center division 358 when the middle division 362 is on its open position.

FIG. 47 also shows a group of lower shelves 364 and a group of upper shelves 365 that are installed at appropriate heights to hold half size pallets 352 on two levels.

FIG. 48 shows the fast loading truck 353 with the flatbed chassis 354 and the standard cargo bay 355 with the right door 356, the left door 357, and the middle division 362 open parked at a truck loading bay 367.

A pair of right door lock bar 368*a* and 368*b* is installed between the right door 356 and the middle division 362 and a pair of left door lock bar 369*a* and 369*b* is installed between the left door 357 and the middle division 362. The right door 356, the left door 357, and the middle division 362 are kept parallel to each other and at a fixed distance to each other.

With the middle division 362 open, the cargo bay center rack 360 installed on both sides of the cargo bay center division 358 and the middle division rack 363 installed on both sides of the middle division 362 form a continuous seamless rack.

Likewise, with the doors open, the cargo bay side rack 361 installed at the right side of the cargo bay 355 is aligned with the door rack 359 installed at the right door 356 and the mirror version of the cargo bay side rack 361 installed at the left side of the cargo bay 355 is aligned with the mirror version of the door rack 359 installed at the left door 357.

The portions of the lower shelves 364*a*, and 364*b* and the upper shelves 365*a*, 365*b* that are installed on both sides of the cargo bay center division 358 that are inside the cargo bay 355 have been drawn in dashed lines to enable the visualization of an access path 366*a*, 366*b*, 366*c*, and 366*d* in the middle of the lower shelves 364*a*, and 364*b* and the upper shelves 365*a*, 365*b* that runs all the way from the door to the front of the cargo bay 355.

The truck loading bay 367 is at the same level of a truck floor 370 that runs all the way from the doors until the front of the cargo bay 355.

Detail FIG. 48A shows the cargo bay center rack 360 installed on both sides of the cargo bay center division 358 and the middle division rack 363*a*, 363*b*, and 363*c* installed on both sides of the middle division 362 in greater magnification to enable the visualization of the frustum shaped teeth 122 and a smooth, seamless rack interface 371 between the cargo bay center rack 360 and the middle division rack 363*a*, 363*b*, and 363*c*.

The middle division rack 363*a*, 363*b*, and 363*c* has three branches, the horizontal branch 363*a* that interfaces with the cargo bay center rack 360 and two vertical branches 363*b*, and 363*c* at the correct distance to match the distance between a pair of tapered teeth gears 214 on one face of the autonomous mobile lift robot 349.

The upper shelves 365a, 365b installed on both sides of the cargo bay center division 358, the left door lock bar 369a, and a short portion of the cargo bay side rack 361 are also visible.

FIG. 49 shows the fast loading truck 353 being loaded with several loaded autonomous mobile lift robots 351a, through 351x that climb the rack structure on the right door 356, the left door 357, and the middle division 362 and continue into the rack structure in the cargo bay 355. The right door lock bars 368a and 368b and the left door lock bars 369a and 369b hold the right door 356, the left door 357, and the middle division 362 at the proper distance and keep the rack structure accessible to the loaded autonomous mobile lift robots.

The loaded autonomous mobile lift robots 351a, through 351x coming from the truck loading bay 367 climb the rack structure and move inside the cargo bay 355 in pairs one after the other at both sides of the middle division 362 and move forward towards the front of the cargo bay 355 to make space for the subsequent pair of loaded autonomous mobile lift robots. This strategy allows for the loading of the entire first level of the fast loading truck 353 in one step.

FIG. 49 shows the last loaded autonomous mobile lift robots 351w, and 351x about to start climbing the rack structure on the right door 356, the left door 357, and the middle division 362 while the other loaded autonomous mobile lift robots 351a, through 351v that are already inside the cargo bay 355 are moving towards the front of the cargo bay 355.

Once all the loaded autonomous mobile lift robots 351a, through 351x are inside the cargo bay 355, the loaded autonomous mobile lift robots 351a, through 351x lower their pantographic lift platforms 178 deposit their half size pallets 352 in the corresponding upper shelves 365a and the loaded autonomous mobile lift robots 351a, through 351x leave, with the last pair of loaded autonomous mobile lift robots 351w, and 351x that went in being the first pair to leave until all loaded autonomous mobile lift robots 351a, through 351x have left.

FIG. 50 shows the fast loading truck 353 with a loaded upper level 372 being loaded at the ground level with several loaded autonomous mobile lift robots 351a, through 351d that run from the truck loading bay 367 directly into the cargo bay 355 using the truck floor 370.

To avoid unnecessary clutter, only four loaded autonomous mobile lift robots 351a, through 351d have been drawn, but as seen in FIG. 49, the exact number of loaded autonomous mobile lift robots necessary to load the entire ground level of the fast loading truck 353 may be used, entering the cargo bay 355 in pairs until they reach the front of the cargo bay 355, then lower their pantographic lift platforms 178 to deposit their half size pallets 352 in the corresponding lower shelves 364a and leave, with the last pair of loaded autonomous mobile lift robots that went in being the first pair to leave until all loaded autonomous mobile lift robots have left. Alternatively, all or some of the loaded autonomous mobile lift robots 351 may remain on the fast loading truck 353 for deployment and delivery of each of the half size pallets 352. Through mapping and scheduling, the loaded autonomous mobile lift robots 351 may load the fast loading truck 353 in the proper order with each of the half size pallets 352 having the proper goods for delivery to each mapped location along the designated route of the fast loading truck 353. Depending on the height of the fast loading truck 353 and the height of the pallets, additional levels may be needed and the rack structure is made accordingly.

Operation—First Embodiment

The warehouse is first assembled to the required size, height and number of access shafts. For concision and to avoid cluttering in the drawings only 9 access shafts and 4 floors are illustrated. This numbers can however be greatly exceeded in a real case application.

FIG. 6 shows the first step of the warehouse being assembled 173. One array of bases 106a, 106b, 106c, etc. with the bases 106a, 106b, 106c placed at the adequate distance from each other in the X and Y direction, is constructed.

FIG. 7 shows the second step of the warehouse being assembled 173. At the correct places, the required number of base spacers 109a, 109b, etc. and base rack spacers 127a, 127b, 127c, 127d, etc. is placed on top of the corresponding bases 106a, 106b, 106c, etc. The base rack spacers 127a, 127b, 127c, 127d, are placed with the front faces facing each other creating the access shafts 174a, 174b, etc. that are regularly spaced.

Detail FIG. 7A shows one base rack spacer 127e in greater magnification to display the shelf insertion notch 110a that is used for the installation of shelves at a later stage. Also visible are the features of the shelf support 128 and the rack extension 129.

Detail FIG. 7B shows one base spacer 109c in greater magnification to display the shelf insertion notch 110b that is used for the installation of shelves at a later stage.

FIG. 8 shows the third step of the warehouse being assembled 173. One array of shelves 161a, 161b, 161c, etc. with each shelf placed at the right orientation is placed over the array of base spacers 109a, 109b, etc. and base rack spacers 127a, 127b, 127c, 127d, etc. that have been previously placed on top of the corresponding bases 106a, 106b, 106c, etc.

The orientation of one particular shelf 161a, 161b, 161c, etc. is defined by its relative position with respect to the access shaft 174a, 174b, etc. it is connected to. Each shelf 161a, 161b, etc. is placed with its shelf access channel 163a, 163b, etc. opening to the respective access shaft 174a, 174b, etc. it is connected to.

At the ground level, the layout of shelves is different than at the subsequent levels due to the necessity to provide access paths to the access shafts 174a, 174b, etc. to load and unload pallets. At the ground level, some shelves 161x (drawn in dash dot lines) are therefore not installed. More shelves may be removed or not installed at ground level to increase the number of access paths to the access shafts 174a, 174b, etc. eventually removing all shelves from the ground level to enable maximum access to all access shafts 174a, 174b, etc.

Where needed, plain blanks 111, shelf blanks 112, and quarter blanks 114 are installed to fill missing elements and ensure the stability of the structure (see detail FIG. 8A and detail FIG. 8B).

Detail FIG. 8A shows one base rack spacer 127e in greater magnification to display the shelf neck 165a and shelf fixation pin 166a from the corresponding shelf installed at this particular place and the plain blank 111, the shelf blank 112, and quarter blank 114a installed to complete the structure and fill the space left by missing elements that were not installed to provide access paths to the access shafts 174a, 174b, etc. The shelf stub 113 of the shelf blank 112 fills the space corresponding to one missing shelf neck from one missing shelf not installed at the access shaft that the base rack spacer 127e is connected. The quarter stub 115a of the quarter blank 114a fills the space of one missing shelf base from one missing shelf not installed at a neighboring access shaft.

Detail FIG. 8B shows one base spacer 109c in greater magnification to display the shelf base 162 and shelf fixation pin 166b from the corresponding shelf installed at this particular place and the quarter blanks 114b, 114c, etc. installed to complete the structure and fill the space left by missing elements that were not installed to provide access paths to the access shafts 174a, 174b, etc. and because the base spacer 109c is located on the edge of the structure.

The quarter stubs 115b, 115c, etc. of the quarter blanks 114b, 114c, etc. fill the space of missing shelf bases 162 left from missing shelves not installed.

FIG. 10 shows a top view of the warehouse being assembled 173 in an intermediate stage with pallets 102 placed on the ground level, each pallet 102 resting on its corresponding installed shelf 161. The access paths to all access shafts 174a, 174b, etc. produced by not installing shelves at convenient points of the structure are indicated using double arrowed lines.

FIG. 15 shows one embodiment of the advanced warehouse of the present invention showing one access shaft 174 with two levels and with moving parts in the first position.

One rack pole 130 equipped with one rack pole standard hinged rack A 139, one rack pole standard hinged rack B 145, and one rack pole top cover 149 properly installed is placed on top of each base rack spacer 127 and its corresponding base 106a at the proper orientation with the front faces of the base rack spacer 127 and the rack pole 130 facing towards the center of the access shaft 174.

Similarly, one plain pole 116 with one single rack piece 120a installed and fitted with one plain top spacer 119 at the top is placed on top of each base spacer 109 and its corresponding base 106b at the proper orientation with the single rack pieces 120a, 120b, etc. aligned with the corresponding shelf 161d, 161e, etc. above it.

One shelf has not been installed on the ground level to allow access to the access shaft 174, leaving the ground level with three shelves 161a, 161b, and 161c. The first level has all four shelves 161d, 161e, 161f, and 161g installed.

Only two pallets 102a, 102b of the total capacity of seven are shown as reference to avoid obstructing the view of other components of the structure.

In the first position shown in FIG. 15, the access shaft 174 is configured to allow vertical movement only and horizontal movement is not possible above the ground level. In the first position, the shelves 161d, 161e, 161f, and 161g in the first level are not accessible. The shelves 161a, 161b, and 161c that are at ground level are accessible and remain accessible at all times.

One rack pole neck cover 134 used when no fixed rack is attached to the rack pole 130 is also visible.

Detail FIG. 15A shows the rack pole 130 equipped with one rack pole standard hinged rack A 139, one rack pole standard hinged rack B 145, and one rack pole top cover 149 in greater magnification to display additional details including the shape of the structures containing frustum shaped teeth 122.

The rack pole standard hinged rack A 139 is held at a fixed position aligned to the left front face of the rack pole 130 using the lock bar 154a that is attached to the hinged rack external lock fixture 142a of the rack pole standard hinged rack A 139.

The rack pole standard hinged rack B 145 is held at a fixed position aligned to the right front face of the rack pole 130 using the lock bar 154b that is attached to the hinged rack external lock fixture 142b of the rack pole standard hinged rack B 145.

Detail FIG. 15A also shows the shelves 161f, and 161g, one plain blank 111, and one quarter blank 114 installed on the rack pole top cover 149 completing the structure and providing a proper place for the installation of one additional rack pole 130 to build another level of the structure.

FIG. 16 shows one embodiment of the advanced warehouse of the present invention showing one access shaft 174 with two levels and with moving parts in the second position.

One rack pole 130 equipped with one rack pole standard hinged rack A 139, one rack pole standard hinged rack B 145a, and one rack pole top cover 149 properly installed is placed on top of each base rack spacer 127 and its corresponding base 106a at the proper orientation with the front faces of the base rack spacer 127 and the rack pole 130 facing towards the center of the access shaft 174.

Similarly, one plain pole 116 with one single rack piece 120a installed and fitted with one plain top spacer 119 at the top is placed on top of each base spacer 109 and its corresponding base 106b at the proper orientation with the single rack pieces 120a, 120b, etc. aligned with the corresponding shelf 161d, 161e, etc. above it.

One shelf has not been installed on the ground level to allow access to the access shaft 174, leaving the ground level with three shelves 161a, 161b, and 161c. The first level has all four shelves 161d, 161e, 161f, and 161g installed.

Only two pallets 102a, 102b of the total capacity of seven are shown as reference to avoid obstructing the view of other components of the structure.

In the second position shown in FIG. 16, the access shaft 174 is configured to allow horizontal movement only and vertical movement is temporarily blocked. In the second position, the rack pole standard hinged rack A 139 and the rack pole standard hinged rack B 145b join at the edges to form a continuous seamless rack that bridges the gap in front of shelf 161f and continues in both directions all the way to the edges of the structure. Similarly, the gap in front of shelf 161d is also bridged. As a result, the shelves 161e, and 161g are accessible while the shelves 161d, and 161f are isolated from the access shaft 174. Components associated with the access to the shelves 161d, and 161f such as the single rack piece 120a remain disconnected from the rest of the rack structure.

One rack pole neck cover 134 used when no fixed rack is attached to the rack pole 130 is also visible.

Detail FIG. 16A shows the bridged region produced with the moving components in the second position in greater magnification to display additional details including the shape of the structures containing frustum shaped teeth 122.

The rack pole standard hinged rack A 139 and the rack pole standard hinged rack B 145b join at the edges to form a continuous seamless rack that bridges the gap in front of shelf 161f As the rack pole standard hinged rack A 139 moves to join with the rack pole standard hinged rack B 145b, the single rack piece 120c becomes disconnected from the rest of the rack structure.

The rack pole standard hinged rack A 139 is held at a fixed position aligned to the right front face of the rack pole 130 using the lock bar 154a that is attached to the hinged rack internal lock fixture 141a of the rack pole standard hinged rack A 139 leaving the hinged rack external lock fixture 142a unused.

FIG. 17 shows one embodiment of the advanced warehouse of the present invention showing one access shaft 174 with two levels and with moving parts in the third position.

One rack pole 130 equipped with one rack pole standard hinged rack A 139*a*, one rack pole standard hinged rack B 145*a*, and one rack pole top cover 149 properly installed is placed on top of each base rack spacer 127 and its corresponding base 106*a* at the proper orientation with the front faces of the base rack spacer 127 and the rack pole 130 facing towards the center of the access shaft 174.

Similarly, one plain pole 116 with one single rack piece 120*a* installed and fitted with one plain top spacer 119 at the top is placed on top of each base spacer 109 and its corresponding base 106*b* at the proper orientation with the single rack pieces 120*a*, 120*b*, etc. aligned with the corresponding shelf 161*d*, 161*e*, etc. above it.

One shelf has not been installed on the ground level to allow access to the access shaft 174, leaving the ground level with three shelves 161*a*, 161*b*, and 161*c*. The first level has all four shelves 161*d*, 161*e*, 161*f*, and 161*g* installed. For better visualization however, the shelf 161*d* is not shown and drawn in dash dotted lines for reference.

Only two pallets 102*a*, 102*b* of the total capacity of seven are shown as reference to avoid obstructing the view of other components of the structure.

In the third position shown in FIG. 17, the access shaft 174 is configured to allow horizontal movement only and vertical movement is temporarily blocked. In the third position, the rack pole standard hinged rack B 145*a* and the rack pole standard hinged rack A 139*b* join at the edges to form a continuous seamless rack that bridges the gap in front of shelf 161*g*. This continuous seamless rack extends in both directions until the edges of the structure, in one direction with the rack pole standard hinged rack B 145*b* and the single rack piece 120*h* and in the other direction with rack pole standard hinged rack A 139*a* and one additional single rack piece not visible as it is obstructed by the pallet 102*b*. The position of the single rack piece that is not visible can be determined though as it is the counterpart to the single rack piece 120*d* that is visible, the same way that the single rack piece 120*h* is the counterpart to the single rack piece 120*a*.

Similarly, the gap in front of shelf 161*e* is also bridged. As a result, the shelves 161*d*, and 161*f* are accessible while the shelves 161*e*, and 161*g* are isolated from the access shaft 174. Components associated with the access to the shelves 161*e*, and 161*g* such as the single rack piece 120*b*, 120*g*, etc. remain disconnected from the rest of the rack structure.

One rack pole neck cover 134 used when no fixed rack is attached to the rack pole 130 is also visible.

Detail FIG. 17A shows the bridged region produced with the moving components in the third position in greater magnification to display additional details including the shape of the structures containing frustum shaped teeth 122.

The rack pole standard hinged rack B 145*a* and the rack pole standard hinged rack A 139*b* join at the edges to form a continuous seamless rack that bridges the gap in front of shelf 161*g*.

The rack pole standard hinged rack B 145*a* is held at a fixed position aligned to the left front face of the rack pole 130 using the lock bar 154*b* that is attached to the hinged rack internal lock fixture 141*b* of the rack pole standard hinged rack B 145*a* leaving the hinged rack external lock fixture 142*b* unused.

FIG. 18 shows the complete two level nine cell warehouse 175 and the warehouse structure 176 that is equipped with shelves 161*a* at ground level and shelves 161*b* at the first level. The warehouse structure 176 of the two level nine cell warehouse 175 is shown in the first position, allowing vertical movement in the access shafts 174.

FIG. 19 shows a top view of the warehouse structure 176 without shelves to allow a better view of the structure. The warehouse structure 176 is shown in the first position, allowing vertical movement in the access shafts 174*a*, 174*b*, etc.

The warehouse structure 176 requires the usage of different components depending on the location they are installed. At places in the edge of the warehouse structure 176 that are adjacent to only one access shaft 174*g*, the single rack piece 120 is installed. At places of the warehouse structure 176 that are adjacent to two access shafts 174*d*, and 174*g* the double standard rack piece 125 is installed and at places at the center of the warehouse structure 176 that are adjacent to four access shafts 174*d*, 174*e*, 174*g*, and 174*h* the quadruple standard rack piece 126 is installed.

Detail FIG. 19A shows one rack pole standard hinged rack B 145 and one rack pole standard hinged rack A 139 in the first position. In the first position, the rack pole standard hinged rack B 145 is in alignment with one single rack piece 120 at the top left and both parts make a continuous seamless rack. Similarly, in the first position the rack pole standard hinged rack A 139 is in alignment with one arm of one double standard rack piece 125 at the bottom and both parts make a continuous seamless rack.

Detail FIG. 19B shows a part of the warehouse structure 176 that requires the installation of rack pole standard fixed racks 137*a*, 137*b* to complete the structure.

The rack pole standard hinged rack A 139*a* and the rack pole standard hinged rack B 145*a* at the left and the rack pole standard hinged rack A 139*b* and the rack pole standard hinged rack B 145*b* at the right are both shown in the first position.

The rack pole standard hinged rack B 145*a* at the bottom left is in alignment with the rack pole standard fixed rack 137*b* at the bottom right and both parts make a continuous seamless rack. Similarly, the rack pole standard hinged rack B 145*b* at the right is in alignment with the rack pole standard fixed rack 137*a* at the left and both parts make a continuous seamless rack. The rack pole standard hinged rack A 139 in alignment with one arm of the quadruple standard rack piece 126 at the top right and both parts make a continuous seamless rack.

FIG. 20 shows the four level nine cell warehouse 177 with the corresponding four level warehouse structure 176 fully loaded with pallets 102.

FIG. 21 shows a top view of the four level nine cell warehouse 177 fully loaded with pallets 102 to illustrate the accessibility of individual pallets 102. Each access shaft 174*a*, 174*b*, etc. provides access to four pallets 102 as indicated by the double arrowed lines. Any pallet 102 is accessible through only one specific access shaft.

FIG. 25 shows the horizontal pivoting support 232 that is driven at the horizontal pivoting support action bar 238 and rotates around the horizontal pivoting support main axis 235. As the horizontal pivoting support 232 rotates, the horizontal pivoting support gear support axis 237 and the horizontal pivoting support actuator reference hole 240 describe an arch carrying the components attached to them.

The horizontal gear support axis 244 is inserted into the horizontal pivoting support gear support axis 237 and allows the horizontal gear support 241 to vary its angle as it is driven by the horizontal pivoting support gear support axis 237.

This is accomplished using the horizontal gear support guide pin 249 that is inserted into the horizontal angle control guide track 223 in the horizontal angle control guide 222 and the horizontal gear support guide knob 250 that fits in the underside of the horizontal angle control guide 222 preventing the horizontal gear support guide pin 249 from escaping the horizontal angle control guide track 223.

As the horizontal pivoting support 232 rotates around the horizontal pivoting support main axis 235, the horizontal pivoting support gear support axis 237 carries the horizontal gear support 241 and the horizontal gear support guide pin 249 slides in the horizontal angle control guide track 223 forcing the horizontal gear support 241 to rotate more or less around the horizontal pivoting support gear support axis 237 providing angle adjustment for the horizontal gear support 241 (see FIG. 35).

FIG. 25 also shows the vertical pivoting support 252 that is driven at the vertical pivoting support action bar 257 and rotates around the vertical pivoting support main axis 255. As vertical pivoting support 252 rotates, the vertical pivoting support gear support axis 256 and the vertical pivoting support actuator reference hole 259 describe an arch carrying the components attached to them.

The vertical gear support axis 263 is inserted into the vertical pivoting support gear support axis 256 and allows the vertical gear support 260 to vary its angle as it is driven by the vertical pivoting support gear support axis 256.

This is accomplished using the vertical gear support guide pin 268 that is inserted into the vertical angle control guide track 226 in the vertical angle control guide 225 and the vertical gear support guide knob 269 that fits in the underside of the vertical angle control guide 225 preventing the vertical gear support guide pin 268 from escaping the vertical angle control guide track 226.

As the vertical pivoting support 252 rotates around the vertical pivoting support main axis 255, the vertical pivoting support gear support axis 256 carries the vertical gear support 260 and the vertical gear support guide pin 268 slides in the vertical angle control guide track 226 forcing the vertical gear support 260 to rotate more or less around the vertical pivoting support gear support axis 256 providing angle adjustment for the vertical gear support 260 (see FIG. 35).

FIG. 26 shows components used for manipulating moving parts in the advanced warehouse of the present invention.

The horizontal actuator angle control guide 271 and the vertical actuator angle control guide 274 are constructed as mirror images of each other.

The horizontal arm actuator sliding bar 282 is inserted into the horizontal actuator angle control track 272 of the horizontal actuator angle control guide 271 that is fixated above the horizontal arm actuator 277 and the horizontal arm actuator sliding knob 283 keeps the horizontal arm actuator sliding bar 282 from falling from the horizontal actuator angle control track 272. The horizontal arm actuator fixation pin 281 is fixated to the horizontal pivoting support actuator reference hole 240 of the horizontal pivoting support 232.

As the horizontal pivoting support 232 rotates around the horizontal pivoting support main axis 235, the horizontal pivoting support actuator reference hole 240 rotates and carries the horizontal arm actuator 277 forcing the horizontal arm actuator sliding bar 282 to slide inside the horizontal actuator angle control track 272 that in turn produces the desired orientation angle for the horizontal arm actuator 277 throughout the excursion of the horizontal pivoting support 232.

The vertical arm actuator sliding bar 289 is inserted into the vertical actuator angle control track 275 of the vertical actuator angle control guide 274 that is fixated above the vertical arm actuator 284 and the vertical arm actuator sliding knob 290 keeps the vertical arm actuator sliding bar 289 from falling from the vertical actuator angle control track 275. The vertical arm actuator fixation pin 288 is fixated to the vertical pivoting support actuator reference hole 259 of the vertical pivoting support 252.

As the vertical pivoting support 252 rotates around the vertical pivoting support main axis 255, the vertical pivoting support actuator reference hole 259 rotates and carries the vertical arm actuator 284 forcing the vertical arm actuator sliding bar 289 to slide inside the vertical actuator angle control track 275 that in turn produces the desired orientation angle for the vertical arm actuator 284 throughout the excursion of the vertical pivoting support 252.

The actuator arm 291 has the same diameter of the horizontal arm actuator center hole 278 and the vertical arm actuator center hole 285 and the actuator arm key 292 matches the horizontal arm actuator center hole key 279 and the vertical arm actuator center hole key 286 so that only one version of the actuator arm 291 is needed and can be installed at both the horizontal arm actuator 277 and the vertical arm actuator 284.

The horizontal arm actuator sliding bar 282 is longer than the vertical arm actuator sliding bar 289 to offset the position of the horizontal arm actuator 277 and the vertical arm actuator 284 to prevent the actuator arms 291 installed at the horizontal arm actuator center hole 278 and the vertical arm actuator center hole 285 from hitting each other allowing horizontal arm actuators 277 and vertical arm actuators 284 to be installed in proximity and move without interfering with each other.

The horizontal actuator hand 297 is equipped with the horizontal actuator hand finger 301 connected to the horizontal actuator hand top 300 that terminates in the horizontal actuator hand grabbing tip 302 that is a partially flexible metal fork that is able to snap into a metal rod of appropriate matching diameter and hold it with a relatively small force but sufficient to move the rod safely if there is no opposition to the movement and releases the rod when some opposition is present.

The vertical actuator hand 303 is equipped with the vertical actuator hand finger 307 connected to the vertical actuator hand top 306 that terminates in the vertical actuator hand grabbing tip 308 that is a partially flexible metal fork that is able to snap into a metal rod of appropriate matching diameter and hold it with a relatively small force but sufficient to move the rod safely if there is no opposition to the movement and releases the rod when some opposition is present.

The hinged rack arm 317 has the same diameter of the horizontal hinged rack actuator center hole 311 and the vertical hinged rack actuator center hole 315 and the hinged rack arm key 318 matches the horizontal hinged rack actuator center hole key 312 and the vertical hinged rack actuator center hole key 316 so that only one version of the hinged rack arm 317 is needed and can be installed at both the horizontal hinged rack actuator 309 and the vertical hinged rack actuator 313.

The hinged rack hand 323 with the pair of hinged rack hand fingers 327a, and 327b connected to the hinged rack hand base 326. Two hinged rack hand rollers 328 that can rotate freely around the hinged rack hand fingers 327a, 327b are installed on each hinged rack hand finger 327a, 327b.

FIG. 32 shows the autonomous mobile lift robot case 330 that has four sets of three different supports one set at each side of the autonomous mobile lift robot case 330 that are designed to support components of the wheel assembly 191. The directional engine support 335 is designed to support the wheel directional engine 200; the wheel engine support 336 is designed to support the wheel driving engine 202; and the wheel assembly support 337 with the wheel driving axis passage hole 338 is designed to support the wheel directional gear 197 and allow the wheel driving axle 203 to pass through.

The autonomous mobile lift robot case 330 has one opening A 331 and one opening B 332 at each corner making a total of 8 corner openings. One separation bar 333 is located at each corner to provide additional structural integrity and prevent the warping of the autonomous mobile lift robot case 330 around any opening A 331 or opening B 332.

The pivoting axis 334 is located at points in the diagonals of the autonomous mobile lift robot case 330 at a short distance from each corner. One pair of one horizontal pivoting support 232 and one vertical pivoting support 252 is installed with their respective horizontal pivoting support main axis 235 and vertical pivoting support main axis 255 around each pivoting axis 334.

On the bottom of the autonomous mobile lift robot case 330 the wheel openings 340 provide access for the wheels 192 to reach the floor and rotate freely and the bottom fixation holes 341 provide the place for the installation of four sets of one horizontal angle control guide 222 and one vertical angle control support 228.

On the top of the autonomous mobile lift robot case 330 the top fixation holes 342 provide the place for the installation of four sets of one horizontal actuator angle control guide 271 and one vertical actuator angle control guide 274.

The extension engine supports 339a is located in the front of the autonomous mobile lift robot case 330 at a slightly higher level and the extension engine support 339b is located at the back of the autonomous mobile lift robot case 330 at a slightly lower level.

The autonomous mobile lift robot case 330 has two pantographic fixed axis holes 343 for the installation of the bottom fixed axis 186 and two pantographic moving axis slots 344 for the installation of the bottom moving axis 187.

The pantographic lift platform 178 has one platform fixed axis hole 179 located near the top face, parallel to the top face that goes all the way through from one side to the other side of the pantographic lift platform 178. The pantographic lift platform 178 also has one platform moving axis slot 180 that is parallel to the top face and is located at the same distance of the top face of the pantographic lift platform 178 as the platform fixed axis hole 179 and goes all the way through from one side to the other side of the pantographic lift platform 178.

Two pantographic bars 181 are installed linked at the middle by the center axis 185 forming a "X" at each side of the pantographic lift platform 178. One top axis 184a is installed at the platform fixed axis hole 179 that remains fixed and another top axis 184b is installed at the platform moving axis slot 180 and is able to slide the length of the platform moving axis slot 180.

The pantographic engine 189 engages the bottom moving axis nut 188 and moves the bottom moving axis 187 closer or further away from the pantographic engine 189 causing the pantographic lift platform 178 to rise or drop accordingly.

FIG. 33 is an isometric view of one embodiment of the tapered teeth gear support and positioning mechanism for each first and second perpendicularly mounted tapered teeth gears installed in each corner of the autonomous mobile lift robot 349 of the present invention.

Four control disks 204a, 204b, 204c, and 204d arranged in two groups of two control disks 204a, and 204b and control disks 204c, and 204d mounted back to back are installed around the case central axis 346. The control disks 204a, and 204b are driven by the control disk actuator beveled gear 209a and the actuator beveled gear driving engine 210a and the control disks 204c, and 204d are driven by the control disk actuator beveled gear 209b and the actuator beveled gear driving engine 210b.

The gear position control bars 212b, and 212f are mounted at opposite control disk attachment pins 208a of the control disk 204b; and the gear position control bars 212c, and 212g are mounted at opposite control disk attachment pins 208 of the control disk 204a. Similarly, the gear position control bars 212a, and 212e are mounted at opposite control disk attachment pins 208 of the control disk 204d; and the gear position control bars 212d, and 212h are mounted at opposite control disk attachment pins 208 of the control disk 204c.

Because the control disks 204a, and 204b are mounted back to back, as the control disk actuator beveled gear 209a rotates clockwise, the control disk 204a is turned clockwise and the control disk 204b is turned counter clockwise and vice versa. The same applies to the control disks 204c, and 204d and the control disk actuator beveled gear 209b.

As a result, the gear position control bars 212b, and 212f and the gear position control bars 212d, and 212h extend or retract simultaneously, depending on the direction the control disk actuator beveled gear 209a rotates, extending if the control disk actuator beveled gear 209a rotates clockwise and retracting if the control disk actuator beveled gear 209a rotates counter clockwise. Similarly, the gear position control bars 212a, and 212e and the gear position control bars 212c, and 212g extend or retract simultaneously, depending on the direction the control disk actuator beveled gear 209b rotates, extending if the control disk actuator beveled gear 209b rotates clockwise and retracting if the control disk actuator beveled gear 209b rotates counter clockwise.

The gear position control bars 212b, and 212f transmit the movement to the horizontal pivoting supports 232a, and 232c respectively that result in movement of the tapered teeth gears 214b, and 214f that are in the same face of the autonomous mobile lift robot case 330. Similarly, the gear position control bars 212d, and 212h transmit the movement to the vertical pivoting supports 252b, and 252d respectively that in turn result in movement of the tapered teeth gears 214d, and 214h that are on the same face, opposite to the face where the tapered teeth gears 214b, and 214f are located.

Likewise, the gear position control bars 212a, and 212e transmit the movement to the vertical pivoting supports 252a, and 252c respectively that result in movement of the tapered teeth gears 214a, and 214e that are in the same face of the autonomous mobile lift robot case 330. Similarly, the gear position control bars 212c, and 212g transmit the movement to the horizontal pivoting supports 232b, and 232d respectively that result in movement of the tapered teeth gears 214c, and 214g that are on the same face, opposite to the face where the tapered teeth gears 214a, and 214e are located.

This mechanism allows for the positioning of all tapered teeth gears 214 in one pair of two opposite corners simultaneously with one actuator beveled gear driving engine 210*a*, and all tapered teeth gears 214 in the other pair of two opposite corners with the other actuator beveled gear driving engine 210*b*.

The exact positioning of a particular tapered teeth gear 214 is also affected by the angle control mechanism. The process is the same for all four pairs of the first and second perpendicularly mounted gears so it will be explained only once for concision, mostly for the pair of tapered teeth gears 214*c*, and 214*d*, exceptions made if other gear pairs offer a better angle for visualization. As the components are the same in all four sets of gears pairs, it is possible to identify the correspondent components in other gear pairs.

The gear position control bar 212*a* drives the vertical pivoting support 252*a* at the vertical pivoting support action bar 257*a* and the vertical pivoting support 252*a* carries the vertical gear support 260*a* that holds the tapered teeth gears 214*a*.

Likewise, the gear position control bar 212*b* drives the horizontal pivoting support 232*a* at the horizontal pivoting support action bar 238*a* and the horizontal pivoting support 232*a* carries the horizontal gear support 241*a* that holds the tapered teeth gears 214*b*.

As the control disk 204*a* moves the gear position control bar 212*c*, the movement is transferred to the vertical pivoting support 252*b* that rotates around the pivoting axis 334*b* and carries the vertical gear support 260*b*. As the vertical gear support 260*b* moves, the movement is transferred to the vertical gear support guide bar 267*b* and the vertical gear support guide pin 268*b* is forced to follow the geometry of the vertical angle control guide track 226*b* of the vertical angle control guide 225*b* installed on top of the vertical angle control support 228*b*. As the vertical gear support guide pin 268*b* slides in the vertical angle control guide track 226*b*, the vertical gear support 260*b* is forced to rotate accordingly to accommodate the geometry providing angle adjustment for the tapered teeth gear 214*c* to have the tapered teeth 215 adjust and align within the frustum shaped teeth 122 providing the traction necessary to move the autonomous mobile lift robot case 330 along the frustum shaped teeth 122 of the rack lattice structure in a vertical direction.

Likewise, as the control disk 204*c* moves the gear position control bar 212*d*, the movement is transferred to the horizontal pivoting support 232*b* that rotates around the pivoting axis 334*b* and carries the horizontal gear support 241*b*. As the horizontal gear support 241*b* moves, the movement is transferred to the horizontal gear support guide bar 248*b* and the horizontal gear support guide pin 249*b* is forced to follow the geometry of the horizontal angle control guide track 223*b* of the horizontal angle control guide 222*b*. As the horizontal gear support guide pin 249*b* slides in the horizontal angle control guide track 223*b*, the horizontal gear support 241*b* is forced to rotate accordingly to accommodate the geometry providing angle adjustment for the tapered teeth gear 214*d* to have the tapered teeth 215 adjust and align within the frustum shaped teeth 122 providing the traction necessary to move the autonomous mobile lift robot case 330 along the frustum shaped teeth 122 of the rack lattice structure in a horizontal direction.

The horizontal angle control guide 222*b* and the vertical angle control guide 225*b* are symmetrical to each other and installed at symmetrical positions. Because of the geometry, to respect the symmetry, the horizontal angle control guide 222*b* and the vertical angle control guide 225*b* need to be installed at different heights, the vertical angle control guide 225*b* on top of the vertical angle control support 228*b* while the horizontal angle control guide 222*b* is installed underneath the vertical angle control support 228*b*. The parts of the structure of the horizontal angle control guide 222*b* that are below the vertical angle control support 228*b* are drawn in dashed lines.

The vertical gear driving engine 220 and the vertical gear driving bevels 221*e*, and 221*f* that drive the tapered teeth gear 214*e* are seen on their installed positions.

The horizontal gear driving engine 217*c*, the horizontal gear driving pulleys 218*e*, and 218*f* and the horizontal gear driving belt 219*c* that drive the tapered teeth gears 214*f* are seen on their installed positions.

The horizontal pivoting support notch 236*c* provides additional space to accommodate the horizontal gear driving engine 217*c* that due to standardization of components may be longer than the available space in the horizontal pivoting support 232*c*.

The vertical hinged rack actuator 313*a* with the hinged rack arm 317*a* and the hinged rack hand 323*a* are seen on their installed position on the vertical gear support 260*a*. The horizontal hinged rack actuator 309*a* with the hinged rack arm 317*b* and the hinged rack hand 323*b* are seen on their installed position on the horizontal gear support 241*a*.

The horizontal pivoting support actuator reference hole 240*b* is indicated in the horizontal pivoting support 232*c* and the vertical pivoting support actuator reference hole 259*b* is indicated in the vertical pivoting support 252*a* as reference for FIG. 34 that describes the actuator positioning control mechanism.

FIG. 34 shows an isometric view of one embodiment of the actuator positioning control mechanism used in the autonomous mobile lift robot 349 of the present invention.

The mechanism controlling the positioning of the vertical pivoting supports 252*a*, 252*b*, 252*c*, and 252*d* and the horizontal pivoting supports 232*a*, 232*b*, 232*c*, and 232*d* is described in FIG. 33.

The control disks 204*a*, 204*b*, 204*c*, and 204*d*; the control disk attachment pin 208*a*; the control disk actuator beveled gears 209*a*, and 209*b*; the actuator beveled gear driving engine 210*a*, and 210*b*; the gear position control bar 212*a*, through 212*h*; the horizontal pivoting support action bar 238*a*; and the vertical pivoting support action bar 257*a* have been drawn and indicated as reference and to facilitate the correspondence with the explanation in FIG. 33.

FIG. 34 describes the components involved in the actuator positioning control mechanism used in the autonomous mobile lift robot 349 of the present invention. The positioning of a particular actuator is affected by the position of the pivoting support it is fixated to and the angle control guide it is linked to. The process is the same for all four pairs of pivoting supports so it will be explained only once for concision, mostly referring to the pair of pivoting supports 232*b*, and 252*b* and to the pair of pivoting supports 232*d*, and 252*d* exceptions made if other pivoting support pairs offer a better angle for visualization. As the components are the same in all four sets of pivoting support pairs, it is possible to identify the correspondent components in other pivoting support pairs.

The horizontal arm actuator 277*b* is installed in the horizontal pivoting support 232*b* fixating the horizontal arm actuator fixation pin 281*b* at the tip of the horizontal arm actuator fixation bar 280*b* in the horizontal pivoting support actuator reference hole 240*b*. The vertical arm actuator 284*b* is installed in the vertical pivoting support 252*b* fixating the vertical arm actuator fixation pin 288*b* at the tip of the vertical arm actuator fixation bar 287*b* in the vertical pivoting support actuator reference hole 259*b* (see FIG. 33).

The horizontal arm actuator sliding bar 282*d* is inserted into the horizontal actuator angle control track 272*d* of the horizontal actuator angle control guide 271*d* that is fixated above the horizontal arm actuator 277*d* and the horizontal arm actuator sliding knob 283*d* keeps the horizontal arm actuator sliding bar 282*d* from falling from the horizontal actuator angle control track 272*d*.

As the horizontal pivoting support 232*d* rotates around the pivoting axis 334*d*, the horizontal arm actuator sliding bar 282*d* slides inside the horizontal actuator angle control track 272*d* that in turn produces the desired orientation angle for the horizontal arm actuator 277*d* throughout the excursion of the horizontal pivoting support 232*d*.

The vertical arm actuator sliding bar 289*d* is inserted into the vertical actuator angle control track 275*d* of the vertical actuator angle control guide 274*d* that is fixated above the vertical arm actuator 284*d* and the vertical arm actuator sliding knob 290*d* keeps the vertical arm actuator sliding bar 289*d* from falling from the vertical actuator angle control track 275*d*.

As the vertical pivoting support 252*d* rotates around the pivoting axis 334*d*, the vertical arm actuator sliding bar 289*d* slides inside the vertical actuator angle control track 275*d* that in turn produces the desired orientation angle for the vertical arm actuator 284*d* throughout the excursion of the vertical pivoting support 252*d*.

The actuator arm 291*g* is installed in the vertical arm actuator 284*d* and the actuator arm 291*h* is installed in the horizontal arm actuator 277*d*.

The horizontal arm actuator sliding bar 282*d* is longer than the vertical arm actuator sliding bar 289*d* to offset the position of the horizontal arm actuator 277*d* and the vertical arm actuator 284*d* to prevent the actuator arms 291*h*, and 291*g* from hitting each other allowing the horizontal arm actuator 277*d* and the vertical arm actuator 284*d* to be installed in proximity and move without interfering with each other.

Due to the offset in the position of the vertical arm actuator 284*d* and the horizontal arm actuator 277*d*, the actuator hand 294*g* is higher than the actuator hand 294*h*. To compensate that, the vertical actuator hand finger 307*d* is longer than the horizontal actuator hand finger 301*d* to align the vertical actuator hand grabbing tip 308*d* with the horizontal actuator hand grabbing tip 302*d* in the same level.

FIG. 35 shows a top view of one embodiment of the autonomous mobile lift robot 349 of the present invention with the tapered teeth gears in the extended position showing the gear positioning mechanism and other internal components affected by the gear positioning mechanism and the clearances to other internal components.

The actuator beveled gear driving engines 210*a*, and 210*b* drive the control disks 204 that in turn drive the gear position control bars 212*a*, and 212*b* that extend the horizontal pivoting supports 232 and the vertical pivoting supports 252 that pivot around the pivoting axis 334 to the extended position.

The vertical pivoting supports 252 hold the vertical gear supports 260 that hold the tapered teeth gears 214*a* that are mounted vertically. The horizontal pivoting supports 232 hold the horizontal gear supports 241 that hold the tapered teeth gears 214*b* that are mounted horizontally.

The vertical gear driving engines 220 in conjunction with two vertical gear driving bevels 221 drive the tapered teeth gears 214*a* that are mounted vertically. The horizontal gear driving engine 217 in conjunction with the horizontal gear driving pulleys 218*a*, and 218*b* and the horizontal gear driving belt 219 drive the tapered teeth gears 214*b* that are mounted horizontally.

The horizontal angle control guide tracks 223 in the horizontal angle control guides 222 provide angle adjustment for the tapered teeth gears 214*b* that are mounted horizontally to have the tapered teeth 215 adjust and align within the frustum shaped teeth 122 providing the traction necessary to move the autonomous mobile lift robot case 330 along the frustum shaped teeth 122 of the rack lattice structure in a horizontal direction. The vertical angle control guide tracks 226 in the vertical angle control guides 225 mounted in the vertical angle control supports 228 provide angle adjustment for the tapered teeth gears 214*a* that are mounted vertically to have the tapered teeth 215 adjust and align within the frustum shaped teeth 122 providing the traction necessary to move the autonomous mobile lift robot case 330 along the frustum shaped teeth 122 of the rack lattice structure in a vertical direction.

In the extended position, the vertical arm actuator sliding knobs 290 move to the nearest end to the corners of the autonomous mobile lift robot case 330 of the vertical actuator angle control tracks 275 of the vertical actuator angle control guides 274 defining the alignment of the vertical arm actuators 284, the actuator arms 291*a*, and the vertical actuator hands 303.

Likewise, in the extended position, the horizontal arm actuator sliding knobs 283 move to the nearest end to the corners of the autonomous mobile lift robot case 330 of the horizontal actuator angle control tracks 272 of the horizontal actuator angle control guides 271 defining the alignment of the horizontal arm actuators 277, the actuator arms 291*b*, and the horizontal actuator hands 297.

The wheels 192, the wheel directional gear 197, and the wheel driving engine 202 are also visible in the center of each of the four faces of the autonomous mobile lift robot 349.

FIG. 36 shows a top view of one embodiment of the autonomous mobile lift robot 349 of the present invention with the tapered teeth gears in the retracted position overlayed with the views of the tapered teeth gears in the parallel and in the extended positions.

The actuator beveled gear driving engines 210 drive the control disks 204 that in turn drive the gear position control bars 212*a*, and 212*b* that retract the horizontal pivoting supports 232 and the vertical pivoting supports 252 that pivot around the pivoting axis 334 to the retracted position.

The positions of the vertically mounted tapered teeth gear 214$a_1$, 214$a_2$, and 214$a_3$ are shown in the retracted position, the parallel position, and the extended position respectively. The positions of horizontally mounted tapered teeth gear 214$b_1$, 214$b_2$, and 214$b_3$ are in the retracted position, the parallel position, and the extended position respectively.

In the retracted position, the vertical arm actuator sliding knobs 290 move to the farthest end to the corners of the autonomous mobile lift robot case 330 of the vertical actuator angle control tracks 275 of the vertical actuator angle control guides 274 defining the alignment of the vertical arm actuators 284, the actuator arms 291*a*, and the vertical actuator hands 303.

Likewise, in the retracted position, the horizontal arm actuator sliding knobs 283 move to the farthest end to the corners of the autonomous mobile lift robot case 330 of the horizontal actuator angle control tracks 272 of the horizontal actuator angle control guides 271 defining the alignment of the horizontal arm actuators 277, the actuator arms 291*b*, and the horizontal actuator hands 297.

FIG. 37 shows an isometric view of one embodiment of the autonomous mobile lift robot 349 of the present invention with the tapered teeth gears in each corner in the retracted position and with the autonomous mobile lift robot case 330 drawn transparent in dash dotted lines to display details of the internal components and provide an overall picture of the components location inside the autonomous mobile lift robot 349.

The numbering pattern is the same used in FIG. 33 and FIG. 34 that are in the extended position, with same components located in the same place using the same differentiation letters to facilitate the identification of a particular component in all figures.

As FIG. 37 displays the autonomous mobile lift robot 349 in the retracted position, the gear position control bars 212c, etc. are mostly inside the control disks 204a, etc. that are located at the center of the autonomous mobile lift robot case 330. The actuator beveled gear driving engine 210b and the control disk actuator beveled gear 209a that drive the control disks 204a, and 204b on top are also visible, however, most of the positioning mechanism is partially obstructed from view by the other components and can be better seen in the extended position in FIG. 33 and FIG. 34.

FIG. 37 shows the horizontal pivoting support 232d and the vertical pivoting supports 252d installed around the pivoting axis 334d, with the horizontal gear support 241d indicated on its installed position in the horizontal pivoting support 232d. For better visualization angle, the vertical gear support 260b is indicated on its installed position in the vertical pivoting supports 252b.

The horizontal angle control guide 222a is installed at the bottom of the autonomous mobile lift robot case 330 and the vertical angle control guide 225a is installed on top of the vertical angle control support 228a that is installed at the bottom of the autonomous mobile lift robot case 330.

The vertical gear driving engine 220a and the vertical gear driving bevels 221a, and 221b that drive the vertical tapered teeth gear 214a are seen on their installed positions.

The horizontal gear driving engine 217a, the horizontal gear driving pulleys 218a, and 218b and the horizontal gear driving belt 219a that drive the horizontal tapered teeth gear 214b are seen on their installed positions.

FIG. 37 also shows the positioning arrangement of tapered teeth gears in each side of the autonomous mobile lift robot 349 allowing for a better understanding of the positioning mechanism.

The tapered teeth gears 214b and 214c are located in the side facing opposite to the side facing where the tapered teeth gears 214f and 214g are installed; and tapered teeth gears 214d and 214e are located in the side facing opposite to the side facing where the tapered teeth gears 214h and 214a are installed.

The positioning mechanism moves the horizontal pivoting supports 232a, and 232c together with the vertical pivoting support 252b, and 252d. This results in simultaneous movement of the tapered teeth gears 214b, and 214f together with the tapered teeth gears 214c, and 214g to configure the positioning of these gears on the two sides facing opposite to each other.

Xxxx

Similarly, the positioning mechanism moves the horizontal pivoting supports 232b, and 232d together with the vertical pivoting support 252a, and 252c. This results in simultaneous movement of the tapered teeth gears 214d, and 214h together with the tapered teeth gears 214a, and 214e to configure the positioning of these gears on the two other sides facing opposite to each other (see FIG. 33).

The horizontal arm actuator 277c is installed fixating the horizontal arm actuator fixation bar 280c in the horizontal pivoting support 232c. The horizontal arm actuator sliding knob 283c keeps the horizontal arm actuator sliding bar 282c from falling from the horizontal actuator angle control track 272c in the horizontal actuator angle control guide 271c that is installed at the top of the autonomous mobile lift robot case 330.

The vertical arm actuator 284c is installed fixating the vertical arm actuator fixation bar 287c in the vertical pivoting support 252c. The vertical arm actuator sliding knob 290c keeps the vertical arm actuator sliding bar 289c from falling from the vertical actuator angle control track 275c in the vertical actuator angle control guide 274c that is installed at the top of the autonomous mobile lift robot case 330.

The actuator arm 291f with the horizontal actuator hand 297c in the end is installed in the horizontal arm actuator 277c and the actuator arm 291e with the vertical actuator hand 303c in the end is installed in the vertical arm actuator 284c.

The wheels 192 are supported by the wheel support 195 that is attached to the wheel directional gear 197. The wheel directional engine 200 drives the wheel directional worm 199 that turns the wheel directional gear 197 adjusting the direction of movement.

The wheel driving axle 203 of the wheel driving engine 202 passes through the center of the wheel directional gear 197 and drives the wheel driving bevel 194b that transfers the movement to the wheel driving bevel 194a that drives the wheels 192.

FIG. 38 is a top view of the autonomous mobile lift robot 349 in the retracted position standing on the floor in middle of one access shaft 174 with two levels to show the clearances to the rack poles 130a, 130b, 130c, and 130d and the shelves 161d, 161e, 161f, and 161g.

FIG. 39 is a top view of the autonomous mobile lift robot 349 in the extended position in the middle of one access shaft 174 with two levels. In the extended position, the tapered teeth gears 214a, through 214h engage the rack poles 130a, 130b, 130c, and 130d allowing the autonomous mobile lift robot 349 to climb the rack poles.

As the autonomous mobile lift robot 349 climbs the rack poles the vertically mounted tapered teeth gears 214a, 214c, 214e, and 214g rotate and drive the autonomous mobile lift robot 349 up or down. The horizontally mounted tapered teeth gears 214b, 214d, 214f, and 214h remain stationary and slide providing a reference to keep the autonomous mobile lift robot 349 steady in the center of the access shaft 174. The clearances to shelves 161d, 161e, 161f, and 161g are visible in FIG. 39

FIG. 40 shows the autonomous mobile lift robot 349 that has climbed the rack poles 130 and reached the first level of the access shaft 174 in preparation to retrieve the pallet 102b stored in the first level exactly above the pallet 102a that is on the ground level.

Detail FIG. 40A shows a zoomed view of the tapered teeth gear 214 engaging the frustum shaped teeth 122 in the rack pole 130, in the rack pole standard hinged rack A 139, and in the rack pole top cover 149 and stopping at the center of the rack pole standard hinged rack A 139 in preparation to unlock and move the rack pole standard hinged rack A 139 to gain access to the pallet 102b.

FIG. 41 shows the autonomous mobile lift robot 349 in position for unlocking and moving the required components to gain access to the pallet 102b (see FIG. 40). To facilitate the view of more details, a reduced number of affected components and components needed to better illustrate the procedure are drawn: the rack poles 130*a*, through 130*d*; the rack pole standard hinged rack A 139*a*, through 139*d*; the rack pole standard hinged rack B 145*a*, trough 145*d*; and the rack pole top cover 149*a*, through 149*d*.

To access the pallet 102*b* the autonomous mobile lift robot 349 needs to move the rack pole standard hinged rack A 139*a*, and 139*c* and the rack pole standard hinged rack B 145*b*, and 145*d*. The process is the same for all parts so it is explained only once for the rack pole standard hinged rack A 139*a*.

Detail FIG. 41A shows a first position with the tapered teeth gear 214 engaging the frustum shaped teeth 122 in the rack pole standard hinged rack A 139. The lock bar 154 is firmly placed between the rack pole top lock fixture 150*a* of the rack pole top cover 149 and the hinged rack external lock fixture 142 of the rack pole standard hinged rack A 139. The hinged rack internal lock fixture 141 of the rack pole standard hinged rack A 139 is left unused.

The gear position control bar 212 attached to the vertical pivoting support action bar 257 keeps the vertical pivoting support 252 in the extended position. The vertical arm actuator fixation bar 287 fixated to the vertical pivoting support 252 puts the vertical arm actuator 284 in the extended position ensuring the proper alignment of the vertical arm actuator 284 (see FIG. 34).

In the extended position, the vertical gear support guide pin 268 is at the extremity of the vertical angle control guide track 226 adjusting the angle of the vertical gear support 260 so that the tapered teeth gear 214 is in full contact with the frustum shaped teeth 122 in the rack pole standard hinged rack A 139.

The vertical hinged rack actuator 313 is installed at the vertical gear support 260 and aligned perpendicularly to the rack pole standard hinged rack A 139. The hinged rack arm 317 is retracted and the hinged rack arm stopper 319 is further to the right. The hinged rack arm hand actuator 320, the hinged rack hand 323, and the hinged rack hand rollers 328 remain at a distance, not engaging the hinged rack hold bar 144 of the rack pole standard hinged rack A 139.

The hinged rack hand 323 is retracted and the hinged rack hand stopper 325 is further to the bottom to keep the hinged rack hand rollers 328 below the hinged rack hold bar 144.

The vertical arm actuator 284 and the actuator arm 291 are aligned with the position of lock bar grabbing neck 159 and the lock bar knob 160. The vertical actuator hand 303 is in a low position in the actuator hand 294 causing the vertical actuator hand grabbing tip 308 to be at exactly the same level of the lock bar grabbing neck 159. As the actuator arm 291 is retracted, the vertical actuator hand grabbing tip 308 stays at a distance and does not engage the lock bar grabbing neck 159.

Detail FIG. 41B shows a second position with the tapered teeth gear 214 engaging the frustum shaped teeth 122 in the rack pole standard hinged rack A 139. The lock bar 154 is firmly placed between the rack pole top lock fixture 150*a* of the rack pole top cover 149 and the hinged rack external lock fixture 142 of the rack pole standard hinged rack A 139. The hinged rack internal lock fixture 141 of the rack pole standard hinged rack A 139 is left unused.

The gear position control bar 212 attached to the vertical pivoting support action bar 257 keeps the vertical pivoting support 252 in the extended position. The vertical arm actuator fixation bar 287 fixated to the vertical pivoting support 252 puts the vertical arm actuator 284 in the extended position ensuring the proper alignment of the vertical arm actuator 284 (see FIG. 34).

In the extended position, the vertical gear support guide pin 268 is at the extremity of the vertical angle control guide track 226 adjusting the angle of the vertical gear support 260 so that the tapered teeth gear 214 is in full contact with the frustum shaped teeth 122 in the rack pole standard hinged rack A 139.

The vertical hinged rack actuator 313 is installed at the vertical gear support 260 and aligned perpendicularly to the rack pole standard hinged rack A 139. The hinged rack arm 317 is extended and the hinged rack arm stopper 319 is in contact with the vertical hinged rack actuator 313. The hinged rack arm hand actuator 320, the hinged rack hand 323, and the hinged rack hand rollers 328 are exactly below the hinged rack hold bar 144 of the rack pole standard hinged rack A 139.

As the hinged rack hand 323 is retracted and the hinged rack hand stopper 325 is further to the bottom the hinged rack hand rollers 328 are not in contact with the hinged rack hold bar 144 of the rack pole standard hinged rack A 139.

The vertical arm actuator 284 and the actuator arm 291 are aligned with the position of lock bar grabbing neck 159 and the lock bar knob 160. The actuator arm 291 is extended and the vertical actuator hand 303 is in a low position in the actuator hand 294 causing the vertical actuator hand grabbing tip 308 to engage the lock bar grabbing neck 159.

Detail FIG. 41C shows a third position with the tapered teeth gear 214 engaging the frustum shaped teeth 122 in the rack pole standard hinged rack A 139. The lock bar 154 is lifted and free to rotate around the rack pole top lock fixture 150*a* of the rack pole top cover 149. The hinged rack hand rollers 328 of the hinged rack hand 323 are in contact with both sides of the hinged rack hold bar 144 of the rack pole standard hinged rack A 139 and hold the rack pole standard hinged rack A 139 in place. The hinged rack internal lock fixture 141 and the hinged rack external lock fixture 142 of the rack pole standard hinged rack A 139 are not used.

The gear position control bar 212 attached to the vertical pivoting support action bar 257 keeps the vertical pivoting support 252 in the extended position. The vertical arm actuator fixation bar 287 fixated to the vertical pivoting support 252 puts the vertical arm actuator 284 to the extended position ensuring the proper alignment of the vertical arm actuator 284 (see FIG. 34).

In the extended position, the vertical gear support guide pin 268 is at the extremity of the vertical angle control guide track 226 adjusting the angle of the vertical gear support 260 so that the tapered teeth gear 214 is in full contact with the frustum shaped teeth 122 in the rack pole standard hinged rack A 139, with the tapered teeth 215 parallel to the rack pole standard hinged rack A 139.

The tapered teeth edge face 216 help the tapered teeth 215 to adjust to eventual minor variations in the frustum shaped teeth 122 individual positions when the tapered teeth gear 214 needs to slide horizontally against the rack pole standard hinged rack A 139 (see detail FIG. 41D).

The vertical hinged rack actuator 313 is installed at the vertical gear support 260 and aligned perpendicularly to the rack pole standard hinged rack A 139. The hinged rack arm 317 is extended and the hinged rack arm stopper 319 is in contact with the vertical hinged rack actuator 313.

The hinged rack arm hand actuator 320 is exactly below the hinged rack hold bar 144 and the hinged rack hand 323 is extended with the hinged rack hand stopper 325 in contact with the hinged rack arm hand actuator 320. The hinged rack hand rollers 328 in both sides of the hinged rack hand 323 are in contact with the hinged rack hold bar 144 holding the rack pole standard hinged rack A 139 in contact with the tapered teeth gear 214.

The vertical arm actuator 284 and the actuator arm 291 are aligned with the position of lock bar grabbing neck 159 and the lock bar knob 160. The actuator arm 291 is extended and the vertical actuator hand 303 is in a raised position in the actuator hand 294 causing the vertical actuator hand grabbing tip 308 engaged to the lock bar grabbing neck 159 to lift the lock bar knob 160 and the lock bar 154 until the tapered end 158 clears the hinged rack external lock fixture 142 of the rack pole standard hinged rack A 139.

To avoid losing the grip on the rack pole standard hinged rack A 139 the hinged rack hand 323 is extended before the vertical actuator hand 303 is raised.

The gear position control bar 212 attached to the vertical pivoting support action bar 257 then retracts and pulls the vertical pivoting support 252 to the parallel position. The vertical arm actuator fixation bar 287 fixated to the vertical pivoting support 252 pushes the vertical arm actuator 284 to the parallel position and the alignment of the vertical arm actuator 284 changes according to the profile of the vertical actuator angle control track 275 of the vertical actuator angle control guide 274 that is made to ensure that the movement of the vertical actuator hand grabbing tip 308 matches the lock bar grabbing neck 159 as the lock bar 154 rotates around the rack pole top lock fixture 150a of the rack pole top cover 149 (see FIG. 34).

At the same time, the vertical gear support guide pin 268 slides in the vertical angle control guide track 226 that has the profile needed to adjust the angle of the vertical gear support 260 so that the tapered teeth gear 214 remains in full contact with the frustum shaped teeth 122 in the rack pole standard hinged rack A 139, with the tapered teeth 215 parallel to the rack pole standard hinged rack A 139 at all times until the tapered teeth gear 214 reaches the parallel position.

Because the pivoting axis are different, the change in the positions of the rack pole standard hinged rack A 139 and the tapered teeth gear 214 requires a change in the relative position of the rack pole standard hinged rack A 139 and the tapered teeth gear 214. In case of a horizontally mounted tapered teeth gear 214 the tapered teeth gear 214 can just rotate. A vertically mounted tapered teeth gear 214 on the other hand has slide horizontally against the rack pole standard hinged rack A 139. The tapered teeth edge face 216 help the tapered teeth 215 to adjust to eventual minor variations in the frustum shaped teeth 122 individual positions throughout the length of the rack pole standard hinged rack A 139 where the slide takes place. As reference, the initial position of the tapered teeth gear 214 is a little to the right of the hinged rack internal lock fixture 141 (see detail FIG. 41D).

Detail FIG. 41D shows a fourth position with the rack pole standard hinged rack A 139 already moved to align with the rack pole standard hinged rack B 145. The lock bar 154 is lifted and free to rotate around the rack pole top lock fixture 150a of the rack pole top cover 149. The hinged rack hand rollers 328 of the hinged rack hand 323 are in contact with both sides of the hinged rack hold bar 144 of the rack pole standard hinged rack A 139 and hold the rack pole standard hinged rack A 139 in place. The hinged rack internal lock fixture 141 and the hinged rack external lock fixture 142 of the rack pole standard hinged rack A 139 are not used.

The vertical arm actuator fixation bar 287 fixated to the vertical pivoting support 252 puts the vertical arm actuator 284 in the parallel position and the alignment of the vertical arm actuator 284 is adjusted according to the profile of the vertical actuator angle control track 275 of the vertical actuator angle control guide 274 that ensures that at the parallel position, the position of the vertical actuator hand grabbing tip 308 matches the position of the hinged rack internal lock fixture 141 of the rack pole standard hinged rack A 139.

In the parallel position, the vertical gear support guide pin 268 sliding in the vertical angle control guide track 226 adjusts the angle of the vertical gear support 260 so that the tapered teeth gear 214 is in full contact with the frustum shaped teeth 122 in the rack pole standard hinged rack A 139.

The vertical hinged rack actuator 313 is installed at the vertical gear support 260 and aligned perpendicularly to the rack pole standard hinged rack A 139. The hinged rack arm 317 is extended and the hinged rack arm stopper 319 is in contact with the vertical hinged rack actuator 313.

The hinged rack arm hand actuator 320 is exactly below the hinged rack hold bar 144 and the hinged rack hand 323 is extended with the hinged rack hand stopper 325 in contact with hinged rack arm hand actuator 320. The hinged rack hand rollers 328 in both sides of the hinged rack hand 323 are in contact with the hinged rack hold bar 144 holding the rack pole standard hinged rack A 139 in contact with the tapered teeth gear 214.

The vertical arm actuator 284 and the actuator arm 291 are aligned with the position of lock bar grabbing neck 159 and the lock bar knob 160. The actuator arm 291 is extended and the vertical actuator hand 303 is in a high position in the actuator hand 294 causing the vertical actuator hand grabbing tip 308 engaged to the lock bar grabbing neck 159 to hold the lock bar 154 in a high position in such a way that the tapered end 158 aligns with and stay above the hinged rack internal lock fixture 141 of the rack pole standard hinged rack A 139.

As the tapered teeth gear 214 reaches the final position of the horizontal slide a little to the left of hinged rack external lock fixture 142 of the rack pole standard hinged rack A 139 the length of the horizontal slide during the pivoting of the rack pole standard hinged rack A 139 can be ascertained comparing the position of the tapered teeth gear 214 in Detail FIG. 41D with the position of the tapered teeth gear 214 in Detail FIG. 41C.

Detail FIG. 41E shows a fifth position with the rack pole standard hinged rack A 139 aligned with the rack pole standard hinged rack B 145. The lock bar 154 is firmly placed between the rack pole top lock fixture 150a of the rack pole top cover 149 and the hinged rack internal lock fixture 141 of the rack pole standard hinged rack A 139. The hinged rack external lock fixture 142 of the rack pole standard hinged rack A 139 is left unused.

The vertical arm actuator fixation bar 287 fixated to the vertical pivoting support 252 puts the vertical arm actuator 284 in the parallel position and the alignment of the vertical arm actuator 284 is adjusted according to the profile of the vertical actuator angle control track 275 of the vertical actuator angle control guide 274 that ensures that at the parallel position, the position of the vertical actuator hand grabbing tip 308 matches the position of the hinged rack internal lock fixture 141 of the rack pole standard hinged rack A 139.

In the parallel position, the vertical gear support guide pin 268 sliding in the vertical angle control guide track 226 adjusts the angle of the vertical gear support 260 so that the tapered teeth gear 214 is in full contact with the frustum shaped teeth 122 in the rack pole standard hinged rack A 139.

The vertical hinged rack actuator 313 is installed at the vertical gear support 260 and aligned perpendicularly to the rack pole standard hinged rack A 139. The hinged rack arm 317 is extended and the hinged rack arm hand actuator 320, the hinged rack hand 323, and the hinged rack hand rollers 328 are exactly below the hinged rack hold bar 144 of the rack pole standard hinged rack A 139.

As the hinged rack hand 323 has retracted, the hinged rack hand stopper 325 is located further to the bottom and the hinged rack hand rollers 328 are no longer in contact with the hinged rack hold bar 144 of the rack pole standard hinged rack A 139.

The vertical arm actuator 284 and the actuator arm 291 are aligned with the position of lock bar grabbing neck 159 and the lock bar knob 160. The actuator arm 291 is extended and the actuator hand 294 has lowered the position of the vertical actuator hand 303 causing the vertical actuator hand grabbing tip 308 engaged in the lock bar grabbing neck 159 to lower the lock bar knob 160 and the lock bar 154 so that the tapered end 158 fits into the hinged rack internal lock fixture 141 of the rack pole standard hinged rack A 139. The conical profile of the tapered end 158 helps to compensate for minor variations in the positioning and ensures a successful insertion of the lock bar 154 into the hinged rack internal lock fixture 141 of the rack pole standard hinged rack A 139.

To avoid losing the grip on the rack pole standard hinged rack A 139 the vertical actuator hand 303 is lowered before the hinged rack hand 323 is retracted.

Detail FIG. 41F shows a sixth position with the rack pole standard hinged rack A 139 aligned with the rack pole standard hinged rack B 145. The lock bar 154 is firmly placed between the rack pole top lock fixture 150a of the rack pole top cover 149 and the hinged rack internal lock fixture 141 of the rack pole standard hinged rack A 139. The hinged rack external lock fixture 142 of the rack pole standard hinged rack A 139 is left unused.

The vertical arm actuator fixation bar 287 fixated to the vertical pivoting support 252 puts the vertical arm actuator 284 in the parallel position and the alignment of the vertical arm actuator 284 is adjusted according to the profile of the vertical actuator angle control track 275 of the vertical actuator angle control guide 274 that ensures that at the parallel position, the position of the vertical actuator hand grabbing tip 308 matches the position of the hinged rack internal lock fixture 141 of the rack pole standard hinged rack A 139.

In the parallel position, the vertical gear support guide pin 268 sliding in the vertical angle control guide track 226 adjusts the angle of the vertical gear support 260 so that the tapered teeth gear 214a is in full contact with the frustum shaped teeth 122 in the rack pole standard hinged rack A 139.

The vertical hinged rack actuator 313 is installed at the vertical gear support 260 and aligned perpendicularly to the rack pole standard hinged rack A 139. The hinged rack arm 317 is retracted and hinged rack arm hand actuator 320, the hinged rack hand 323, and the hinged rack hand rollers 328 remain at a distance, not engaging the hinged rack hold bar 144 of the rack pole standard hinged rack A 139 and clear of other structures.

The hinged rack hand 323 is retracted and the hinged rack hand stopper 325 is further to the bottom keeping the hinged rack hand rollers 328 below the hinged rack hold bar 144.

The vertical arm actuator 284 and the actuator arm 291 are aligned with the position of lock bar grabbing neck 159 and the lock bar knob 160. As the actuator arm 291 retracts, the vertical actuator hand grabbing tip 308 disengages the lock bar grabbing neck 159 and moves back and stays clear of other structures. The vertical actuator hand 303 is in a low position in the actuator hand 294 and the vertical actuator hand grabbing tip 308 remains at the same level of the lock bar grabbing neck 159.

The tapered teeth gear 214b remains stationary at the same position throughout the process of pivoting the rack pole standard hinged rack A 139. Once the process of pivoting the rack pole standard hinged rack A 139 is complete, the tapered teeth gear 214b is able to rotate to propel the autonomous mobile lift robot case 330 horizontally. The tapered teeth gear 214a perpendicularly mounted to the tapered teeth gear 214b does not rotate but slides along the rack pole standard hinged rack A 139 and the rack pole standard hinged rack B 145. As the tapered teeth gear 214a slides, the engaged teeth function as guides to keep the autonomous mobile lift robot case 330 at the desired level.

FIG. 42 shows the autonomous mobile lift robot 349 at the first level of the access shaft 174 positioned to retrieve the pallet 102b stored in the first level exactly above the pallet 102a that is on the ground level.

The single rack piece 120, the rack pole standard hinged rack A 139a, and the rack pole standard hinged rack B 145a installed at the rack pole 130a and the rack pole standard hinged rack A 139b, and the rack pole standard hinged rack B 145b installed at the rack pole 130b are all aligned and form a single seamless rack. The same occurs at the other side of the access shaft 174 allowing the autonomous mobile lift robot 349 to leave the center of the access shaft 174 and move to the retrieving position below the pallet 102b.

Detail FIG. 42A shows the autonomous mobile lift robot 349 under the pallet 102b that is still resting on the shelf 161. The storage gap 350 between the pallet 102a and the pallet 102b provides sufficient space for the autonomous mobile lift robot 349 to fit in and the single rack piece 120, the and the single rack piece 120, the rack pole standard hinged rack B 145a and the rack pole standard hinged rack A 139a provide a continuous rack that supports the autonomous mobile lift robot 349.

FIG. 43 shows the autonomous mobile lift robot 349 with the pantographic lift platform 178 raised at the first level of the access shaft 174 retrieving the pallet 102b stored in the first level exactly above the pallet 102a that is on the ground level.

The single rack piece 120, the rack pole standard hinged rack A 139, and the rack pole standard hinged rack B 145 are all aligned and form a single seamless rack.

Detail FIG. 43A shows the autonomous mobile lift robot 349 with the pantographic lift platform 178 raised and supporting the pallet 102b that is no longer resting on the shelf 161. The storage gap 350 between the pallet 102a and the pallet 102b provides sufficient space for the autonomous mobile lift robot 349 to fit in and the single rack piece 120, the rack pole standard hinged rack B 145 and the rack pole standard hinged rack A 139 provide a continuous rack that supports the autonomous mobile lift robot 349.

FIG. 44 shows the autonomous mobile lift robot 349 with the pantographic lift platform 178 raised and carrying the pallet 102b that was retrieved from the shelf 161 on the first level. The shelf access channel 163 provides the path to allow the raised pantographic lift platform 178 to pass and remove the pallet 102b from the shelf 161.

The rack pole standard hinged rack A 139 and the rack pole standard hinged rack B 145 are aligned and form a single seamless rack that supports the autonomous mobile lift robot 349 as it moves back to the center of the access shaft 174.

Detail FIG. 44A shows the autonomous mobile lift robot 349 with the pantographic lift platform 178 raised and supporting the pallet 102*b* that is no longer above the pallet 102*a*. The rack pole standard hinged rack A 139 and the rack pole standard hinged rack B 145 are aligned and form a single seamless rack that supports the autonomous mobile lift robot 349 as it moves back to the center of the access shaft 174.

FIG. 45 shows one loaded autonomous mobile lift robot 351 configured with one half size pallet 352 loaded on top of the autonomous mobile lift robot 349 with the pantographic lift platform 178 raised and the tapered teeth gears 214*a*, and 214*b* in the front face and the corresponding tapered teeth gears 214*e*, and 214*f* on the opposite face on the back in the parallel position and the tapered teeth gears 214*g*, and 214*h* in the right face and the corresponding tapered teeth gears 214*c*, and 214*d* in the left face in the retracted position.

FIG. 46 is an embodiment of a fast loading truck 353 of the present invention used for hauling pallets. The fast loading truck 353 has the flatbed chassis 354 a standard cargo bay 355 with a right door 356 and left door 357 providing access to the cargo bay 355.

FIG. 47 shows the right door 356 and the left door 357 open showing a door rack 359 and a cargo bay side rack 361 installed at the right door 356. The standard cargo bay 355 has a cargo bay center division 358 with a cargo bay center rack 360 installed on both sides of the cargo bay center division 358. The cargo bay center division 358 has a middle division 362 split by a middle division rack 363 with lower shelves 364 and upper shelves 365.

FIG. 48 shows the fast loading truck 353 with the flatbed chassis 354 and the standard cargo bay 355 with the right door 356, the left door 357, and the middle division 362 open parked at one truck loading bay 367.

The right door lock bars 368*a* and 368*b* are installed between the right door 356 and the middle division 362 and the left door lock bars 369*a* and 369*b* are installed between the left door 357 and the middle division 362. The right door 356, the left door 357, and the middle division 362 are kept parallel to each other and at a fixed distance to each other.

With the middle division 362 open, the cargo bay center rack 360 installed on both sides of the cargo bay center division 358 and the middle division rack 363 installed on both sides of the middle division 362 form a continuous seamless rack.

Likewise, with the doors open, the cargo bay side rack 361 installed at the right side of the cargo bay 355 is aligned with the door rack 359 installed at the right door 356 and the mirror version of the cargo bay side rack 361 installed at the left side of the cargo bay 355 is aligned with the mirror version of the door rack 359 installed at the left door 357.

The portions of the lower shelves 364*a*, and 364*b* and the upper shelves 365*a*, 365*b* that are installed on both sides of the cargo bay center division 358 that are inside the cargo bay 355 have been drawn in dashed lines to enable the visualization of the access path 366*a*, 366*b*, 366*c*, and 366*d* in the middle of the lower shelves 364*a*, and 364*b* and the upper shelves 365*a*, 365*b* that runs all the way from the door to the front of the cargo bay 355 that allow loaded autonomous mobile lift robots 351 with their respective pantographic lift platforms 178 to pass through the lower shelves 364 and the upper shelves 365.

The truck loading bay 367 is at the same level of the truck floor 370 that runs all the way from the doors until the front of the cargo bay 355.

FIG. 49 shows the fast loading truck 353 being loaded with several loaded autonomous mobile lift robots 351*a*, through 351*x* that climb the rack structure on the right door 356, the left door 357, and the middle division 362 and continue into the rack structure in the cargo bay 355. The right door lock bars 368*a* and 368*b* and the left door lock bars 369*a* and 369*b* hold the right door 356, the left door 357, and the middle division 362 at the proper distance and keep the rack structure accessible to the loaded autonomous mobile lift robots.

The loaded autonomous mobile lift robots 351*a*, through 351*x* coming from the truck loading bay 367 climb the rack structure and move inside the cargo bay 355 in pairs one after the other at both sides of the middle division 362 and move forward towards the front of the cargo bay 355 to make space for the subsequent pair of loaded autonomous mobile lift robots. This strategy allows for the loading of the entire first level of the fast loading truck 353 in one step.

FIG. 49 shows the last loaded autonomous mobile lift robots 351*w*, and 351*x* about to start climbing the rack structure on the right door 356, the left door 357, and the middle division 362 while the other loaded autonomous mobile lift robots 351*a*, through 351*v* that are already inside the cargo bay 355 are moving towards the front of the cargo bay 355.

Once all the loaded autonomous mobile lift robots 351*a*, through 351*x* are inside the cargo bay 355, the loaded autonomous mobile lift robots 351*a*, through 351*x* lower their pantographic lift platforms 178 deposit their half size pallets 352 in the corresponding upper shelves 365*a* and the loaded autonomous mobile lift robots 351*a*, through 351*x* leave, with the last pair of loaded autonomous mobile lift robots 351*w*, and 351*x* that went in being the first pair to leave until all loaded autonomous mobile lift robots 351*a*, through 351*x* have left.

FIG. 50 shows the fast loading truck 353 with the loaded upper level 372 being loaded at the ground level with several loaded autonomous mobile lift robots 351*a*, through 351*d* that run from the truck loading bay 367 directly into the cargo bay 355 using the truck floor 370.

To avoid unnecessary clutter, only four loaded autonomous mobile lift robots 351*a*, through 351*d* have been drawn, but as seen in FIG. 49, the exact number of loaded autonomous mobile lift robots necessary to load the entire ground level of the fast loading truck 353 is used, entering the cargo bay 355 in pairs until they reach the front of the cargo bay 355, then lower their pantographic lift platforms 178 to deposit their half size pallets 352 in the corresponding lower shelves 364*a* and leave, with the last pair of loaded autonomous mobile lift robots that went in being the first pair to leave until all loaded autonomous mobile lift robots have left.

Alternatively, all or some of the loaded autonomous mobile lift robots 351 may remain on the fast loading truck 353 for deployment and delivery of each of the half size pallets 352. Through mapping and scheduling, the loaded autonomous mobile lift robots 351 may load the fast loading truck 353 in the proper order with each of the half size pallets 352 having the proper goods for delivery to each mapped location along the designated route of the fast loading truck 353. Depending on the height of the fast loading truck 353 and the height of the pallets, additional levels may be needed and the rack structure is made accordingly.

CONCLUSION

A new design for the storage of goods in a warehouse is described that enables goods to be stored more efficiently, with better usage of space, smaller number of parts and smaller number of different machines needed to manipulate the goods.

Furthermore, as the goods are stored in a more compact way and are more accessible, meaning that multiple machines can access different locations simultaneously than is possible in traditional designs, this translates in an increase in speed for manipulation of the goods.

The increase in storage efficiency, increase in manipulation speed, reduction of components and machines and reduction in maintenance costs translates into better returns for the companies operating and a competitive edge in an ever more competitive market.

DRAWINGS—REFERENCE NUMERALS

| N | Item Name | Shown in FIGS. |
|---|---|---|
| 100 | traditional warehouse | 1 2 |
| 101 | shelf structure | 1 2 |
| 102 | pallet | 1 2 9 10 15 16 17 20 21 40 42 42A 43 43A 44 44A |
| 103 | single row | 1 2 |
| 104 | back-to-back row | 1 2 |
| 105 | access row | 1 2 |
| 106 | base | 3 6 7 8 15 16 17 |
| 107 | guide pin | 3 4 4A |
| 108 | guide pin notch | 3 4 |
| 109 | base spacer | 3 7 7B 8 8B 15 16 17 |
| 110 | shelf insertion notch | 3 4 7A 7B |
| 111 | plain blank | 3 8A 15A |
| 112 | shelf blank | 3 8A |
| 113 | shelf stub | 3 8A |
| 114 | quarter blank | 3 8A 8B 15A |
| 115 | quarter stub | 3 8A 8B |
| 116 | plain pole | 3 15 16 17 |
| 117 | plain pole neck | 3 |
| 118 | pole horizontal rack plane | 3 4 4A |
| 119 | plain top spacer | 3 15 16 17 |
| 120 | single rack piece | 3 15 16 16A 17 19 19A 42 42A 43 43A |
| 121 | standard rack track | 3 |
| 122 | frustum shaped teeth | 3 3A 4 4A 15A 16A 17A 40A 41A 41B 41C 41D 41E 41F 48A |
| 123 | square base | 3 |
| 124 | square base insertion hole | 3 |
| 125 | double standard rack piece | 3 19 19A |
| 126 | quadruple standard rack piece | 3 19 19B |
| 127 | base rack spacer | 4 7 7A 8 8A 15 16 17 |
| 128 | shelf support | 4 7A |
| 129 | rack extension | 4 7A |
| 130 | rack pole | 4 4A 11 12 13 14 15 15A 16 16A 17 17A 38 39 40 40A 41 42 |
| 131 | hinge pin | 44A |
| 132 | rack pole neck | 4 4A |
| 133 | dovetail notch | 4 4A |
| 134 | rack pole neck cover | 4 12 15 16 17 |
| 135 | dovetail pin | 4 |
| 136 | rack pole short fixed rack | 4 |
| 137 | rack pole standard fixed rack | 4 13 14 19B |
| 138 | rack pole long fixed rack | 4 |
| 139 | rack pole standard hinged rack A | 4 11 12 13 14 15 15A 16 16A 17 17A 19A 19B 40A41 41A 41B 41C 41D 41E 41F 42 42A 43 43A 44 44A |
| 140 | hinge A | 411 |
| 141 | hinged rack internal lock fixture | 4 11 12 13 14 16A 17A 41A 41B 41C 41D 41E 41F |
| 142 | hinged rack external lock fixture | 4 11 12 13 14 15A 16A 17A 41A 41B 41C 41D 41E 41F |
| 143 | hinged rack lock hole | 4 |
| 144 | hinged rack hold bar | 4 41A 41B 41C 41D 41E 41F |
| 145 | rack pole standard hinged rack B | 4 11 12 13 14 15 15A 16 16A 17 17A 19A 19B 41 41D 41E 41F 42 42A 43 43A 44 44A |
| 146 | hinge B | 411 |
| 147 | rack pole short hinged rack A | 4 |
| 148 | rack pole short hinged rack B | 4 |
| 149 | rack pole top cover | 44A 11 12 13 14 15 15A 16 16A 17 17A 40A 41 41A 41B 41C 41D 41E 41F |
| 150 | rack pole top lock fixture | 44A 11 12 13 14 41A 41B 41C 41D 41E 41F |
| 151 | rack pole top lock hole | 4 4A |
| 152 | rack pole base | 4A |
| 153 | hinge pin hole | 4A |

-continued

| N | Item Name | Shown in FIGS. |
|---|---|---|
| 154 | lock bar | 44A 11 12 13 14 15A 16A 17A 41A 41B 41C 41D 41E 41F |
| 155 | horizontal bar | 4A |
| 156 | centered vertical bar | 4A |
| 157 | pivoting vertical bar | 4A |
| 158 | tapered end | 4A 41C 41D 41E 41F |
| 159 | lock bar grabbing neck | 4A 41A 41B 41C 41F |
| 160 | lock bar knob | 4A 41A 41B 41C 41D 41E 41F |
| 161 | shelf | 5 8 9 10 15 15A 16 16A 17 17A 18 38 39 42A 43 A44 |
| 162 | shelf base | 5 8B |
| 163 | shelf access channel | 5 8 43A 44 |
| 164 | rim reinforcement | 5 |
| 165 | shelf neck | 5 8A |
| 166 | shelf fixation pin | 5 8A 8B |
| 167 | longer shelf | 5 |
| 168 | longer shelf base | 5 |
| 169 | longer shelf access channel | 5 |
| 170 | wider shelf | 5 |
| 171 | wider shelf base | 5 |
| 172 | wider shelf access channel | 5 |
| 173 | warehouse being assembled | 6 7 8 9 10 |
| 174 | access shaft | 7 8 10 15 16 17 18 19 21 38 39 40 42 43 44 44A |
| 175 | two level nine cell warehouse | 18 |
| 176 | warehouse structure | 18 19 20 |
| 177 | four level nine cell warehouse | 20 21 |
| 178 | pantographic lift platform | 22 31 32 43 43A 44 44A 45 |
| 179 | platform fixed axis hole | 22 32 |
| 180 | platform moving axis slot | 22 31 32 |
| 181 | pantographic bar | 22 31 32 |
| 182 | outer axis hole | 22 |
| 183 | center axis hole | 22 |
| 184 | top axis | 22 31 32 |
| 185 | center axis | 22 31 32 |
| 186 | bottom fixed axis | 22 32 |
| 187 | bottom moving axis | 22 32 |
| 188 | bottom moving axis nut | 22 32 |
| 189 | pantographic engine | 22 32 |
| 190 | pantographic engine axis | 22 |
| 191 | wheel assembly | 23 |
| 192 | wheel | 23 31 35 37 45 |
| 193 | wheel axis | 23 |
| 194 | wheel driving bevel | 23 37 |
| 195 | wheel support | 23 37 |
| 196 | wheel support axis hole | 23 |
| 197 | wheel directional gear | 23 35 37 |
| 198 | wheel directional gear center passage | 23 |
| 199 | wheel directional worm | 23 37 |
| 200 | wheel directional engine | 23 37 |
| 201 | wheel directional engine shaft | 23 |
| 202 | wheel driving engine | 23 35 37 |
| 203 | wheel driving axle | 23 37 |
| 204 | control disk | 24 33 34 35 36 37 |
| 205 | control disk central axis | 24 |
| 206 | weight reduction cut | 24 |
| 207 | control disk beveled teeth | 24 |
| 208 | control disk attachment pin | 24 33 34 |
| 209 | control disk actuator beveled gear | 24 33 34 37 24 33 34 35 |
| 210 | actuator beveled gear driving engine | 36 37 |
| 211 | actuator beveled gear driving engine shaft | 24 |
| 212 | gear position control bar | 24 33 34 35 36 37 41A 41B 41C |
| 213 | gear position control bar attachment hole | 24 |
| 214 | tapered teeth gear | 24 31 33 35 36 3739 40A 41 41A 41B 41C 41D 41E 41F 45 |
| 215 | tapered teeth | 24A 41C |
| 216 | tapered teeth edge face | 24A 41C |
| 217 | horizontal gear driving engine | 24 33 35 37 |
| 218 | horizontal gear driving pulley | 24 33 35 37 |
| 219 | horizontal gear driving belt | 24 33 35 37 |
| 220 | vertical gear driving engine | 24 33 35 37 |
| 221 | vertical gear driving bevel | 24 33 35 37 |
| 222 | horizontal angle control guide | 25 33 35 37 |
| 223 | horizontal angle control guide track | 25 33 35 |
| 224 | horizontal angle control guide fixation hole | 25 |
| 225 | vertical angle control guide | 25 33 35 37 |

-continued

| N | Item Name | Shown in FIGS. |
|---|---|---|
| 226 | vertical angle control guide track | 25 33 35 41A 41B 41C |
| 227 | vertical angle control guide fixation hole | 25 |
| 228 | vertical angle control support | 25 33 35 37 |
| 229 | vertical angle control support raised platform | 25 |
| 230 | vertical angle control support angle control guide fixation hole | 25 |
| 231 | vertical angle control support fixation hole | 25 |
| 232 | horizontal pivoting support | 25 31 33 34 35 36 37 |
| 233 | horizontal pivoting support top bar | 25 |
| 234 | horizontal pivoting support bottom bar | 25 |
| 235 | horizontal pivoting support main axis | 25 |
| 236 | horizontal pivoting support notch | 25 33 |
| 237 | horizontal pivoting support gear support axis | 25 34 |
| 238 | horizontal pivoting support action bar | 25 33 34 |
| 239 | horizontal pivoting support top bar extension | 25 |
| 240 | horizontal pivoting support actuator reference hole | 25 33 |
| 241 | horizontal gear support | 25 33 35 37 |
| 242 | horizontal gear support top plate | 25 |
| 243 | horizontal gear support bottom plate | 25 |
| 244 | horizontal gear support axis | 25 |
| 245 | horizontal gear support engine support | 25 |
| 246 | horizontal gear support gear shaft hole | 25 |
| 247 | horizontal gear support actuator insertion hole | 25 |
| 248 | horizontal gear support guide bar | 25 33 |
| 249 | horizontal gear support guide pin | 25 33 |
| 250 | horizontal gear support guide knob | 25 |
| 251 | horizontal gear shaft | 25 |
| 252 | vertical pivoting support | 25 3133 34 35 36 37 41A 41B 41C 41D 41E 41F |
| 253 | vertical pivoting support top bar | 25 |
| 254 | vertical pivoting support bottom bar | 25 |
| 255 | vertical pivoting support main axis | 25 |
| 256 | vertical pivoting support gear support axis | 25 34 |
| 257 | vertical pivoting support action bar | 25 33 34 41A 41B 41C |
| 258 | vertical pivoting support top bar extension | 25 |
| 259 | vertical pivoting support actuator reference hole | 25 33 |
| 260 | vertical gear support | 25 33 35 37 41A 41B 41C |
| 261 | vertical gear support left plate | 25 |
| 262 | vertical gear support right plate | 25 |
| 263 | vertical gear support axis | 25 |
| 264 | vertical gear support engine support | 25 |
| 265 | vertical gear support gear shaft hole | 25 |
| 266 | vertical gear support actuator insertion hole | 25 |
| 267 | vertical gear support guide bar | 25 33 |
| 268 | vertical gear support guide pin | 25 33 41A 41B 41C |
| 269 | vertical gear support guide knob | 25 |
| 270 | vertical gear shaft | 25 |
| 271 | horizontal actuator angle control guide | 26 34 35 36 37 |
| 272 | horizontal actuator angle control track | 26 34 35 36 37 |
| 273 | horizontal actuator angle control guide fixation hole | 26 |
| 274 | vertical actuator angle control guide | 26 34 35 36 37 |
| 275 | vertical actuator angle control track | 26 34 35 36 37 |
| 276 | vertical actuator angle control guide fixation hole | 26 |
| 277 | horizontal arm actuator | 26 34 35 36 37 |
| 278 | horizontal arm actuator center hole | 26 |
| 279 | horizontal arm actuator center hole key | 26 |
| 280 | horizontal arm actuator fixation bar | 26 34 37 |
| 281 | horizontal arm actuator fixation pin | 26 |
| 282 | horizontal arm actuator sliding bar | 26 34 |
| 283 | horizontal arm actuator sliding knob | 26 34 35 36 37 |
| 284 | vertical arm actuator | 2634 35 3637 41A 41B 41C 41D 41E 41F |
| 285 | vertical arm actuator center hole | 26 |
| 286 | vertical arm actuator center hole key | 26 |
| 287 | vertical arm actuator fixation bar | 2634 37 41A 41B 41C 41D 41E 41F |
| 288 | vertical arm actuator fixation pin | 26 |
| 289 | vertical arm actuator sliding bar | 26 34 |
| 290 | vertical arm actuator sliding knob | 26 34 35 36 37 |
| 291 | actuator arm | 2634 35 3637 41A 41B 41C 41D 41E 41F |
| 292 | actuator arm key | 26 26A |
| 293 | actuator arm stopper | 26 |

-continued

| N | Item Name | Shown in FIGS. |
|---|---|---|
| 294 | actuator hand | 26 26A 34 41A 41B 41C 41D 41E 41F |
| 295 | actuator hand center hole | 26A |
| 296 | actuator hand center hole key | 26A |
| 297 | horizontal actuator hand | 26 35 36 37 |
| 298 | horizontal actuator hand key | 26 |
| 299 | horizontal actuator stopper | 26 |
| 300 | horizontal actuator hand top | 26 |
| 301 | horizontal actuator hand finger | 26 34 |
| 302 | horizontal actuator hand grabbing tip | 26 34 |
| 303 | vertical actuator hand | 26 35 3637 41A 41B 41C 41D 41E 41F |
| 304 | vertical actuator hand key | 26 |
| 305 | vertical actuator stopper | 26 |
| 306 | vertical actuator hand top | 26 |
| 307 | vertical actuator hand finger | 26 34 |
| 308 | vertical actuator hand grabbing tip | 26 34 41A 41B 41C 41D 41E 41F |
| 309 | horizontal hinged rack actuator | 26 33 |
| 310 | horizontal hinged rack actuator attachment bar | 26 |
| 311 | horizontal hinged rack actuator center hole | 26 |
| 312 | horizontal hinged rack actuator center hole key | 26 |
| 313 | vertical hinged rack actuator | 26 33 41A 41B 41C 41D 41E 41F |
| 314 | vertical hinged rack actuator attachment bar | 26 |
| 315 | vertical hinged rack actuator center hole | 26 |
| 316 | vertical hinged rack actuator center hole key | 26 |
| 317 | hinged rack arm | 2633 41A 41B 41C 41D 41E 41F |
| 318 | hinged rack arm key | 26 |
| 319 | hinged rack arm stopper | 26 41A 41B 41C |
| 320 | hinged rack arm hand actuator | 26 41A 41B 41C 41D 41E 41F |
| 321 | hinged rack arm hand actuator center hole | 26 |
| 322 | hinged rack arm hand actuator center hole key | 26 |
| 323 | hinged rack hand | 26 33 41A 41B 41C 41D 41E 41F |
| 324 | hinged rack hand key | 26 |
| 325 | hinged rack hand stopper | 26 41A 41B 41C 41D 41E 41F |
| 326 | hinged rack hand base | 26 |
| 327 | hinged rack hand finger | 26 |
| 328 | hinged rack hand roller | 26 41A 41B 41C 41D 41E |
| 329 | hinged rack hand roller center hole | 26 |
| 330 | autonomous mobile lift robot case | 27 28 29 31 32 35 36 37 |
| 331 | opening A | 27 28 31 32 |
| 332 | opening B | 27 28 31 32 |
| 333 | separation bar | 27 28 31 32 |
| 334 | pivoting axis | 27 28 29 31 32 33 34 35 36 37 |
| 335 | directional engine support | 27 28 29 32 |
| 336 | wheel engine support | 27 28 29 32 |
| 337 | wheel assembly support | 27 28 29 32 |
| 338 | wheel driving axis passage hole | 27 29 34 |
| 339 | extension engine support | 27 28 29 32 |
| 340 | wheel opening | 27 29 32 |
| 341 | bottom fixation holes | 27 29 32 |
| 342 | top fixation holes | 27 29 32 |
| 343 | pantographic fixed axis hole | 27 32 |
| 344 | pantographic moving axis slot | 27 32 |
| 345 | pantographic engine niche | 27 29 |
| 346 | case central axis | 27 28 29 |
| 347 | bottom lid | 30 |
| 348 | bottom lid wheel opening | 30 |
| 349 | autonomous mobile lift robot | 31 35 36 37 38 39 40 41 42 42A 43 43A 44 44A 45 |
| 350 | storage gap | 42A 43A |
| 351 | loaded autonomous mobile lift robot | 45 49 50 |
| 352 | half size pallet | 45 |
| 353 | fast loading truck | 46 47 48 49 50 |
| 354 | flatbed chassis | 46 47 48 |
| 355 | cargo bay | 46 47 48 |
| 356 | right door | 46 47 48 49 |
| 357 | left door | 46 47 48 49 |
| 358 | cargo bay center division | 47 48 |
| 359 | door rack | 47 48 |
| 360 | cargo bay center rack | 47 48 48A |
| 361 | cargo bay side rack | 47 48 48A |
| 362 | middle division | 47 48 48A 49 |
| 363 | middle division rack | 47 48 48A |
| 364 | lower shelves | 47 48 49 50 |
| 365 | upper shelves | 47 48 48A 49 |

| N | Item Name | Shown in FIGS. |
|---|---|---|
| 366 | access path | 48 50 |
| 367 | truck loading bay | 48 49 50 |
| 368 | right door lock bar | 48 49 |
| 369 | left door lock bar | 48 48A 49 |
| 370 | truck floor | 48 50 |
| 371 | rack interface | 49 |
| 372 | loaded upper level | 50 |

What is claimed is:

1. An advanced warehouse and logistic system, comprising:
   a rack lattice having a plurality of hinged racks configured to set the geometry of the rack lattice;
   an autonomous mobile lift robot having a plurality of driving trains, the autonomous mobile lift robot configured to be movable along the rack lattice in an up, down, left, and right direction depending on the geometry of the rack lattice;
   an internal lock fixture configured to lock the hinged rack in a first position to set the geometry of the rack lattice for movement of the autonomous mobile lift robot in a first direction;
   an external lock fixture configured to lock the hinged rack in a second position to set the geometry of the rack lattice for movement of the autonomous mobile lift robot in a second direction;
   a lock bar configured to set the hinged rack in either the first position or the second position;
   an actuator arm configured to move the lock bar from the first position to the second position to set the geometry of the rack lattice; and
   wherein the geometry of the rack lattice sets the direction of movement of the autonomous mobile lift robot.

2. The advanced warehouse and logistic system of claim 1 wherein the rack lattice comprising a plurality of rack poles, each rack pole having frustum shaped teeth, the rack pole configured to support one or more components of the rack lattice.

3. The advanced warehouse and logistic system of claim 2 wherein each rack pole having a hinge pin configured to support and pivot one of the plurality of hinged racks.

4. The advanced warehouse and logistic system of claim 2 wherein each rack pole having at least one dovetail notch configured for the attachment of a fixed rack having a dovetail pin.

5. The advanced warehouse and logistic system of claim 1 wherein each of the plurality of hinged racks of the rack lattice having a hinge and frustum shaped teeth.

6. The advanced warehouse and logistic system of claim 1 wherein the rack lattice comprising a rack pole top cover having a lock fixture configured to support the lock bar.

7. The advanced warehouse and logistic system of claim 1 wherein the rack lattice comprising a plurality of plain poles configured to support one or more of a plurality of non-hinged racks.

8. The advanced warehouse and logistic system of claim 1 comprising a truck having a rack lattice system installed to configure the truck for fast loading using a plurality of autonomous mobile lift robots.

9. The advanced warehouse and logistic system of claim 1 wherein the autonomous mobile lift robot comprising wheels configured to move and maneuver the autonomous mobile lift robot in any direction outside of the rack lattice system.

10. The advanced warehouse and logistic system of claim 1 wherein the autonomous mobile lift robot comprising electronics to establish connection to one or more digital devices for communication to have the one or more digital devices control the operation and movement of the autonomous mobile lift robot.

11. The advanced warehouse and logistic system of claim 1 wherein the autonomous mobile lift robot comprising electronics to establish connection to one or more digital devices for communication to have the one or more digital devices schedule the operations of the autonomous mobile lift robot using one or more software applications.

12. The advanced warehouse and logistic system of claim 1 wherein the autonomous mobile lift robot comprising electronics to establish connection to one or more digital devices for communication to have the one or more software applications map the locations for delivery and schedule the loading of pallets using the autonomous mobile lift robot in the proper order to have the proper goods of each pallet be delivered along a designated route to the proper location.

13. The advanced warehouse and logistic system of claim 1 wherein the autonomous mobile lift robot comprising:
   a plurality of control disks;
   at least one driving engine configured to drive one or more of the plurality of control disks; and
   wherein the control disks configured to move the actuator arm that is configured to move the lock bar from the first position to the second position to move a hinged rack to set the geometry of the rack lattice.

14. An advanced warehouse and logistic system comprising:
   a rack lattice having a plurality of hinged racks configured to set the geometry of the rack lattice;
   an autonomous mobile lift robot having a plurality of driving trains, the autonomous mobile lift robot configured to be movable along the rack lattice in an up, down, left, and right direction depending on the geometry of the rack lattice;
   a plurality of base rack spacers having frustum shaped teeth, a shelf insertion notch, a shelf support, and a rack extension, and wherein the base rack spacer configured to support components of the rack lattice.

15. The advanced warehouse and logistic system of claim 14 wherein the rack lattice comprising a plurality of shelves.

16. The advanced warehouse and logistic system of claim 15 wherein the rack lattice comprising a plurality of shelves having a shelf neck and shelf fixation pin configured for insertion in the shelf insertion notch.

17. The advanced warehouse and logistic system of claim 14 wherein the rack lattice comprising a shelf blank having a shelf stub, the shelf blank with shelf stub configured to fill space corresponding to a shelf not installed.

18. The advanced warehouse and logistic system of claim 14 wherein the rack lattice comprising access shafts configured to provide for the autonomous mobile lift robot to reach any storage location without blocking the entire shaft.

19. The advanced warehouse and logistic system of claim 14 wherein the autonomous mobile lift robot comprising a pantographic lift, the pantographic lift configured to raise a pallet for transport using the autonomous mobile lift robot and lower a pallet to a shelf.

20. An advanced warehouse and logistic system comprising:
- a rack lattice having a plurality of hinged racks configured to set the geometry of the rack lattice;
- an autonomous mobile lift robot having a plurality of driving trains, the autonomous mobile lift robot configured to be movable along the rack lattice in an up, down, left, and right direction depending on the geometry of the rack lattice;
- at least one first gear having tapered teeth, the first gear configured to move the autonomous mobile lift robot in a vertical direction along the frustum shaped teeth of the rack lattice;
- at least one second gear having tapered teeth mounted perpendicularly to the first gear, the second gear configured to move the autonomous mobile lift robot in a horizontal direction along the frustum shaped teeth of the rack lattice;
- a control guide track configured to adjust the angle of the tapered teeth to have the tapered teeth adjust and align within the frustum shaped teeth providing the traction necessary to move the square autonomous mobile lift robot case along the frustum shaped teeth of the rack lattice.

* * * * *